(12) United States Patent
Alexander

(10) Patent No.: US 10,395,193 B2
(45) Date of Patent: *Aug. 27, 2019

(54) RELEVANCE MANAGEMENT SYSTEM

(71) Applicant: Mike Alexander, Charlottesville, VA (US)

(72) Inventor: Mike Alexander, Charlottesville, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/247,163

(22) Filed: Jan. 14, 2019

(65) Prior Publication Data

US 2019/0147388 A1    May 16, 2019

Related U.S. Application Data

(63) Continuation of application No. 15/203,841, filed on Jul. 7, 2016, now Pat. No. 10,089,585.

(51) Int. Cl.
| | |
|---|---|
| *G06K 9/00* | (2006.01) |
| *G06K 9/62* | (2006.01) |
| *G06Q 10/06* | (2012.01) |
| *G06Q 10/10* | (2012.01) |

(52) U.S. Cl.
CPC .  *G06Q 10/063112* (2013.01); *G06K 9/00463* (2013.01); *G06K 9/00483* (2013.01); *G06K 9/6202* (2013.01); *G06K 9/6215* (2013.01); *G06Q 10/06398* (2013.01); *G06Q 10/103* (2013.01)

(58) Field of Classification Search
CPC ................. G06Q 10/063112; G06Q 10/06398
USPC ....................................................... 705/7.14
See application file for complete search history.

(56) References Cited

U.S. PATENT DOCUMENTS

| | | | |
|---|---|---|---|
| 5,164,897 | A | 11/1992 | Clark et al. |
| 5,642,502 | A | 6/1997 | Driscoll |
| 5,758,324 | A | 5/1998 | Hartman et al. |

(Continued)

FOREIGN PATENT DOCUMENTS

| | | | | |
|---|---|---|---|---|
| CA | 2639656 A1 | * | 3/2010 | ............. G06Q 10/10 |
| CA | 2680960 A1 | * | 3/2010 | ............. G06Q 10/10 |

(Continued)

OTHER PUBLICATIONS

Authors: Sujoy Basu, Sven Graupner, Kivanc Ozonai, Sharad Singhal, Donald Young Title of the Article: "Service Selection in Business Service Ecosystem" Title of the Item: Service-Oriented Computing— ICSOC 2008 Workshops Date: Copyright 2009 pp. 256-269.

(Continued)

*Primary Examiner* — John Villecco

(57) ABSTRACT

A relevance management system for managing relevance of a plurality of request for proposal (RFP) documents with respect to a plurality of project description (PD) documents; receiving a PD document; creating a PD-document decomposition by decomposing the PD document into PD segments; determining an RFP-document-to-PD-segment relevance for an RFP document from the plurality of RFP documents and the PD segments using document similarity processing and a metric; aggregating the RFP-document-to-PD-segment relevance by the PD-document decomposition to produce an RFP-to-PD relevance; and transmitting the RFP-to-PD relevance to an originator of the PD document.

20 Claims, 114 Drawing Sheets

(56) References Cited

U.S. PATENT DOCUMENTS

| | | | |
|---|---|---|---|
| 5,832,497 A | 11/1998 | Taylor | |
| 5,978,768 A | 11/1999 | McGovern et al. | |
| 6,256,622 B1 | 7/2001 | Howard, Jr. et al. | |
| 6,266,659 B1 | 7/2001 | Nadkarni | |
| 6,598,045 B2 | 7/2003 | Light et al. | |
| 6,647,374 B2 | 11/2003 | Kansal | |
| 6,871,181 B2 | 3/2005 | Kansal | |
| 6,874,002 B1 | 3/2005 | Peleus et al. | |
| 7,130,802 B1* | 10/2006 | Mehregany | G06Q 10/06 705/7.14 |
| 7,219,066 B2 | 5/2007 | Parks et al. | |
| 7,457,764 B1 | 11/2008 | Bullock et al. | |
| 7,506,001 B2 | 3/2009 | Johnson et al. | |
| 7,555,441 B2 | 6/2009 | Crow et al. | |
| 7,620,566 B2 | 11/2009 | Tenorio | |
| 7,650,286 B1 | 1/2010 | Obeid | |
| 7,689,559 B2 | 3/2010 | Canright et al. | |
| 7,711,573 B1 | 5/2010 | Obeid | |
| 7,765,220 B2 | 7/2010 | Bernhardt | |
| 7,844,595 B2 | 11/2010 | Canright et al. | |
| 7,996,441 B2 | 8/2011 | Johnson et al. | |
| 8,086,501 B2 | 12/2011 | Rao | |
| 8,117,024 B2 | 2/2012 | Dane | |
| 8,137,107 B2 | 3/2012 | Bantz et al. | |
| 8,156,051 B1 | 4/2012 | Shah et al. | |
| 8,185,536 B2 | 5/2012 | Basu et al. | |
| 8,200,527 B1* | 6/2012 | Thompson | G06Q 10/0639 705/7.39 |
| 8,615,533 B2 | 12/2013 | Johnson et al. | |
| 9,697,492 B1* | 7/2017 | Birnbaum | G06Q 10/06398 |
| 9,977,773 B1* | 5/2018 | Birnbaum | G06Q 10/06398 |
| 10,229,374 B2* | 3/2019 | Alexander | G06K 9/6215 |
| 2001/0042000 A1 | 11/2001 | Defoor | |
| 2001/0051913 A1 | 12/2001 | Vashistha et al. | |
| 2003/0097296 A1 | 5/2003 | Putt | |
| 2007/0124231 A1* | 5/2007 | Ristock | G06Q 30/08 705/37 |
| 2007/0203713 A1 | 8/2007 | Habichler et al. | |
| 2008/0167935 A1* | 7/2008 | Lopez | G06Q 10/06 705/7.14 |
| 2009/0076928 A1* | 3/2009 | Hjertonsson | G06Q 30/02 705/26.1 |
| 2011/0054968 A1* | 3/2011 | Galaviz | G06Q 10/06 705/7.28 |
| 2011/0307347 A1* | 12/2011 | Jentsch | G06Q 10/00 705/26.4 |
| 2012/0041769 A1* | 2/2012 | Dalal | G06Q 10/101 705/1.1 |
| 2012/0072252 A1 | 3/2012 | Deegan et al. | |
| 2013/0124243 A1 | 5/2013 | Johnson et al. | |
| 2013/0124244 A1 | 5/2013 | Johnson et al. | |
| 2013/0339101 A1* | 12/2013 | Riley | G06Q 10/0637 705/7.36 |
| 2013/0339102 A1* | 12/2013 | Riley | G06Q 30/06 705/7.36 |
| 2016/0098802 A1* | 4/2016 | Bruffey | G06Q 40/08 705/4 |
| 2017/0169459 A1* | 6/2017 | Bruffey | G06Q 30/0234 |
| 2017/0270456 A1* | 9/2017 | Branagh | G06Q 10/063112 |
| 2018/0082240 A1* | 3/2018 | Meyerzon | G06Q 10/063112 |
| 2018/0096280 A1* | 4/2018 | Chee | G06Q 10/063112 |
| 2018/0143975 A1* | 5/2018 | Casal | G06F 17/2785 |
| 2018/0174106 A1* | 6/2018 | Kenthapadi | G06Q 10/1053 |
| 2018/0268342 A1* | 9/2018 | Duncan | G06Q 10/06398 |
| 2019/0005436 A1* | 1/2019 | Alexander | G06K 9/6215 |

FOREIGN PATENT DOCUMENTS

| | | |
|---|---|---|
| EP | 1054333 A2 | 11/2000 |
| EP | 1054333 A3 | 3/2004 |

OTHER PUBLICATIONS

Authors: Virendrakumar G. Bhavsar, Harold Boley, and Lu Yang Title of the Article: "A Weighted-Tree Similarity Algorithm for Multi-Agent Systems in E-Business Environments" Title of the Item: Computational Intelligence Date: Nov. 2004 pp. 584-602.

Authors: Harold Boley, Virendrakumar C. Bhavsar, David Hirtle, Anurag Singh, Zhongwei Sun, and Lu Yang Title of the Article: "A Match-Making System for Learners and Learning Objects" Title of the Item: The International Journal of Interactive Technology and Smart Education Date: Aug. 2005.

Authors: Lu Yang, Marcel Ball, Harold Boley, and Virendrakumar C. Bhavsar Title of the Article: "Weighted Partonomy-Taxonomy Trees with Local Similarity Measures for Semantic Buyer-Seller Match-Making" Title of the Item: Journal of Business and Technology Date: Oct. 2005.

Author: Gerard H. Fisher Title of the Article: "Model-Based Proposal Development" Title of the Item: INCOSE International Symposium (Proceedings) Date: Jul. 1998 pp. 421-428.

Author: William Arms Title of the Article: "Lecture 2—Searching Full Text 2" Title of the Item: CS 430 / INFO 430: Information Retrieval (http://www.cs.cornell.edu/Courses/cs430/2007fa/) Date: Fall 2007 pp. Slide 8-10.

Author: Mausam Title of the Article: Lecture on "Document Similarity in Information Retrieval" Title of the Item: CSE 573—Artificial Intelligence (https://courses.cs.washington.edu/courses/cse573/12sp/) Date: Spring 2012 pp. Slides 1-60, in particular Slides 9-11.

* cited by examiner

| META DATA | | PROJECT DESCRIPTOR | | ORGANIZATION OF DATA | | |
|---|---|---|---|---|---|---|
| | | | | HIERARCHICAL | | RANGE-BASED |
| LEVEL 1 | LEVEL 2 | LEVEL 3 | LEVEL 4 | LEVEL-BASED | VALUE-BASED | |
| TEAM | | | | X | | |
| | PROJECT OWNER (PD OWNER, RFP OWNER) | | | X | | |
| | | PROJECT (PD, RFP) | | X | | |
| | | | PERIOD OF PERF. (POP) | | | X |
| | | | VALUE | | | X |
| | | | CUSTOMER | | X | |
| | | | WORK | X | | |
| | | | CONTRACT TYPE | | X | |
| | | | SECURITY CLASSIFICATION | | X | |
| | | | LINE OF BUSINESS (LOB) | | X | |
| | | | SPECIAL BUSINESS (SB) CLASSIFICATION | | X | |
| | | | RELEVANT ACHIEVEMENT | | X | |

```
PROCEDURE DETERMINE_RELEVANCE_MATRIX ( ) {

INPUT: ARRAY A[1 .. N], ARRAY B[1..M];
           FUNCTION CONTENT_COMPARATOR ( X, Y );
           DOUBLE MIN_THRESHOLD;

LET REL= NEW MATRIX OF DIMENSION N BY M; INITIALIZED TO ZEROS;
    FOR ( I = 1; I <= N; I++ ) {
       FOR ( J = 1; J <= M; J++ ) {
          ELEMENT_MATCH_VALUE = CONTENT_COMPARATOR ( A [ I ], B [ J ] );
          IF (ELEMENT_MATCH_VALUE >= MIN_THRESHOLD ) {
              REL [ I ] [ J ] = ELEMENT_MATCH_VALUE;
          }
       }
    }

OUTPUT:
    RETURN REL;
}
```

FIG. 35

```
FUNCTION TFIDF_CONTENT_COMARATOR ( ) {

INPUT: DOCUMENT D1, DOCUMENT D2;

LET S = TF_IDF ( D1, D2 );

SCALE S TO THE RANGE 0.0 <= S <= 1.0, AS REQUIRED;

OUTPUT:
    RETURN S;
}
```

FIG. 36

```
PROCEDURE BUILD_RELEVANCE_TABLE ( ) {

INPUT: MATRIX REL [ 1..N, 1..M ];
   ARRAY A[1 .. N], ARRAY B[1..M];

LET T = NEW EMPTY TABLE T WITH COLUMNS: "PD ELEMENT", "RFP ELEMENT",
   "MATCH VALUE","PD ID", "RFP ID","PD OWNER", "RFP OWNER";

FOR ( I = 1; I <= N; I++ ) {
      FOR ( J = 1; J <= M; J++ ) {
         IF ( REL [ I ] [ J ] != 0 ) {
            INSERT INTO TABLE T A NEW ROW  WITH VALUES:
               A [ I ], B [ J ], REL [ I ] [ J ],
               PD ID FOR PROJECT DESCRIPTOR ASSOCIATED WITH ARRAY A,
               RFP ID FOR PROJECT DESCRIPTOR ASSOCIATED WITH ARRAY B,
               PD OWNER FOR PROJECT DESCRIPTOR ASSOCIATED WITH ARRAY A,
               RFP OWNER FOR PROJECT DESCRIPTOR ASSOCIATED WITH ARRAY B;
         }
      }
   }

OUTPUT:
   RETURN TABLE T;
}
```

FIG. 38

| PD ELEMENT | RFP ELEMENT | MATCH VALUE | PD ID | RFP ID | PD OWNER | RFP OWNER |
|---|---|---|---|---|---|---|
| P9 | R14 | 0.94 | PD001 | RFP001 | PRIME | PRIME |
| P10 | R10 | 0.87 | PD001 | RFP001 | PRIME | PRIME |
| P12 | R11 | 0.92 | PD001 | RFP001 | PRIME | PRIME |
| P13 | R12 | 0.88 | PD001 | RFP001 | PRIME | PRIME |

FIG. 39

```
PROCEDURE ROLL_UP_BY_PD ( ) {

INPUT: RELEVANCE TABLE REL WITH COLUMNS: "PD ELEMENT", "RFP ELEMENT",
  "MATCH VALUE","PD ID", "RFP ID","PD OWNER", "RFP OWNER";

LET PD_ID = PROJECT DESCRIPTOR ASSOCIATED WITH "PD ID" COLUMN;
  LET RFP_ID = PROJECT DESCRIPTOR ASSOCIATED WITH "RFP_ID" COLUMN;

LET T = NEW EMPTY TABLE T WITH COLUMNS THAT REPRESENT THE WORK
  ELEMENTS ASSOCIATED WITH THE PROJECT DESCRIPTOR FOR RFP_ID, "PD ID",
  "RFP ID","PD OWNER", "RFP OWNER";

INSERT INTO TABLE T A NEW ROW IN WHICH THE COLUMNS FOR "PD ID", "RFP ID",
  "PD OWNER", AND "RFP OWNER"IDENTIFY THE PD AND RFP OVER WHICH
  AGGREGTION IS BEING PERFORMED;

FOR EACH RFP_ELEMENT IN COLUMN "RFP ELEMENT" OF TABLE REL {
      ENTER INTO TABLE T, IN THE COLUMN ASSOCIATED WITH RFP_ELEMENT,
      THE "MATCH VALUE" AND "PD ELEMENT" ENTRIES FROM TABLE REL THAT ARE
      ASSOCIATED WITH RFP_ELEMENT;
  }

OUTPUT:
  RETURN TABLE T;
}
```

FIG. 40

| R10 | R11 | R12 | R13 | R14 | PD ID | RFP ID | PD OWNER | RFP OWNER |
|---|---|---|---|---|---|---|---|---|
| 0.87, [P10] | 0.92, [P12] | 0.88, [P13] |  | 0.94, [P9] | PD001 | RFP001 | PRIME | PRIME |

FIG. 41

```
PROCEDURE UPDATE_RELEVANCE_CHART ( ) {

INPUT: RELEVANCE CUBE TABLE REL WITH COLUMNS THAT REPRESENT THE WORK
  ELEMENTS ASSOCIATED WITH THE PROJECT DESCRIPTOR FOR THE "RFP ID"
  COLUMN, "PD ID", "RFP ID","PD OWNER", "RFP OWNER";
  RUL_ID;

LET PD_ID = PROJECT DESCRIPTOR ASSOCIATED WITH "PD ID" COLUMN;
  LET RFP_ID = PROJECT DESCRIPTOR ASSOCIATED WITH "RFP_ID" COLUMN;

IF RELEVANCE CHART ALREADY EXISTS {
      LET RC = CURRENT RELEVNCE CHART;
      ADD AN EMPTY ROW R TO RELEVANCE CHART RC;
  }
  ELSE {
      LET RC BE AN EMPTY RELEVANCE CHART, WITH EMPTY HEADER AND
      AN EMPTY ROW R;

CREATE THE RELEVANCE CHART COLUMN HEADINGS FROM THE TABLE REL
      COLUMNS THAT REPRESENT THE RFP WORK ELEMENTS ASSOCIATED WITH THE
      PROJECT DESCRIPTOR FOR RFP_ID, BY ASSOCIATING EACH RFP ELEMENT ID
      WITH A COLUMN IN RC, AND LABELING EACH COLUMN HEADER WITH THE RFP
      ELEMENT LABEL;

CREATE THE LABEL FOR THE PROJECT DESCRIPTION ROW R IN RC, USING THE
      PROJECT DESCRIPTOR NAME ASSOCIATED WITH RUL_ID;
  }

FOR EACH RFP_ELEMENT COLUMN OF TABLE REL {
      IF THE REL TABLE ENTRY FOR THAT RFP_ELEMENT IS NON EMPTY {
          ADD A "BLACK DIAMOND" TO THE RELEVANCE CHART ROW R COLUMN WHOSE
          COLUMN HEADER CONTAINS THE RFP ELEMENT ID EQUAL TO RFP_ELEMENT;

ASSOCIATE THE CORRESPONDING "MATCH VALUE" AND CORRESPONDING
          PD (OR, PDS) WITH THAT BLACK DIAMOND;
      }
  }

OUTPUT:
  RETURN RELEVANCE CHART RC;
}
```

FIG. 42

| PD ELEMENT | RFP ELEMENT | MATCH VALUE | PD ID | RFP ID | PD OWNER | RFP OWNER |
|---|---|---|---|---|---|---|
| P9 | R14 | 0.94 | PD001 | RFP001 | PRIME | PRIME |
| P10 | R10 | 0.87 | PD001 | RFP001 | PRIME | PRIME |
| P12 | R11 | 0.92 | PD001 | RFP001 | PRIME | PRIME |
| P13 | R12 | 0.88 | PD001 | RFP001 | PRIME | PRIME |
| P10 | R12 | 0.77 | PD002 | RFP001 | PRIME | PRIME |
| P13 | R14 | 0.81 | PD002 | RFP001 | PRIME | PRIME |
| P9 | R14 | 0.66 | PD003 | RFP001 | SUB 1 | PRIME |
| P10 | R12 | 0.72 | PD003 | RFP001 | SUB 1 | PRIME |
| P11 | R11 | 0.81 | PD003 | RFP001 | SUB 1 | PRIME |
| P12 | R13 | 0.98 | PD003 | RFP001 | SUB 1 | PRIME |
| P13 | R10 | 0.77 | PD003 | RFP001 | SUB 1 | PRIME |
| P11 | R13 | 0.82 | PD004 | RFP001 | SUB 1 | PRIME |
| P9 | R10 | 0.81 | PD005 | RFP001 | SUB 2 | PRIME |
| P12 | R13 | 0.96 | PD005 | RFP001 | SUB 2 | PRIME |
| P13 | R14 | 0.77 | PD005 | RFP001 | SUB 2 | PRIME |
| P13 | R12 | 0.79 | PD005 | RFP001 | SUB 2 | PRIME |

FIG. 44

```
PROCEDURE ROLL_UP_BY_RFP ( ) {

INPUT RELEVANCE CUBE TABLE REL;
  MATRIX WEIGHT [ 1..M, 2 ] OF RFP ELEMENT WEIGHTS;

ADD NEW COLUMN TO TABLE REL NAMED "RFP-TO-PD RELEVANCE";

FOR EACH ROW R IN REL {
     LET SUM = 0.0;
     FOR EACH RFP WORK ELEMENT COLUMN C IN TABLE R {
        ADD TO SUM THE PRODUCT OF COLUMN C'S MATCH VALUE AND THE
        WEIGHT VALUE THAT CORRESPONDS TO ROW R'S "RFP ELEMENT" VALUE;
     }
     UPDATE THE "RFP-TO-PD RELEVANCE" COLUMN ASSOCIATED WITH ROW R
     WITH THE VALUE SUM;
  }

OUTPUT:
  RETURN UPDATED RELEVANCE CUBE TABLE REL;
}
```

FIG. 46

| RFP ELEMENT | WEIGHT |
|---|---|
| R10 | 1.0 |
| R11 | 1.0 |
| R12 | 1.0 |
| R13 | 1.0 |
| R14 | 1.0 |

| RFP-TO-PD RELEVANCE | R10 | R11 | R12 | R13 | R14 | PD ID | RFP ID | PD OWNER | RFP OWNER |
|---|---|---|---|---|---|---|---|---|---|
| 3.61 | 0.87, [P10] | 0.92, [P12] | 0.88, [P13] |  | 0.94, [P9] | PD001 | RFP001 | PRIME | PRIME |
| 1.58 |  |  | 0.77, [P10] |  | 0.81, [P13] | PD002 | RFP001 | PRIME | PRIME |
| 3.94 | 0.77, [P13] | 0.81, [P11] | 0.72, [P10] | 0.98, [P12] | 0.66, [P9] | PD003 | RFP001 | SUB 1 | PRIME |
| 0.82 |  |  |  | 0.82, [P11] |  | PD004 | RFP001 | SUB 1 | PRIME |
| 3.33 | 0.81, [P9] |  | 0.79, [P13] | 0.96, [P12] | 0.77, [P13] | PD005 | RFP001 | SUB 2 | PRIME |

FIG. 48

| RFP-TO-PD-OWNER RELEVANCE | R10 | R11 | R12 | R13 | R14 | RFP ID | PD OWNER | RFP OWNER |
|---|---|---|---|---|---|---|---|---|
| 5.19 | 0.87 | 0.92 | 1.65 |  | 1.75 | RFP001 | PRIME | PRIME |
| 4.76 | 0.77 | 0.81 | 0.72 | 1.80 | 0.66 | RFP001 | SUB 1 | PRIME |
| 3.33 | 0.81 |  | 0.79 | 0.96 | 0.77 | RFP001 | SUB 2 | PRIME |

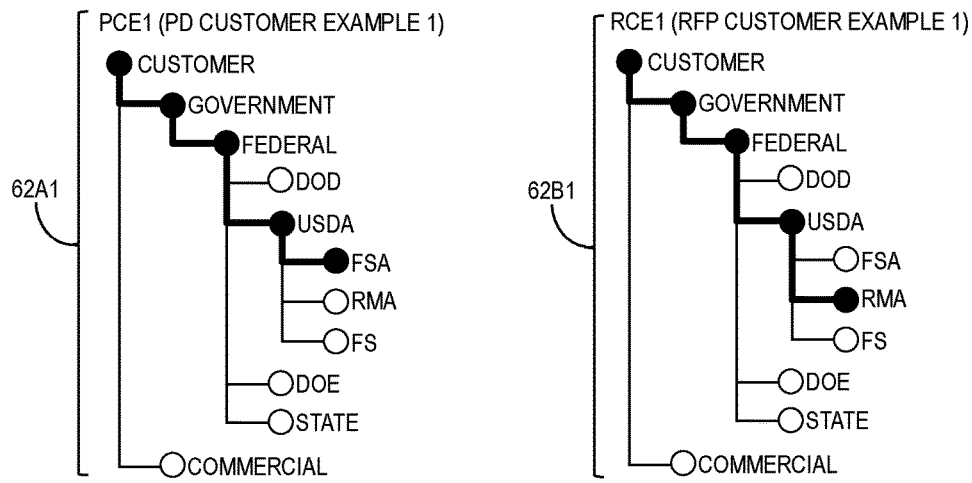
FIG. 62A
FIG. 62B
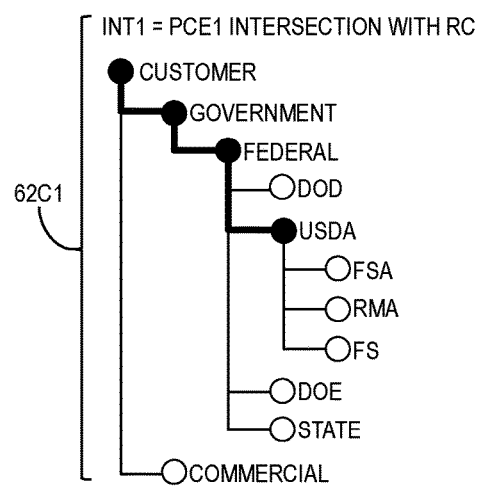
FIG. 62C

|  |  | RFP CRITERIA HIERARCHY | |
|---|---|---|---|
|  |  | SHALLOW | DEEP |
| PROCESS | FILTERING | BROAD | NARROW |
|  | RANKING | LOW FIDELITY | HIGH FIDELITY |

```
PROCEDURE CREATE_DESCRIPTOR_MAP ( ) {

INPUT: PROJECT DESCRIPTOR SUB-DSCRIPTOR DESC;

LET M = NEW MAP;

PERFORM DEPTH-FIRST TRAVERSAL OF DESC, AT EACH NODE N DO {
      LET L = THE LABEL OF NODE N;
      ADD TO M THE KEY/VALUE PAIR L,"1";
   }

OUTPUT:
   RETURN M;
}
```

```
PROCEDURE OVERLAY_DESCRIPTORS ( ) {

INPUT: DESCRIPTOR MAP DESC1, DESCRIPTOR MAP DESC2, AND_OR_FLAG;

LET DESC2_KEYS = ENUMERATION OF KEYS IN DESC2;
   LET M = COPY OF DESC1;

FOR EACH KEY K IN DESC2_KEYS {
      IF ( ( MAP M CONTAINS THE KEY K ) AND ( THE AND_OR_FLAG EQUALS "AND" ) ) {
         UPDATE MAP M WITH KEY/VALUE PAIR: K, M.K + DESC2.K;
      }
      ELSE {
         ADD TO MAP M THE KEY/VALUE PAIR: K, DESC2.K;
      }
   }

OUTPUT:
   RETURN M;
}
```

FIG. 71

```
PROCEDURE DETERMINE_DESCRIPTOR_INTERSECTION ( ) {

INPUT: DESCRIPTOR MAP DESC1, DESCRIPTOR MAP DESC2;

LET DESC2_KEYS = ENUMERATION OF KEYS IN DESC2;
   LET M = NEW MAP;

FOR EACH KEY K IN DESC2_KEYS {
      IF ( DESC1 CONTAINS THE KEY K ) {
         ADD TO MAP M THE KEY/VALUE PAIR: K, MINIMUM ( DESC1.K, DESC2.K );
      }
   }

OUTPUT:
   RETURN M;
}
```

```
PROCEDURE COMPUTE_WEIGHTED_RELEVANCE_VALUE ( ) {

INPUT: INTERSECTON MAP M (FOR INTERSECTON OF DESC1 AND DESC2);
          DESCRIPTOR MAP DESC2,
          DESCRIPTOR DESC2 WEIGHTING MAP W;

LET M_KEYS = ENUMERATION OF KEYS IN M;
   LET SUM1 = 0.0;

FOR EACH KEY K IN M_KEYS {
       SUM1 = SUM1 + ( M.KEY * W.KEY );
   }

LET DESC2_KEYS = ENUMERATION OF KEYS IN DESC2;
   LET SUM2 = 0.0;

FOR EACH KEY K IN DESC2_KEYS {
       SUM2 = SUM2 + DESC2.KEY;
   }

LET WEIGHTED_VALUE = SUM1 / SUM2;

OUTPUT:
   RETURN WEIGHTED_VALUE;
}
```

FIG. 76

```
PROCEDURE CREATE_FILTER_TABLE_FROM_MAP ( ) {

INPUT: DESCRIPTOR INTERSECTION MAP INT, DESCRIPTOR MAP DESC2;

LET T = NEW TABLE WITH COLUMNS LABELED WITH KEYS OF DESC2;

LET DESC2_KEYS = ENUMERATION OF KEYS IN DESC2;

FOR EACH KEY K IN DESC2_KEYS {
        IF ( MAP INT CONTAINS KEY K ) {
            UPDATE TABLE T COLUMN LABELED BY K WITH THE VALUE INT.K;
        }
    }

OUTPUT:
    RETURN TABLE T;
}
```

FIG. 78

| D1 | D2 | D5 | D6 | D8 |
|----|----|----|----|----|
| 2  | 1  | 1  |    |    |

|   | 8501 | 8502 |
|---|---|---|
| | PROJECT DESCRIPTOR | CUSTOMER DESCRIPTOR DATA |
| 8503 | RFP001 | ANY, GOV., FED., USDA, RMA |
| 8504 | PD001 | ANY, GOV., FED., USDA, FSA |
| | PD002 | ANY, GOV., FED., DOE |
| | PD003 | ANY, COMMERCIAL |
| | PD004 | ANY, GOV., FED., DOD |
| | PD005 | ANY, GOV., FED., USDA, RMA |

FIG. 85

|  | ANY (8601) | GOV. (8602) | FED. (8603) | USDA (8604) | RMA (8605) | PD ID (8606) |
|---|---|---|---|---|---|---|
| 8621 | 1 | 1 | 1 | 1 | | PD001 |
| 8622 | 1 | 1 | 1 | | | PD002 |
| 8623 | 1 | | | | | PD003 |
| 8624 | 1 | 1 | 1 | | | PD004 |
| 8625 | 1 | 1 | 1 | 1 | 1 | PD005 |

FIG. 86

| | | ANY | GOV. | FED. | USDA | RMA | RFP-TO-PD RELEVANCE | R10 | R11 | R12 | R13 | R14 | PD ID | RFP ID | PD OWNER | RFP OWNER |
|---|---|---|---|---|---|---|---|---|---|---|---|---|---|---|---|---|
| | CUSTOMER RELEVANCE | | | | | | | | | | | | | | | |
| 8711 | 0.80 | 1 | 1 | 1 | 1 | | 3.61 | 0.87, [P10] | 0.92, [P12] | 0.88, [P13] | | 0.94, [P9] | PD001 | RFP001 | PRIME | PRIME |
| 8712 | 0.60 | 1 | 1 | 1 | | | 1.58 | | | 0.77, [P10] | | 0.81, [P13] | PD002 | RFP001 | PRIME | PRIME |
| 8713 | 0.20 | 1 | | | | | 3.94 | 0.77, [P13] | 0.81, [P11] | 0.72, [P10] | 0.98, [P12] | 0.66, [P9] | PD003 | RFP001 | SUB 1 | PRIME |
| 8714 | 0.60 | 1 | 1 | 1 | | | 0.82 | | | | 0.82, [P11] | | PD004 | RFP001 | SUB 1 | PRIME |
| 8715 | 1.00 | 1 | 1 | | 1 | 1 | 3.33 | 0.81, [P9] | | 0.79, [P13] | 0.96, [P12] | 0.77, [P13] | PD005 | RFP001 | SUB 2 | PRIME |

FIG. 87

|  | PD POP START | PD POP END | PD ID |
|---|---|---|---|
| 8810 | | | |
| 8811 | 1-1-2014 | 12-31-2015 | PD001 |
| 8812 | 1-1-2011 | 12-31-2012 | PD002 |
| 8813 | 1-1-2014 | 12-31-2015 | PD003 |
| 8814 | 1-1-2012 | 12-31-2012 | PD004 |
| 8815 | 1-1-2012 | 12-31-2014 | PD005 |

Columns: 8801, 8802, 8803

FIG. 88

| PD POP START | PD POP END | CUSTOMER RELEVANCE | ANY | GOV. | FED. | USDA | RMA | RFP-TO-PD RELEVANCE | R10 | R11 | R12 | R13 | R14 | PD ID | RFP ID |
|---|---|---|---|---|---|---|---|---|---|---|---|---|---|---|---|
| 1-1-2014 | 12-31-2015 | 0.80 | 1 | 1 | 1 | 1 |   | 3.61 | 0.87, [P10] | 0.92, [P12] | 0.88, [P13] |   | 0.94, [P9] | PD001 | RFP001 |
| 1-1-2011 | 12-31-2012 | 0.60 | 1 | 1 | 1 |   |   | 1.58 |   |   | 0.77, [P10] |   | 0.81, [P13] | PD002 | RFP001 |
| 1-1-2014 | 12-31-2015 | 0.20 | 1 |   |   |   |   | 3.94 | 0.77, [P13] | 0.81, [P11] | 0.72, [P10] | 0.98, [P12] | 0.66, [P9] | PD003 | RFP001 |
| 1-1-2012 | 12-31-2012 | 0.60 | 1 | 1 | 1 |   |   | 0.82 |   |   |   | 0.82, [P11] |   | PD004 | RFP001 |
| 1-1-2012 | 12-31-2014 | 1.00 | 1 | 1 | 1 | 1 | 1 | 3.33 | 0.81, [P9] |   | 0.79, [P13] | 0.96, [P12] | 0.77, [P13] | PD005 | RFP001 |

FIG. 89

|  | 9001 | 9002 | 9003 | 9004 | |
|---|---|---|---|---|---|
| 9010 | OVERALL RELEVANCE | CUSTOMER RELEVANCE | RFP-TO-PD RELEVANCE | PD ID | RFP ID |
| 9011 | 4.41 | 0.80 | 3.61 | PD001 | RFP001 |
| 9012 | 2.18 | 0.60 | 1.58 | PD002 | RFP001 |
| 9013 | 4.14 | 0.20 | 3.94 | PD003 | RFP001 |
| 9014 | 1.42 | 0.60 | 0.82 | PD004 | RFP001 |
| 9015 | 4.33 | 1.00 | 3.33 | PD005 | RFP001 |

FIG. 90

9111 — CONTRACT CRITERIA:

9112 — ◉ FILTERS  ◯ RANKING

9113 — ◉ USE ORIGINAL RFP CRITERIA FOR RANKING
◯ USE CUSTOM FILTER AND RANK CRITERIA
◯ USE COMMON FILTER AND RANK CRITERIA

9115 —
RFP OWNER: PRIME
RFP ID: RFP001
RFP NAME: REQUEST FOR PROPOSALS 1

9120 —
9121 — POP DATE RANGE: ◉ ANY  ◯ START TO END   WEIGHT: 1.0 — 9122

9123 — VALUE RANGE: ◉ ANY  ◯ LOW TO HIGH   WEIGHT: 1.0 — 9124

9130 —
9131 — CUSTOMER: ANY ▼   WEIGHT: 1.0 — 9134
9132 —
9133 — MULTIPLE...

9143 — WORK ELEMENTS:   WEIGHT: 1.0 — 9142
9140 —

| REQUIRED | RFP SOW | WEIGHT |
|---|---|---|
| ☐ | SOW 1 – DEVELOP SOFTWARE | 1.0 |
| ☐ | SOW 1.1 PERFORM DESIGN | 1.0 |
| ☐ | SOW 1.2 DEVELOP MODULES | 1.0 |
| ☐ | SOW 1.3 PERFORM TESTING | 1.0 |
| ☐ | SOW 2 – MANAGE THE PROJECT | 1.0 |

9141 — 9144 — 9145

9150 — MORE CRITERIA...   CANCEL — 9152
9151 —                     SAVE — 9153

9211 — CONTRACT CRITERIA:

9215 —
RFP OWNER: PRIME
RFP ID: RFP001
RFP NAME: REQUEST FOR PROPOSALS 1

9220 —
9221 — CONTRACT TYPE: ANY ▼  WEIGHT: 1.0 — 9222

9223 — SECURITY CLASSIFICATION: ANY ▼  WEIGHT: 1.0 — 9224

9225 — LINE OF BUSINESS: ANY ▼  WEIGHT: 1.0 — 9226

MULTIPLE... — 9227

9230 —
9231 — SPECIAL BUSINESS CLASSIFICATIONS:
☐ SMALL BUSINESS
☐ 8(A)
☐ WOMAN OWNED
☐ VETERAN OWNED
☐ HUB ZONE
WEIGHT: 1.0 — 9232

9240 — MORE CRITERIA...
9241 —
CANCEL — 9242
SAVE — 9243

FIG. 92

CONTRACT CRITERIA:

- ● FILTERS
- ○ RANKING

- ● USE ORIGINAL RFP CRITERIA FOR RANKING
- ○ USE CUSTOM FILTER AND RANK CRITERIA
- ○ USE COMMON FILTER AND RANK CRITERIA

RFP OWNER:  PRIME
RFP ID:  RFP001
RFP NAME:  REQUEST FOR PROPOSALS 1

POP DATE RANGE:
- ○ ANY
- ● 1-1-2013 TO 12-31-2015

WEIGHT: 1.0

VALUE RANGE:
- ● ANY
- ○ LOW TO HIGH

WEIGHT: 1.0

CUSTOMER: FED ▼

WEIGHT: 1.0

[ MULTIPLE... ]

WORK ELEMENTS:

WEIGHT: 1.0

| REQUIRED | RFP SOW | WEIGHT |
|---|---|---|
| ☐ | SOW 1 – DEVELOP SOFTWARE | 1.0 |
| ☐ | SOW 1.1 PERFORM DESIGN | 1.0 |
| ☐ | SOW 1.2 DEVELOP MODULES | 1.0 |
| ☐ | SOW 1.3 PERFORM TESTING | 1.0 |
| ☐ | SOW 2 – MANAGE THE PROJECT | 1.0 |

[ MORE CRITERIA... ]  [ CANCEL ]
[ SAVE ]

FIG. 94

REFERENCE RFP:

- RFP OWNER: PRIME ▼
- RFP ID: RFP001 ▼
- RFP NAME: REQUEST FOR PROPOSALS 1

[VIEW FILTER AND RANKING CRITERIA]

SELECTED TEAM PROJECT DESCRIPTIONS

| | RFP SOW | | | | | CONTRACT CRITERIA | | | | | | | |
|---|---|---|---|---|---|---|---|---|---|---|---|---|---|
| | SOW 1 | SOW 1.1 | SOW 1.2 | SOW 1.3 | SOW 2 | POP | VALUE | CUST. | TYPE | SEC. | LOB | SB CLASS. | ACHIEVE. | CONFIRMED |
| TEAM | | | | | | | | | | | | | | |

[RECOMMENDATION]

ALL MATCHING PROJECT DESCRIPTIONS [CONTACT PD OWNER]

REQUIRED ☐☐☐☐☐☐☐ ☐☐☐☐☐☐

| | SOW 1 | SOW 1.1 | SOW 1.2 | SOW 1.3 | SOW 2 | POP | VALUE | CUST. | TYPE | SEC. | LOB | SB CLASS. | ACHIEVE. | CONFIRMED |
|---|---|---|---|---|---|---|---|---|---|---|---|---|---|---|
| ☐ SUB 1, PD003 | ◆ | ◆ | ◆ | ◆ | ◆ | ✓ | ✓ | ✓ | ✓ | ✓ | ✓ | ✓ | ✓ | ✱ |
| ☐ PRIME, PD001 | ◆ | ◆ | ◆ | | ◆ | ✓ | ✓ | ✓ | ✓ | ✓ | | | ✓ | ✱ |
| ☐ SUB 2, PD005 | ◆ | | ◆ | ◆ | ◆ | ✓ | ✓ | ✓ | ✓ | ✓ | ✓ | ✓ | | |
| ☐ PRIME, PD002 | | | ◆ | | ◆ | ✓ | ✓ | ✓ | ✓ | ✓ | | | ✓ | ✱ |
| ☐ SUB 1, PD004 | | | | ◆ | | ✓ | ✓ | ✓ | ✓ | ✓ | ✓ | ✓ | | ✱ |

[MORE OPTIONS...] [CANCEL] [SAVE TEAM]

CONTRACT CRITERIA:

- ● FILTERS
- ○ RANKING

- ● USE ORIGINAL RFP CRITERIA FOR RANKING
- ○ USE CUSTOM FILTER AND RANK CRITERIA
- ○ USE COMMON FILTER AND RANK CRITERIA

RFP OWNER: PRIME
RFP ID: RFP001
RFP NAME: REQUEST FOR PROPOSALS 1

POP DATE RANGE:
● ANY
○ START TO END
WEIGHT: 1.0

VALUE RANGE:
● ANY
○ LOW TO HIGH
WEIGHT: 1.0

CUSTOMER: ANY ▼
WEIGHT: 1.0

[ MULTIPLE... ]

WORK ELEMENTS:
WEIGHT: 1.0

| REQUIRED | RFP SOW | WEIGHT |
|---|---|---|
| ☐ | SOW 1 – DEVELOP SOFTWARE | 1.0 |
| ☐ | SOW 1.1 PERFORM DESIGN | 1.0 |
| ☐ | SOW 1.2 DEVELOP MODULES | 1.0 |
| ☒ | SOW 1.3 PERFORM TESTING | 1.0 |
| ☐ | SOW 2 – MANAGE THE PROJECT | 1.0 |

[ MORE CRITERIA... ]  [ CANCEL ]
[ SAVE ]

| CONTRACT CRITERIA: | |
|---|---|
| ⦿ FILTERS<br>○ RANKING | ⦿ USE ORIGINAL RFP CRITERIA FOR RANKING<br>○ USE CUSTOM FILTER AND RANK CRITERIA<br>○ USE COMMON FILTER AND RANK CRITERIA |

RFP OWNER: PRIME
RFP ID: RFP001
RFP NAME: REQUEST FOR PROPOSALS 1

POP DATE RANGE: ○ ANY   ⦿ 1-1-2013 TO 12-31-2015   WEIGHT: 1.0

VALUE RANGE: ⦿ ANY   ○ LOW TO HIGH   WEIGHT: 1.0

CUSTOMER: FED. ▼   WEIGHT: 1.0

MULTIPLE...

WORK ELEMENTS:   WEIGHT: 1.0

| REQUIRED | RFP SOW | WEIGHT |
|---|---|---|
| ☐ | SOW 1 – DEVELOP SOFTWARE | 1.0 |
| ☐ | SOW 1.1 PERFORM DESIGN | 1.0 |
| ☐ | SOW 1.2 DEVELOP MODULES | 1.0 |
| ☐ | SOW 1.3 PERFORM TESTING | 1.0 |
| ☐ | SOW 2 – MANAGE THE PROJECT | 1.0 |

[MORE CRITERIA...]   [CANCEL]
                     [SAVE]

FIG. 102

REFERENCE RFP: (10310)

RFP OWNER: PRIME ▼
RFP ID: RFP001 ▼
RFP NAME: REQUEST FOR PROPOSALS 1

[VIEW FILTER AND RANKING CRITERIA]

SELECTED TEAM PROJECT DESCRIPTIONS (10330)

| | | RFP SOW | | | | | CONTRACT CRITERIA | | | | | | | CONFIRMED |
|---|---|---|---|---|---|---|---|---|---|---|---|---|---|---|
| | | SOW 1 | SOW 1.1 | SOW 1.2 | SOW 1.3 | SOW 2 | POP | VALUE | CUST. | TYPE | SEC. | LOB | SB CLASS. | ACHIEVE. | |
| | TEAM | ◆ | ◆ | ◆ | ◆ | ◆ | ✓ | ✓ | ✓ | ✓ | ✓ | ✓ | ✓ | ✓ | ✱ |
| ☒ | PRIME | ◆ | ◆ | ◆ | | ◆ | ✓ | ✓ | ✓ | ✓ | ✓ | ✓ | | ✓ | ✱ |
| | ☒ PD001 | ◆ | ◆ | ◆ | | | ✓ | ✓ | ✓ | ✓ | ✓ | ✓ | | ✓ | ✱ |
| | ☒ PD002 | | | ◆ | | ◆ | ✓ | ✓ | ✓ | ✓ | ✓ | | | ✓ | ✱ |
| ☒ | SUB 1 | ◆ | ◆ | ◆ | ◆ | ◆ | ✓ | ✓ | ✓ | ✓ | ✓ | ✓ | ✓ | ✓ | ✱ |
| | ☒ PD003 | ◆ | ◆ | ◆ | ◆ | ◆ | ✓ | ✓ | ✓ | ✓ | ✓ | ✓ | ✓ | ✓ | ✱ |

[RECOMMENDATION]

ALL MATCHING PROJECT DESCRIPTIONS (10340)   [CONTACT PD OWNER]

10342 — REQUIRED: ☐ ☐ ☐ ☐ ☐ ☒ ☐ ☒ ☐ ☐ ☐ ☐ ☐ (10343)

| | | | | | | | | | | | | | | | |
|---|---|---|---|---|---|---|---|---|---|---|---|---|---|---|---|
| ☒ | PRIME, PD001 | ◆ | ◆ | ◆ | | ◆ | ✓ | ✓ | ✓ | ✓ | ✓ | ✓ | | ✓ | ✱ |
| ☐ | SUB 2, PD005 | ◆ | | ◆ | ◆ | ◆ | ✓ | ✓ | ✓ | ✓ | ✓ | ✓ | ✓ | ✓ | |

(10341) (10344)

[MORE OPTIONS...]   [CANCEL]   [SAVE TEAM]

| PROPOSAL OUTLINE | REQ. | PD OWNER | PD ID | PD NAME |
|---|---|---|---|---|
| TECHNICAL VOLUME | | | | |
| 1.0 INTRODUCTION | | | | |
| 2.0 TECHNICAL APPROACH | | | | |
| 2.1 SOFTWARE DEV. | SOW 1 - DEVELOP SOFTWARE | PRIME | PD001 | PROJECT DESCRIPTION 1 |
| | | DESCRIPTION: Our team of 8 software professionals developed and deployed the software system with full capability, on time and within budget, using the java programming language... ||||
| | SOW 1.1 - PERFORM DESIGN | PRIME | PD001 | PROJECT DESCRIPTION 1 |
| | | DESCRIPTION: Under the guidance of our Systems Architect, our team of 6 software engineers performed object oriented analysis and design to... ||||
| | SOW 1.2 - DEVELOP MODULES | PRIME | PD001 | PROJECT DESCRIPTION 1 |
| | | DESCRIPTION: Our team of 6 software engineers developed the required modules in the Java programming language. We created 12 software ||||
| | | PRIME | PD002 | PROJECT DESCRIPTION 2 |
| | | DESCRIPTION: On this project for a Department of Energy (DOE) customer, our team constructed 50 modules using the Ada programming language... ||||
| 3.0 CONCLUSION | | | | |
| MANAGEMENT VOLUME | | | | |
| 1.0 INTRODUCTION | | | | |
| 2.0 MGMT. APPROACH | SOW 2.0 - MANAGE THE PROJECT | PRIME | PD001 | PROJECT DESCRIPTION 1 |
| | | DESCRIPTION: Our Project Leader kept Government leadership informed throughout the project by using open communication... ||||
| | | PRIME | PD002 | PROJECT DESCRIPTION 2 |
| | | DESCRIPTION: On this DOE project our Project Leader used his PMBOK knowledge and experience to ensure on-schedule, within-cost delivery of... ||||
| 3.0 STAFFING | | | | |
| 4.0 CONCLUSION | | | | |

FIG. 106

| RATIONALE FOR TEAM COMPOSITION | | | | | |
|---|---|---|---|---|---|
| REQUEST FOR PROPOSAL (RFP) / TEAM CAPABILITIES | SOW 1 – DEVELOP SOFTWARE | SOW 1.1 PERFORM DESIGN | SOW 1.2 DEVELOP MODULES | SOW 1.3 PERFORM TESTING | SOW 2 – MANAGE THE PROJECT |
| Overall Team Capabilities | ◆ | ◆ | ◆ | ◆ | ◆ |
| Prime | ◆ | ◆ | ◆ |   | ◆ |
| Subcontractor 1 | ◆ | ◆ | ◆ | ◆ | ◆ |
| Subcontractor 2 | ◆ |   | ◆ | ◆ | ◆ |

FIG. 107

| RATIONALE FOR PAST PERFORMANCE SELECTION | | | | | |
|---|---|---|---|---|---|
| REQUEST FOR PROPOSAL (RFP) / PROJECT DESCRIPTIONS | SOW 1 – DEVELOP SOFTWARE | SOW 1.1 PERFORM DESIGN | SOW 1.2 DEVELOP MODULES | SOW 1.3 PERFORM TESTING | SOW 2 – MANAGE THE PROJECT |
| Overall Relevant Experience | ◆ | ◆ | ◆ | ◆ | ◆ |
| Project Description 1 | ◆ | ◆ | ◆ |   | ◆ |
| Project Description 2 |   |   | ◆ |   | ◆ |
| Project Description 3 | ◆ | ◆ | ◆ | ◆ | ◆ |
| Project Description 5 | ◆ |   | ◆ | ◆ | ◆ |

FIG. 108

| Past Performance Volume, Project 1 of 4 | |
|---|---|
| CUSTOMER: | USDA Farm Service Agency (FSA) |
| PERIOD OF PERFORMANCE: | 1-1-2014 to 12-31-2015 |
| CONTRACT VALUE: | TBD |
| CONTRACT TYPE: | Firm Fixed Price (FFP) |
| SECURITY CLASSIFICATION: | For Official Use Only (FOUO) |
| CONTRACTOR: | PRIME |
| PROJECT NAME: | Project Description 1 |
| Relevance to RFP | |
| RFP REQUIREMENT | RELEVANT EXPERIENCE |
| SOW 1 - DEVELOP SOFTWARE | DESCRIPTION: Our team of software professionals developed and deployed the software system with full capability, on time and within budget, using the Java programming language... |
| SOW 1.1 - PERFORM DESIGN | DESCRIPTION: Under the guidance of our Systems Architect, our team of 6 software engineers performed object oriented analysis and design to create UML domain... |
| SOW 1.2 - DEVELOP MODULES | DESCRIPTION: Our team of 6 software engineers developed the required modules in the Java programming language. We created 12 software packages... |
| SOW 2.0 - MANAGE THE PROJECT | DESCRIPTION: Our Project Leader kept Government leadership informed throughout the project by using open communication... |

FIG. 109

```
PROCEDURE TEMPLATE_BASED_MATCH ( ) {

INPUT:  MATRIX P [ 1..N, 1..S ], MATRIX R [ 1..M, 1..S ];
            FUNCTION MEASURE ( A, B );

LET RT [ 1..S, 1..M ] = TRANSPOSE OF MATRIX R;

LET REL [ 1..N, 1..M ] = NEW EMPTY MATRIX;

FOR ( I = 1; I <= N; I++ ) {
        FOR ( J = 1; J <= M; J++ ) {
            FOR ( K = 1; K <= S; K++ ) {
                REL [ I ][ J ] += MEASURE ( P [ I ][ K ], RT [ K ][ J ] );
            }
        }
    }

OUTPUT:
    RETURN REL;
}
```

FIG. 115

```
FUNCTION INTERSECTION ( ) {

INPUT: NUMBER A, NUMBER B;

LET VAL = MINIMUM ( A, B );

OUTPUT:
    RETURN VAL;
}
```

FIG. 116A

```
FUNCTION HIGH_PASS_FILTERED_AVERAGE ( ) {

INPUT: NUMBER A, NUMBER B;

IF ( A < 0.25 OR B < 0.25 ) {
        LET VAL = 0.0;
    }
    ELSE {
        LET VAL = ( A + B ) / 2.0;
    }

OUTPUT:
    RETURN VAL;
}
```

FIG. 116B

```
FUNCTION PRODUCT ( ) {

INPUT: NUMBER A, NUMBER B;

LET VAL = A * B;

OUTPUT:
    RETURN VAL;
}
```

FIG. 116C

| I | J | K | P[I,K] | RT[K,J] | MINIMUM(P[I,K],RT[K,J]) | REL[I,J] |
|---|---|---|--------|---------|-------------------------|----------|
| 1 | 1 | 1 | 0.70 | 0.80 | | 0.70 |
| 1 | 2 | 1 | 0.70 | 0.81 | 0.70 | 0.70 |
| 2 | 7 | 2 | 0.71 | 0.82 | 0.71 | 0.71 |
| 3 | 3 | 3 | 0.72 | 0.83 | 0.72 | 0.72 |
| 5 | 4 | 5 | 0.74 | 0.84 | 0.74 | 0.74 |
| 6 | 5 | 6 | 0.75 | 0.85 | 0.75 | 0.75 |

FIG. 119

RELEVANCE MANAGEMENT SYSTEM

CROSS REFERENCE TO RELATED APPLICATIONS

This application discloses and claims only subject matter disclosed in prior application Ser. No. 15/203,841, filed Jul. 7, 2016, and names the inventor in the prior application. Accordingly, this application may constitute a continuation or divisional.

STATEMENT REGARDING FEDERALLY SPONSORED RESEARCH OR DEVELOPMENT (IF APPLICABLE)

Not Applicable

REFERENCE TO SEQUENCE LISTING, A TABLE, OR A COMPUTER PROGRAM LISTING COMPACT DISC APPENDIX (IF APPLICABLE)

Not Applicable

BACKGROUND OF THE INVENTION

The present invention relates to the field of document analysis, and more particularly to methods and systems for rapidly determining relevancy of documents to one another. More particularly, the present invention relates to methods and systems to determine relevancy of experience and work requirements, including such as may be represented in documents. More particularly, the present invention relates to methods and systems to identify, aggregate, navigate, validate, recommend, and broker relevant experience and team member capabilities, which more particularly may be used to facilitate a proposal response to a Request for Proposals (RFP).

BRIEF SUMMARY OF THE INVENTION

We disclose a method for determining the relevance of a plurality of project description (PD) documents or other documents with respect to a plurality of request for proposal (RFP) documents or other documents, establishing hierarchical relationships between PD documents and at least one hierarchical level, and aggregating the relevance of PD documents using these hierarchical relationships. We disclose a relevance management system that performs RFP-to-PD relevance determination to assist a contractor in identifying PDs that represent relevant experience with respect to an RFP, or in identifying relevant RFPs that represents work opportunities with respect to work experience, such as represented in a PD. The relevance management system may use document similarity matching techniques to identify elements of a PD that represent relevant experience with respect to elements of an RFP, and techniques such as hierarchical aggregation, filtering, and ranking to determine RFP-to-PD relevance, PD-owner (company) capabilities, and overall team capabilities. The relevance management system may provide functionality to validate, recommend, and broker relevant experience and team member capabilities. Through such functionality, significant elements of a business development process, such as identifying subcontractors with complementary or overlapping capabilities or identifying relevant work opportunities, and the costs associated with such activities, may be eliminated or greatly streamlined, thereby reducing business development costs. The relevance management system may help a prime contractor identify, understand, and manage experience and capabilities it may draw upon, both from within its organization, as well as from external subcontractors, which may be helpful in responding to an RFP with a proposal.

BRIEF SUMMARY OF SEVERAL VIEWS OF THE DRAWINGS

FIG. 35 is procedure Determine_Relevance_Matrix( ), in accordance with an exemplary embodiment of the invention.

FIG. 36 is function Content_Comparator( ) in accordance with an exemplary embodiment of the invention.

FIG. 38 is procedure Build_Relevance_Table( ), in accordance with an exemplary embodiment of the invention.

FIG. 39 depicts an exemplar execution of procedure Build_Relevance_Table( ), in accordance with an exemplary embodiment of the invention.

FIG. 40 is procedure Roll_Up_By_PD( ), in accordance with an exemplary embodiment of the invention.

FIG. 41 depicts exemplar execution of procedure Roll_Up_By_PD( ), in accordance with an exemplary embodiment of the invention.

FIG. 42 is procedure Update_Relevance_Chart( ), in accordance with an exemplary embodiment of the invention.

FIG. 44 depicts an exemplar execution of procedure Build_Relevance_Table( ) using multiple PD Project Descriptors inputs, in accordance with an exemplary embodiment of the invention.

FIG. 46 is procedure Roll_Up_By_RFP( ), in accordance with an exemplary embodiment of the invention.

FIG. 47 is an exemplar weights matrix, such as may be used by procedure Roll_Up_By_RFP( ), in accordance with an exemplary embodiment of the invention.

FIG. 48 depicts exemplar execution of procedure Roll_Up_By_RFP( ) using multiple PD Project Descriptors inputs, in accordance with an exemplary embodiment of the invention.

FIG. 62A depicts PD customer example 1 (PCE1), in accordance with an exemplary embodiment of the invention.

FIG. 62B depicts RFP customer example 1 (RCE1), in accordance with an exemplary embodiment of the invention.

FIG. 62C depicts PCE1 intersection with RCE1 (INT1), in accordance with an exemplary embodiment of the invention.

FIG. 71 is procedure Overlay_Descriptors( ), in accordance with an exemplary embodiment of the invention.

FIG. 76 is procedure Compute_Weighted_Relevance( ), in accordance with an exemplary embodiment of the invention.

FIG. 77 is an exemplar weighting map, as may be used as input to procedure Compute_Weighted_Relevance( ), in accordance with an exemplary embodiment of the invention.

FIG. 78 is procedure Create_Filter_Table_From_Map( ), in accordance with an exemplary embodiment of the invention.

FIG. 79 depicts an exemplar execution of procedure Create_Filter_Table_From_Map( ) using INT6 input, in accordance with an exemplary embodiment of the invention.

FIG. 85 depicts exemplar customer descriptor information for RFP and PDs, in accordance with an exemplary embodiment of the invention.

FIG. 86 depicts an exemplar execution of procedure Create_Filter_Table_From_Map( ) using multiple customer descriptor inputs, in accordance with an exemplary embodiment of the invention.

FIG. 87 depicts an exemplar updating of a relevance cube table for customer filters and customer relevance, in accordance with an exemplary embodiment of the invention.

FIG. 88 depicts an exemplar construction process for PoP date filters, in accordance with an exemplary embodiment of the invention.

FIG. 89 depicts an exemplar updating of relevance cube table for PoP date filters, in accordance with an exemplary embodiment of the invention.

FIG. 90 depicts an exemplar construction process for overall relevance, in accordance with an exemplary embodiment of the invention.

FIG. 91 is a mock-up of a contract criteria interface 1 for filtering and ranking, in accordance with an exemplary embodiment of the invention.

FIG. 92 is a mock-up of a contract criteria interface 2 for filtering and ranking, in accordance with an exemplary embodiment of the invention.

FIG. 94 depicts exemplar execution 1 of a contract criteria interface, entering filters for PoP dates and customer, in accordance with an exemplary embodiment of the invention.

FIG. 97 is a mock-up of a team construction interface, in accordance with an exemplary embodiment of the invention.

FIG. 98 depicts exemplar execution 1 of a team construction interface, in accordance with an exemplary embodiment of the invention.

FIG. 99 depicts exemplar execution of a contract criteria interface for recommendation processing, in accordance with an exemplary embodiment of the invention.

FIG. 100 depicts exemplar execution 2 of a team construction interface, in accordance with an exemplary embodiment of the invention.

FIG. 102 depicts exemplar execution of a contract criteria interface for filtering using criteria from an end user, in accordance with an exemplary embodiment of the invention.

FIG. 103 depicts exemplar execution 4 of a team construction interface, in accordance with an exemplary embodiment of the invention.

FIG. 104 depicts exemplar execution 5 of a team construction interface, in accordance with an exemplary embodiment of the invention.

FIG. 105 is a mock-up of a proposal outline-to-RFP mapping interface, in accordance with an exemplary embodiment of the invention.

FIG. 106 depicts a mock-up of an exemplar proposal writing plan artifact generated by a relevance management system, in accordance with an exemplary embodiment of the invention.

FIG. 107 depicts a mock-up of an exemplar rationale for team composition artifact generated by a relevance management system, in accordance with an exemplary embodiment of the invention.

FIG. 108 depicts a mock-up of an exemplar rationale for past performance selection artifact generated by a relevance management system, in accordance with an exemplary embodiment of the invention.

FIG. 109 depicts a mock-up of an exemplar past performance write-up artifact generated by a relevance management system, in accordance with an exemplary embodiment of the invention.

FIG. 110 depicts template processing, in accordance with an exemplary embodiment of the invention.

FIG. 111 depicts an ST Project Descriptor for template processing, in accordance with an exemplary embodiment of the invention.

FIG. 112 is a mock-up of an ST data entry interface for template processing, in accordance with an exemplary embodiment of the invention.

FIG. 113 is a mock-up of an element-to-element (E2E) relevance interface, in accordance with an exemplary embodiment of the invention.

FIG. 114 depicts relevance relationships for template processing, in accordance with an exemplary embodiment of the invention.

FIG. 115 is procedure Template_Based_Match( ) in accordance with an exemplary embodiment of the invention.

FIG. 116A is function Intersection( ), in accordance with an exemplary embodiment of the invention.

FIG. 116B is function High_Pass_Filtered_Average( ), in accordance with an exemplary embodiment of the invention.

FIG. 116C is function Product( ), in accordance with an exemplary embodiment of the invention.

Figure 117A:
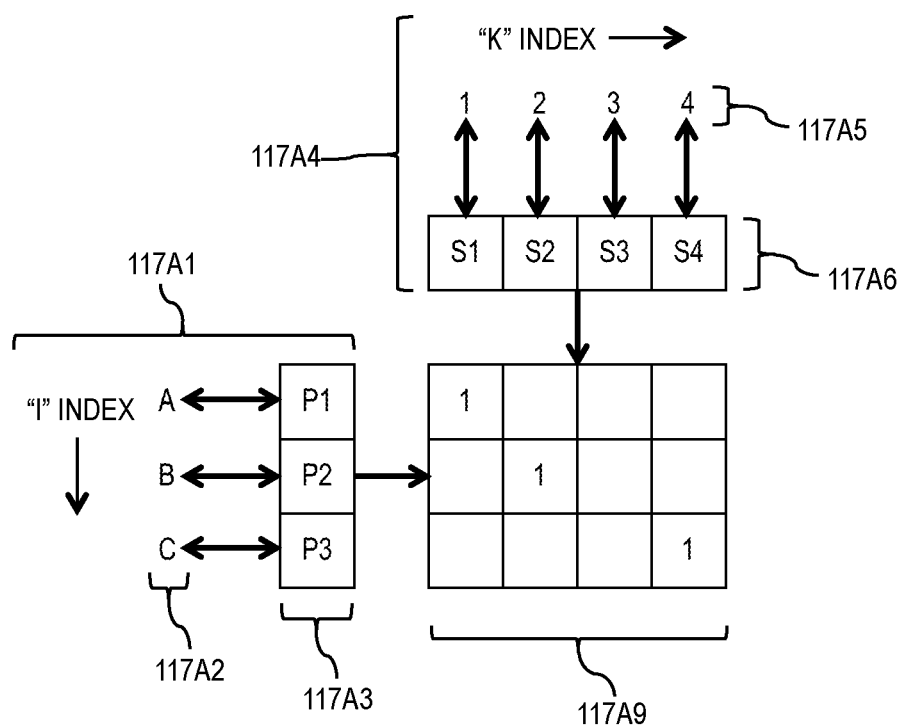

FIG. 117A depicts exemplar execution 1 of procedure Template_Based_Match( ) using Set 1 and Set 2 as inputs, in accordance with an exemplary embodiment of the invention.

Figure 117B:
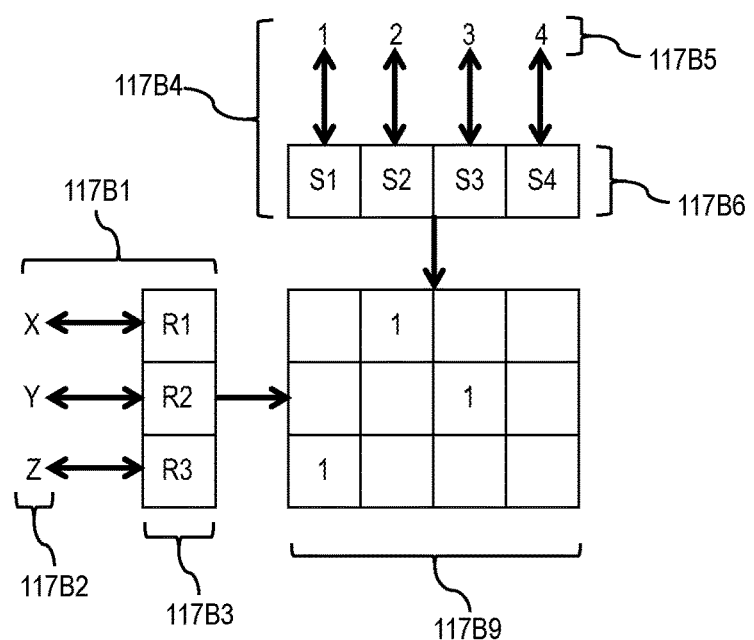

FIG. 117B depicts exemplar execution 2 of procedure Template_Based_Match( ) using Set 3 and Set 2 as inputs, in accordance with an exemplary embodiment of the invention.

Figure 117C:
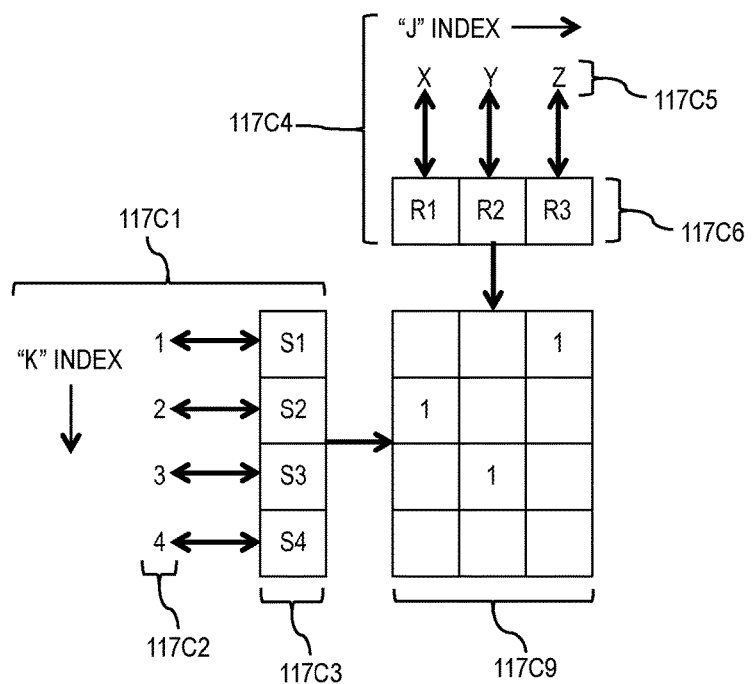

FIG. 117C depicts exemplar execution 3 of procedure Template_Based_Match( ) transpose operation, in accordance with an exemplary embodiment of the invention.

Figure 117D:
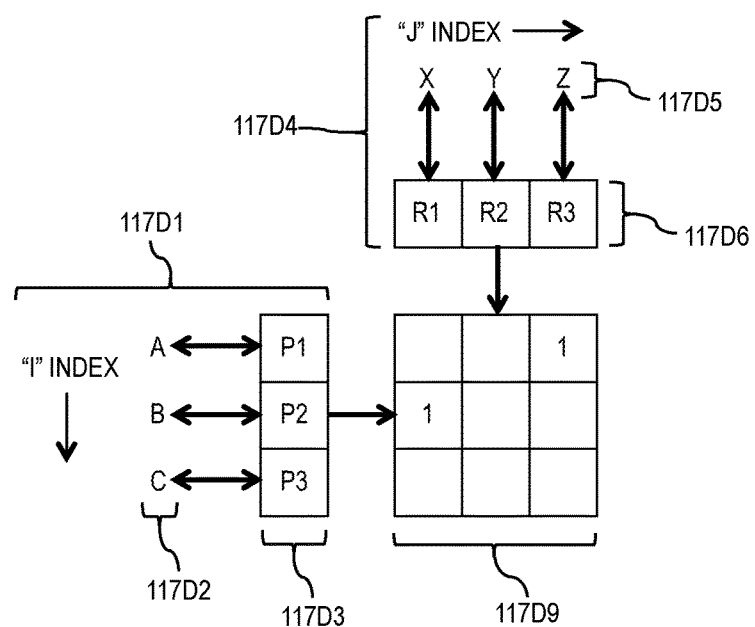

FIG. 117D depicts exemplar execution 4 of procedure Template_Based_Match( ) result for Sets 1 and 3, in accordance with an exemplary embodiment of the invention.

Figure 118A:
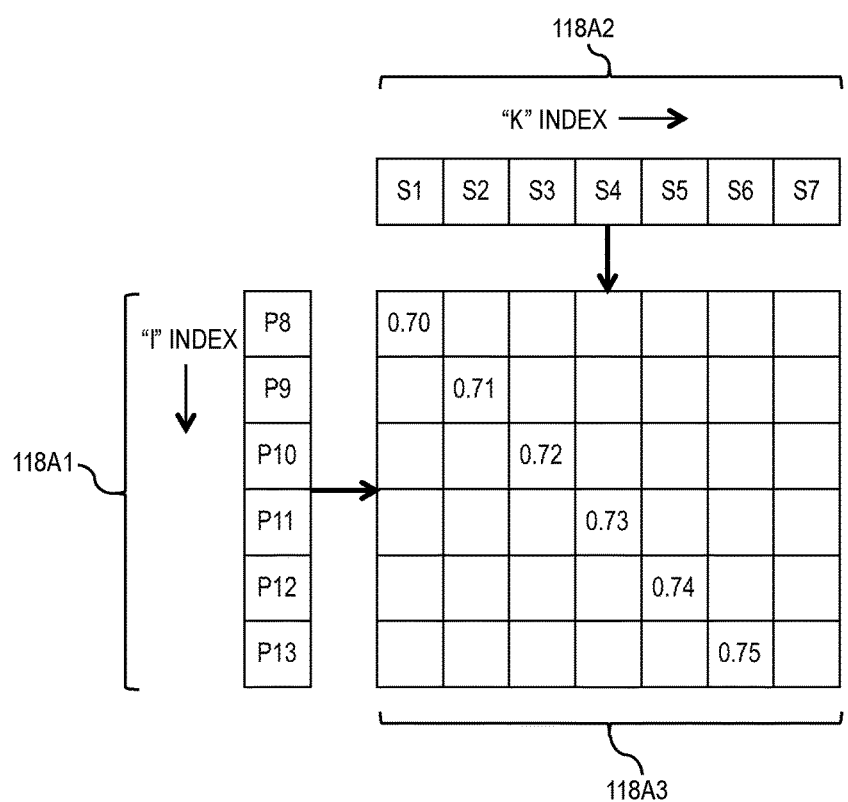

FIG. 118A depicts exemplar execution 1 of procedure Template_Based_Match( ) using PD and ST inputs, in accordance with an exemplary embodiment of the invention.

Figure 118B:
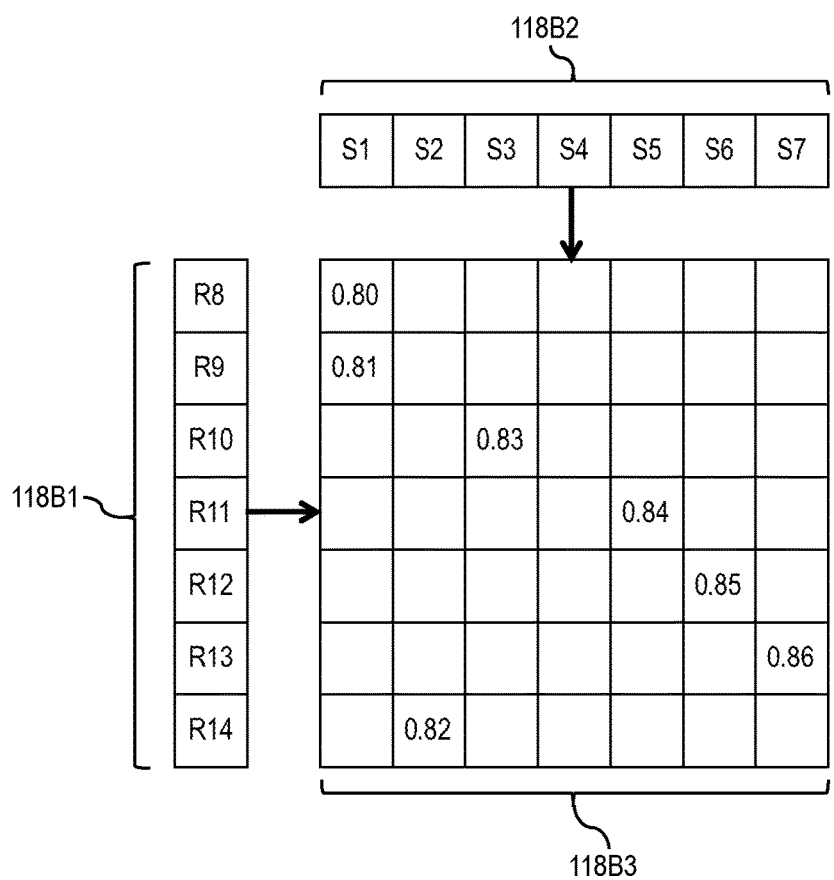

FIG. 118B depicts exemplar execution 2 of procedure Template_Based_Match( ) using RFP and ST inputs, in accordance with an exemplary embodiment of the invention.

Figure 118C:
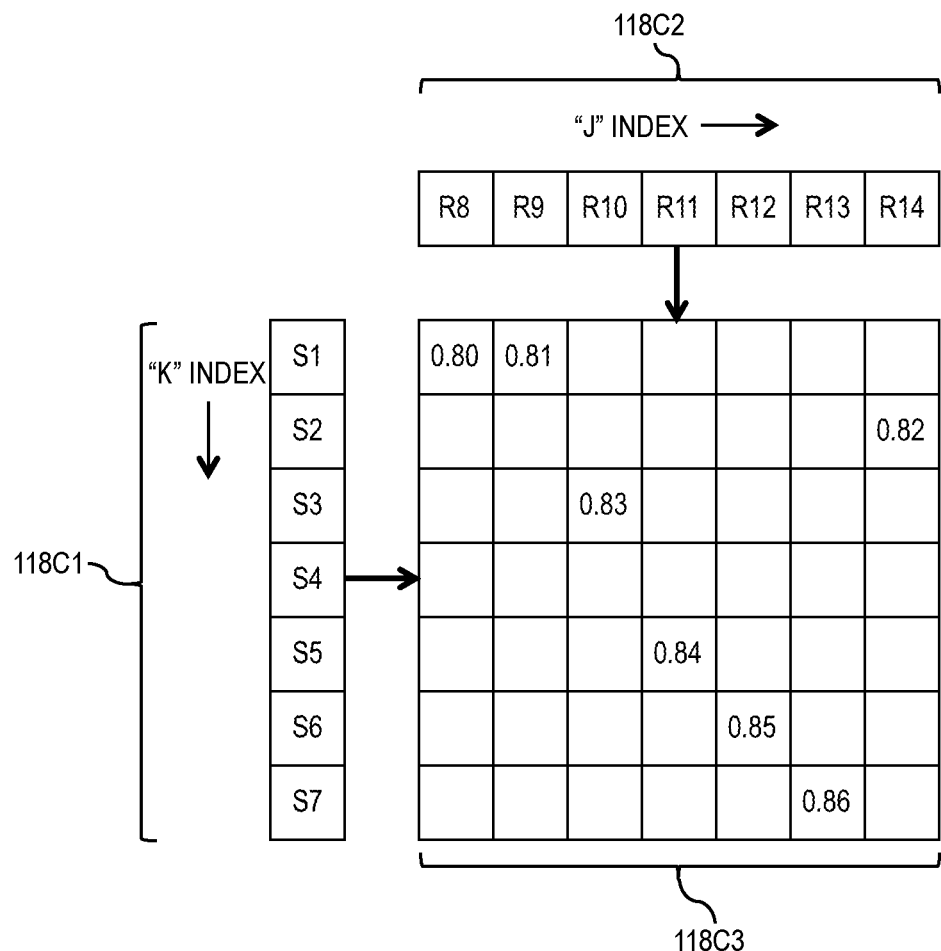

FIG. 118C depicts exemplar execution 3 of procedure Template_Based_Match( ) transpose operation, in accordance with an exemplary embodiment of the invention.

Figure 118D:
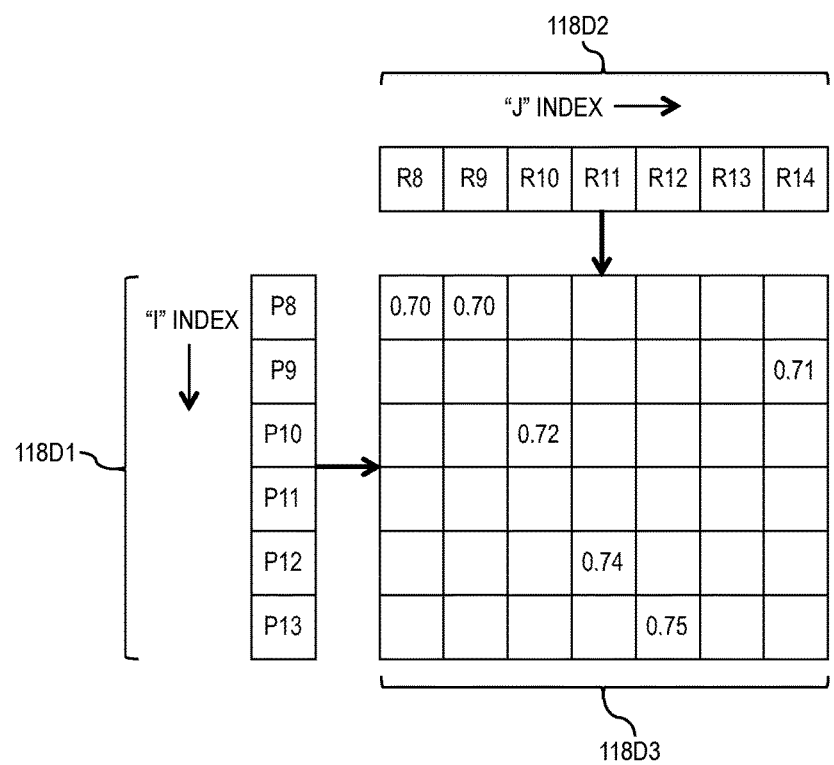

FIG. 118D depicts exemplar execution 4 of procedure Template_Based_Match( ) result for PD and RFP, in accordance with an exemplary embodiment of the invention.

FIG. 119 depicts exemplar execution values for procedure Template_Based_Match( ) using ST, PD, and RFP inputs, in accordance with an exemplary embodiment of the invention.

Figure 120:
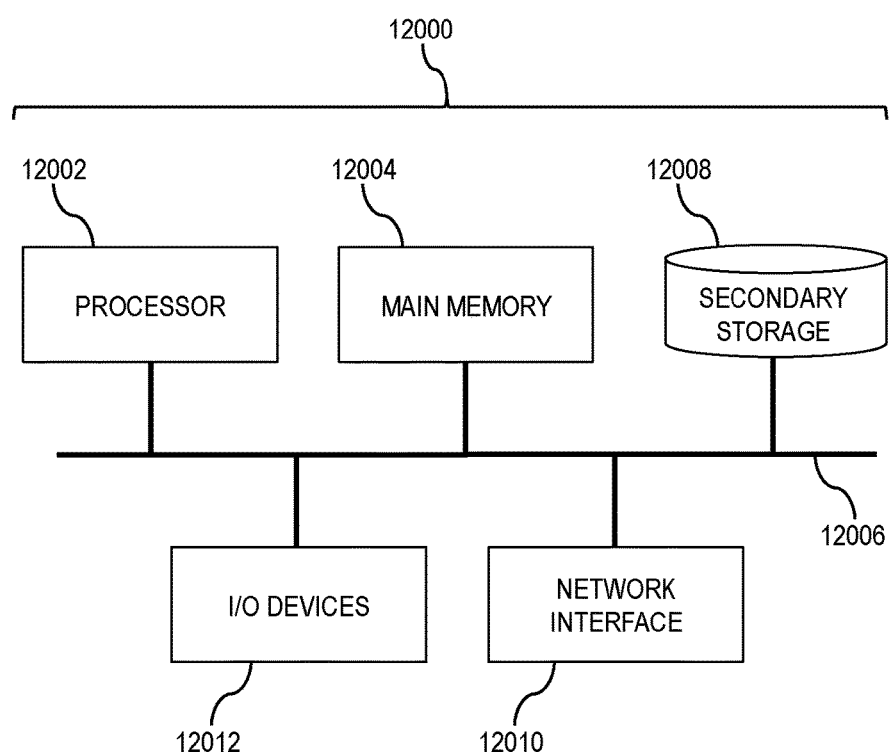

FIG. 120 depicts a computer-based device with a computer-based product implementation, in accordance with an exemplary embodiment of the invention.

Figure 121A:
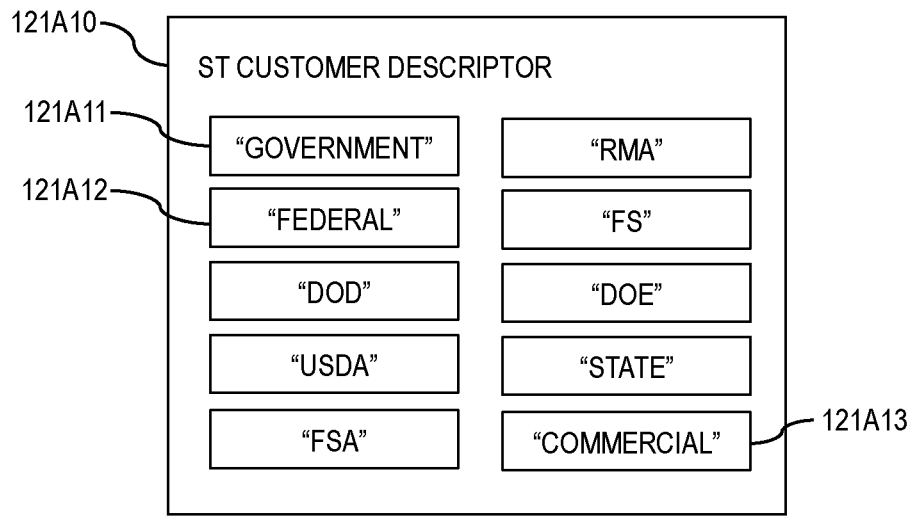

FIG. 121A depicts a tag-based Project Descriptor sub-descriptor for an exemplar ST, in accordance with an exemplary embodiment of the invention.

Figure 121B:
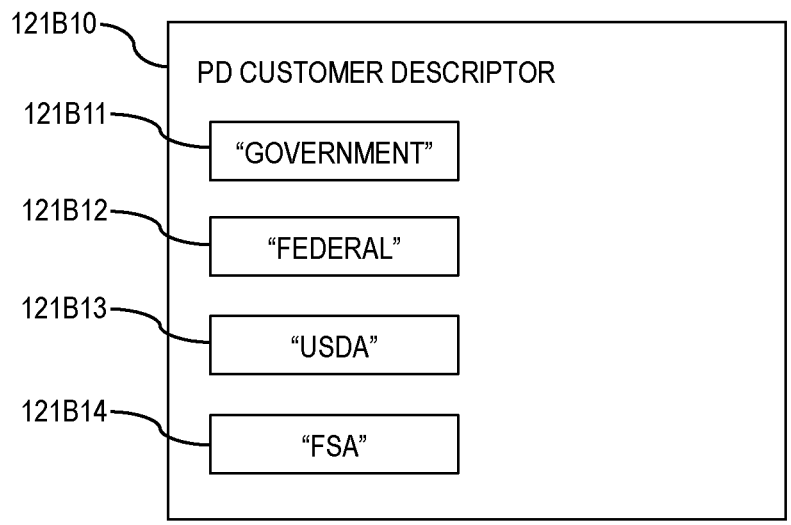

FIG. 121B depicts a tag-based Project Descriptor sub-descriptor for an exemplar PD, in accordance with an exemplary embodiment of the invention.

DETAILED DESCRIPTION OF THE INVENTION

Reference will now be made in detail to the present exemplary embodiments of the invention, examples of which are illustrated in the accompanying drawings.

Figure 1:
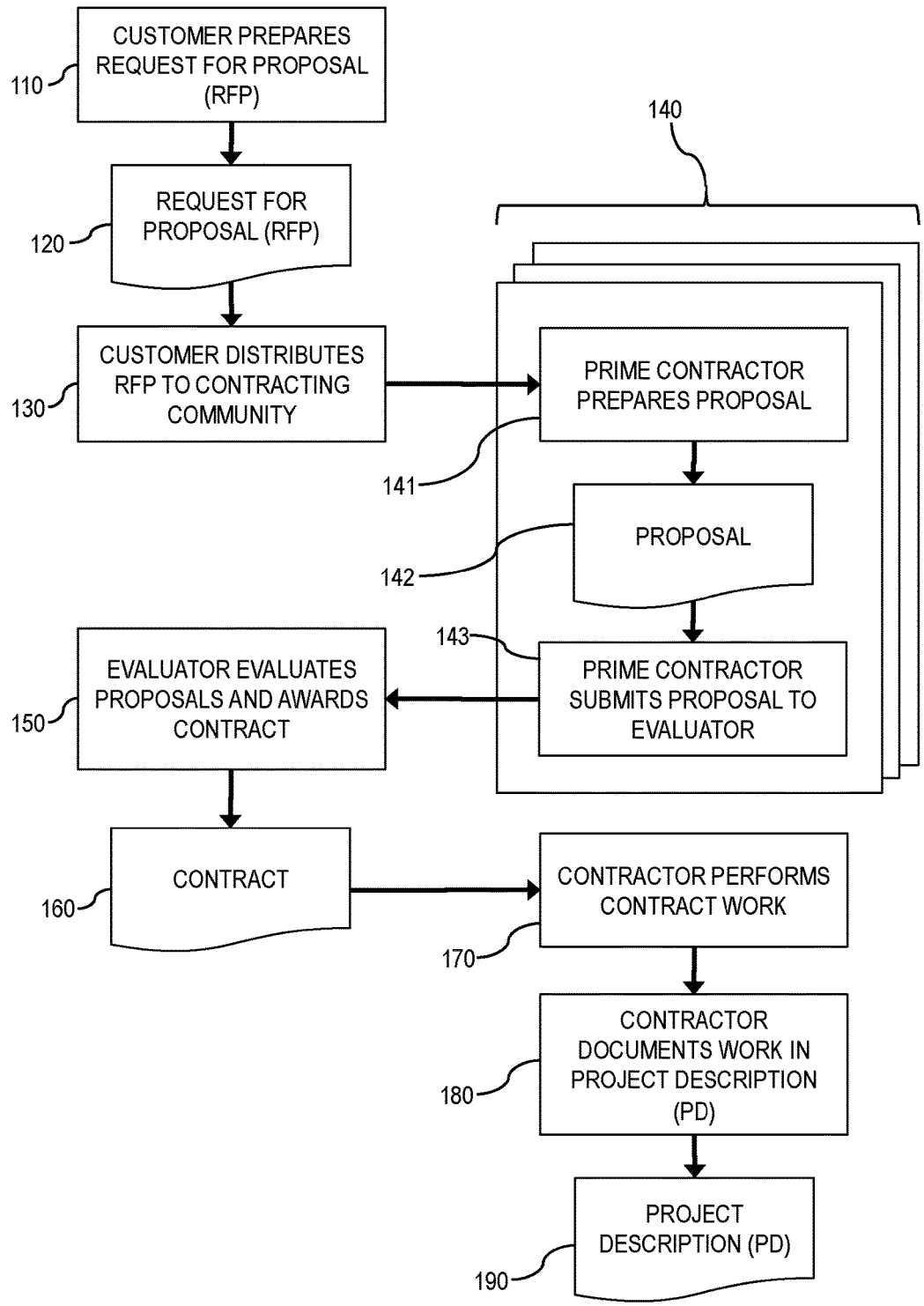
FIG. 1 is a contracting process overview, in accordance with an exemplary embodiment of the invention.

An exemplary embodiment of the present invention may relate to the business of contracting. Referring to FIG. 1 we describe an overall contracting process. A customer, which may be a U.S. Government agency or other entity, may prepare 110 a Request for Proposal (RFP) document 120, which may also be referred to as a "Request for Quote (RFQ)", "Task Order Request (TOR)", "Delivery Order (DO)", or other similar name. An RFP may be comprised of multiple sections, such as (1) a Statement of Work (SOW) or Performance Work Statement (PWS) that describes requirements of work to be performed (i.e., goods and/or services sought); (2) Proposal Preparation Instructions (PPI) that describe documents or other artifacts a contractor must prepare and submit as a proposal to bid upon the work; and (3) Evaluation Criteria (EC), which describe how an evaluator in a customer organization shall evaluate and rank submitted proposals, and possibly select one for award as a contract. A customer distributes an RFP 130 to a contracting community 140, requesting that interested and qualified contractors prepare and submit proposals that achieve the RFP requirements.

Upon receiving an RFP, a contractor within a contracting community 140 may begin making determinations of its individual (and potentially collective) capabilities to respond competitively to the RFP requirements. At the most basic level, does said contractor have the technical and management capabilities to provide the requested services as described in a SOW, at a competitive price? Based upon determinations of in-house capabilities, and external communications with other contractors that have complementary and/or overlapping capabilities, a small number of prime contractors may emerge, who are those contractors that may prepare proposals. Often, in order to effectively respond to RFP 120 requirements, a prime contractor may build and lead a team of subcontractors who may bid collectively on an RFP "under" said prime contractor. Note that a prime contractor may be responsible for preparing 141 a proposal 142 and submitting it to a customer 143, and a contract 160 awarded as a result of proposal evaluation 150 will be awarded to said prime contractor.

A prime contractor may prepare 141, in accordance with a PPI, a proposal 142 that meets the RFP requirements, and submit said proposal 143 to an evaluator, typically a group within a customer organization, for evaluation according to an EC. An evaluator may examine, evaluate, and rank proposals received from prime contractors 150, and may award a contract to a (prime) contractor whose proposal was evaluated most favorably, generally indicated by highest evaluation score. A resulting contract 160 may represent a legally binding agreement between a customer and a prime contractor, for work to be performed.

In order to provide the required goods or services, a prime contractor performs the contractual work 170, typically as a project under the guidance and responsibility of a Program Manager from said prime contractor organization. As a project implementation for a contract is underway, or at the conclusion of said project, a contractor organization will often document 180, such as for internal use, work performed under said contract, typically in a short (often 1-5 pages) project description (PD) 190 that may serve as a description of current or past performance. A contractor may be well motivated to prepare and maintain such PDs, as said PDs may serve as documentation a contractor may use in preparing future proposals, as evidence of said contractor's ability to perform such work.

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise.

All publications mentioned herein are incorporated herein by reference to disclose and describe the methods or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates, which may need to be independently confirmed.

Relevance Management System Overview

Figure 2:
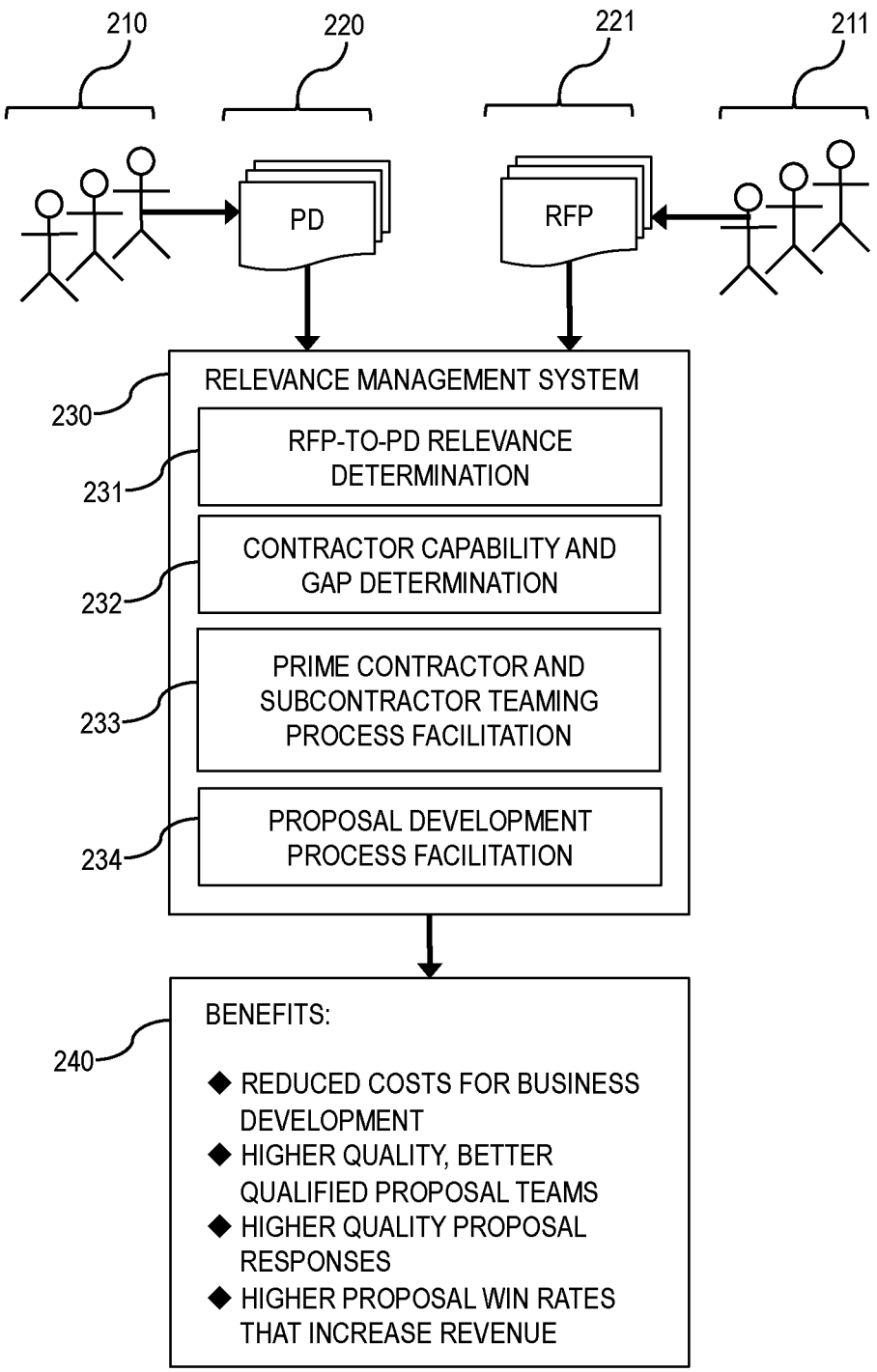
FIG. 2 is a relevance management system, in accordance with an exemplary embodiment of the invention.

FIG. 2 generally depicts an overview of a relevance management system 230, in accordance with an exemplary embodiment of the invention, showing end users (Ref. 210 and 211), inputs (Ref 220 and 221), key components of system processing (Ref. 231, 232, 233, and 234), and key benefits 240 to an end user. End users are generally contractors, who may generally fall into two categories, a first being a contractor 211 who has received an RFP 221 and is considering being a prime contractor, which will entail preparing and submitting a proposal; and a second being a contractor 210 who brings capabilities and experience, such as represented by PDs 220, which may be useful to a prime contractor in preparing a proposal. The second category of contractors, those having PDs 210, will generally overlap with (i.e., include members from) the first category of contractors, who have received an RFP 211, in addition to including a broad base of subcontractors who may generally seek to join a prime contractor's team. For example, a prime contractor may typically belong to both categories (Ref. 210, 211), whereas a subcontractor may typically use the system as a PD provider 210.

To prepare a proposal 234 that will be evaluated favorably, a potential prime contractor 211 must generally understand how well said prime contractor's experience and capabilities match the requirements of an RFP 221. The RFP requirements are generally well documented and readily accessible, captured in the SOW, PPI, and EC of an RFP 221. In contrast, in the current state of the art, a contractor's "experience" and "capabilities", evidence of which may need to be submitted as part of a proposal, are often less well documented, less readily accessible, or may in some cases be based on contractor organization assertions that are exaggerated or cannot readily be substantiated—for example, may contain significant marketing hyperbole. Because a proposal will likely be evaluated using specific criteria from an EC, which typically require describing and documenting where a contractor (and its subcontractors) has performed work that is of similar "size, scope, and complexity" to the RFP requirements, it is beneficial for a contractor to base assertions of "experience" and "capabilities" in a proposal upon actual experience, such as may be represented by PDs. The relevance management system 230 we disclose herein performs RFP-to-PD relevance determination 231, which may assist a contractor 211 in identifying PDs 220 that represent relevant experience with respect to an RFP, for use in a proposal. Said RFP-to-PD relevance determination 231 may also assist a contractor (Ref. 210 or 211) in identifying an RFP that represents a relevant work opportunity with respect to a PD.

A second critical task a potential prime contractor 211 may need to perform is capability gap determination 232, to identify any RFP 221 requirements for which said prime contractor does not have in-house capabilities (or for which said prime contractor's team does not have collective capabilities). The relevance management system 230 may further process results of RFP-to-PD relevance determination 231 to determine contractor capabilities; said contractor capabilities may be compared to RFP requirements to identify capability gaps. To eliminate said capability gaps, a prime contractor may broaden its search of PDs 220, such as to include PDs that belong to subcontractors, to identify potential teammates with relevant experience (as represented by a PD), who may be brought on-board the team to fill a capability gap.

A relevance management system 230 may use results such as RFP-to-PD relevance 231 and contractor capabilities gaps 232, to facilitate a process of prime contractor and subcontractor teaming 233. The relevance management system 230 may enable a prime contractor to rapidly locate subcontractors with complementary and overlapping capabilities, in order to fill capability gaps and effectively bolster the prime contractor team's overall capabilities, respectively. A systematic, quantified approach to teaming enables a prime contractor to propose to a customer a higher-quality, better-qualified team, whose experience and capabilities are proven, and may be verified. In the current state of the art, the process of identifying potential subcontractors typically involves many face-to-face meetings between a prime contractor and subcontractors, and can incur significant business-development expense. Significant elements of the business development process, such as identifying subcontractors with complementary and overlapping capabilities or identifying relevant opportunities, and the costs associated with these activities, may be eliminated or greatly streamlined by an embodiment of the present invention, thereby reducing business development costs 240.

A relevance management system 230 may also facilitate the actual proposal development process 234, including the development of proposal artifacts, such as may be used in proposal volumes to be submitted with a proposal. For example, the results from RFP-to-PD relevance determination 231 and contractor capability determination 232 may be used to produce tangible artifacts, such as a relevance chart, that capture and convey a team's experience and capabilities, which may be included in a proposal, and whose automated development may speed-up a proposal development process 234. A net result for a contractor may be higher proposal win rates that increase revenue and profits 240.

Figure 3:
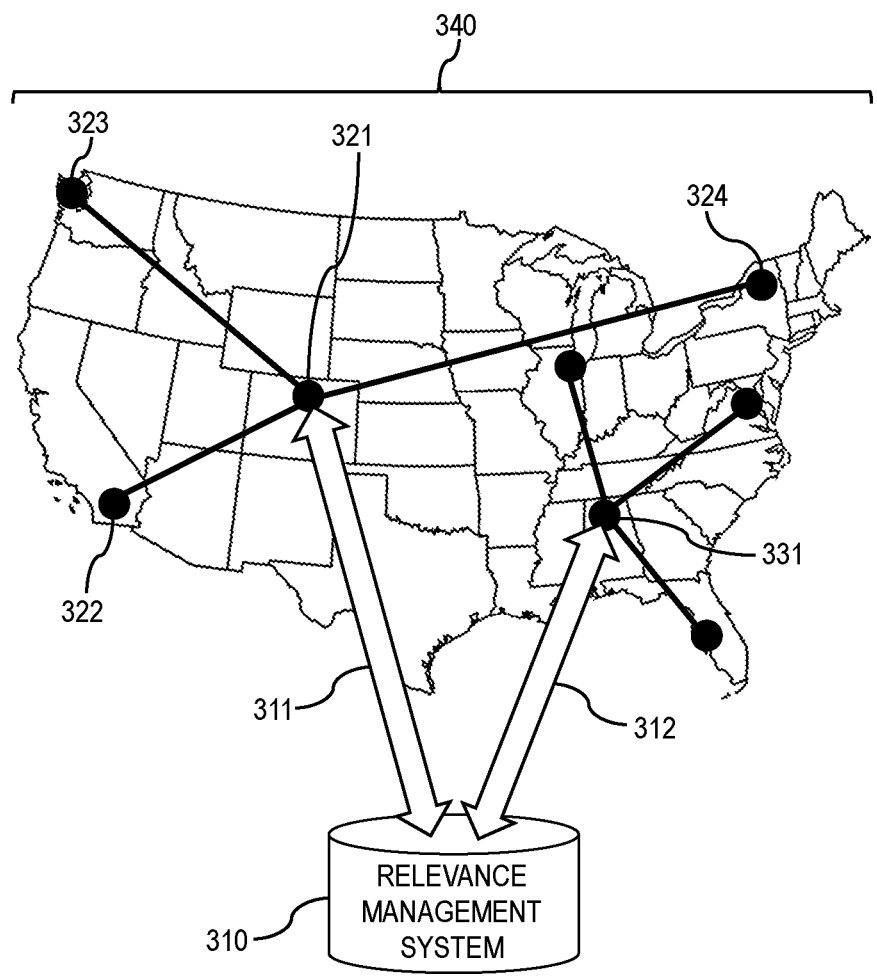
FIG. 3 is a relevance management system supporting a distributed end user base, in accordance with an exemplary embodiment of the invention.

FIG. 3 generally depicts a relevance management system 310, in accordance with an exemplary embodiment of the invention, advantageously supporting a distributed end user base. We disclose in reference to FIG. 3 how multiple contractors (such as a first contractor 321 or a second contractor 331, which correspond to a contractor 211 in FIG. 2) may use functionality of a relevance management system 310, such as to identify the experience and capabilities of potential team members, who may be geographically distributed 340, including internationally, by interacting with (via a first interaction 311 or a second interaction 312) a relevance management system 310. For example, a prime contractor, such as a first contractor 321 or a second contractor 331, may use a relevance management system 310 to identify, communicate with, and bring onboard potential team members (illustrated for a prime contractor 321, as a first subcontractor 322, a second subcontractor 323, and a third subcontractor 324, who correspond to a group of contractors 210) with significantly reduced business development costs, as compared to current approaches that may rely on e.g. social networking, traveling to pre-RFP customer conferences to (hopefully) identify potential qualified partners, or other types of interactions that may involve significant face-to-face, voice-to-voice, or other types of communication.

Figure 4:
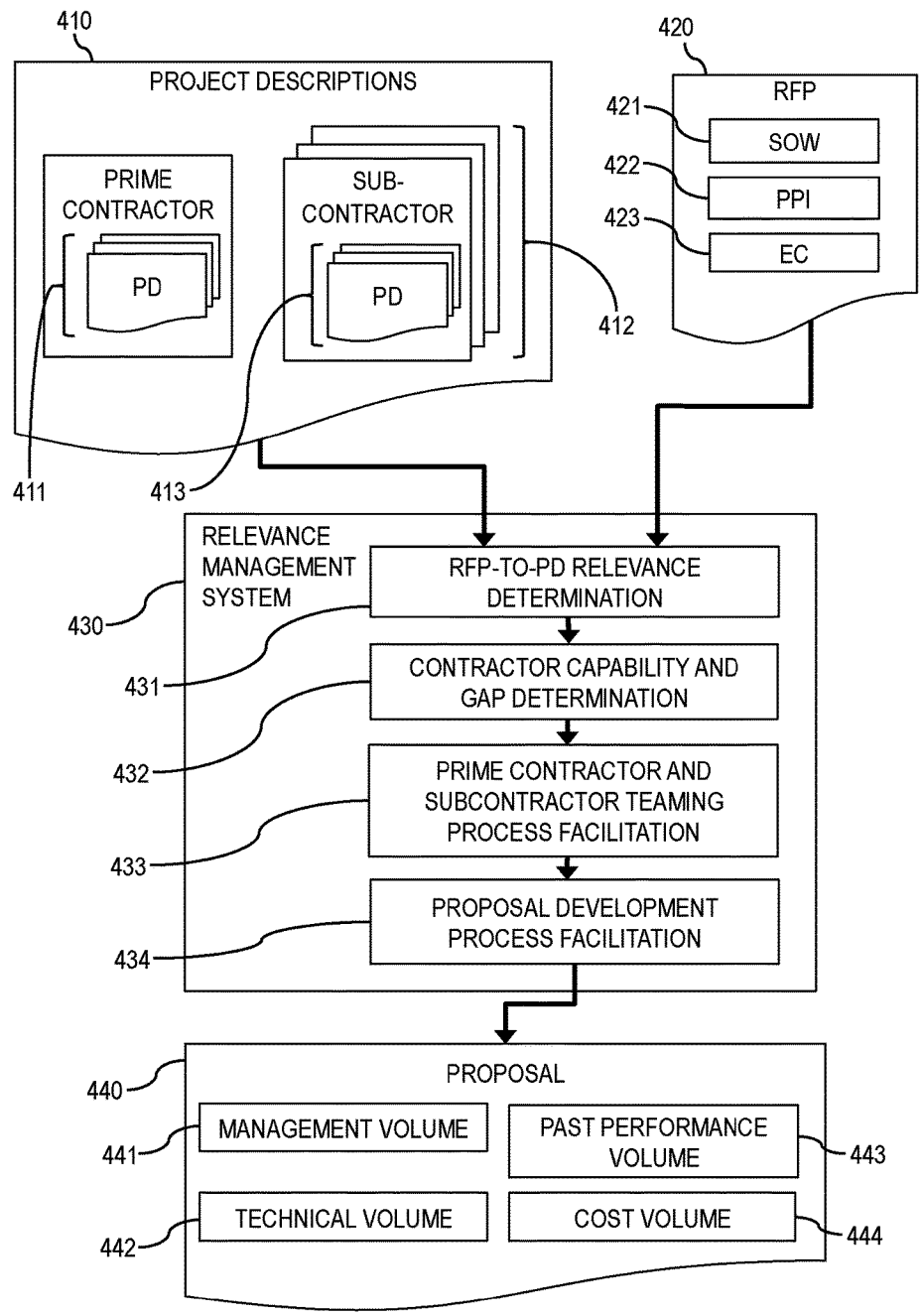
FIG. 4 is a relevance management system, in accordance with an exemplary embodiment of the invention.

FIG. 4 generally depicts in further detail a relevance management system 430, in accordance with an exemplary embodiment of the invention, disclosing further detail including relationships between components of PD 410 and RFP 420 inputs, a relevance management system 430, and a proposal 440 that a prime contractor may be preparing, in response to an RFP 420. In reference to FIG. 4 we also disclose further detail on several challenges (Ref 431, 432, 433, and 434) an end user may face when preparing a proposal 440 in response to an RFP 420, which a relevance management system 430 may address. Such challenges include identifying a relevant PD from a potentially large collection of PDs 410 or identifying a relevant RFP from a potentially large collection of RFPs, such as may be performed by RFP-to-PD relevance determination 431; identifying team capabilities, such as may be performed by contractor capability and gap determination 432; facilitating prime contractor and subcontractor teaming 433; and preparing proposal volumes, which may be performed by proposal development process facilitation 434.

Regarding components of an RFP 420, an EC 423 provides guidance on how an evaluator will evaluate prior and current experience presented in a proposal. Typically, said experience needs to be of similar "size, scope, and complexity" to the work called for in a SOW 421. In addition, a PPI 422 component will generally provide guidance to a prime contractor on how past performance experience shall be submitted in a proposal 440. Typically, such PPI instructions require a prime contractor to provide a Past Performance volume 443, which may need to include a handful of (generally, three to five, however such number may be higher or lower) past performance references, which are typically brief (normally, one to two pages) descriptions of relevant projects. One of the key goals of identifying relevant PDs 431 is to identify the handful of projects (such as represented by PDs), which may comprise a Past Performance Volume 443, that will be evaluated most favorably.

Regarding identifying a relevant PD or RFP 431, relevance may be a qualitative or quantitative measure of how well a prior (or current) project or contract demonstrates experience performing work that is similar to future work requirements, such as specified in a SOW 421 of an RFP. For example, how similar is an instance of previous work experience, such as represented in a prime contractor 411 or subcontractor 413 PD, to work elements as called for in a SOW 421? For example, if a SOW 421 includes requirements to provide "Help Desk" phone services for a specific Government customer, are there PDs 410 that a prime contractor can use in their proposal that represent direct experience (or indirectly, via one of their subcontractors) in providing similar "Help Desk" type services? Perhaps comparable services for another Government agency? Identifying a relevant PD 431 that will be evaluated favorably may not be a simple task, as a medium to large-sized contractor may have hundreds or even thousands of prior contracts to draw upon, each of which may have provided a multitude of services or products. Such prior and current contract projects may be represented as PDs 410.

Regarding identifying team capabilities 432 and the set of PDs that may be considered 410, a prime contractor may need to identify SOW 421 requirements, or other requirements, for which it does not have capabilities, referred to as capability gaps, for which said prime contractor may increase the size of its team by bringing on-board teammates as subcontractors 433, to fill such gaps. Broadening a search for experience and capabilities, to include not only PDs of a prime contractor 411, but also PDs 413 from multiple subcontractors 412, may significantly increase the number of PDs under consideration. Similarly, at any given time, a contractor may have the opportunity to consider bidding on any of a large number of RFPs that cover a broad range of work requirements. Which of these RFPs represent the best opportunity to bid upon, that represent the best match with the contractor's experience, such as represented in a PD?

Regarding components of a proposal 440, a proposal 440 will typically include a Management Volume 441, Technical Volume 442, and Cost Volume 444, each of which is generally evaluated according to guidance in an EC 423. Typically, such volumes may be evaluated more favorably (i.e., given a higher score) if the content in said volumes is "substantiated" by examples, such as how a contractor (including subcontractor team members) has performed work that is of similar "size, scope, and complexity". For example, a Technical Volume 442 is where a contractor typically presents a proposed solution to meet SOW 421 requirements. In describing how SOW 421 work will be performed, it may be to a contractor's benefit to present their experience performing similar work, for example by inserting short excerpts (e.g., sentences that may be taken from PDs that are included in a Past Performance Volume 443) into a Management 441, Technical 442 or Cost 444 Volume, to substantiate (i.e., demonstrate) the contractor's ability to provide the required services. A relevance management system 430 may facilitate the task of identifying short excerpts from PDs, so they may be inserted into said volumes by a proposal writing team, including by generating proposal artifacts, such as a detailed work plan that incorporates relevant information from PDs, as we disclose in reference to FIG. 105, FIG. 106, FIG. 107, FIG. 108, and FIG. 109.

Thus we can see the usefulness of a relevance management system 430, such as we disclose in the present invention, which may assist a prime contractor in identifying relevant PDs and RFPs 431 and identifying team capabilities and gaps 432; that draws upon inputs that may include, but are not limited to, project descriptions 410 and RFPs 420; and may also facilitate a prime contractor in constructing a team 433 and in preparing a 434 proposal volume 440.

At a fundamental level, a relevance management system 430 may help a prime contractor to identify a work opportunity, such as represented by an RFP, and to identify, understand, and manage the experience and capabilities it may draw upon, as may be represented by PDs 410, both from within its organization 411, as well as from external subcontractors 413, which may be helpful in responding to an RFP 420 with a proposal 440.

Relevance Framework
Premise Framework for Establishing Demonstrated Experience and Proven Capability A key premise that enables a relevance management system 430 is that a contractor may effectively show "demonstrated experience" performing work, such as described in SOW requirements 421, by providing or referencing in their proposal a PD 410, or other suitable representation, that establishes a contractor as having previously performed work that is similar to said SOW 421 requirements. The PD 410 establishes such experience, and may serve as proof of experience; without a relevant PD 410, claimed experience may be unverifiable, a misrepresentation of work previously performed, or even a false claim. In short, "a relevant PD represents demonstrated experience".

A second key premise that enables a relevance management system 430 is that a contractor may effectively demonstrate a "capability" to perform work, such as described in SOW requirements 421, by having performed said work previously, namely through demonstrated experience.

Thus we can summarize these two premises as the following disclosure: (1) If a contractor has a PD 410 that is relevant to an area, it implies they have Demonstrated Experience in said area; and (2) if a contractor has at least one example of Demonstrated Experience in an area, it implies they have a Proven Capability to perform work in said area. This is represented below with "implies" represented as a "→" symbol:

(1) Relevant PD→Demonstrated Experience
(2) Demonstrated Experience→Proven Capability Combining these two premises, we may infer and disclose that: (3) If a contractor has a PD 410 that is relevant to an area, it implies they have the Proven Capability to perform work in said area.

(3) Relevant PD→Proven Capability

Note that premises (1) and (3) are both driven by a tangible input, namely the existence of a relevant PD. For example, a contractor may prove it has "demonstrated experience" by providing a relevant PD 410 (as proof), and similarly, may show that it has a "proven capability" by providing the associated relevant PDs 410 (again, as proof). Note that the functionality we disclose to demonstrate the results of (1) and (3) (Demonstrated Experience, and Proven Capability, respectively) is quite different than, and much stronger than, an unsubstantiated claim made by a contractor that it has "experience" performing specific work, or the "capability" to perform such work. The premise framework that we disclose above, upon which a relevance management system 430 may be based, provides a clear, unambiguous way for a contractor to substantiate (i.e., prove) such claims, through relevant PDs 410. Broadly speaking, we disclose a relevance management system 430 that may use the disclosed premise framework to identify an RFP that is relevant to one or more PDs; as well as to identify one or mote PDs that are relevant to an RFP 410, which may be used to establish "demonstrated experience" and "proven capabilities" for contractors, which may be useful in preparing a proposal.

To clarify these concepts, it is useful to disclose a structure that may represent a typical PD and a typical RFP, and disclose how a relevance management system 430 may use the premise framework to establish "demonstrated experience" and "proven capabilities" using a PD and an RFP.

PD and RFP Structure

Figure 5:
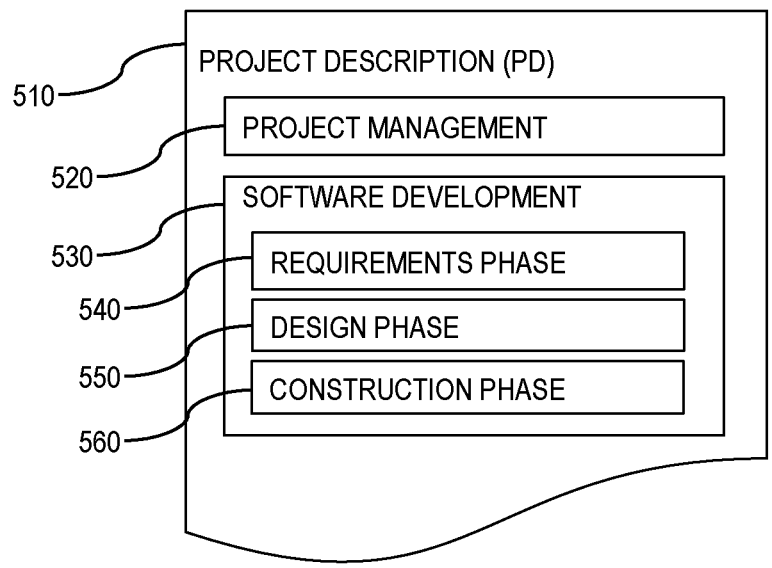
FIG. 5 is a Project Description (PD) structure, in accordance with an exemplary embodiment of the invention.

FIG. 5 generally depicts and discloses a structure that represents an example project description (PD) 510, in accordance with an exemplary embodiment of the invention, showing that said exemplar PD structure contains two major sections, a first section describing project management 520 being a description of a work element performed to manage an example project, and a second section describing a work element performed for software development 530, on said example project. Delving further into the structure, we can see that a contractor who may have developed said PD has further broken down the section on software development 530 into three constituent subsections, which represent work elements that were performed; in this example these are a requirements phase 540, a design phase 550, and a construction phase 560. Each of the elements (Ref 520 through 560) of the PD structure 510 may represent sentences or paragraphs in a project description, such as a paper or electronic document, or other suitable content or representation, that describe work that was performed for a project for said element. For example, a project management element 520 may represents one or more sentences or paragraphs that describe how a contractor managed a project; for example, that a "Team Leader managed a staff of software developers, provided a customer with daily updates on progress, and developed and delivered a weekly written status report that described that week's achievements and planned activities for the coming week."

We observe in this example that the terminology a contractor has used to describe project work elements that are represented in the PD 510, are typical of such terms used in industry (e.g. terms such as "software development", "requirements phase", and so on); however, such terms are not part of a prescribed, rigid, or standard lexicon. For example, on this particular project example, a contract may have referred to a task of developing software modules as "Software Development", rather than using an analogous term such as "Software Engineering" or "Module Construction". Thus, the example project description, and corresponding terms used in a PD 510, may reflect a broad range of customer terminology, such as used on a contract.

Figure 6:
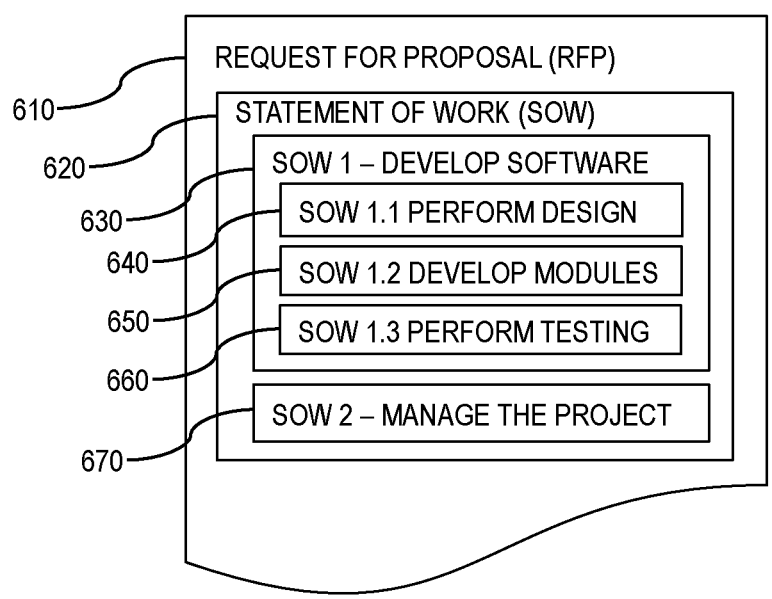
FIG. 6 is a Request for Proposal (RFP) structure, in accordance with an exemplary embodiment of the invention.

FIG. 6 generally depicts and discloses a structure that represents an example request for proposal (RFP) 610, in accordance with an exemplary embodiment of the invention, which has been simplified here to focus only on a Statement of Work (SOW) 620 contained in an RFP 610; the PPI 422 and EC 423 that would normally be part of an RFP are not shown. Here we can see that a SOW element 620 represents requirements for two work elements, "SOW 1—Develop Software" 630 and "SOW 2—Manage the Project" 670. As is typical of an RFP, a SOW work element that describes complex requirements (such as "SOW 1—Develop Software", in this case) has been broken down further into its constituent work elements that represent more-detailed requirements, namely work elements that contain requirements for "SOW 1.1 Perform Design" 640, "SOW 1.2 Develop Modules" 650, and "SOW 1.3 Perform Testing" 660. Each such element may represent sentences or paragraphs in a SOW, such as a paper or electronic document, or other suitable content or representation, that describe in detail the work to be performed.

As with the PD shown in FIG. 5, the terminology a customer has used, and which are reflected in the RFP structure in FIG. 6, to describe SOW requirements (e.g., SOW 1—Develop Software 630, SOW 1.1 Perform Design 640, and so on) are typical of those used in industry, but are not part of a prescribed, rigid, or standard lexicon. In this example, a customer may simply be expressing SOW requirements using terminology familiar to its organization. Also, the ordering of requirements within an RFP, such as those within a SOW, and the corresponding order within an RFP structure 610, is not prescribed, but instead may follow an order that makes sense to a customer. For example, this customer has put the "technical" work within the SOW as a first element ("SOW 1—Develop Software" 630), followed by "management" work as a second element ("SOW 2—Manage the Project" 670). An RFP developed by a different customer (or indeed, this very same customer) could have just as easily switched order; similarly, said customer could prepare a second RFP for similar work (for example), in which the SOW element order was also switched. In short, as we disclose, there is no single, prescribed order in which RFP elements, including such as within a SOW, must be specified by a customer.

Overview of System and Methods to Determine RFP-To-PD Relevance

Figure 114:
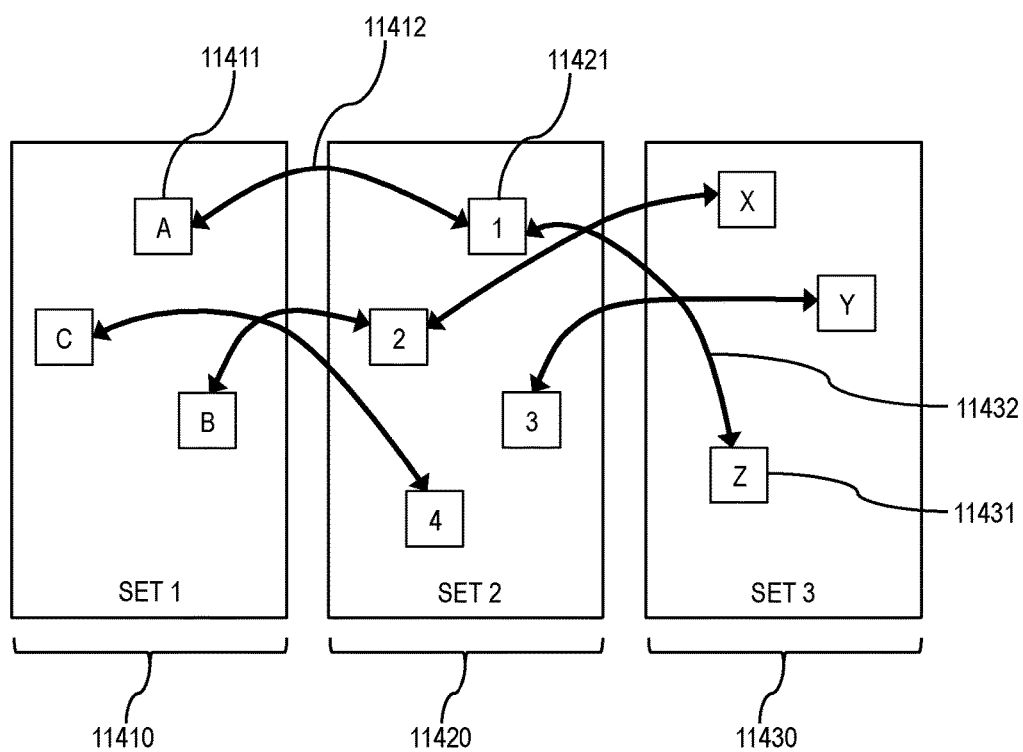

For clarity of the specification, and as we disclose in further detail in reference to FIG. 114, a relevance management system 430 may define relevance as a bidirectional, transitive relationship between two entities; thus when we determine, for example, "RFP to PD relevance", the information contained therein may be used to determine and express the complementary relationship "PD to RFP relevance", and vice versa.

In responding to example RFP requirements, such as illustrated in an exemplar RFP in FIG. 6, a contractor may need to determine if a PD 510, such as the example illustrated in FIG. 5, is relevant. A subject matter expert (SME) who was to review the PD represented in FIG. 5 and the RFP represented in FIG. 6 would immediately notice similarity across work elements, despite differences in terminology. For example, the project description of work performed for Project Management (associated with an element 520) may correspond to RFP requirements in "SOW 2—Manage the Project" (associated with an element 670). Similarly, the project description of work performed for Design Phase (associated with an element 550) may correspond to RFP requirements in "SOW 1.1—Perform Design" (associated with an element 670); and so on.

Figure 20:
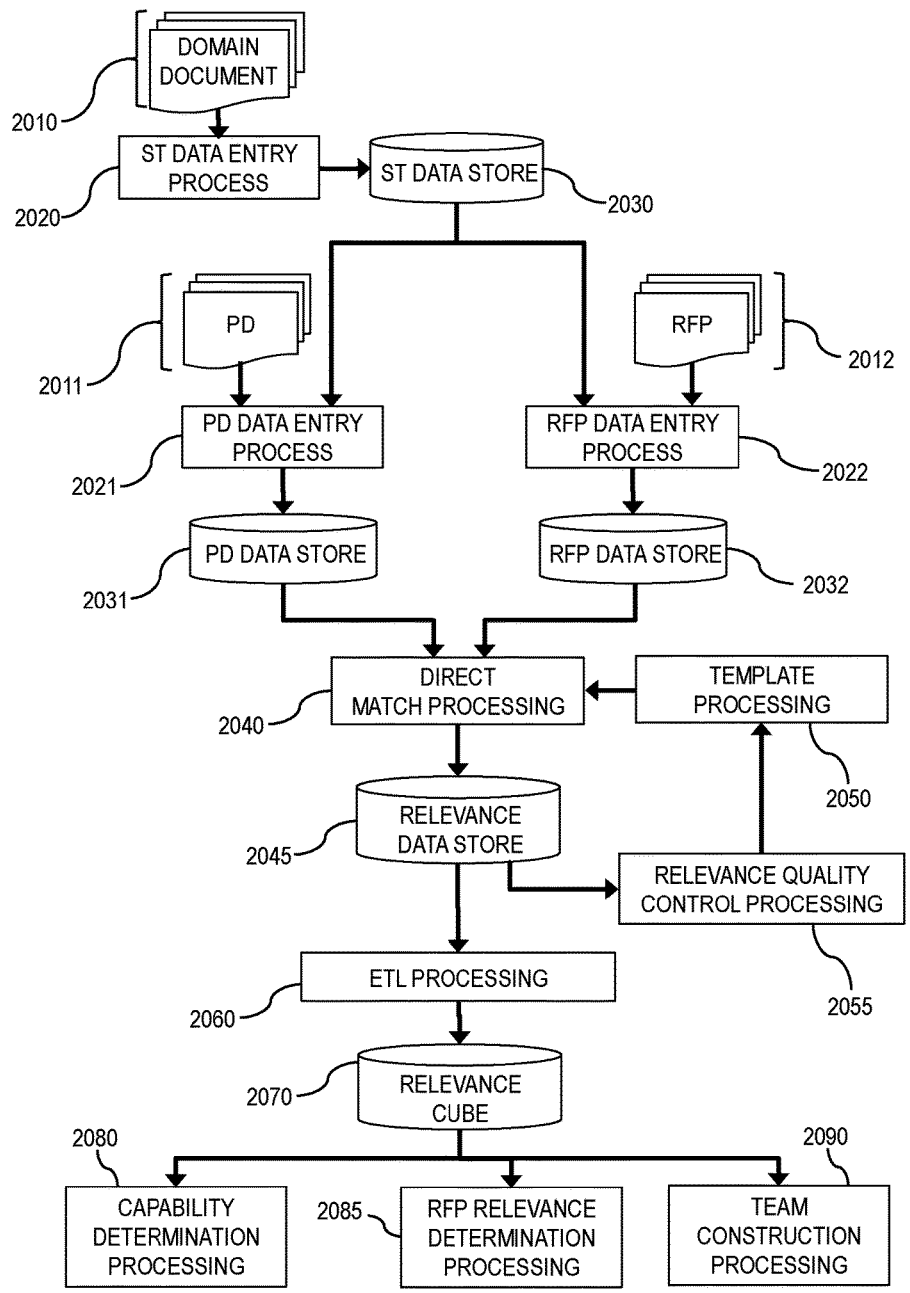
FIG. 20 is a processing module, in accordance with an exemplary embodiment of the invention.
Figure 110:
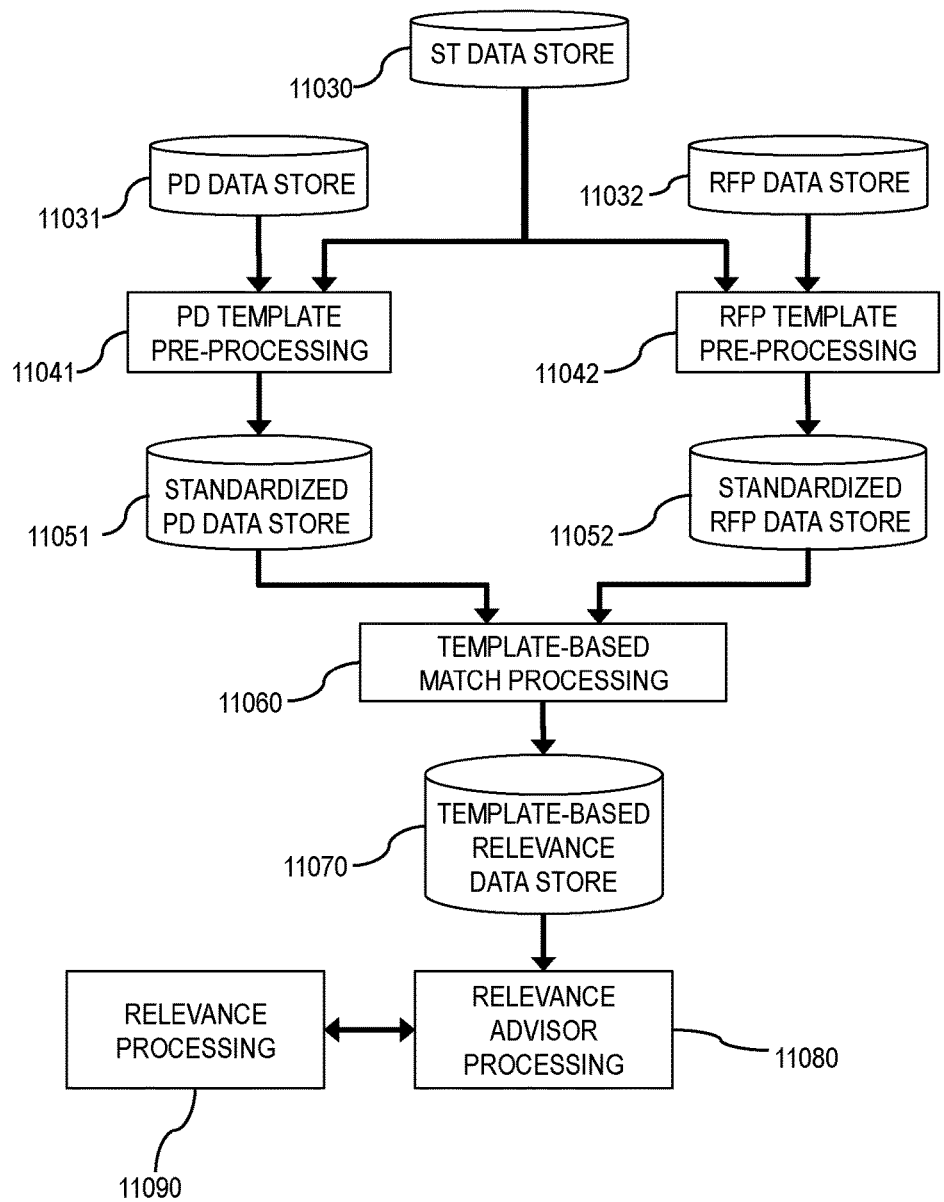

As we disclose in further detail below, a relevance management system 430 may use multiple methods to identify similarity between RFP and PD work elements. A relevance management system 430 may use a method that makes use of techniques, now known or hereafter developed, such as document similarity matching techniques, to directly identify elements of an RFP and a PD that are similar, and thus relevant to one another (i.e., experience represented in said PD is comparable to a corresponding RFP requirement). Such a method broadly discloses direct match processing as depicted in FIG. 20. A relevance management system 430 may also use a second, indirect method, which may include said system prompting an end user who is a subject-matter expert (SME) to efficiently capture and store specific PD information, and also to capture and store specific RFP information. Said second, indirect method may then automatically process said captured or stored information to rapidly estimate relevance of a PD to an RFP. Such a method broadly discloses template-based match processing as depicted in FIG. 110. Both of these methods eliminate a need for a SME to perform manual, time-consuming determination of relevance of an RFP to a PD, and vice versa, in a relevance management system 430.

Determining Relevance of a PD to an RFP

Figure 7:
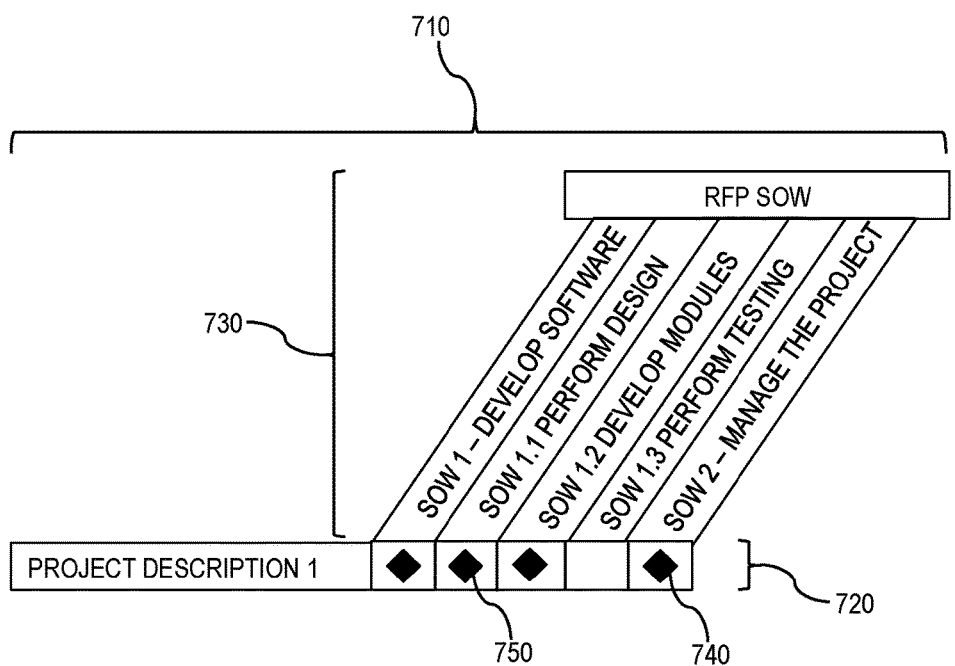
FIG. 7 is a mock-up of a single-row relevance comparison chart that may be used to represent the relevance of an RFP to a PD, in accordance with an exemplary embodiment of the invention.

FIG. 7 generally depicts a single-row relevance comparison chart 710, in accordance with an exemplary embodiment of the invention, sometimes referred to as a relevance chart or comparison table, that a relevance management system 430 may advantageously use to represent the relevance of a PD 510 to an RFP 610. In reference to FIG. 7, we disclose a PD represented by a single row 720, which contains an incomplete row of "black diamonds" ("◆") 720, whose columns 730 correspond to elements of an RFP SOW 620. The existence of an indicator, such as a black diamond in a row 720, for example a black diamond beneath "SOW 2—Manage the Project" 740 SOW element, is intended to convey that a PD is relevant to said SOW element; as disclosed above, a PD 510 description of work performed for Project Management 520 may correspond to RFP 610 requirements in "SOW 2—Manage the Project" 670. Similarly, a black diamond beneath the "SOW 1.1 Perform Design" 750 SOW element is intended to indicate the PD is also relevant to that SOW element; a similar relationship holds for all black diamonds in a row 720. Thus a relevance chart 710 shows how a PD 510 is relevant to an RFP 610. In other words, a relevance chart 710 illustrates how a PD 510 represents demonstrated experience performing SOW work areas 620 for those SOW work areas in which a black diamond appears 720. In the exemplar we disclose in reference to FIG. 7, the example PD looks like a "reasonably good match" to the RFP, as it covers four of the five SOW work areas.

Determining Relevance of Multiple PDs to an RFP

Figure 8:
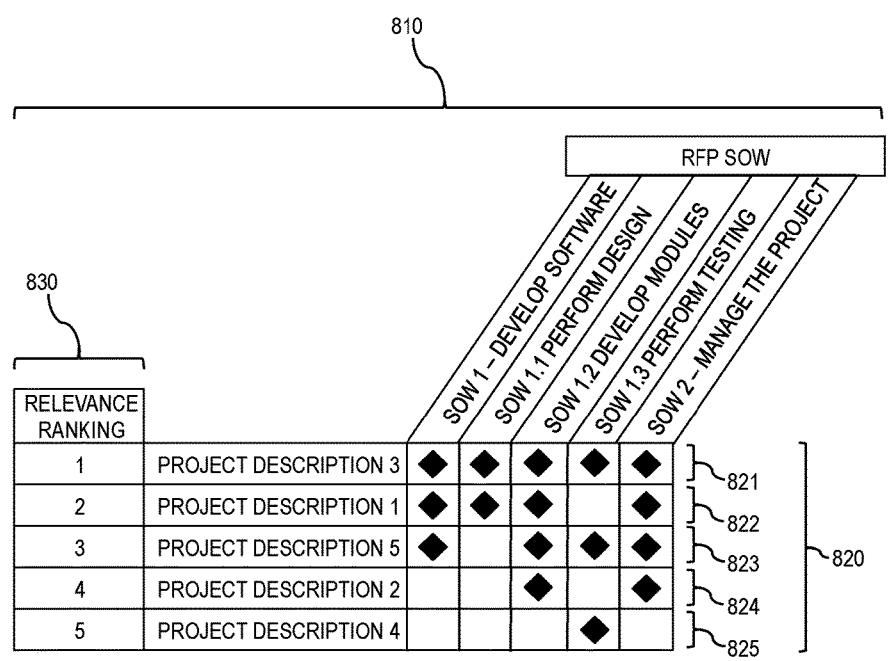
FIG. 8 is a mock-up of a relevance chart that may be used to represent the relevance of an RFP to multiple PDs, in accordance with an exemplary embodiment of the invention.

FIG. 8 generally depicts an extension of the relevance chart depicted in FIG. 7, in accordance with an exemplary embodiment of the invention, and discloses a relevance chart to represent the relevance of an RFP to multiple PDs. Here we can see that the single PD 720 from FIG. 7 corresponds in FIG. 8 to Project Description 1 822. The exemplar relevance chart depicted in FIG. 8 shows the relevance of an RFP to five PDs (Ref. 821 through 825). For now, we may consider the number of indicators in a row, such as black diamonds (Ref. 821 through 825) in this example, as a measure of the degree of relevance of a PD to an RFP. Thus, we observe that Project Description 3 821 has the highest degree of relevance, as indicated by five black diamonds that appear in its row 821; said PD 821 is indicated as being relevant to all five RFP SOW areas. Similarly, Project Description 1 822 and Project Description 5 823 each have four black diamonds; while Project Description 2 824 and Project Description 4 825 have two and one black diamonds, respectively. These rows (Ref. 821 through 825) have been ordered in the relevance chart 820 by degree of relevance, as indicated by the column titled Relevance Ranking 830. A relevance chart 810, such as the exemplar we disclose in reference to FIG. 8, provides a quick and intuitive way to visualize and understand the relative suitability of PDs for use in responding to an RFP, as it ranks each PD according to its relevance to an RFP.

Determining a Capability Gap

Figure 9:
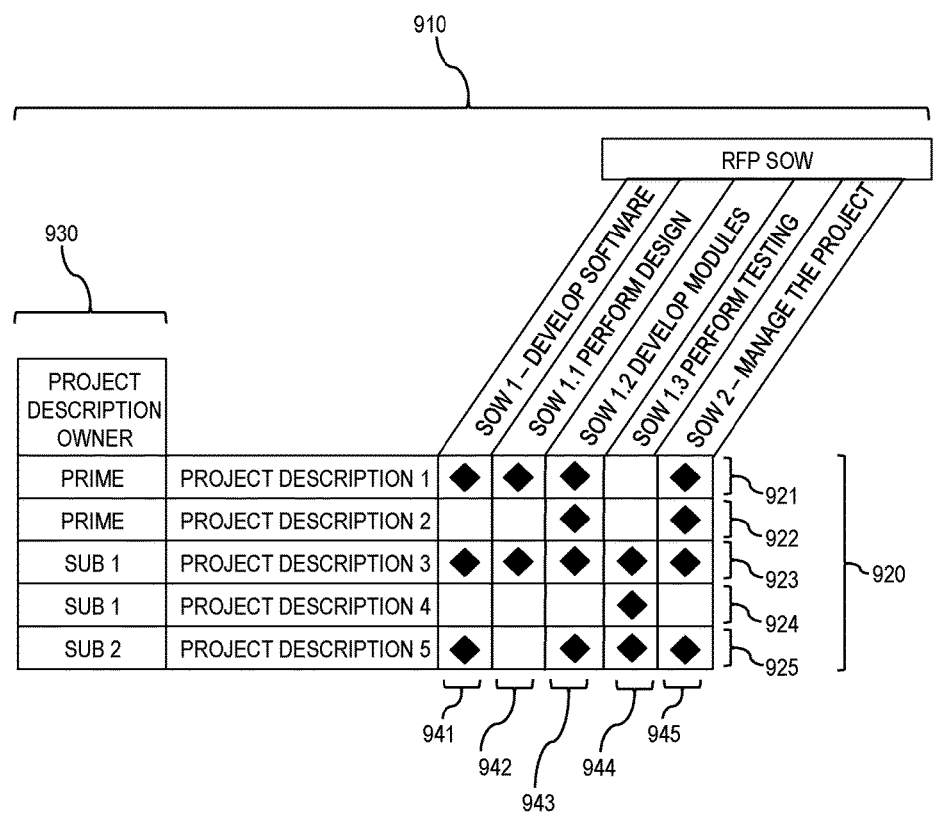
FIG. 9 is a mock-up of a relevance chart that may be used to determine a capability gap, in accordance with an exemplary embodiment of the invention.

FIG. 9 generally depicts a modification of the relevance chart depicted in FIG. 8, in accordance with an exemplary embodiment of the invention, and discloses a relevance chart that represents project ownership, and which may be used to determine a capability gap. The relevance chart exemplar depicted in FIG. 9 presents information on the same example PDs as shown in FIG. 8, but here a relevance ranking column 830 has been replace with a new column indicating PD owner 930. In the exemplar depicted in FIG. 9, the PD owner column 930 shows whether a PD is owned by a prime contractor (whose name is "PRIME", in this example), a subcontractor number one (whose name is abbreviated to "SUB 1"), or a subcontractor number two (abbreviated "SUB 2"), where ownership is meant to convey a relationship, such as "performed the work described in a corresponding PD", or "was awarded a contract to perform the work described in a corresponding PD", or other type of relationship. The order of rows 920 in the relevance chart has also been updated, so that PDs are grouped by owner; for example, rows one 921 and two 922 represent PDs that belong to a prime contractor ("PRIME"); rows three 923 and four 924 represent PDs that belong to subcontractor number one ("SUB 1"); and row five 925 represents a PD that belongs to subcontractor number two ("SUB 2").

A relevance management system 430 may identify a capability gap for a particular RFP SOW area (such as a first 941, second 942, third 943, fourth 944, or fifth 945 SOW area, in this example), for a particular PD, or collection of PDs, such as PDs owned by a particular owner, by determining, for each said RFP SOW area, whether none of the relevance chart rows (or, a single row) associated with the said particular PD, or said collection of PDs, contain an indictor, such as a black diamond, for the said RFP SOW area. For example, we can use such a capability gap determination disclosure to determine (and verify by inspection) that for the PDs that belong to prime contractor "Prime", namely Project Description 1 921 and Project Description 2 922, neither of the PDs has a black diamond in column 944, which corresponds to SOW 1.3 Perform Testing. Thus, prime contractor Prime has a capability gap for SOW 1.3 Perform Testing, in this example.

Regarding the identification of a PD that may (or a PD owner, whose capabilities may) be used to fill a capability gap for a SOW area, we disclose a similar processes that may be used, in which we identify, such as in a relevance chart, a PD (or, a PD owner) that has an indicator, such as a black diamond, for said SOW area. Using such a process, we observe, in this example, that there are three project descriptions, all of which happen to belong to subcontractors, which may be used to fill the prime contractor's capability gap for SOW 1.3 Perform Testing. Specifically, both of the project descriptions from subcontractor number one (Ref. 923 and 924) have an indicator (a black diamond, in this case) in the column 944 corresponding to SOW 1.3 Perform Testing; also, Project Description 5 925 from subcontractor number 2 has a black diamond in the column 944 corresponding to SOW 1.3 Perform Testing. Any one of these PDs (Ref 923, 924, or 925) would be sufficient for the prime contractor to fill the capability gap. Having identified the PDs that may be used to fill a capability gap, and having an understanding of the ownership of said PDs, a prime contractor is now in a position to contact said PD owners (such as subcontractor number one, or subcontractor number two, in this example) to discuss bringing one or more of them onboard the prime contractor's team, to fill a capability gap.

Determining PD Owner Capabilities

Figure 10:
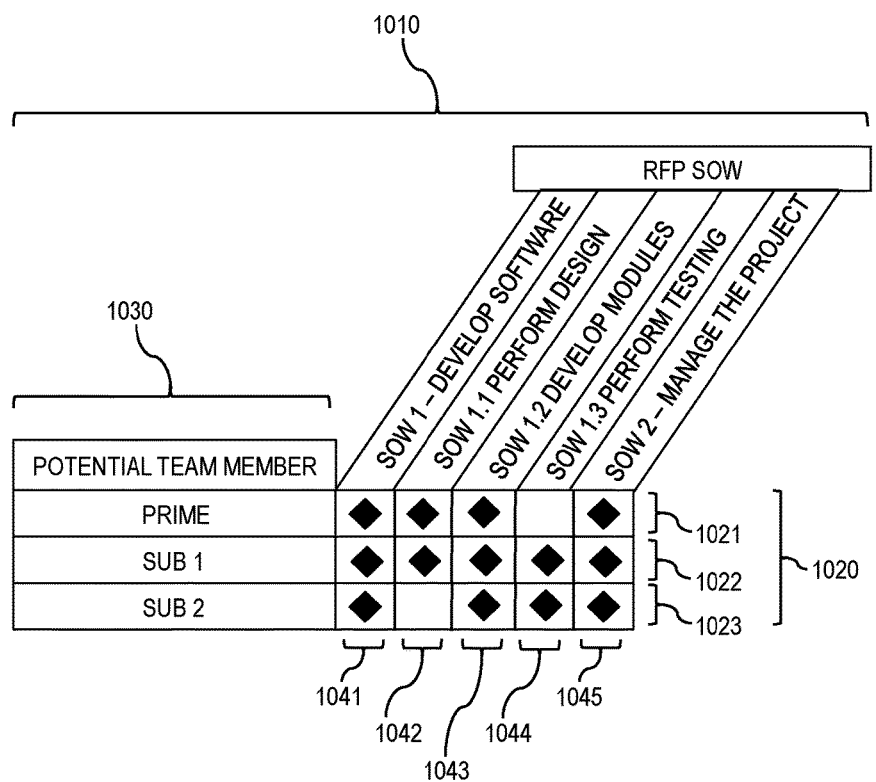
FIG. 10 is a mock-up of a relevance chart that may be used to represent PD owner capabilities, in accordance with an exemplary embodiment of the invention.

FIG. 10 generally depicts a modification of the relevance chart depicted in FIG. 9, in accordance with an exemplary embodiment of the invention, and discloses a relevance chart that may be used to represent PD owner capabilities, such as may be determined from PD experience, and which may further be used to determine team capability gaps.

We first motivate a relevance chart such as shown in FIG. 10, which may be useful to a prime contractor when using a relevance management system 430. Broadly speaking, a prime contractor may consider many criteria when bringing a potential subcontractor onboard as a teammate, including whether said subcontractor brings complementary or overlapping capabilities that bolster the overall team's ability to receive a high score during proposal evaluation. We note that the criteria a prime contractor may consider for such subcontractor teaming may include not only technical capabilities, but also cost considerations. For example, although two subcontractors may provide technically equivalent capabilities, the cost a first subcontractor may charge to provide said capability may be quite different than that of a second subcontractor, which may be due to different structures for overhead rates or other considerations such as discounts that a subcontractor may provide. However, a vital piece of information a prime contractor may consider during such teaming negotiations is the capabilities that each potential subcontractor brings to a team. To meet this need, we disclose in reference to the relevance chart in FIG. 10 a method to determine the capabilities, with respect an RFP, of a PD owner, such as prime contractor or a subcontractor.

The exemplar relevance chart depicted in FIG. 10 builds upon the same example information used in FIG. 9 (and FIG. 8, before it), replacing a column in FIG. 9 that denoted PD ownership 930 and corresponding names of PDs (e.g., Project Description 1, Project Description 2, and so on through Project Description 5) with a column representing PD owners 1030, who may represent potential team members as shown by the column heading "Potential Team Member", and which in this example consist of a prime contractor ("PRIME"), subcontractor number one ("SUB 1"), and subcontractor number two ("SUB 2").

The data to populate a relevance chart such as depicted in FIG. 10 may be computed by aggregating capabilities of PDs for each PD owner. By "aggregating" capabilities of PDs, we mean that if any of the PDs that are owned by a contractor indicate demonstrated experience for a particular SOW area (for example, have a black diamond indicator, in this case), then the said PD owner has a proven capability in said SOW area, and thus receives a corresponding indicator, such as a black diamond, in said SOW area. For example, reviewing the example data in FIG. 9, the prime contractor has two PDs, Project Description 1 921 and Project Description 2 922 in this example, and we may observe in a column 941, corresponding to "SOW 1—Develop Software", that Project Description 1 has a black diamond indicating demonstrated experience for "SOW 1—Develop Software", while Project Description 2 does not have a black diamond indicating "SOW 1—Develop Software" demonstrated experience. When we aggregate these two PD indicators of demonstrated experience (a first indicating presence of such experience, a second indicating absence of such experience) for a prime contractor in the column 1041 representing "SOW 1—Develop Software", we place an indicator, such as a black diamond, in a column 1041, indicating that said prime contractor has a proven capability (because at least one of its PDs indicated demonstrated experience in the corresponding column). When we thus "roll up" the combined experience for each potential team member 1030 across the PDs they own in an analogous manner (experience [Ref. 921 and 922] for a prime contractor; experience [Ref. 923 and 924] for subcontractor number one; and experience 925 for subcontractor number two), we may determine the capability for each PD owner (shown in a first 1021, second 1022, and third 1023 capability chart row, respectively).

Regarding identifying team capability gaps, and how a contractor, such as a prime contractor, may best fill such a capability gap, we disclose a method in reference to FIG. 97 that addresses these items. We disclose in reference to FIG. 10 a simplified method, in which we may identify a capability gap as a SOW area that does not have a capability indicator for a PD owner (or a set of PD owners) that represents a team. In reference to FIG. 10, if we consider the prime contractor 1021 as constituting the current team, we can use this simplified team capability gap determination method to identify a capability gap for SOW 1.3 Perform Testing 1044 for said prime contractor, by the absence of a capability indicator, such as a black diamond in this case, for said prime contractor for SOW area 1044. Similarly, we may use this method to determine a PD owner that has the capability to fill said capability gap, as indicated by said PD owner having an indicator in the SOW area for said capability gap.

Using these methods, we can see in the example depicted in FIG. 10, that both subcontractor number one and subcontractor number two have the capability to fill the prime contractor's capability gap for SOW 1.3 Perform Testing. When a prime contractor is considering which subcontractor to bring onboard as a team member, a relevance chart such as we disclose in reference to FIG. 10, may be used to convey to a prime contractor that a first subcontractor, such as subcontractor number one 1022 in this example, brings "stronger" relevant capabilities than does second subcontractor, such as subcontractor number two 1023 in this example, which may be determined by computing the overall relevance of each subcontractor's capabilities. We may use a number of methods to compute the overall relevance of each subcontractor's capabilities, including, but not limited to, summing across indicators, which in an embodiment variation may count the number of indicators, such as black diamonds. Using such an embodiment variation, on the data shown in FIG. 10, we may determine that the capabilities of a first subcontractor (subcontractor number one) 1022 include five black diamonds, whereas those of a second subcontractor (subcontractor number two) 1023 include only four black diamonds; as such, a relevance management system 430 may identify, in this exemplar, subcontractor number one as bringing "stronger" capabilities than subcontractor number two. Results such as these, which may be conveyed to an end user using a relevance chart such as depicted in FIG. 10, may be useful, and may serve to motivate a prime contractor to consider as a high priority bringing a first subcontractor onto a team, with pursuit of a second subcontractor being a lower priority, or fallback option.

Relevance Management System and Modular Components

Figure 11:
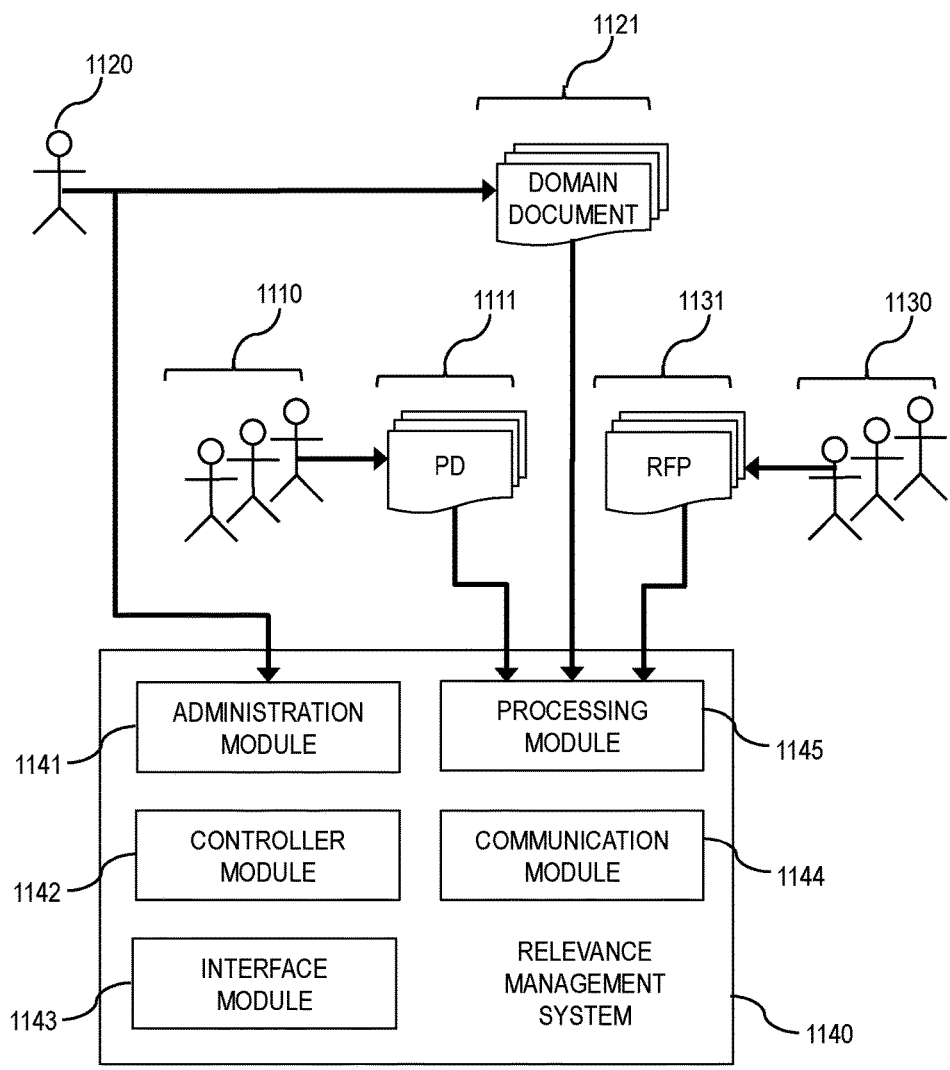
FIG. 11 is a relevance management system overview disclosing modular components, in accordance with an exemplary embodiment of the invention.

FIG. 11 generally depicts a relevance management system, in accordance with an exemplary embodiment of the invention, disclosing further detail regarding users (Ref. 1110, 1120, and 1130), inputs (Ref. 1111, 1121, and 1131), and a relevance management system 1140, which may be comprised of modules (such as a first 1141, second 1142, third 1143, fourth 1144, and fifth 1145 module).

Regarding users depicted in FIG. 11, we further disclose that an end user 1110 (which corresponds to a first user 210) associated with a PD 1111 (which corresponds to a PD 220), may be referred to as a "capability-providing" end user; and that an end user 1130 (which corresponds to a second user 211) associated with an RFP 1131 (which corresponds to an RFP 221), may be referred to as a "capability-seeking" end user. Generally speaking, a prime contractor is often referred to as a "capability-seeking end user", and a subcontractor may often be referred to as a "capability-providing end user". In addition, we disclose an administrative user 1120, who may prepare, operate, and maintain a relevance management system 1140, such as for use by end users (Ref. 1110, and 1130).

Regarding an administrative user 1120, we disclose that said user may perform multiple roles; a first may be to perform general administrative functions enabled by an administration module 1141, such as to operate and maintain a relevance management system 1140; and a second may be to develop and enter templates that may used within a relevance management system 1140, such as in a processing module 1145, using various inputs, such as business and technical documents from the contracting domain 1121.

Further regarding users in FIG. 11, in disclosing a capability-providing end user 1110, capability-seeking end user 1130, or administrative user 1140, as well as roles and activities each may perform, we contemplate an alternative embodiment in which proxies may perform such roles and activities for each such said users. Such proxies may include, but are not limited to, an alternate individual, organization, system, or service that may perform such a role or activity on behalf of the said user. For example, an organization that specializes in data entry, or which has specialized subject-matter expertise, may enter into a business relationship with an end user, and perform a role or activity on behalf of said end user as a proxy. In the specification for the present invention we consider such a proxy as representing said corresponding user, without loss of generality, and such embodiments are intended to be within the scope of the present invention.

Regarding a relevance management system 1140, we disclose that said system 1140 may be comprised of modules, which may include, but are not limited to, an administration module 1141, a controller module 1142, an interface module 1143, a communication module 1144, and a processing module 1145. Broadly speaking, an administration module 1141 may provide functionality, such as for system operation and maintenance; a controller module 1142 may provide functionality, such as to implement high-level business logic and overall application-level workflow, and may call upon the services of a display 1143, communications 1144, and processing 1145 module, or other module, which may provide functionality, such as to implement functionality provided to a user (Ref 1110, 1120, or 1130), or other functionality. We disclose the functionality of these modules (Ref 1141 through 1144) in turn below.

Administration Module

Regarding an administration module 1141, said module may be used by an administrative user 1120 to operate and maintain a relevance management system 1140. Key functionality an administrative module 1141 may provide includes, but is not limited to:

User Administration: Creating accounts, such as that may enable an end user (Ref. 1110 and 1130) to interact with a relevance management system 1140, such as in a role of capability-providing end user or capability-seeking end user, respectively.

System Administration: Performing general systems operation and maintenance, such as backing-up of data associated with a relevance management system 1140; as well as archiving and removal of data that is no longer used for system operation; or other operations.

Billing: Implementing functionality, such as to track usage, in a relevance management system 1140, of end users (Ref 1110 and 1130), and supporting processing of such usage information, which may include, but is not limited to, supporting billing or charging, such as of said end users or associated entities.

Controller Module

Regarding a controller module 1142, said module may implement high-level business logic and overall application-level workflow, and may call upon the services of a display 1143, communications 1144, and processing 1145 module, such as to implement functionality provided to a user (Ref. 1110, 1120, or 1130), or other functionality. Functionality that a controller module 1142 may provide includes, but is not limited to:

Standard Template (ST) Data Entry Process: Enabling a user, such as an administrative user 1120, to develop and enter templates into a relevance management system 1140, using input, such as business and technical documents from the contracting domain 1121, and other sources.

PD Data Entry Process: Enabling capability-providing end users 1110 to enter PDs 1111 into a relevance management system 1140.

RFP Data Entry Process: Enabling capability-seeking end users 1130 to enter RFPs 1131 into a relevance management system 1140.

Template Processing: Enabling capability-providing end users 1110 and capability-seeking end users 1130 to specify in a relevance management system 1140 how elements of PDs 1111 and RFPs 1131, respectively, relate to elements of an ST, which may be used during template processing.

Processing Operations Sequencing: Sequencing of operations within a relevance management system 1140, to include shepherding of PD and RFP instances through multiple processing steps, such as we disclose in reference to FIG. 20 and FIG. 110, which may include, but are not limited to:

Direct Match Processing (Determining PD relevance to an RFP).

Extract Transform Load (ETL) processing, to transform relevance results into a format that efficiently supports filtering, ranking, and aggregation.

Capability Determination Processing (Determining contractor capability rankings for an RFP)

RFP Relevance Determination Processing (Determining RFP relevance rankings for a PD)

Template-Based Match Processing (Estimating PD relevance to an RFP).

Figure 12:
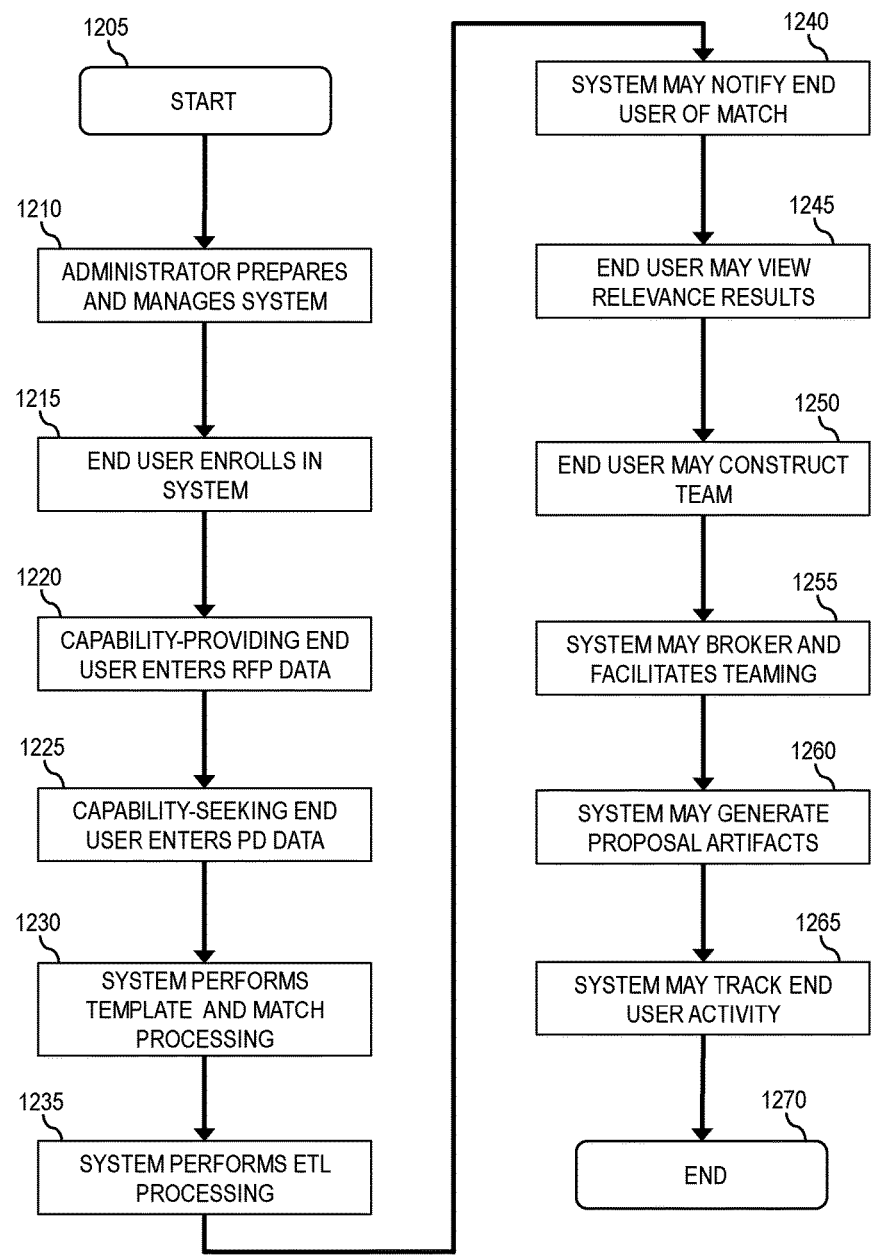
FIG. 12 is a controller module, in accordance with an exemplary embodiment of the invention.

FIG. 12 generally depicts a process, in accordance with an exemplary embodiment of the invention, disclosing how a controller module 1142 may sequence operations of a relevance management system 1140, by performing steps in the indicated order, or in other orders.

As shown in FIG. 12, when processing begins 1205, a user, such as an administrative user, may prepare and manage a relevance management system 1140. As we disclose in further detail in reference to ST data entry 1411, FIG. 23, FIG. 24, FIG. 111, and FIG. 112, a user may enter an ST into a relevance management system 1140 (Ref. 2020), components of which, such as a customer descriptor 2314 and work descriptor 11115, may facilitate PD 2021 or RFP 2022 data entry, match or template processing (Ref 2040 and 2050; and 11041, 11042, and 11060), or ETL processing 2060. A user may also perform standard information technology (IT) administration and maintenance tasks, such as user administration to create accounts within a relevance management system 1140, or enable such accounts to be created, as well as general system administration. Administrator preparation may include creating an account for an end user with necessary permissions, such as to enable said end user to access information said end user has entered in a relevance management system 1140, or which is associated with said end user, such as match results of data associated with said end user.

Next, as we disclose in a step 1215, once an administrator has prepared a relevance management system 1140, a controller module enables an end user (Ref. 1110 or 1130) to enroll in said system, so that said users may operate as a capability-seeking end user, a capability-providing end user, or as both a capability-seeking and a capability-providing end user.

Next, as we disclose in two steps (Ref. 1220 and 1225), a capability-providing end user 1110 and a capability-seeking end user 1130 may perform data entry (Ref. 2021 and 2022) to enter PDs and RFPs into a relevance management system 1140 (Ref. 1111 and 1131, respectively). As we disclose in further detail below, a controller module 1142 may shepherd entered PDs and RFPs through subsequent match processing 2040 and further processing steps, and may use a "data flow" architecture, or other similar functionality, that monitors for additional or updated PDs or RFPs entered into a relevance management system 1140 at any time, and may process said new or updated PDs and RFPs. Thus, a first step 1220 and a second step 1225 may be performed essentially in a continual, as-needed, asynchronous manner by an end user, who may enter into a relevance management system 1140 new PDs or RFPs (and updates to such) as the corresponding PD and RFP documents and associated content (Ref. 2011 and 2012, respectively) become available (i.e., such as an end user develops a new project description 180, or a customer distributes a new RFP 130).

Next, as we disclose in a step 1230, a controller module 1142 may enable a relevance management system 1140 to perform match processing or template processing, which may consist of direct match processing 2040, as well as template processing (Ref. 2050; and FIG. 110). Using such match or template processing techniques, a relevance management system 1140 may determine the relevance of an RFP to a PD (and vice versa).

Next, as we disclose in a step 1235, using relevance results that may be stored in a relevance data store 2045, and possibly in collaboration with relevance advisor processing 11080, a controller module 1142 may enable ETL processing 2060, which generally may involve transforming relevance results stored in a relevance data store 2045 into a format that efficiently supports filtering, ranking, and aggregation (i.e., roll-up and drill-down) of relevance results.

Next, as we disclose in a step 1240, a controller module 1142 may notify an end user (e.g., a first user 1110 or a second user 1130) of a match a relevance management system 1140 has identified for a PD or RFP with which said end user is associated. A controller module 1142 may work with a communication module 1144 to inform an end user of said match, and may use techniques such as we disclose in reference to FIG. 18.

Next, as we disclose in a step 1245, a controller module 1142 and an interface module 1143 may provide an end user a variety of ways to interface with and navigate relevance results, such as may be stored in a relevance cube 2070, including, but not limited to, capability determination processing 2080, or RFP relevance determination processing 2085. An end user may view relevance results 1245 using a variety of interfaces, including such as we disclose in reference to FIG. 49, FIG. 50, FIG. 51, FIG. 52, FIG. 58, FIG. 60, and FIG. 61. A relevance management system 1140 may support filtering and ranking, and may support roll-up and drill-down for navigation and summarization of relevance, experience, and capability results.

Next, as we disclose in a step 1250, a controller module 1142 may enable an end user to construct a team 1250 using team construction processing 2090, which may include using interface such as we disclose in reference to FIG. 97 to identify team member experience or capabilities, as well as experience or capabilities gaps.

Figure 19:
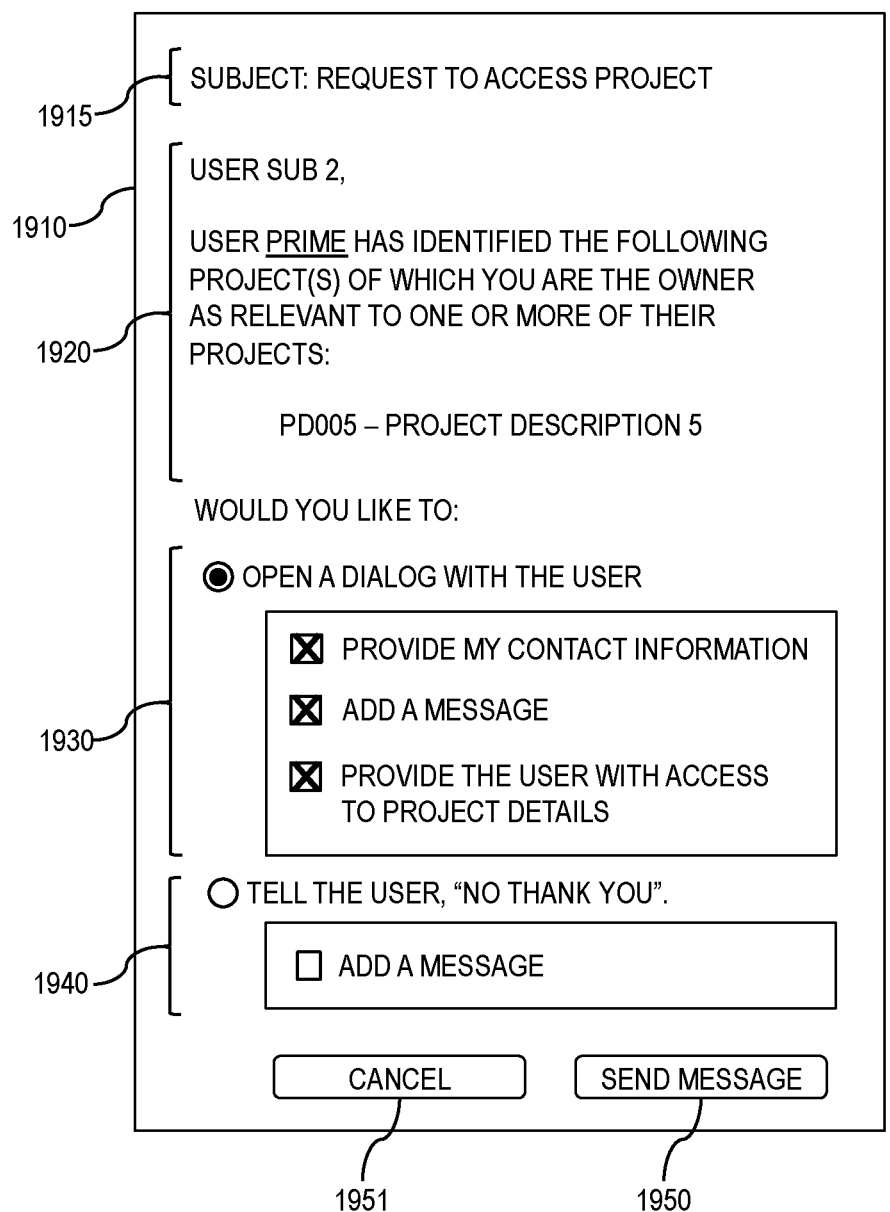
FIG. 19 is a mock-up of a brokered request interface as may be used by a communication module, in accordance with an exemplary embodiment of the invention.

Next, as we disclose in a step 1255, a controller module 1142 may next broker and facilitate teaming, which may include enabling incremental communication between RFP and PD owners, such as we disclose in reference to FIG. 19.

Next, as we disclose in a step 1260, a controller module 1142 may generate proposal artifacts, which may include using results produced via team construction processing (Ref 2090; and FIG. 97), or such as stored in a relevance data store 2045 or relevance cube 2070, to develop documents that may be useful in preparing proposal volumes (Ref. 434 and 440), using functionality we disclose in reference to FIG. 105, FIG. 106, FIG. 107, and FIG. 109.

Next, as we disclose in a step 1265, a controller module 1142 may interoperate with an administration module 1141 to track end user activity within a relevance management system 1140. Said tracking may include, but is not limited to, tracking how many PDs or RFPs said user has entered into a relevance management system 1140, how many matches have been identified for said user over a given time period, or other such measures of system usage and utility.

A relevance management system 1140 may use such metrics to support activities such as, but not limited to, billing; business development, such as to demonstrate current and prospective customers the value of said system to said customers; or for other purposes.

Finally, as we disclose in a step 1270, a controller module 1142 may end processing 1270, or may resume processing, such as performing one or more processing steps, such as disclosed in reference to FIG. 12.

Interface Module

Figure 13:
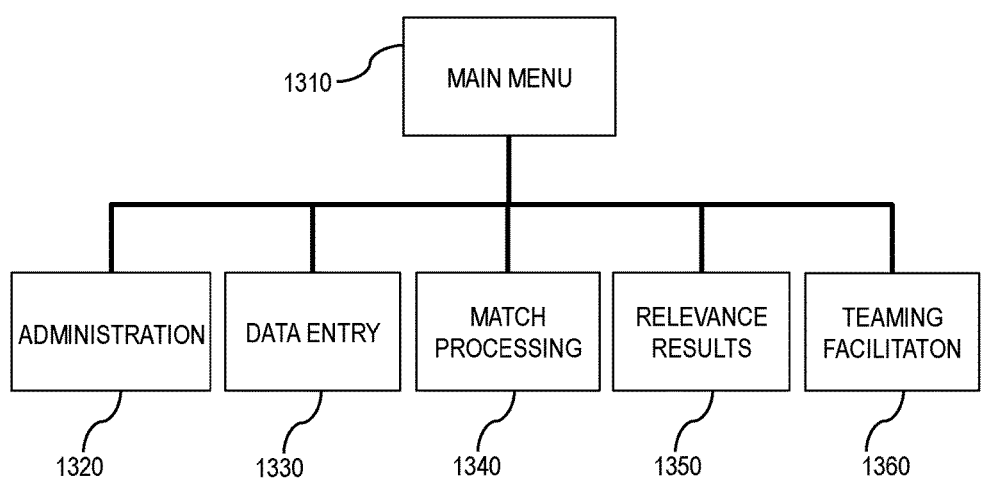
FIG. 13 is an interface module overview, in accordance with an exemplary embodiment of the invention.

We first disclose, in reference to FIG. 11, overall functionality an interface module may provide, and then disclose, in reference to FIG. 13, further detail regarding an organization of interfaces that may be used in a relevance management system 1140.

Regarding an interface module 1143, such as shown in FIG. 11, said module may provide functionality through which a user, such as an administrative user 1120, or an end user (Ref 1110 and 1130) may interact with a relevance management system 1140. An interface module 1143 may provide functionality that includes, but is not limited to:

Input of Data to a Relevance Management System: Data input, including user (Ref. 1110, 1120, and 1130) commands and interactions (such as via a computer keyboard, computer mouse, touch-sensitive computer display, or other input device) to control operations of a relevance management system 1140.

Output of Data from a Relevance Management System: Data output, including methods to visualize or otherwise represent current system status, such as results of processing and communication, as well as options for a user to select from which may serve as input to a relevance management system 1140, including commands an end user may perform, which may be displayed or otherwise presented to users (Ref 1110, 1120, and 1130).

FIG. 13 generally depicts an interface module, in accordance with an exemplary embodiment of the invention, disclosing further detail regarding an organization of interfaces that may be used in a relevance management system 1140, such as to support interaction with users (Ref. 1110, 1120, and 1130), or other users.

We disclose in reference to FIG. 13 a framework that may include, but is not limited to, interfaces that a controller module 1142 and an interface module 1143 may generate and present to an end user to provide business functionality. We disclose a main menu interface 1310 that may serve as an entry point to overall business functionality, providing to a user (Ref. 1110, 1120, and 1130) interface options to execute functionality that may include, but is not limited to system administration 1320; ST, PD, and RFP data entry 1330; match processing 1340 to determine relevance relationships between PDs and RFPs; viewing relevance results 1350; or facilitation of teaming 1360 between end users (Ref 1110 and 1130). We disclose below the functionality of these five exemplary interface options in turn.

Regarding an administration interface 1320, we disclose that said interface may enable a user, such as an administrative user 1120, to manage a relevance management system 1140 using functionality provided in an administration module 1141. Such administration interface 1320 may provide an interface for user administration, system administration, billing, or other functions.

Regarding a data entry interface 1330, we disclose that said interface may support an ST 2020, PD 2021, or RFP 2022 data entry process, which may enable a user, such as an administrative user 1120, to develop and enter an ST in a relevance management system 1140; enable a capability-providing end user 1110 to enter a PD 1111 into a relevance management system 1140; or a enable capability-seeking end user 1130 to enter an RFP 1131 into a relevance management system 1140, respectively.

Regarding a match processing interface 1340, we disclose that said interface may enable an end user to view or determine status, such as of relevance processing for PDs and RFPs.

Regarding a relevance results interface 1350, we disclose that said relevance results interface may support viewing by end users of proposal and RFP relevance results, which may include capability results computed during processing (Ref 2080 and 2085).

Regarding a teaming facilitation interface 1360, we disclose that said teaming facilitation interface may enable a capability-providing end user 1110 or a capability-seeking end user 1130 to construct teams, as well as communicate, or collaborate with one another, and which may be based on results of relevance processing.

Figure 14:
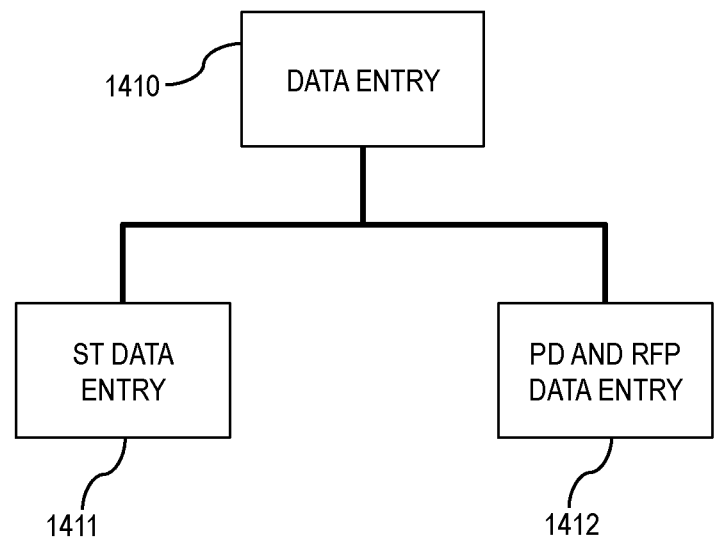
FIG. 14 is an interface module for data entry, in accordance with an exemplary embodiment of the invention.
Figure 24:
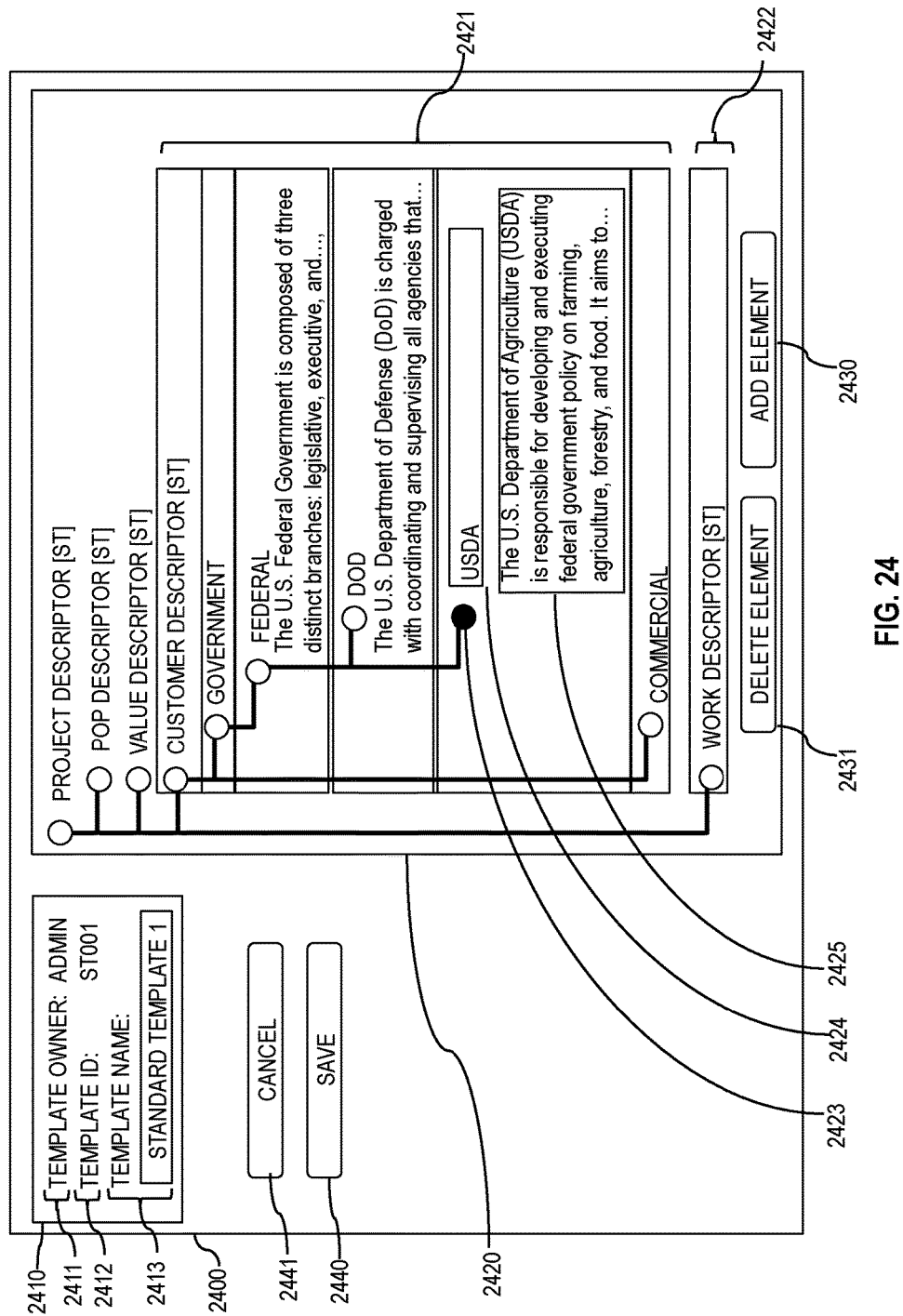
FIG. 24 is a mock-up of an ST data entry interface, in accordance with an exemplary embodiment of the invention.
Figure 26:
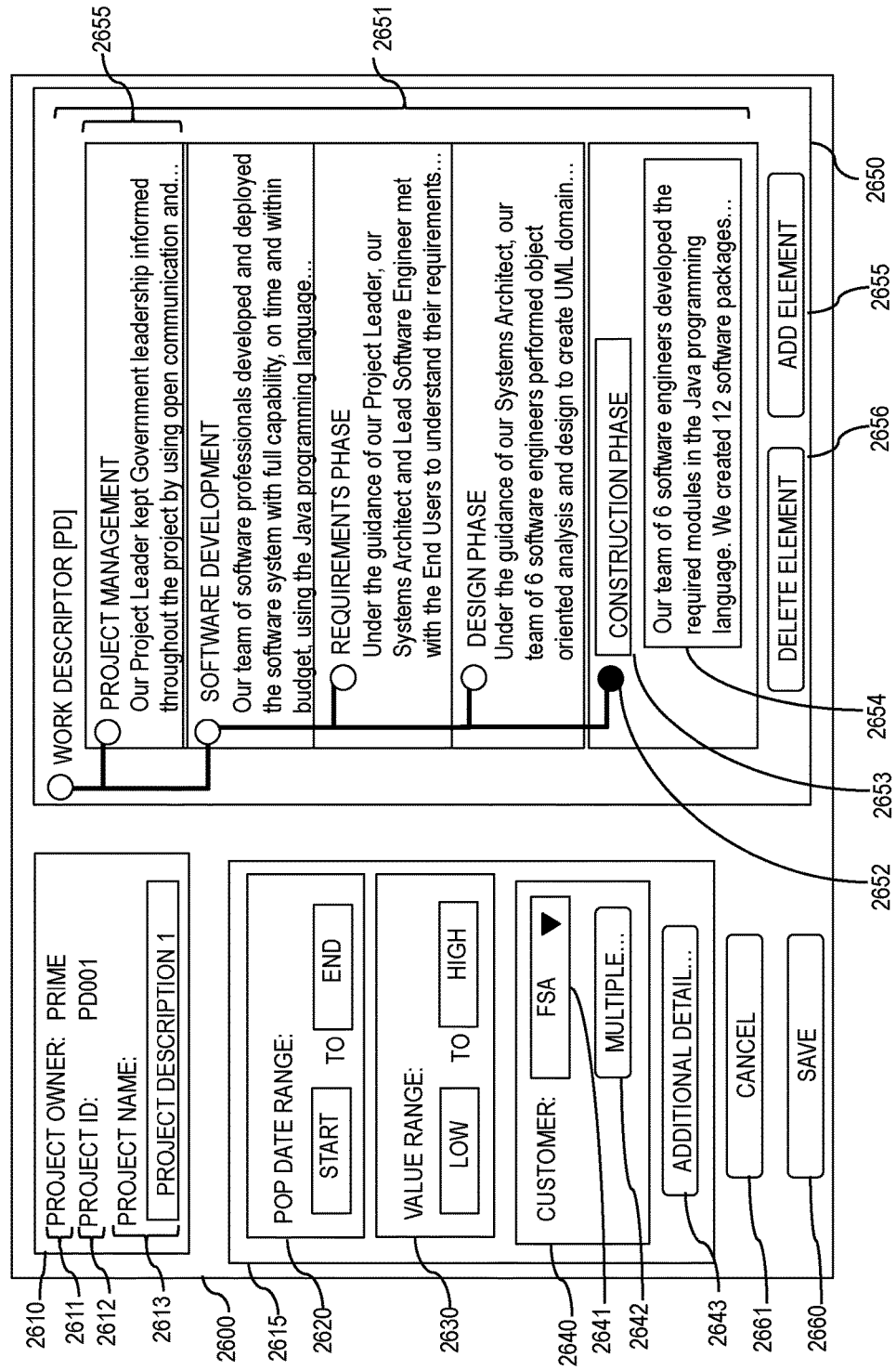
FIG. 26 is a mock-up of a PD data entry interface, in accordance with an exemplary embodiment of the invention.
Figure 31:
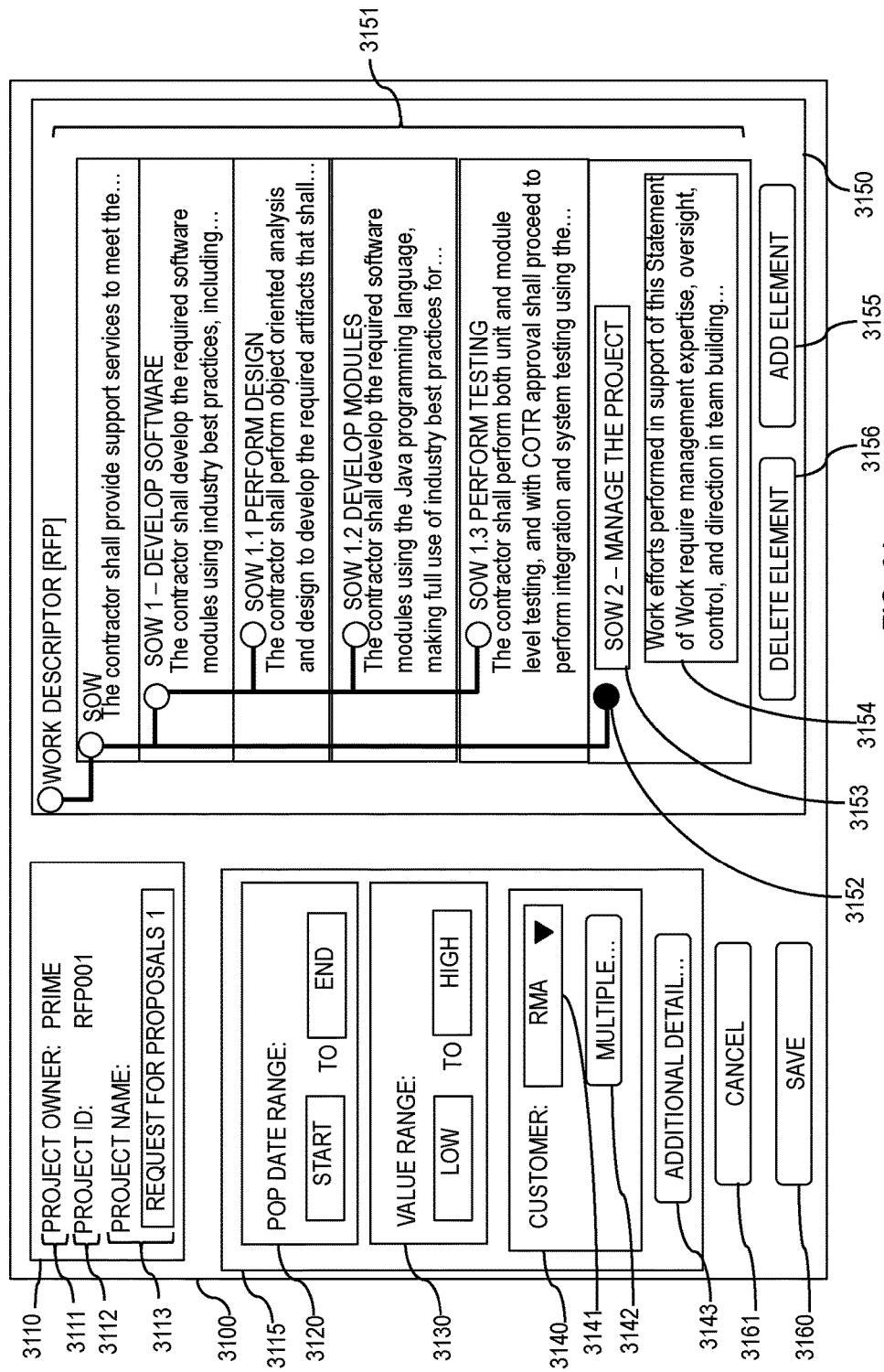
FIG. 31 is an RFP data entry interface, in accordance with an exemplary embodiment of the invention.
Figure 112:
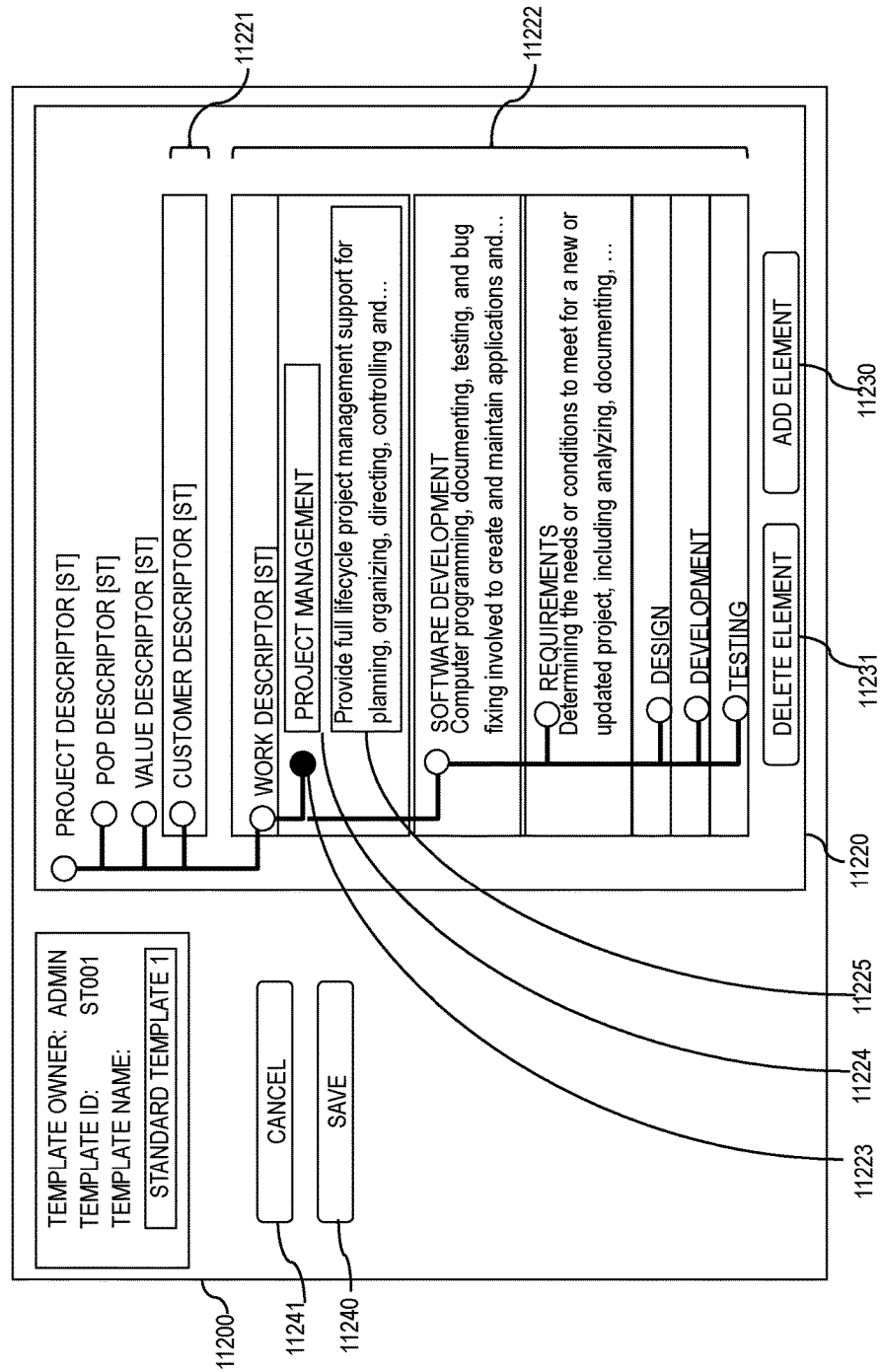

FIG. 14 generally depicts a data entry interface, in accordance with an exemplary embodiment of the invention, disclosing further detail on a data entry interface 1330, showing how said interface 1410 may be comprised of sub-interfaces, such as an interface for ST data entry 1411, which may correspond to interfaces we disclose in reference to FIG. 24 and FIG. 112; and an interface that may be used for both PD and RFP data entry 1412, which may correspond to an interface such as we disclose in reference to FIG. 26 and FIG. 31. We describe such data entry processes in further detail below.

Figure 15:
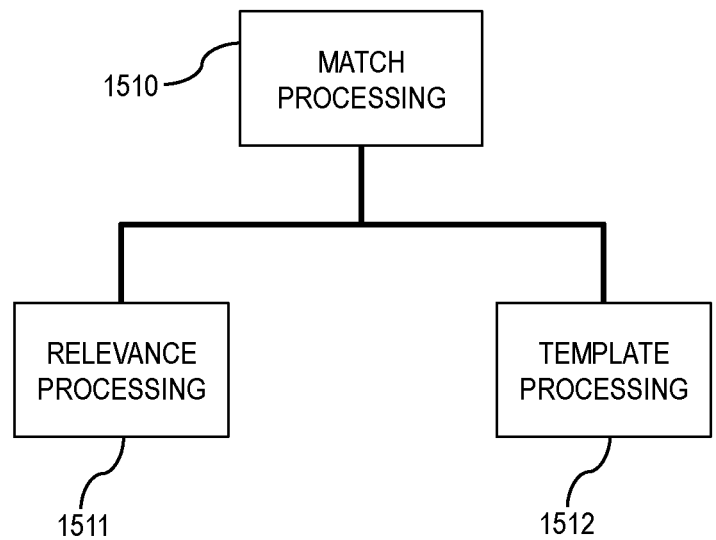
FIG. 15 is an interface module for match processing, in accordance with an exemplary embodiment of the invention.

FIG. 15 generally depicts a match processing interface, in accordance with an exemplary embodiment of the invention, disclosing further detail on a match processing interface 1340. In reference to FIG. 15 we disclose that said match processing interface may contain sub-interfaces, including an interface for relevance processing 1511 or an interface for template processing 1512. We disclose further that a relevance processing interface 1511 may enable an end user to view or determine status, such as of relevance processing for PDs and RFPs. We disclose further that a template processing interface 1512 may support PD 11041 or RFP 11042 template pre-processing, which may enable a capability-providing end user 1110 or capability-seeking end user 1130 to specify to a relevance management system 1140 how elements of PDs 1111 or RFPs 1131, respectively, with which said users may be associated, relate to elements of an ST.

Figure 16:
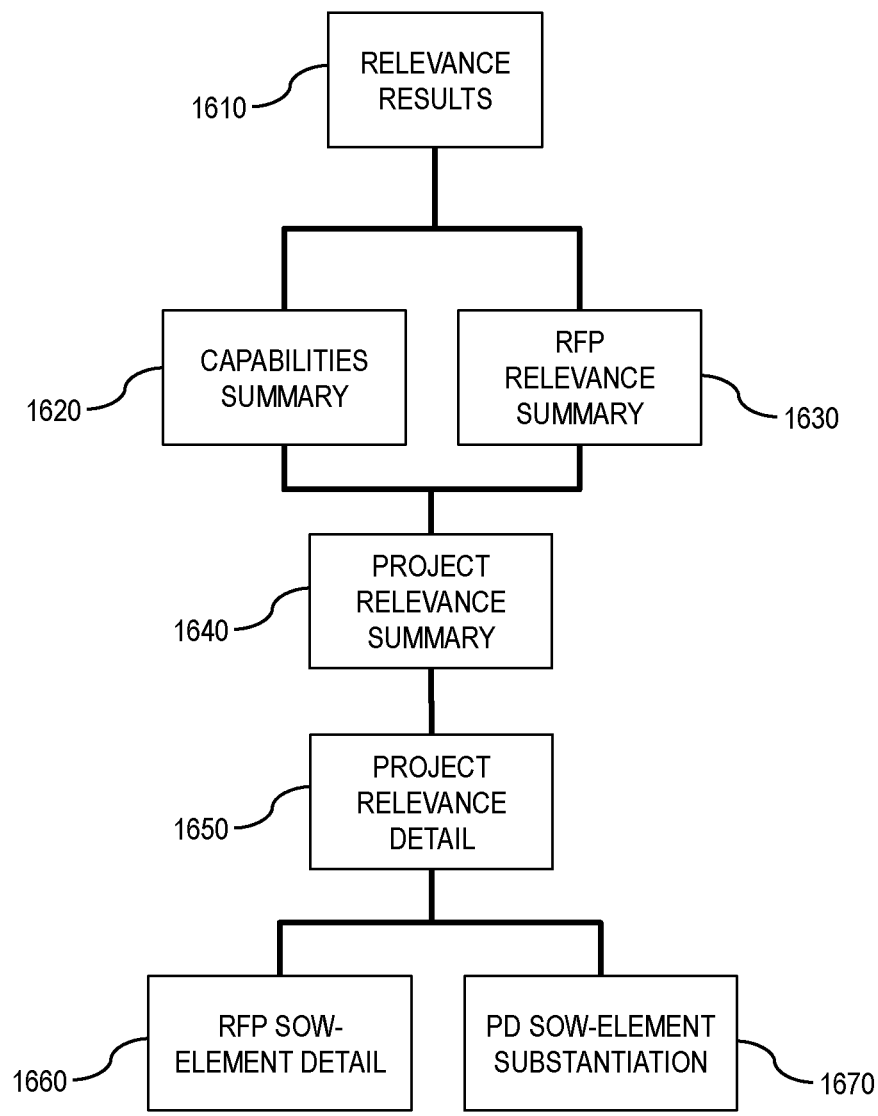
FIG. 16 is an interface module for relevance results, in accordance with an exemplary embodiment of the invention.

FIG. 16 generally depicts a relevance results interface (corresponding to an interface 1350), in accordance with an exemplary embodiment of the invention, disclosing further detail on how said interface may be comprised of sub-interfaces, which when selected, such as from a main menu interface 1310, may enable an end user (Ref. 1110 and 1130) to view high-level summaries (Ref. 1620 and 1630) and successively "drill down" into results, including such as into mid-level project-relevance summaries 1640, and further down into individual project-relevance detail 1650. Finally, a project relevance detail interface 1650 may enable an end user (Ref. 1110 and 1130) to drill down even further, to view an original RFP requirement at a SOW-element level 1660 alongside a corresponding SOW-element level substantiation associated with a PD 1670. An interface module 1143 may implement a hierarchy of interfaces (such as we disclose in reference to FIG. 16) or provide drill-down functionality using common interfaces, which may include, but are not limited to, embodiments such as we disclose in reference to FIG. 49, FIG. 51, FIG. 58, and FIG. 60.

Figure 17:
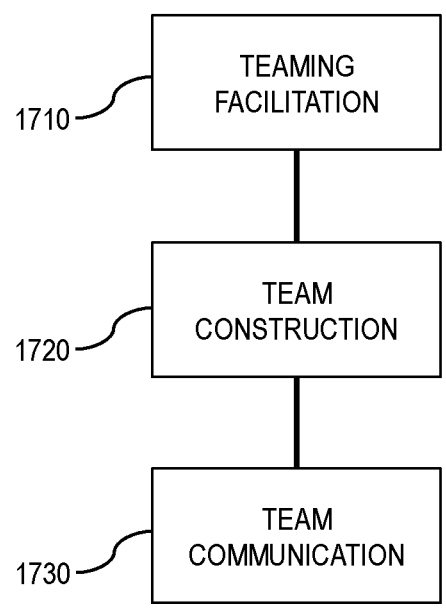
FIG. 17 is an interface module for teaming facilitation, in accordance with an exemplary embodiment of the invention.

FIG. 17 generally depicts a teaming facilitation interface (corresponding to an interface 1360), in accordance with an exemplary embodiment of the invention, disclosing further detail on how a teaming facilitation interface 1710 may provide multiple sub-interfaces, including for facilitating team construction 1720, or facilitating team communication 1730. We disclose, in reference to FIG. 17, a process for team construction, and interfaces that may support said process, in reference to FIG. 97 through FIG. 104. A team communication interface 1730 may enable an end user to communicate with another user for a variety of reasons. For example, a relevance management system 1140, may provide a capability-seeking end user 1130 an ability to contact a capability-providing end user 1110, or vice versa, which may be based on results of relevance processing, to facilitate teaming discussions, as we disclose in reference to a first 4943, second 5853, third 6053, and fourth 9742 functionality. As an example, if a capability-seeking end user 1130 determines that a PD owned by a capability-providing end user 1110 can fill a capability gap, said capability-seeking end user 1130 may have the ability to contact said PD owner 1110 to discuss the possibility of bringing said PD owner 1110 on board a team as a subcontractor. We disclose that for an initial contact between end users (such as a first 1110 and second 1130 user), communication may be performed with a variety of degrees of confidentiality, and for example may not have either end user share identity or detailed information with the other. If both end users are interested in further dialog regarding teaming, for example, said end users may have an ability to share e.g. name or contact info, or other information, including in an incremental manner, to facilitate further communication, which may include communication internal to a relevance management system 1140, as well as communication external to a relevance management system 1140, such as direct emails, telephone conversations, and so on. A relevance management system 1140 may use such communication functionality, including incremental communication functionality, to broker experience and capabilities among end users (Ref 1110 and 1130).

Communication Module

Figure 18:
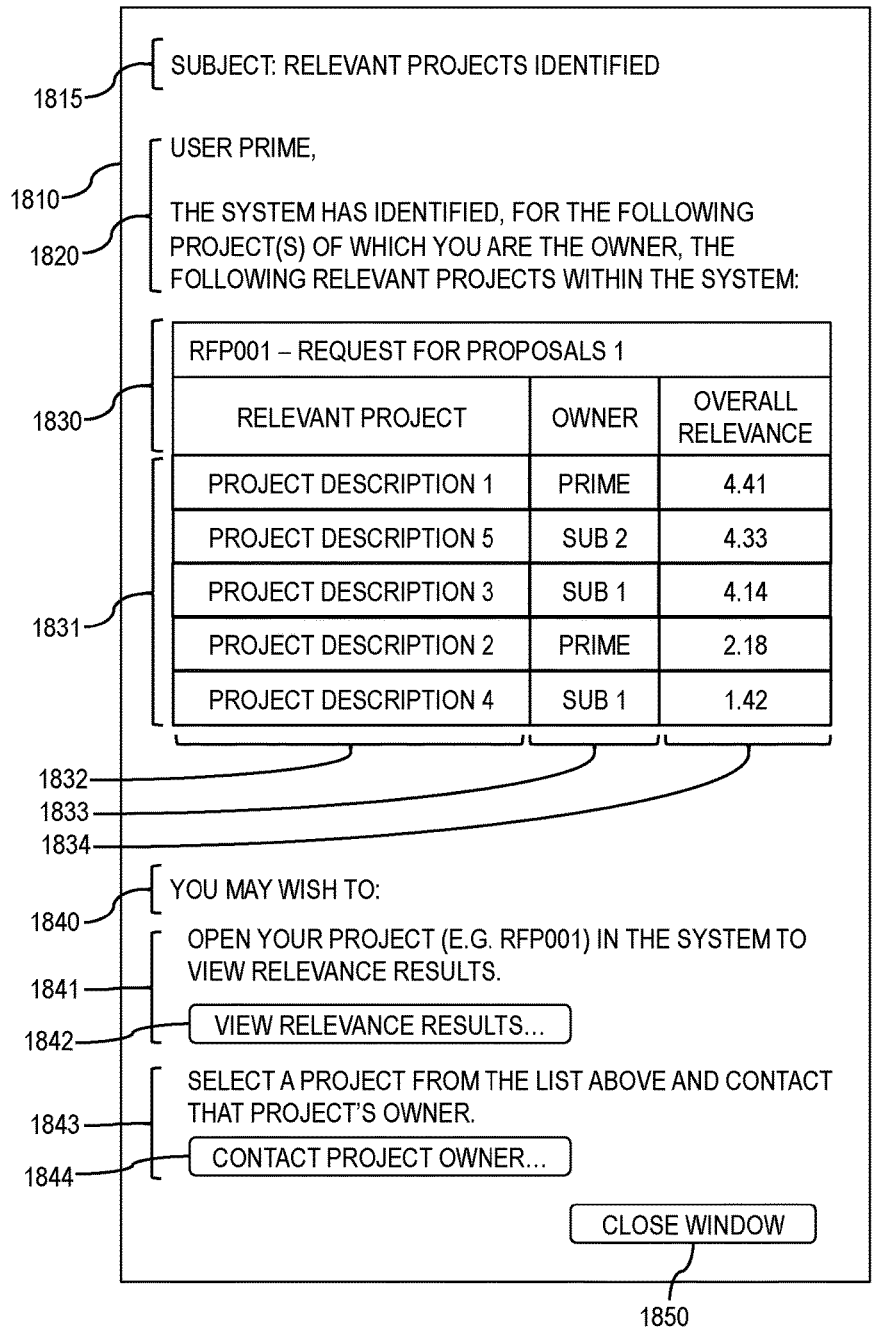
FIG. 18 is a mock-up of a brokered relevance notification interface as may be used by a communication module, in accordance with an exemplary embodiment of the invention.

We first disclose, in reference to FIG. 11, overall functionality a communication module may provide, and then disclose, in reference to FIG. 18 and FIG. 19, further detail regarding communication module interfaces that may be used in a relevance management system 1140. A communication module 1144 may enable end users (Ref. 1110 and 1130) to communicate with one another, which may be facilitated by a controller module 1142 and an interface module 1143, which may generate or manage the interfaces and application workflow. A communication module 1144 may provide functionality that includes, but is not limited to:

Capability-Providing and Capability-Seeking End User Notification and Brokering: A communications module 1144 may perform notification or brokering services to inform a capability-seeking end user 1130 when a relevance management system 1140 has determined that a PD has relevance to an RFP with which said end user is associated. Conversely, a communications module 1144 may perform notification or brokering services to inform a capability-providing end user 1110 when a relevance management system 1140 has determined that an RFP has relevance to a PD with which said end user is associated. Notification methods may include, but are not limited to:

Immediate notification messages (e.g., by email, instant messaging, and other methods) to an end-user (Ref. 1110 and 1130) endpoint external to a relevance management system 1140, as well as to an end-user (Ref 1110 and 1130) internal to a relevance management system 1140.

Periodic (e.g., morning, hourly, daily) notification messages (e.g., by email) to an end-user (Ref. 1110 and 1130) endpoint external to a relevance management system 1140, as well as to an end-user (Ref 1110 and 1130) internal to a relevance management system 1140, which may highlight new activity, report, or summarize activity, such as for PDs or RFPs with which said end user is associated, or a combination of such highlighting, reporting, or summarization, or provide other information.

A dashboard associated with a relevance management system 1140 that may be accessible to an end-user (Ref. 1110 and 1130), which highlights new activity, or summarizes activity, such as for PDs or RFPs with which said end user is associated, or a combination of such highlighting, reporting, or summarization, or provide other information.

Confidential Communication and Brokering: A communication module 1144 may enable a capability-providing end user 1110 and a capability-seeking end user 1130 to communicate with one other, including in ways that may preserve the confidentiality (e.g., anonymity), or degree of confidentiality, of one or both users:

A communication module 1144 may enable a capability-providing end user 1110 to be informed that a PD with which it is associated matches the experience or capabilities sought by a capability-seeking end user 1130, without disclosing to said capability-providing end user 1110 the identity of said capability-seeking end user 1130.

Conversely, a communication module 1144 may enable a capability-seeking end user 1130 to be informed that a PD associated with a capability-providing end user 1130 matches the experience or capabilities in an RFP with which said capability-seeking end user 1130 is associated, without disclosing to said capability-seeking end user 1130 the identity of said capability-providing end user 1110.

Regular Communication and Brokering: A communication module 1144 may also enable a capability-providing end user 1110 and a capability-seeking end user 1130 to communicate where the identity of both said end users may be disclosed.

Transition from Confidential to Regular Communication and Brokering: A communication module 1144 may enable end users (such as a first 1110 and a second 1130 user) to collaboratively come to agreement and transition, possibly using multiple, incremental stages, from confidential to regular communication or brokering.

Figure 49:
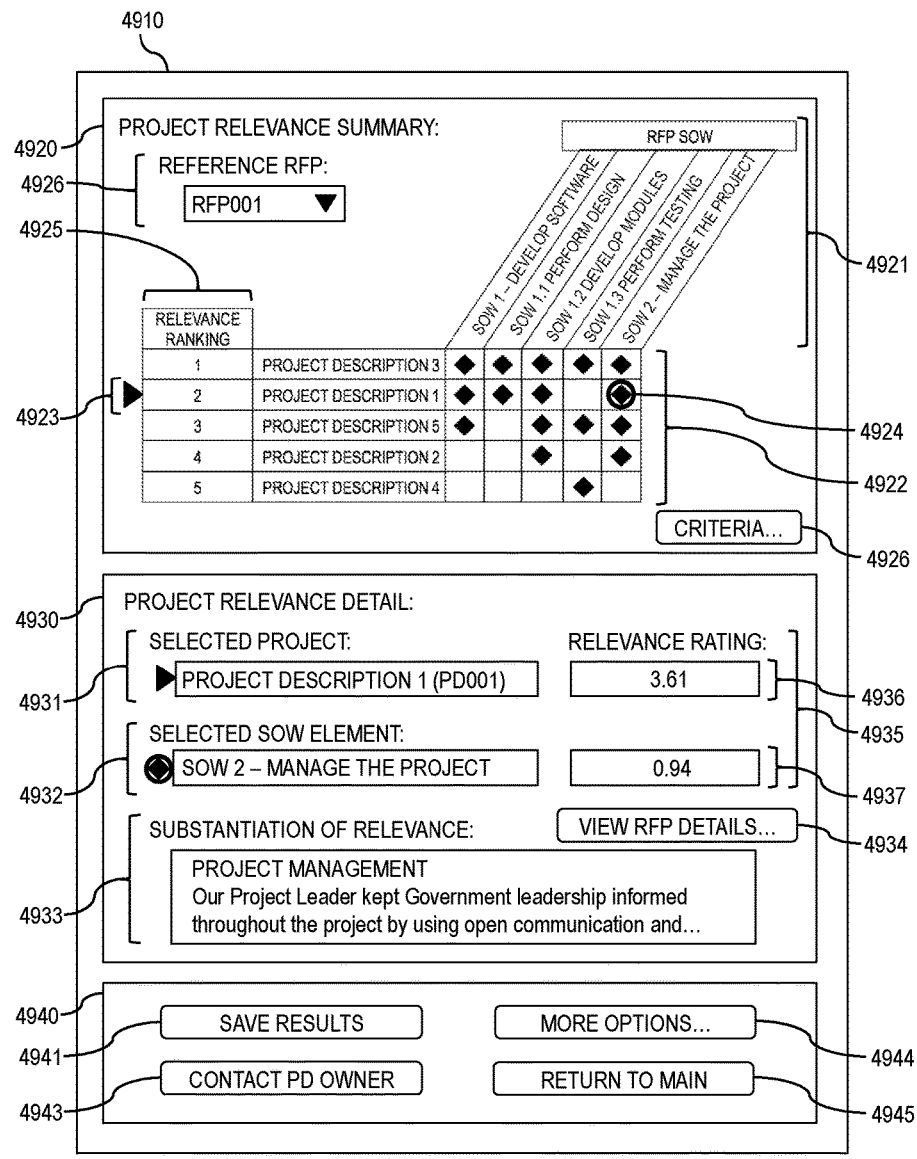
FIG. 49 is a mock-up of a project relevance summary interface, in accordance with an exemplary embodiment of the invention.

FIG. 18 generally depicts a brokered relevance notification interface 1810, in accordance with an exemplary embodiment of the invention, disclosing further detail on how a relevance management system 1140 may broker information regarding relevant experience or capabilities, for example to inform a first end user that a relevance management system 1140 has identified a project associated with a second end user that is relevant to a project associated with said first end user. We disclose in reference to FIG. 18 that the form of an informing message in a notification interface 1810 may be similar to that of an email message, blog entry, or other type of communication, although we contemplate more elaborate alternative message formats, which may include graphical elements such a relevance chart, other media idioms, or formats; as well as simplified alternative message formats, such as may be used by Short Message Service (SMS), instant messaging (IM), short character-based messages, and other formats. As we disclose in reference to FIG. 18, a message 1810 may include functionality such as represented by a "Subject" line 1815, or a short introduction 1820, which may state the intended purpose of a communication, as well as information regarding a relevant project that has been identified (Ref. 1830 and 1831). Such information may provide functionality to identify a project associated with a message sender (e.g., RFP001 1830 as shown for the "Prime" user 1810), as well as a name or other identifying information associated with a relevant project 1832, or the owner of a relevant project 1833. A notification interface 1810 may also provide functionality such an indicator of relevance, such as overall relevance 1834 of an identified project 1831 to a project associated with a message recipient 1830, or other pertinent information. (The "overall relevance" of a project is disclosed in further detail in reference to FIG. 90.) In a notification interface 1810, such communications may provide a message recipient with options 1840, the exercise of which may include functionality such as an ability 1842 to open or access an indicated project 1830 to view relevance results 1341, which may provide functionality, such as to open a project relevance summary interface, such as shown in FIG. 49, or other suitable interface. A notification interface 1810 may provide a message recipient functionality, such as to select a project indicated in a message 1831 and contact the associated project owner 1844. An end user may also close a message interface 1850. We disclose in reference to FIG. 18 a notification interface 1810 that a relevance management system 1140 may use to inform a capability-seeking end user ("Prime" in this case) regarding PDs that said system 1140 has identified a project 1831 as relevant to an RFP 1830 associated with said capability-seeking end user. Those skilled in the art will recognize that the notification interface 1810 we disclose in reference to FIG. 18 may be easily modified to perform the function of notifying a capability-providing end user of an RFP a relevance management system 1140 has identified as relevant to a PD associated with said capability-providing end user (analogous to information provided in FIG. 60) in an alternative embodiment, and such embodiments are intended to be within the scope of the present invention.

FIG. 19 generally depicts a brokered request interface 1910, in accordance with an exemplary embodiment of the invention, disclosing further detail on how a relevance management system 1140 may enable a project owner (e.g., a PD or RFP owner) to initiate communication with one another, such as opening a dialog between a first and a second end user regarding a project owned by a first user that a relevance management system 1140 has determined is relevant to a project owned by a second end user. FIG. 19 illustrates a case where a capability-seeking end user ("Prime" in this case) may use functionality (such as represented by a first 10345 or a second 4943 functionality) to contact a capability-providing end user (illustrated as an end user "Sub 2" in this case, owner of PD005). A brokered request interface 1910 may include functionality such as represented by a "Subject" section 1815, or short introduction 1920, which may state an intended purpose of a communication, as well as information regarding a relevant project that has been identified. As with the interface we disclosed in reference to FIG. 18, here too in reference to FIG. 19 we contemplate alternative message formats that may be used on a brokered request interface 1910, including more elaborate message formats and simplified message formats, such as disclosed in reference to a notification interface 1810.

A brokered request interface 1910 may provide a message recipient with options that may include, but are not limited to, functionality 1930 to open a dialog with a message sender, or to forego such dialog 1940. For example, if a message recipient wishes to open a dialog 1930, said recipient may be provided with additional functionality, such as the ability to send contact information to a message sender, add a message as part of a response, or to authorize a message sender to access further details of a project. If an end user elects to forego further dialog 1940, a relevance management system 1140 may enable a message recipient to provide a message to a message sender, which may be useful in explaining why said message recipient is foregoing further dialog. When a message recipient has completed making selections on an interface 1910, said recipient may inform a communications module 1144 to send a message to an original message sender (i.e., Prime in this case), or cancel the operation 1951. As part of such communication, or possibly in follow-on communications, an original message recipient (e.g., Sub 2 in this example) may send a "confirmation" message to an original sender (e.g., Prime in this example), indicating that an original message sender has been confirmed and granted permission to access and use within a relevance management system 1140 an identified project associated with an original message recipient. Such confirmation techniques are disclosed in further detail in reference to a "Confirmed" indicator (such as a first indicator 9733 in FIG. 97, or a second indicator 10344 in FIG. 103) and serve as an indicator that a first and a second end user have communicated regarding access and use (by a second end user) of a project owned by a first end user, and come to agreement that such access and use is authorized.

Processing Module

FIG. 20 generally depicts a processing module, in accordance with an exemplary embodiment of the invention, disclosing further detail on a relevance management system 1140. We disclose in reference to FIG. 20 further detail of a processing module 1145, including an overall flow of data through a processing module to perform relevance processing, which may include, but is not limited to, key processing elements for data entry for an ST 2020, a PD 2021, and an RFP 2022, direct match processing 2040, ETL processing 2060, capability determination processing 2080, RFP relevance determination processing 2085, or team construction processing 2090. As we disclose below, a relevance management system 1140 may use an efficient, common structure to store an ST, PD, or RFP.

Generally speaking, we disclose that a relevance management system 1140 may make use of multiple types of processing, such as "transaction" processing and "analytic" processing: transaction processing for data entry and match processing, and analytic processing for capability and relevance determination processing. Those skilled in the art will recognize that data-centric information technology (IT) systems are often classified as either on-line transaction processing (OLTP) systems or as on-line analytic processing (OLAP) systems, based upon the type of access and updates made to a system's data stores. Broadly speaking, we disclose that data entry and direct match processing steps (such as a first 2020, second 2021, and a third 2022 processing step; and a fourth processing step 2040, respectively) are most similar to OLTP-type systems, where data is entered into a relevance management system 1140 and "processed" to update various data stores (which may be implemented as relational databases, or other types of data persistence technologies). In contrast, we disclose that system processing, such as for capability determination processing 2080, RFP relevance determination processing 2085, and team construction processing 2090, may need to support an end user in visualizing, navigating, aggregating (including hierarchically aggregating), or dynamically filtering cumulative RFP-to-PD relevance data to identify capabilities, or construct or compare advantageous teaming arrangements. We recognize these functions (i.e., visualizing, navigating, aggregating, and filtering of data) as core OLAP functionality, which may motivate us to transform data to an OLAP-friendly, data warehouse-type format 2070 as it is processed by a relevance management system 1140, to more effectively support the interactive nature of capability 2080, relevance determination 2085, or team construction 2090 processing.

A processing module, such as shown in FIG. 20, may perform Extract, Transform, and Load (ETL) processing 2060, which may use ETL processing techniques, now known or hereafter developed, to transform data stored in a relevance data store 2045 from e.g. a relational database format, or other format, to that of a multidimensional database (MDB), or other format, commonly referred to as a "data cube", which a relevance management system 1140 may store in a relevance cube 2070, which may provide native support for OLAP-type multidimensional functionality. Thus we disclose in reference to FIG. 20 that capability determination processing 2080, RFP relevance determination processing 2085, or team construction processing 2090 may be driven advantageously in a relevance management system 1140 by a relevance cube 2070.

For clarity of presentation and improved understanding of the specification of the present invention, we have characterized "front end" system processing (such as a first 2020, second 2021, and third 2022 processing step; and a fourth processing step 2040) as OLTP-type, and the "back-end" system processing (such as a fifth 2080, sixth 2085 and seventh processing step 2090) as OLAP-type. Those skilled in the art will recognize that OLTP and OLAP are in fact part of a continuum of data storage, retrieval, and processing techniques that have a long history, and which are constantly undergoing change. For example, newer "OLTP databases" may provide OLAP-type functionality, and conversely newer OLAP-type databases may support OLTP functionality. Furthermore, those skilled in the art will recognize that it is possible to implement systems that provide what we have characterized as "OLTP-type" functionality (data entry, storage, and matching) without using traditional OLTP-type technologies (e.g., without relational databases), and similarly that it is possible to implement systems that provide what we have characterized as "OLAP-type functionality" without using traditional OLAP-type technologies (e.g., without a multidimensional database), such as by instead performing e.g. "roll-up" and "drill-down" via application-level code. Thus, although we may characterize a relevance management system 1140 as performing OLTP-type or OLAP-type processing, we do not contemplate a limitation that a relevance management system 1140 provide functionality that is implemented with (or, only with) specific or traditional OLTP-type or OLAP-type technologies.

Further regarding ETL processing 2060, we generally depict, in the specification of the present invention, said ETL processing as transforming relevance results (such as may be stored in 2045) into a tabular structure (such as may be stored in a relevance cube 2070); procedure Build_Relevance_Table( ) (Ref. FIG. 38) is such an example. In the specification of the present invention, we have deliberately elected to disclose such ETL processing 2060 via tabular transformations, for clarity of presentation. Those skilled in the art will recognize that a broad range of representations (such as tabular, de-normalized tabular, relational, hierarchical, matrix, or similar organizations) may be used to represent both non-multi-dimensional and multi-dimensional data, such as may be represented in a relevance cube 2070. Those skilled in the art will also recognize that the transformations and processing that we disclose, such as for direct match processing 2040, ETL processing 2060, capability determination processing 2080, RFP relevance determination processing 2080, team construction processing 2090, or template based match processing 11060 may be performed using analogous transformations or processing in an alternative embodiment, and that such embodiments are intended to be within the scope of the present invention.

Having disclosed a processing module as shown in FIG. 20, we disclose next a structure for ST, PD, and RFP data during OLTP-type processing steps (Ref. 2020, 2021, and 2022; and 2040, respectively), as well as further detail regarding these processing steps. This is followed by a disclosure of OLAP-type structures that may be used in subsequent processing (Ref. 2070, 2080, 2085, and 2090), as well as further detail regarding these subsequent processing steps.

Data Organization

Figure 21:
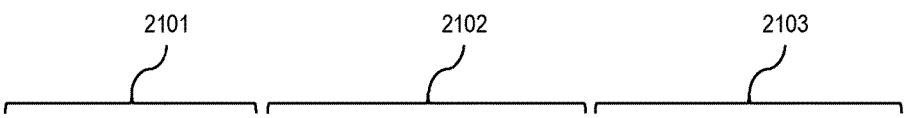
FIG. 21 is a Project Descriptor data organization, in accordance with an exemplary embodiment of the invention.

FIG. 21 generally depicts a Project Descriptor data organization, in accordance with an exemplary embodiment of the invention, disclosing detail regarding a concept of a "project", which may correspond to a PD 2011 or RFP 2012 instance, such as stored in a PD data store 2031 or an RFP data store 2032, respectively, in a relevance management system 1140. Because of the similarity between an ST (stored in an ST data store 2030) and a PD or an RFP instance, we also may model an ST as a project.

Further regarding FIG. 21, we disclose in reference to said figure a Project Descriptor data organization that may provide an efficient and flexible structure to represent ST, PD, and RFP instances, such as within a relevance management system 1140. A Project Descriptor data organization (Ref. FIG. 21) discloses multiple types of information, which may include, but are not limited to: (1) meta data about a Project Descriptor 2101; and (2) at least one sub-descriptor that may be used to efficiently classify and describe a project, such as represented by a Project Descriptor 2102. A component of a Project Descriptor (such as illustrated in FIG. 21) may be associated with a "Level". A Project Descriptor component 2102 may be identified as being at "Level 3", and said Project Descriptor may have a unique identifier (e.g., each PD may have a "PD ID", each RFP an "RPF ID, and each ST an "ST ID"). A sub-descriptor may be identified as being at "Level 4" within a relevance management system 1140, as we disclose in reference to FIG. 21.

Regarding Project Descriptor meta data 2101, said meta data may be used by a relevance management system 1140 to represent hierarchical or other types of relationships, such as may exist between a Project Descriptor instance and its owner, for example that a particular PD is owned by a specific company, or which RFPs are owned by which companies, and so on. Such "PD Owner" and "RFP Owner" relationships may be identified as "Level 2" within a relevance management system 1140. Finally, meta data may support a concept of a "team", such as to represent multiple companies whose capabilities and experience may be aggregated, as e.g. a group of companies who may collectively bid on an RFP (under the lead of a prime contractor). These team-based relationships may be identified as "Level 1" within a relevance management system 1140, as we disclose in reference to 2101.

Regarding organization of data 2103, and disclosed in further detail below, we broadly disclose a data organization that may model multiple levels (such as, Level 1 through Level 4), and further disclose that such levels may include both hierarchical and non-hierarchical descriptors (to include, for example, range-based). Hierarchical and range-based descriptors may enable efficient determination of relevance, including partial relevance, via overlap. While hierarchical and range-based descriptors are not required by a relevance management system 1140, an embodiment of the present invention may use them advantageously. For example, we disclose that hierarchical and range-based descriptors may enable PD and RFP information to be conveyed by PD and RFP owners, respectively, with a level of confidentiality, using e.g. ranges or less-specific values instead of exact values, as disclosed in further detail below.

Figure 22:
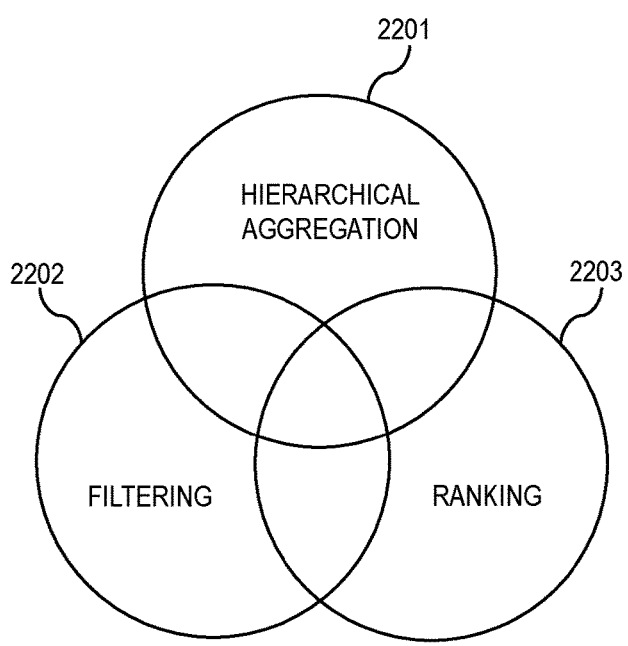
FIG. 22 depicts relationship between hierarchical aggregation, filtering, and ranking, in accordance with an exemplary embodiment of the invention.

FIG. 22 generally depicts the relationship between hierarchical aggregation, filtering, and ranking, in accordance with an exemplary embodiment of the invention, disclosing further how the data organization we have disclosed in reference to FIG. 21 may have been structured to facilitate core functionality in a relevance management system 1140, to include, but not limited to, hierarchical aggregation 2201, filtering 2202, and ranking 2203. We disclose that hierarchical organization of data 2103 facilitates functionality such as hierarchical aggregation; for example, we may "roll up" by work elements within a project, and then roll up projects by owner (i.e., by company), and finally roll up capabilities of companies as a team. Using a data organization such as depicted in FIG. 21, we may also roll up by contract type, security classification, and so on. We also disclose in reference to FIG. 22 that, complementary to such roll-up functionality 2201, we may also use the data organization to "filter" 2202—for example, we may restrict the results (which may subsequently be rolled up) to only include projects that contain specific work elements, are of a specific contract type, or have a specific security classification, and so on. And also complementary to such roll-ups 2201 and filtering 2202, we may "rank" 2203 results—for example, projects that better match indicated criteria, projects whose contract type is similar (but not the exact same), or which involve a similar security classification to a criteria, may be ranked higher than others, for example in results that may be presented to an end user (such as a first 1110 or second 1130 user), in a relevance management system 1140.

Further regarding FIG. 22, we disclose in reference to said figure a representation of core functionality as a Venn diagram, to emphasize that the data organization may support the three functional elements (hierarchical aggregation 2201, filtering 2202, or ranking 2203). For example, such a data organization (as illustrated in FIG. 21) enables construction of a relevance management system 1140 embodiment in which it is possible to perform all three functional elements (hierarchical aggregation 2201, filtering 2202, and ranking 2203) for each of the exemplar elements of said data organization (i.e., Team, Project Owner, Project, Period of Performance, Value, Customer, Work, and so on through Relevant Achievement). However, in a preferred embodiment it may be advantageous to partition, or selectively use, these functional elements across elements of said data organization, to simplify use of a relevance management system 1140 by an end user, or for other reasons. For example, to identify and compare experience and capabilities of multiple projects and project owners (potential teammates), it may be natural to (hierarchically) aggregate by work elements, project, project owner, and team. It may be similarly natural to filter and rank such results by criteria such as period of performance, value, customer, work elements, contract type, and so on through relevant achievements.

For clarity of presentation throughout the specification of the present invention, we disclose in detail the hierarchical aggregation by the exemplars work element, project, project owner, and team 2102; as well as filtering and ranking on the exemplars period of performance, value, customer, work elements, contract type, and so on through relevant achievements 2102. Those skilled in the art will recognize that the specification of the present invention may be used to construct a broad range of alternative embodiments, such as by applying the functional elements shown in FIG. 22 to data elements (or, a subset of data elements, or a superset of data elements) such as the exemplars shown in FIG. 21, for example providing hierarchical aggregation by contract type, and that such embodiments are intended to be within the scope of the present invention.

Further regarding Level 3 and Level 3 data organization, such as we disclose in reference to FIG. 21, a Project Descriptor (Level 3) may include multiple contracting-domain specific sub-descriptors (Level 4) to efficiently classify and describe contractual work; these sub-descriptors may fall into zero or more classes, and in an embodiment may fall into two exemplar classes, which we may denote as primary and secondary, and which may generally correspond to their relative importance when considering RFP-to-PD relevance. A primary class may contain one or more sub-descriptors, such as those sub-descriptor disclosed above or other sub-descriptors, and in an embodiment may include four exemplary sub-descriptors, such as: project "period of performance" (PoP), dollar (or other currency) "value", "customer" for whom the work was (or will be) performed, and "work" associated with the project. A secondary class may contain zero or more sub-descriptors, such as those sub-descriptor disclosed above or other sub-descriptors, and in an embodiment may include five further exemplary sub-descriptors, such as: "contract type", "security classification", "line of business", "special business classification", and "relevant achievements".

While the specification for the present invention discloses nine exemplary sub-descriptors, partitioned into two exemplary classes of sub-descriptors, we contemplate a broad range of sub-descriptors and classes; those skilled in the art will recognize that additional (or fewer) classes and sub-descriptors may be used in alternative embodiments, and that the resulting embodiments are intended to be within the scope of the present invention.

Further regarding FIG. 21, we first disclose below four primary exemplary sub-descriptors (Level 4 in FIG. 21), in turn.

Period of Performance (PoP): Represents the project's period of performance (PoP). For a PD, PoP may represent a time period between a start date and an end date of work performed. For an RFP, a PPI 422 may include restrictions on the dates of projects that may be submitted in a Past Performance volume. For example, it is often the case that PPI will stipulate that a project included in a Past Performance volume must either be currently active, or have been completed within a specified number of years (i.e., a project must be current or recent, for example, not more than three years old). In such case, for example, a PoP for an RFP may be used to represent a valid date range for projects that may be submitted as part of a Past Performance Volume.

Value: Represents a dollar value of a project; for example, whether a project represented about $1M, $10M, or $100M of work. We note that contractors are often reluctant to disclose publicly an actual, specific dollar value for a project; in part to alleviate such an issue, a value descriptor may enable a project dollar value to be represented as a range; as an example, a projects whose actual value was $600 k may be represented as being a range, such as $500 k to $1M. Using a range allows a contractor to more confidentially convey a project dollar value, without giving away confidential or proprietary information such as might occur using an exact value, which might enable a viewer of said PD to estimate that PD owner's overhead or so-called "wrap rate", which said PD owner may consider confidential information. To alleviate this, a PD owner may represent project contract value as a range. (We disclose that an exact value may be specified, for example, such as by setting upper and lower range bounds to the same value, or other methods.)

Customer: Represents a customer for a project, i.e., an entity (or, entities) for whom said project work was, or will be, performed. For example, we may classify at a high level a customer as being a "government" customer (who may, for example, be procuring support services), or a "commercial" customer (such as a bank that may also be procuring similar or different support services). These high-level classifications (e.g., "government" and "commercial") may include multiple further sub-classifications, to more specifically identify a customer. For example, for a government sub-classification, we disclose that the U.S. Government Office of Management and Budget (OMB) provides a hierarchical classification scheme to identify government program owners for use in the OMB's yearly budgeting process. Such classification of U.S. government organizations is well known and may be used to classify U.S. Government customers by Department (e.g., the Department of Agriculture), and then Agency within (e.g., the Farm Service Agency), and so on.

Work: Represents technical and management work that may have been (or, may be) performed for a project. As with a Customer sub-descriptor, we may also use a hierarchical classification scheme to classify a project's work and its constituent work elements. There are multiple examples of hierarchical classification schemes, including but not limited to that used by the U.S. Government OMB to classify the type of work performed within a government program, as well as NAICS codes that also classify work items. A SOW 421 that is used to describe work requirements in an RFP 420 is often organized hierarchically. Similarly, a work description in a PD document 410 is typically written as a series of short sentences or paragraphs, where each paragraph describes a particular functional area of work that was performed (e.g., a paragraph on Program Management, a paragraph on Technical Work Element 1, and so on). Such sequences of paragraphs may be easily represented as a hierarchy within a relevance management system 1140, with each said paragraph having the same level within a hierarchical structure. In an alternative embodiment, a relevance management system 1140 may also support non-hierarchical work descriptors, which may be accomplished by a variety of methods, including, but not limited to, representing work elements in a PD as members of a list, map, set (such as we disclose in reference to FIG. 121A and FIG. 121B), or other suitable data structure. Those skilled in the art will recognize that such embodiments are intended to be within the scope of the present invention.

Further regarding FIG. 21, we next disclose secondary exemplary sub-descriptors (Level 4 in FIG. 21), in turn.

Contract Type: Represents a type of contract under which work was (or, will be) performed. U.S. Government contracts are often structured in accordance with the Federal Acquisition Register (FAR), which organizes contract types hierarchically, and has five first-level classifications:

Fixed Price Contracts
Cost Reimbursement Contracts
Incentive Contracts
Indefinite Delivery Contracts
Time-and-Materials, Labor-Hour, and Letter Contracts Under each of these contract types, the FAR specifies additional more-specific classifications. For example, under Fixed Price Contracts, the FAR specifies six more-specific contract types including "Firm-Fixed-Price Contracts", "Fixed-Price Contracts with Economic Price Adjustment", and four others; and similarly for the other first-level classifications. A relevance management system 1140 may use, or include, but is not limited to, a contract type descriptor that may be based on a FAR contract-type organization, or other suitable type of organization.

Security Classification: Represents the highest level of security that was used (or, will be used) during implementation of a project. Here too a hierarchical organization (which may represent specialization) may be used to describe such security classifications. Such security classification may begin, for example, at a top-most level with a classification of "None" (meaning no security classification), followed by "For Official Use Only (FOUO)" as a specialization beneath None, "Secret" as a specialization of FOUO, "Top Secret" as a specialization of Secret, and so on. There are a broad range of security classifications, including across various branches of government and within private industry, which may enable alternative embodiments; those skilled in the art will recognize that such embodiments are intended to be within the scope of the present invention.

Line of Business (LOB): Line of business is intended to represent the general nature of work performed. LOB may be similar to, but is not limited to, a classification scheme such as based on the U.S. Federal Enterprise Architecture (FEA) Business Reference Model (BRM) 2.0, which includes 39 entries that describe in functional terms the purpose as well as support functions a customer may conduct. As described in the BRM 2.0, each LOB includes a collection of sub-functions that provide greater specificity. For example, within a "Health" LOB, we find specializations (where the "4" symbol represents specialization within a broader classification) for "Health Illness Prevention", "Health Immunization Management", "Health Public Sector Monitoring", and so on. A relevance management system 1140 may use, or selectively use, including with modification, such LOB classifications to describe a business area that technical work supports, which may be helpful in determining relevance of a PD to an RFP. For example, if we have an RFP requirement for e.g. updating of weapons-system software, and have available a PD whose customer (as described above) is a branch of the U.S. military, and whose work (as described above) involved a contractor performing software maintenance, we may believe we have a good match for said RFP requirement, until we determine that the LOB for said PD was "Financial Management→Accounting", which is likely of less relevance than if the LOB had been e.g. "Defense and National Security", as may be the case with a second PD, which may indeed be a more relevant example of software maintenance, in this case.

Special Business (SB) Classification: Represents types of businesses that may be identified as being within a special classification, such as pertaining to government contracting. As described in FAR Part 19, "Small Business Programs", there are a number of special business classifications that are often given preferential treatment during proposal evaluation. For example, an RFP may include a requirement that a percentage of work on a contract (to be awarded to a prime contractor) must be performed by subcontractors (to said prime contractor) that have a specific classification; for example, that "23% of the total contract work must be performed by Small Business Administration (SBA) certified 8(a) companies". Representative SB classifications that a relevance management system 1140 may use to classify a project may include, but are not limited to:

Small Business
SBA 8(a)
Woman Owned
Veteran Owned
Historically Underutilized Business Zones (HUBZone)

Relevant Achievement: A relevant achievement represents an instance of tangible (such as, verifiable) evidence that a project was performed satisfactorily, and may be used to identify projects that provided excellent service or achieved noteworthy results. A relevant achievement may be represented by, but is not limited to, customer testimonials (quotes from a customer for a prior project), or a quantified benefit achieved on a project, such as reduced cost, increased quality, increased capability, or reduced schedule. It may be important that a relevant achievement be verifiable, and represent stronger evidence than e.g. a contractor simply stating (without verifiable proof), "The customer really loved us on this project." If a statement of that sort is indeed true, a contractor should be able to provide a quote from said customer indicating such, or provide evidence (such cost savings, which may be documented) from which it would be clear that said customer indeed viewed a contractor favorably.

We disclose that all of the exemplary primary and secondary sub-descriptors (with the exception of PoP and Value) may be easily represented hierarchically, as disclosed above, and that the PoP and Value sub-descriptors are both easily represented as ranges of values (each using a pair of dates and dollar values, respectively).

Secondary sub-descriptors may be enabled analogously to primary sub-descriptors. Because secondary sub-descriptors may be represented hierarchically (analogously, for example, to the primary sub-descriptor for customer), in the specification of embodiments of the present invention that follows we focus on the primary sub-descriptors, which include hierarchical sub-descriptors (e.g., customer and work), with the understanding and intention that those skilled in the art will be able to use the specification of the present invention that we provide for primary sub-descriptors, to fully enable secondary sub-descriptors.

Relationship Between STs, PDs, and RFPs

We disclose below an important relationship, between a standard template (ST) and the creation of a PD or RFP instance, such as during a data entry process (Ref. 2021 and 2022, respectively). Broadly speaking, an ST may be used to simplify a PD or RFP data-entry process, while simultaneously enabling entry by an end user of e.g. the unmodified text of a PD or RFP work-element description, respectively, which a relevance management system 1140 may use to perform the more difficult task of matching, to determine RFP-to-PD relevance on an element-by-element basis.

As we have disclosed above, a Project Descriptor (which may be used to represent an ST, PD, or RFP within a relevance management system 1140 as Level 3) may be comprised of multiple sub-descriptors (Level 4).

Recall that a user, such as an administrative user 1120, may construct an ST, including using input from the contracting domain 1121, which may be separate from the PDs 1111 and RFPs 1131. Instead of PD or RFP document inputs, a user may use inputs such as the FAR and FEA BRM (described above) to construct an ST, so said ST data may be used subsequently during PD and RFP data entry to create a series of "templates" for sub-descriptors (which may be hierarchical). As disclosed above, a customer sub-descriptor may consist of a hierarchical classification of customers, from most general (e.g., government or commercial) to most specific (e.g., government Departments, and Agencies within, when following the government branch). Thus, in constructing an ST, a user may enter (possibly once) into a relevance management system 1140 an overall hierarchy or taxonomy that an end user may use subsequently to describe a customer when said end user enters a PD or an RFP. As we disclose below, such hierarchy may be displayed to a said end user (such as, a series of populated, drop-down menus) when said end user enters a PD or RFP into a relevance management system 1140, allowing said end user to select from available entries (which a user, such as an administrative user, enabled when creating an ST).

We disclose that such functionality, including ST-driven, selection-based data entry for PDs and RFPs, may be used for PD and RFP sub-descriptors; however in a preferred embodiment we may choose to treat the work descriptor differently, and instead may enable an end user to enter directly into a relevance management system 1140, for example as unmodified PD or RFP text, data that describes a corresponding PD or RFP work element (for example, such as we disclose in reference to a section component 2424 and a section component 2425). There are several important motivations for the type of data entry we disclose.

First, as we disclose below, via this process, data entry for a PD or RFP has been made a simple, clerical task, and does involve the skill of e.g. a subject matter expert (SME) to perform. A PD or RFP data entry task has been simplified for an end user through the use of selections, such as via drop-down menus (e.g., a data entry component 2640, said "drop-down" menu selection which may be indicated by the presence of an exemplar "▼" symbol) for all of the sub-descriptors (except for work, which may be simplified differently, as disclosed below). The contents of a selector, such as a drop-down menu (i.e., a hierarchical selection of values), may be populated by data from an ST (e.g., as illustrated in an exemplar in FIG. 27), from which an end user may simply select an appropriate entry (e.g., a selector 2641). Thus, with a PD document in-hand, it may be a simple matter for a data-entry clerk to enter period of performance dates (project start and end dates) as noted on said PD document, project dollar value range (low and high dollar value), and navigate through selections (such as via drop-down menus) that a relevance management system 1140 may present, to select a customer for whom work was performed, as indicated on said PD document.

In contrast, classification of the type of work performed on a PD (or, work requirements for an RFP) is a more difficult task, and one that may not be easily performed by a data-entry clerk, who is assumed to have less knowledge than a subject matter expert. Indeed, it is the automatic "classification" of work performed (using, e.g. document/content similarity matching techniques, or other techniques) with respect to an RFP that is one of the key features of embodiments of the present invention. Thus, instead of forcing such a difficult task onto e.g. a less-qualified data-entry clerk, the task of an end user, who may be data-entry clerk, may be greatly simplified by merely requiring an end user to enter a description for a project work element (or, for an RFP, a project work requirement) into a relevance management system 1140 by copying said description from a PD (or, RFP) document into a data-entry form, verbatim, or with minimal modification. Indeed, this is one reason that the PD 2021 and ST 2022 data entry processes are termed "data entry" processes, as they involve only simple data entry tasks, and not the far more complex process of classification or matching (as may be performed by a relevance management system 1140 automatically via direct match processing 2040).

A note regarding the specification of the present invention, and the ordering of disclosures within, which has been done to clarify presentation of the specification. We disclose that an ST may be used for different, but related, purposes with respect to direct match processing 2040, which we disclose first, and template-based match processing 11060, which we disclose below. More specifically, we first disclose the use of an ST in a relevance management system 1140 for determining RFP-to-PD relevance (such as we disclose above in reference to in FIG. 20, and further in reference to e.g. FIG. 35) that uses direct match processing 2040, in which a relevance management system 1140 may use e.g. document similarity matching techniques, now known or hereafter developed, whose inputs are the unmodified RFP-element and PD-element text that were input during data-entry above. We disclose a second use of an ST when we disclose below, in reference to FIG. 110 through FIG. 113, that direct match processing 2040 may be augmented by results from template-based match processing 11060, which may use as input the results of PD 11041 and RFP 11042 template pre-processing that also uses an ST, and which may leverage the knowledge of subject matter experts (SME) who may use their expertise to match, or confirm the matches of, work elements in a PD or RFP with those of an ST, which a relevance management system 1140 may then process 11060 to estimate RFP-to-PD relevance, based on matches derived through an ST.

To clarify concepts of a Project Descriptor, it is useful to disclose exemplar Project Descriptors for an ST, a PD, and an RFP, which we do below, using as a basis the example previously presented in FIG. 5 through FIG. 10.

Figure 23:
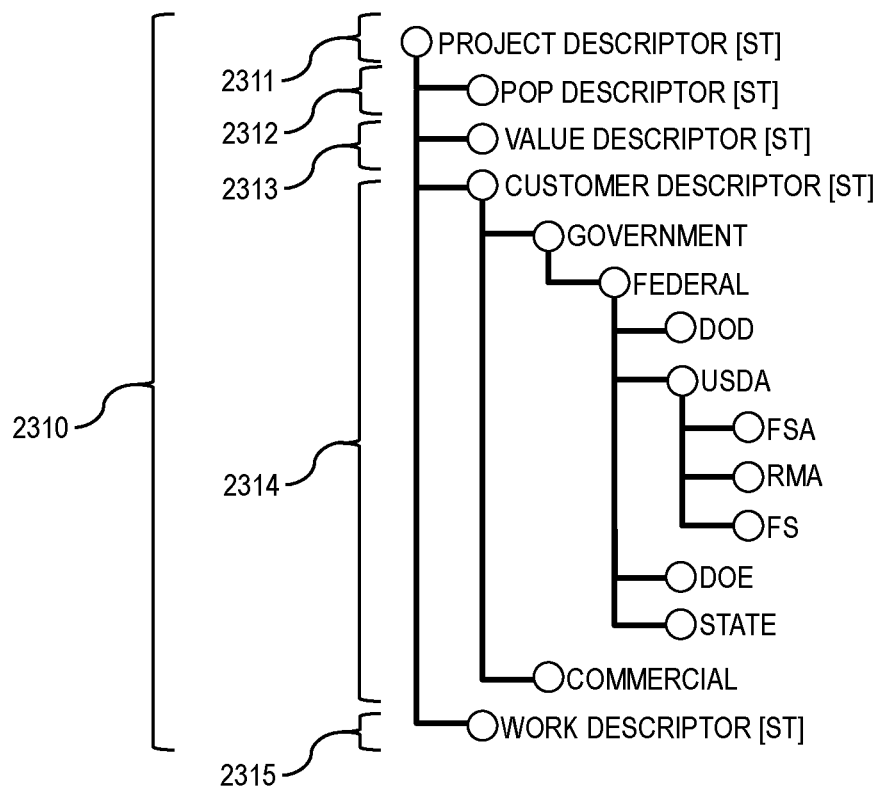
FIG. 23 is an ST exemplar based on a Project Descriptor, in accordance with an exemplary embodiment of the invention.
Figure 25:
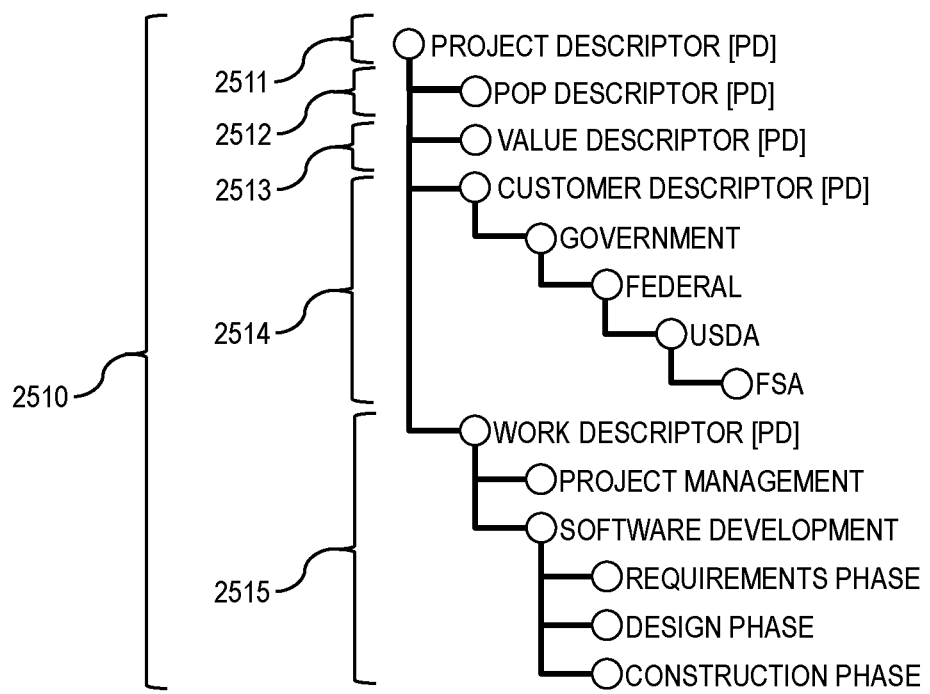
FIG. 25 is a PD exemplar based on a Project Descriptor, in accordance with an exemplary embodiment of the invention.
Figure 30:
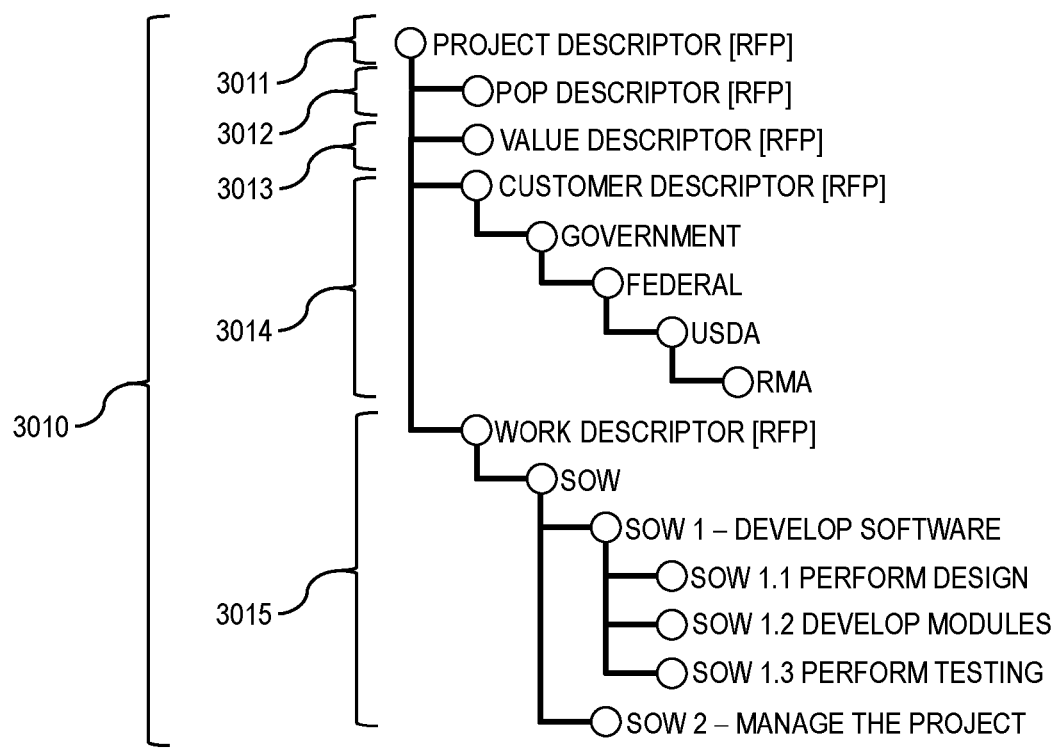
FIG. 30 is an RFP exemplar based on a Project Descriptor structure, in accordance with an exemplary embodiment of the invention.

We disclose in reference to FIG. 23, FIG. 25, and FIG. 30 exemplar Project Descriptors for an ST, PD, and RFP, respectively, which a relevance management system 1140 may use to represent primary and secondary descriptors that comprise said Project Descriptors. For example, elements that comprise a customer descriptor may be represented as nodes in a hierarchical, tree-like structure, or other type of data structure, such as a set as we disclose in reference to FIG. 121A and FIG. 121B below; and said nodes may include information that identifies said node. Identifying information for each such node or element in a descriptor may include, but is not limited to, a label or a description. A label may generally be, but is not limited to, a short piece of descriptive text. Similarly, a description may generally be, but is not limited to, a piece of descriptive text that may be longer than a label, and may be comprised of one or more sentences or paragraphs. For example, a node in a customer descriptor that is intended to identify or represent the United States Department of Agriculture may have as its label "USDA" 2424, and as its description a longer entry that may provide further detail, definition, or description, such as a description based on information from Wikipedia, such as, "The U.S. Department of Agriculture (USDA) is responsible for developing and executing federal government policy on farming, agriculture, forestry, and food. It aims to . . . " (as we disclose in reference to a data entry component 2425) for the exemplar USDA. In the specification of the present invention we may characterize ST, PD, or RFP nodes or elements as having identifiers such as a label or a description, however we contemplate a broad range of alternative embodiments whose said identifiers may include a label or a description, as well as additional items, which may include, but are not limited to, numeric or other identifiers (which may facilitate implementation), hyperlinks to other internal or external information (such as a link to a USDA website, or a Wikipedia entry, for the example above), or visual icons (which may be used to facilitate interaction with an end user), and that such embodiments are intended to be within the scope of the present invention.

ST Project Descriptor Exemplar and Data Entry Interface

FIG. 23 generally depicts an ST exemplar, in accordance with an exemplary embodiment of the invention, represented using a Project Descriptor structure 2102. An ST 2310 may be comprised of sub-descriptors, such as primary sub-descriptors, such as exemplars PoP 2312, value 2313, customer 2314, and work 2315. Because the relationship of said sub-descriptors (Ref. 2312 through 2315) to a project descriptor 2311 is clear, we refer to said sub-descriptors simply as "descriptors" in the specification below, for clarity of presentation.

For a processing module such as we disclose in reference to FIG. 20, and specifically the direct match processing step 2040, ST descriptors for PoP 2312, value 2313, and work 2315 may not be used by a relevance management system 1140, and are thus left blank as shown in FIG. 23 (i.e., the descriptors have no sub-elements, in contrast to a customer descriptor 2314). We disclose, however, that an ST descriptor for work may in fact be used by a relevance management system 1140, such as part of template processing, which we disclose below in reference to FIG. 110 and FIG. 111. Thus, for direct match processing 2040, which is the focus of the processing flow depicted in FIG. 20, a customer descriptor for an ST 2313 is of primary importance. We disclose next how a user, such as an administrative user, may create such an ST customer descriptor 2313.

FIG. 24 generally depicts an ST data entry interface, in accordance with an exemplary embodiment of the invention, in which a controller module 1142 and an interface module 1143 may provide the necessary interfaces and application logic for an ST data entry processes. We disclose in reference to FIG. 24 how an end user may be presented with functionality such as an interface 2400 that may present a view of an ST Project Descriptor 2310 that is in the process of being constructed, reviewed, or updated, such as by an administrative user.

We further disclose, in reference to an ST data entry interface 2400, that said interface may be comprised of sections, such as a meta-data section 2410, or an ST Project Descriptor section 2420, and that each such section can be considered its own interface, as can each field within a section.

Functionality provided by a meta-data section 2410 may include presenting information regarding an owner of a template 2411, which is illustrated as an exemplar "Admin" administrative user in this case, as well as a system-generated unique identifier for a template 2412, which is illustrated as an exemplar "ST001" in this case. A meta-data section may enable a user to provide a name for a template as well 2413.

Functionality provided by an ST Project Descriptor section 2420 may enable a user to update a customer descriptor section 2421, as well as a work descriptor section 2422, as we disclose in reference to FIG. 112. A user may be provided functionality to add 2430 or delete 2431 elements in a Project Descriptor section 2420, as well as rearrange or replicate elements or subtrees within a Project Descriptor section 2420. A Project Descriptor section 2420 may enable an end user to select elements, as we disclose by illustrating the selection of an element labeled USDA 2423, whose circle is shown as darkened, although we contemplate a broad range of alternative selection indicators, such as highlighting or other idioms, now known or hereafter developed, that may be used in alternative embodiments. A user may be provided functionality to enter data for a selected element label field 2424 as well as an element description field 2425. As we disclose in reference to FIG. 27, customer descriptor labels (such as Federal, Government, DOD, and so on, in the example) may be used to generate selection-based data-entry elements, which may include but are not limited to drop-down menus or alternative selectors, during a PD or RFP data entry process. A user may instruct a relevance management system 1140 to save 2440 to an internal ST data store 2030 changes made to a Project Descriptor, or to reject these changes by canceling 2441.

Further regarding an ST data entry interface 2400, in an ST data entry process 2021, a user 1120 may use input from the contracting domain (Ref 2011 and 1121) to create an ST instance 2310, which may be stored in an ST data store 2031. In the ST exemplar we disclose in reference to FIG. 23 and the ST data entry interface FIG. 24, we see that a customer may be classified as being of type "government" or "commercial". We can see that under a government classification in this example, a customer may be of type "federal"; in a more expansive example of an ST instance these sub-classifications might include "federal", "state", "local", "tribal", or other classifications, corresponding to a more comprehensive breakdown of types of government organizations; and similarly for other subclassifications. Beneath federal in this example, we see further classifications for the Department of Defense (DoD), and other departments such as the U.S. Department of Agriculture (USDA), the Department of Energy (DOE), and the State Department (STATE). Under USDA, we see three further classifications for agencies within USDA, namely the Farm Service Agency (FSA), the Risk Management Agency (RMA), and the Forest Service (FS).

PD Project Descriptor Exemplar and Data Entry Interface

FIG. 25 generally depicts a PD exemplar, in accordance with an exemplary embodiment of the invention, represented using a Project Descriptor structure 2102. A PD 2510 may be comprised of sub-descriptors, such as primary sub-descriptors, such as exemplars PoP 2512, value 2513, customer 2514, and work 2515. Because the relationship of said sub-descriptors (Ref. 2612 through 2615) to a project descriptor 2611 is clear, we refer to said sub-descriptors simply as "descriptors" in the specification below, for clarity of presentation.

FIG. 26 generally depicts a PD data entry interface, in accordance with an exemplary embodiment of the invention, in which a controller module 1142 and an interface module 1143 may provide the necessary interfaces and application logic (as we disclose in reference to FIG. 26 through FIG. 29) to represent and save PD data in a relevance management system 1140. The functionality provided by data-entry interfaces that we disclose in reference to FIG. 26 through FIG. 29 may be used for both PD and RFP data entry processes; thus we may refer to the functionality that 2600 provides as a "PD-RFP" data entry interface when speaking of it generally, as a "PD" data entry interface when disclosing its use entering PDs, or as an "RFP" data entry interface when disclosing its use entering RFPs.

We further disclose, in reference to a PD data entry interface 2600, that said interface may be comprised of sections, such as a meta-data section 2610, a project information section 2615, or a PD Project Descriptor section 2650, and that each such section can be considered its own interface, as can each field within a section.

In a PD data entry process 2021, a capability-providing end user 1110 may use functionality, such as provided by a PD data entry section shown in FIG. 26, and information that an end user may have on hand, which may be a PD document (Ref 2011 and 1111), to create a PD instance 2510, which may be stored in a PD data store 2031.

Further regarding a PD data entry interface 2600, an end user may use functionality such as provided by said interface to create a PD Project Descriptor 2510, as follows. When a relevance management system 1140 presents a PD data entry interface 2600 to an end user, several pieces of information in a meta data section 2610 may have already been filled out by a relevance management system 1140; these may include a project owner 2611, or a project identifier 2612, which may have been assigned a unique identifier generated by a relevance management system 1140 (such as an exemplar "PD001", in this example). An end user may provide a name for a PD 2613; here an end user is shown as having provided a name "Project Description 1", as an exemplar.

Regarding a project information section 2615, an end user may be provided functionality to fill out information in said section 2615, which may consists of various data-entry fields and mechanisms, such as to specify ranges and selections, and which may be made via drop-down menus, or similar idioms. Functionality such as a PoP date range field 2620 may be used to enter a start date and end date for a project, which may be stored in a PoP descriptor 2512. Similarly, functionality such as a value range field 2630 may be used to enter a lower and upper bound for a contract value of a project, which may then be stored in a value descriptor 2513.

Regarding a customer field 2640, an end user may use functionality such as said customer field 2640 to specify a customer for a project, which may be stored in a customer descriptor 2514. Functionality such as a customer field 2640 may contain a selector, such as a drop-down menu 2641, whose hierarchical, multi-level fields may be populated by the contents of a previously entered ST customer descriptor 2314, which may be presented to an end user as a series of selections, as shown in FIG. 27.

Figure 27:
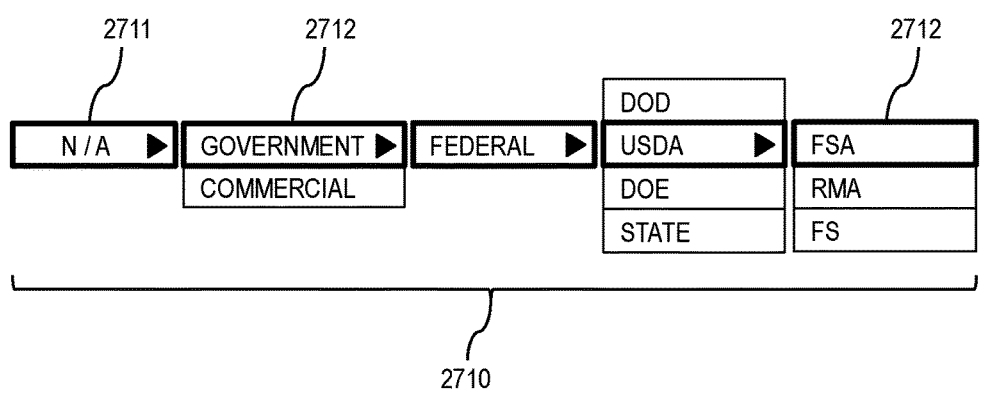
FIG. 27 is a mock-up of a PD data entry selection exemplar, in accordance with an exemplary embodiment of the invention.

FIG. 27 generally depicts a PD data entry selection, using customer as an exemplar, in accordance with an exemplary embodiment of the invention, in which an end user may navigate a menu hierarchy (such as via successive drop-down selections, in an exemplar) to select initially under "N/A" 2711 (for "Not Available"); the selection "Government" 2712 from a choice of "Government" or "Commercial"; followed by "Federal" and "USDA"; and finally "FSA" 2713. A relevance management system 1140 may also provide functionality to specify multiple entries for a customer descriptor, as we disclose by functionality such as represented by a "Multiple . . . " button 2642, which we disclose in further detail in reference to FIG. 80 and FIG. 81.

In practice, for many PDs, a customer descriptor will likely only specify a single customer (i.e., the functionality such as represented by "Multiple . . . " 2642 may not need to be exercised).

Regarding further functionality that may be available from a project information section 2615, an end user may be presented functionality 2643 to enter additional information, such as secondary-level sub-descriptors, as previously discussed. When an end user invokes functionality such as represented by "Additional Detail . . . " 2643, they may be presented with functionality such as an additional contract detail interface FIG. 28.

Figure 28:
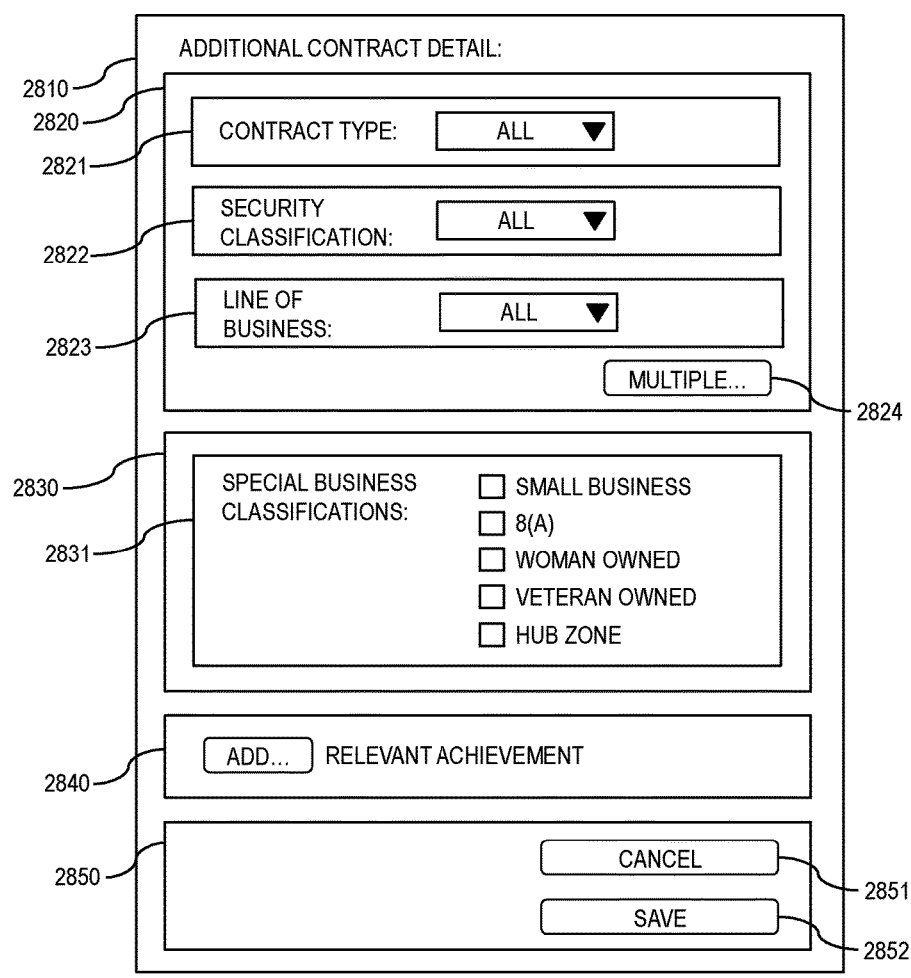
FIG. 28 is a mock-up of a PD data entry additional contract detail interface, in accordance with an exemplary embodiment of the invention.

FIG. 28 generally depicts an additional contract detail interface, in accordance with an exemplary embodiment of the invention, which we disclose may be comprised of sections, such as an additional contract detail section 2820, a special business classification section 2830, or a relevant achievements section 2840; and that each such section can be considered its own interface, as can each field within a section.

Regarding an additional contract detail section 2820, we disclose that an end user may enter an exemplar contract type 2821, security classification 2822, or line of business 2823 for a project, such as using a selection-type input, including but not limited to a drop-down menu or alternatives selector, whose functionality may be analogous to that for a customer field (Ref 2640, and FIG. 27) as previously discussed, and which may include functionality for multiple entries 2824 under each.

Regarding a special business classification section 2830, and a relevant achievements section 2840, an end user may also be provided functionality such as the ability to specify one or more special business classifications 2831 for a PD, as well as add one or more relevant achievements 2830, respectively. When functionality to add a relevant achievement 2830 is activated, an end user may be presented with functionality such as a relevant achievements interface (such as an interface we disclose in reference to FIG. 29).

Figure 29:
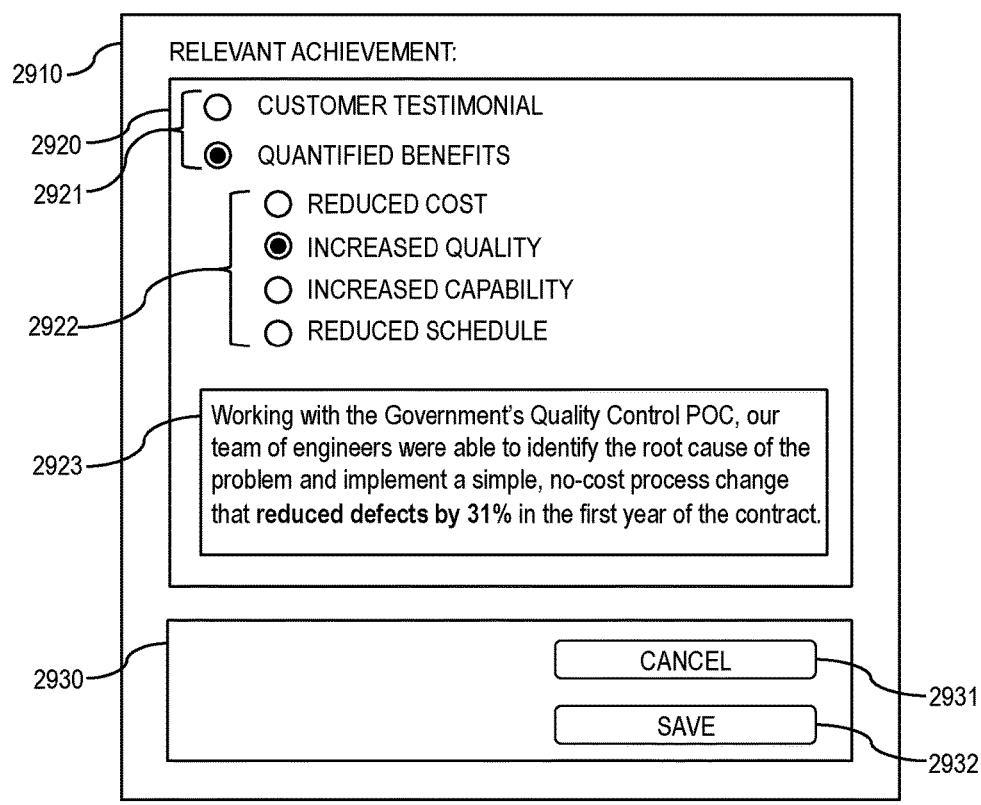
FIG. 29 is a mock-up of a PD data entry relevant achievement interface, in accordance with an exemplary embodiment of the invention.

FIG. 29 generally depicts a relevant achievements interface, in accordance with an exemplary embodiment of the invention. For each relevant achievement entered, an end user may be provided functionality such as the ability to specify whether said achievement represents a customer testimonial or a quantified benefit 2921, or other such identifier. If an end user specifies a quantified benefit, said user may further be able to specify its type 2922, which may include selections, such as for reduced cost, increased quality, increased capability, or reduced schedule, or other identifiers. If an end user has selected either customer testimonial or quantified benefits 2921, said user may enter an accompanying description 2923. An end user may be provided functionality to save a relevant achievement 2932 or cancel the operation 2931. Furthermore, when an end user has returned to an additional contract detail interface 2810 or has completed data entry, they may be provided functionality to save information 2852 or cancel the operation 2852, and in either case a relevance management system 1140 may return an end user to a PD data entry interface 2600.

Regarding a PD Project Descriptor section 2650, we disclose that a relevance management system 1140 may provide functionality for an end user to enter work descriptor information. A work descriptor 2515 for a PD may be used to represent the type of technical or management work that was performed for a project. In FIG. 25 we can see that an example PD includes two work elements under a work descriptor 2515, namely project management and software development. We see that a software development work element has been further specified by representing its constituent components as a Requirements Phase, a Design Phase, and a Testing Phase.

As part of PD data entry an end user may enter a description of work elements performed as part of a project. A process for entering work descriptor 2515 elements of a PD Project Descriptor 2510 may use functionality analogous to that used for entering a customer descriptor 2314 for an ST Project Descriptor 2310, as we have disclosed previously in reference to FIG. 23 and FIG. 24, and disclose below for a work descriptor.

Further regarding a PD Project Descriptor section 2650, we disclose that said section may present a PD work descriptor 2651 to an end user, such as for review or updating. We further disclose that said section 2650 may provide functionality for an end user to add 2655 or delete 2656 elements in a work descriptor section 2651, as well as rearrange or replicate elements or subtrees within work descriptor section 2651. Functionality such as a work descriptor section 2651 may enable an end user to select elements, as shown by a selection of an element for "Construction Phase" 2652, whose circle may be shown as darkened; we contemplate alternative ways to indicate selection, such as we have disclosed above in reference to a selection 2423. A PD Project Descriptor section 2650 may provide functionality that enables an end user to update a currently selected element 2652, such as by editing an element label field 2653 or an element description field 2654. As shown, such fields (Ref. 2653 and 2654) may provide functionality where an end user may enter data into a relevance management system 1140, including unmodified text from a PD-element work description taken from a PD document, or other descriptive text; this may be advantageously performed by using simple copy-and-paste type operations, to copy descriptive text directly from a PD document into an element label field 2653 or description field 2654 input area.

At the completion of PD data entry, a PD data entry interface 2600 may provide functionality for an end user to instruct a relevance management system 1140 to save 2660, such as to an internal PD data store 2031, changes made to a PD Project Descriptor, or to reject these changes by canceling 2661.

RFP Project Descriptor Exemplar and Data Entry Interface

FIG. 30 generally depicts an RFP exemplar, in accordance with an exemplary embodiment of the invention, represented using a Project Descriptor structure 2102. An RFP 3010 may be comprised of sub-descriptors, such as primary sub-descriptors, such as exemplars PoP 3012, value 3013, customer 3014, or work 3015. Because the relationship of said sub-descriptors (Ref. 3112 through 3115) to a project descriptor 3111 is clear, we refer to said sub-descriptors simply as "descriptors" in the specification below, for clarity of presentation.

FIG. 31 generally depicts an RFP data entry interface, in accordance with an exemplary embodiment of the invention, in which a controller module 1142 and an interface module 1143, such as we disclose in reference to FIG. 11, may generate or manage data-entry interfaces and application workflow (illustrated in FIG. 31) to represent and save RFP data in a relevance management system 1140. As noted above, data entry interfaces, such as we disclose in reference to FIG. 26 through FIG. 29, may provide functionality that may be used for both PD and RFP data entry processes; thus we disclose in reference to FIG. 31 the use of a data entry interface 3100, analogous to that shown in FIG. 26, but now used for RFP data entry.

We further disclose, in reference to an RFP data entry interface 3100, that said interface may be comprised of sections, such as a meta-data section 3110, a project information section 3115, or an RFP Project Descriptor section 3150, and that each such section can be considered its own interface, as can each field within a section.

Further regarding FIG. 31, in an RFP data entry process 2022, a capability-seeking end user 1130 may use functionality such as provided in a data entry interface 3100, and information said end user may have on hand, which may be an RFP document (Ref 2012 and 1131), to create an RFP instance 3010, which may be stored in an RFP data store 2032.

Further regarding an RFP data entry interface 3100, an end user may use functionality such as provided by said interface to create an RFP Project Descriptor 3010, as follows. When a relevance management system 1140 presents an RFP data entry interface 3100 to an end user, several pieces of information in a meta data section 3110 may have already been filled out by said system; these may include an RFP owner 3111, or an RFP identifier 3112, which may have been assigned a unique identifier generated by said system (such as an exemplar "RFP001", in this example). An end user may provide a name for an RFP 3113; here an end user is shown as having provided a name "Request for Proposals 1", as an example.

Regarding a project information section 3115, an end user may be provided functionality to fill out information in said section 3115, which may consists of various data-entry fields or mechanisms, such as to specify ranges or selections, and which may be made via drop-down menus, or similar idioms. Functionality such as a PoP date range field 3120 may be used to enter a start date and end date for allowable past performance, for example as specified in the PPI 422 or EC 423, which may be stored in a PoP descriptor 3012. Similarly, functionality such as a value range field 3130 may be used to enter a lower and upper bound for a contract value of an RFP, which may then be stored in a value descriptor 3013.

Regarding a customer field 3140, an end user may use functionality such as said customer field 3140 to specify a customer for a project, which may be stored in a customer descriptor 3014. Functionality such as a customer field 3140 may contain a selector, such as a drop-down menu 3141, whose hierarchical, multi-level fields may be populated by the contents of a previously entered ST customer descriptor 2314, which may be presented to an end user as a series of selections, as shown in FIG. 27, as disclosed above. The customer field 3140 shows how an end user may analogously navigate to, and select, "RMA" 3141, as an example.

Regarding further functionality that may be available from a project information section 3115, an end user may be presented functionality 3143 to enter additional information, such as secondary-level sub-descriptors, as previously discussed. When an end user invokes functionality such as represented by "Additional Detail . . . " 3143, they may be presented with functionality such as an additional contract detail interface as disclosed above in reference to FIG. 28, to enter secondary-level sub-descriptors for RFP.

Once again said user may be presented with functionality such as an additional contract detail interface 2810, with which said end user may enter, a contract type 2821, security classification 2822, or line of business 2823 as called for in an RFP. An end user may also be able to specify one or more special business classifications 2831 that may be a requirement (or of benefit, during evaluation) of an RFP. For RFP data entry, functionality such represented by an "Add relevant achievement" field 2840 may be deactivated, so an end user may not add such information. When an end user has completed their additional contract detail 2810 data entry, said end user may be provided functionality to save information 2852 or cancel the operation 2852, and in either case a relevance management system 1140 may returns said end user to an RFP data entry interface 3100.

Regarding an RFP Project Descriptor section 3150, we disclose that a relevance management system 1140 may provide functionality for an end user to enter work descriptor information. A work descriptor 3015 for an RFP may be used to identify the type or types of technical and management work requirements for a project. In FIG. 30 we can see an example RFP that includes two work elements under a work descriptor 3015, namely SOW 1—Develop Software, and SOW 2—Manage the Project. We see that SOW 1 work element has been further specified by identifying its constituent components, shown in this example as SOW 1.1—Perform Design, SOW 1.2—Develop Modules, and SOW 1.3—Perform Testing.

Further regarding an RFP Project Descriptor section 3150, we disclose that said section may present an RFP work descriptor 3151 to an end user, such as for review or updating. A process for entering work descriptor 3015 elements of an RFP Project Descriptor 3010 may be analogous to that used for entering work descriptor 2515 elements of a PD Project Descriptor 2510, as we have disclosed previously in reference to FIG. 26 for a PD data entry process. As was the case for PD work descriptor data entry, functionality such as RFP work descriptor data entry fields (Ref. 3153 and 3154) may enable an end user to view, create, update, or delete data associated with a selected work descriptor element 3152. As we disclose in reference to data entry fields (Ref. 3153 and 3154), such fields may provide functionality where an end user may enter into a relevance management system 1140 unmodified text from an RFP-element work requirement, such as taken from an RFP document, or other descriptive text. This may be advantageously performed by using simple copy-and-paste type operations, such as to copy descriptive text directly from an RFP document into appropriate fields (Ref. 3153 and 3154).

At the completion of RFP data entry, an RFP data entry interface 3100 may provide functionality for an end user to instruct a relevance management system 1140 to save 3160, such as to an internal RFP data store 2032, changes made to an RFP Project Descriptor, or to reject said changes by canceling 3161.

We have disclosed, in reference to FIG. 24, FIG. 26, and FIG. 31, interfaces that provide functionality with which an end user may create, store and update ST, PD, and RFP instances in a relevance management system 1140 via corresponding data-entry processes (Ref. 2020, 2021, and 2022, respectively). Those skilled in the art will recognize that a result of these data-entry processes has been to populate an ST, PD, or RFP data store (Ref. 2030, 2031, and 2032, respectively) with an ST, PD, or RFP instance (as exemplified by FIG. 23, FIG. 25, and FIG. 30), and that it may be possible to populate said ST, PD, or RFP data stores using alternate embodiments. We contemplate an alternative embodiment in which an end user may create such an ST, PD, or RFP instance, such as externally to a relevance management system 1140, as a file, document, or other such container of information, using for example a text editor or other such tool or process, which may then be imported directly into a relevance management system 1140 by a corresponding data entry process (Ref. 2021, 2020, and 2022, respectively). Those skilled in the art will recognize that such type of file-based data entry for an ST, PD, or RFP instance may be performed using simple file-input functionality, web services, or other methods or services, such as "cloud" or distributed services, locally or over an Internet or network, and that such embodiments are intended to be within the scope of the present invention.

We also contemplate an alternative embodiment in which a user, or a proxy, or system operating on behalf of said user, may use functionality, such as that provided by parsing technology, now known or hereafter developed, to automatically (or, semi-automatically) construct an ST, PD, or RFP instance (or parts thereof), from inputs such as from the contracting domain, a project description, or an RFP document, respectively, or other inputs. For example, such an alternative embodiment may use parsing techniques to create inputs that may be "read in" or imported into a relevance management system 1140, such as may be performed by file-based data entry, as disclosed above. Those skilled in the art will recognize that embodiments that incorporate such parsing techniques are intended to be within the scope of the present invention.

Relevance Matching

A key step performed by a processing module (such as we disclose in reference to FIG. 20) is determining the relevance of an RFP to a PD, which may be performed via functionality such as direct match processing 2040. To assist match processing, it may be advantageous for a relevance management system 1140 to transform a representation of a PD, RFP, or ST, exemplars of which we disclose in reference to FIG. 25, FIG. 30, and FIG. 23, respectively, into an array, vector, map, or other data structure. We disclose that such transformation may be accomplished by navigating a Project Descriptor, such as a PD, RFP or ST, exemplars of which we disclose in reference to FIG. 25, FIG. 30, and FIG. 23, respectively, using a depth-first traversal, and associating each node in a Project Descriptor with an element of an array.

We disclose that in a tag-based alternative embodiment, such as we disclose below in reference to FIG. 121A and FIG. 121B, such transformation to an array format may accomplished in a variety of ways, including but not limited to enumerating the tag nodes in the sets comprising a tag-based Project Descriptor embodiment, and associating each such tag node with an element of an array.

Figure 32:
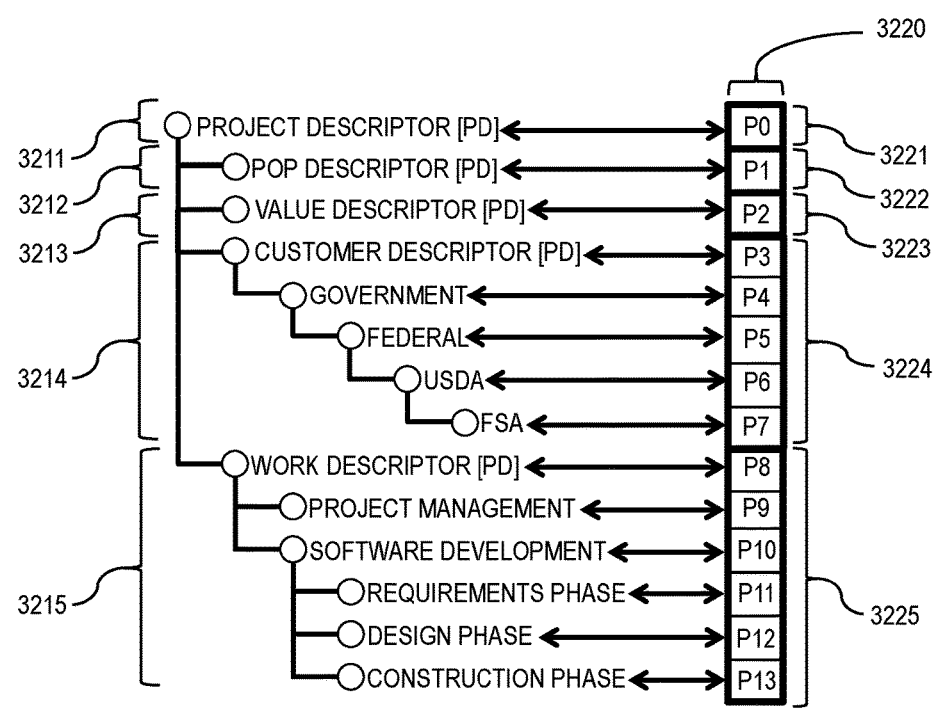
FIG. 32 is an exemplar of a PD Project Descriptor in array format, in accordance with an exemplary embodiment of the invention.

FIG. 32 generally depicts an exemplar PD Project Descriptor in array format, in accordance with an exemplary embodiment of the invention, which we disclose for performing such a PD Project Descriptor-to-array transformation. We disclose such transformation to an array format in reference to FIG. 32 using a PD instance example from FIG. 25, where an array 3220 has been populated with 14 entries (P0 through P13), each of which corresponds to an element of a PD Project Descriptor. For example, array element P0 3221 corresponds to the root node of a PD Project Descriptor 3211; array element P1 3222 corresponds to the PoP descriptor 3212; and so on for the remainder of array elements through P13.

Figure 33:
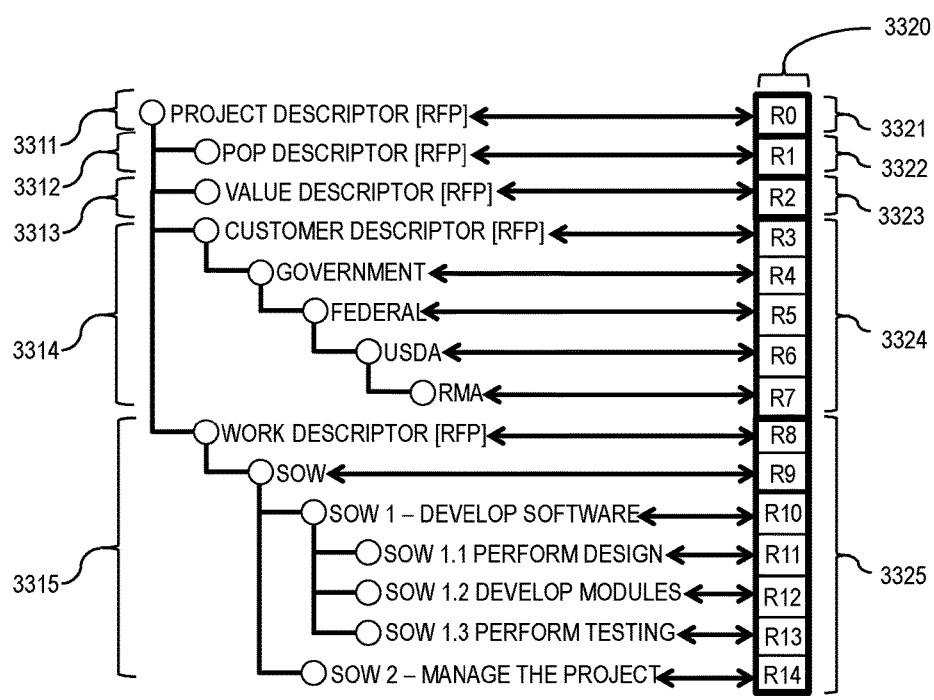
FIG. 33 is an exemplar of an RFP Project Descriptor in array format, in accordance with an exemplary embodiment of the invention.

FIG. 33 generally depicts an exemplar RFP Project Descriptor in array format, in accordance with an exemplary embodiment of the invention, which we disclose for performing such an RFP Project Descriptor-to-array transformation. Similar to FIG. 32, we disclose in reference to FIG. 33 a corresponding array representation for an RFP instance shown in FIG. 30. Here we disclose that analogously, array element R0 3321 corresponds to the root node of an RFP Project Descriptor 3311; array element R1 3322 corresponds to the PoP descriptor 3312; and so on for the remainder of array elements through R14.

Figure 34:
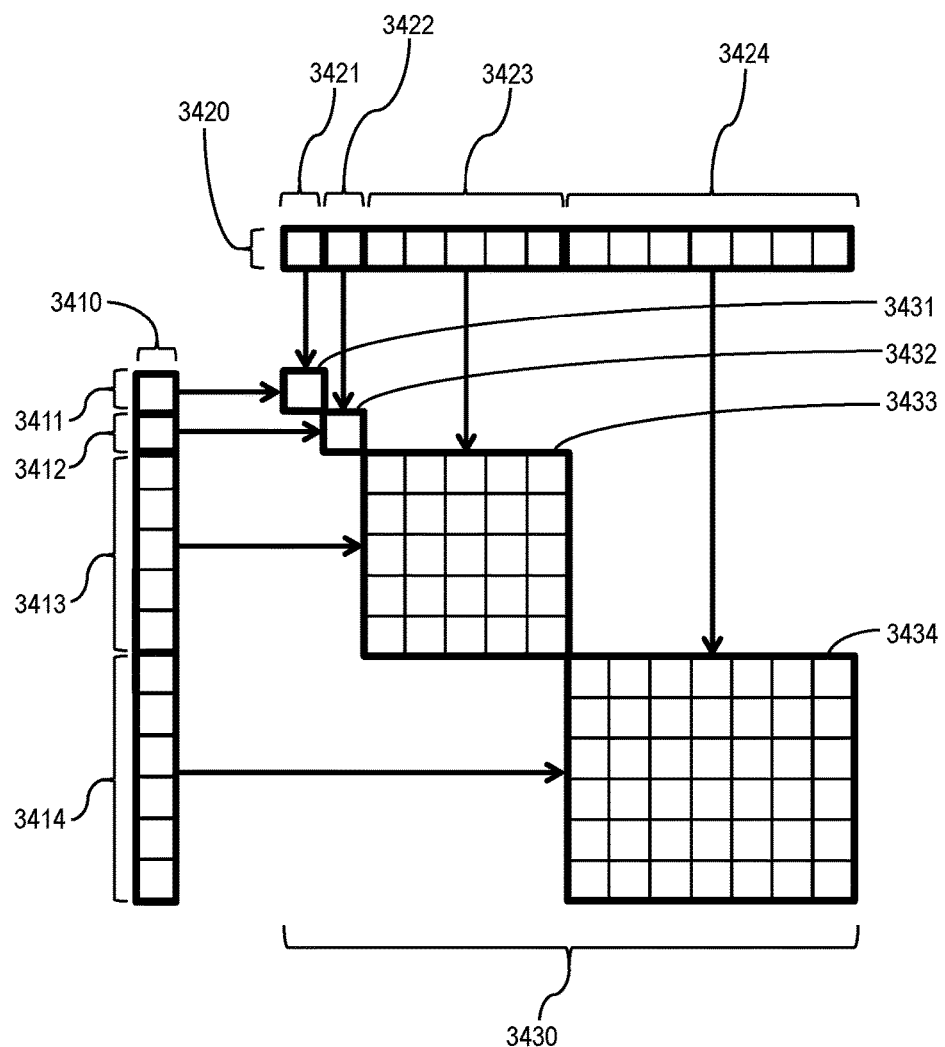
FIG. 34 is an exemplar for match processing using a PD Project Descriptor and an RFP Project Descriptor, in accordance with an exemplary embodiment of the invention.

FIG. 34 generally depicts an exemplar for match processing using a PD Project Descriptor and an RFP Project Descriptor, in accordance with an exemplary embodiment of the invention. We disclose in reference to FIG. 34 how a relevance management system 1140 may determine, during direct match processing 2040, relevance of a PD, such as in array format 3410, to an RFP, such as in array format 3420. In effect, a relevance management system 1140 may pair-up corresponding descriptors from a PD instance and an RFP instance, e.g., PoP descriptors (Ref. 3411 and 3421, respectively, which correspond to descriptors (Ref. 3212 and 3312), respectively); value descriptors (Ref. 3412 and 3422); customer descriptors (Ref. 3413 and 3423); and work descriptors (Ref. 3414 and 3424). We disclose in further detail below (in reference to FIG. 68 through FIG. 71, and FIG. 84 through FIG. 87, for a customer descriptor; and in reference to FIG. 88 through FIG. 89 for a PoP descriptor) how relevance may be determined and used for a customer descriptor, as well as a PoP or value (range-type) descriptor. In the specification below, our disclosure focuses on determining relevance of a PD work descriptor and an RFP work descriptor; descriptors (Ref. 3414 and 3424, respectively), which correspond to descriptors (Ref. 3215 and 3315, respectively).

FIG. 35 generally depicts pseudo-code for a procedure Determine_Relevance_Matrix( ) that we disclose, in accordance with an exemplary embodiment of the invention, that a relevance management system 1140 may use to determine relevance of a PD work descriptor to an RFP work descriptor, both of which may be provided to said procedure as inputs in arrays named A and B, respectively, and which are shown as arrays (Ref 3710 and 3720), respectively. For clarity, we note that arrays (Ref. 3710 and 3720) correspond to arrays (Ref. 3414 and 3424), respectively, which in turn correspond to descriptors (Ref 3215 and 3315), respectively. Procedure Determine_Relevance_Matrix( ) (Ref. FIG. 35) takes as input two additional arguments, a function named Content_Comparator( ) and a numeric value named Min Threshold (which stands for "minimum threshold"); we disclose the use of said arguments below.

Further regarding input arguments as depicted in FIG. 35, Content_Comparator( ) is an argument that is passed to Determine_Relevance_Matrix( ) (Ref. FIG. 35) that enables a relevance management system 1140 to use tailorable, interchangeable functionality in determining similarity of two documents. (In programming languages, such a technique is commonly referred to as a "function argument".) Content_Comparator( ) is a function that takes as input two input arguments, and returns a numeric value (that we may disclose as a real number value between 0.0 and 1.0, scaled to such range as needed) that represents how "similar" the two arguments it has received are to one another. We may use a numeric value having a range between 0.0 and 1.0 to represent similarity, which we do for clarity of presentation in the specification of the present invention. We also contemplate a broad range of alternative embodiments for similarity metrics, which for example may use a different range, or step-wise, discrete-valued entities, which may or may not be numeric, with a simple example of such being a similarity metric that may take on discrete values such as "High", "Medium", or "Low", and so on (as well as in much finer gradations). For clarity, we use a similarity metric whose range is 0.0 to 1.0 throughout the specification of the present invention; those skilled in the art will recognize that alternative similarity metrics may be used, and that such embodiments are intended to be within the scope of the present invention.

Regarding procedure Determine_Relevance_Matrix( ) that we disclose in reference to FIG. 35, the input argument that is received as a Content_Comparator( ) function may be implemented with any of a broad range of methods, now known or hereafter developed, for determining similarity of a first document to a second document, examples of which include, but are not limited to, the well-known Term Frequency-Inverse Document Frequency (TF-IDF) methodology, and more sophisticated Latent Semantic Analysis (LSA) techniques, both of which may incorporate further techniques, now known or hereafter developed, such as removal of stop words (i.e., unimportant words), stemming, and other techniques. Such methods and techniques, now known or hereafter developed, alone or in combination, may be configured to perform textual and other analysis of two documents which may be provided as arguments, and to return a number between 0.0 and 1.0 (scaled to such range, as needed) to indicates how similar a first document is to a second document, with 0.0 indicating no similarity, and 1.0 indicating high similarity, and may be used as a Content_Comparator( ).

FIG. 36 generally depicts pseudo-code for a function TFIDF_Content_Comparator( ) that we disclose, in accordance with an exemplary embodiment of the invention, that a relevance management system 1140 may use to provide a TF-IDF measure of similarity. A relevance management system 1140 may pass the function TFIDF_Content_Comparator( ) (Ref. FIG. 36) to procedure Determine_Relevance_Matrix( ) (Ref. FIG. 35) as the input argument Content_Comparagor( ). We disclose in the pseudo code depicted in FIG. 36 that a function TFIDF_Content_Comparator( ) may receive two arguments, named D1 and D2, that represent documents to be compared. The function TFIDF_Content_Comparator( ) (Ref. FIG. 36) makes a call a function named TF_IDF( ), which represents an implementation of a TF-IDF methodology, and assigns a returned numeric value from said TF-IDF function call to a variable named S, which may be scaled as necessary to fall within a range of 0.0 to 1.0, or other value in an alternative embodiment, where a value of 0.0 may represent no similarity, and a value of 1.0 may represent high similarity. Function TFIDF_Content_Comparator( ) (Ref. FIG. 36) then returns a scaled comparison value to Determine_Relevance_Matrix( ). We contemplate a broad range of alternative embodiments whose operation may be similar to a Content_Comparator( ) function such as depicted in FIG. 36, and which may be based on alternative document similarity matching techniques, now known or hereafter developed, including various implementations of TF-IDF, LSA, or other techniques. Those skilled in the art will recognize that such embodiments are intended to be within the scope of the present invention.

Further regarding procedure Determine_Relevance_Matrix( ) that we disclose in reference to FIG. 35, we disclose that the pair of documents that are provided to Content_Comparator( ) correspond to a document associated with a PD work descriptor element, and a document associated with an RFP work descriptor element; we may refer to said document associated with a PD work descriptor element as a first "segment", which may have been derived from a decomposition of a PD document, such as performed during a PD data entry process 2021; and may refer to said document associated with an RFP work descriptor element as a second "segment", which may have been derived from a decomposition of an RFP document, such as performed during an RFP data entry process 2022. An example of a PD work descriptor element 2652 is shown in FIG. 26, whose associated document (or segment) consists of two components: an element label 2653 whose content is "CONSTRUCTION PHASE" in this case, and an element description 2654, whose content begins with "Our team of 6 software engineers . . . ". An example of an RFP work descriptor element 3152 is shown in FIG. 31, whose associated document (or segment) consists of two components: an element label 3153 whose content is "SOW 2—MANAGE THE PROJECT", and an element description 3154, whose content begins with "Work efforts performed in support of this . . . ".

Further regarding procedure Determine_Relevance_Matrix( ) depicted in FIG. 35, a Min_Threshold argument may be a numeric value or metric between 0.0 and 1.0, or other value in an alternative embodiment, that serves to screen out (i.e., eliminate) match results whose values may be considered too low to be significant. For example, with a Content_Comparator( ) function configured to return values between 0.0 (no similarity) and 1.0 (high similarity), an exemplary Min_Threshold value of e.g. 0.25 may be used to consider as "not a match" any element match value that is below 0.25. Clearly, smaller values for Min_Threshold will cause a larger number of matches to be retained, and vice versa, via such simple screening functionality. We contemplate alternative embodiments that may use a broad range of Min_Threshold values, not only the single 0.25 exemplar value as disclosed, and such embodiments are intended to be within the scope of the present invention.

Figure 37:
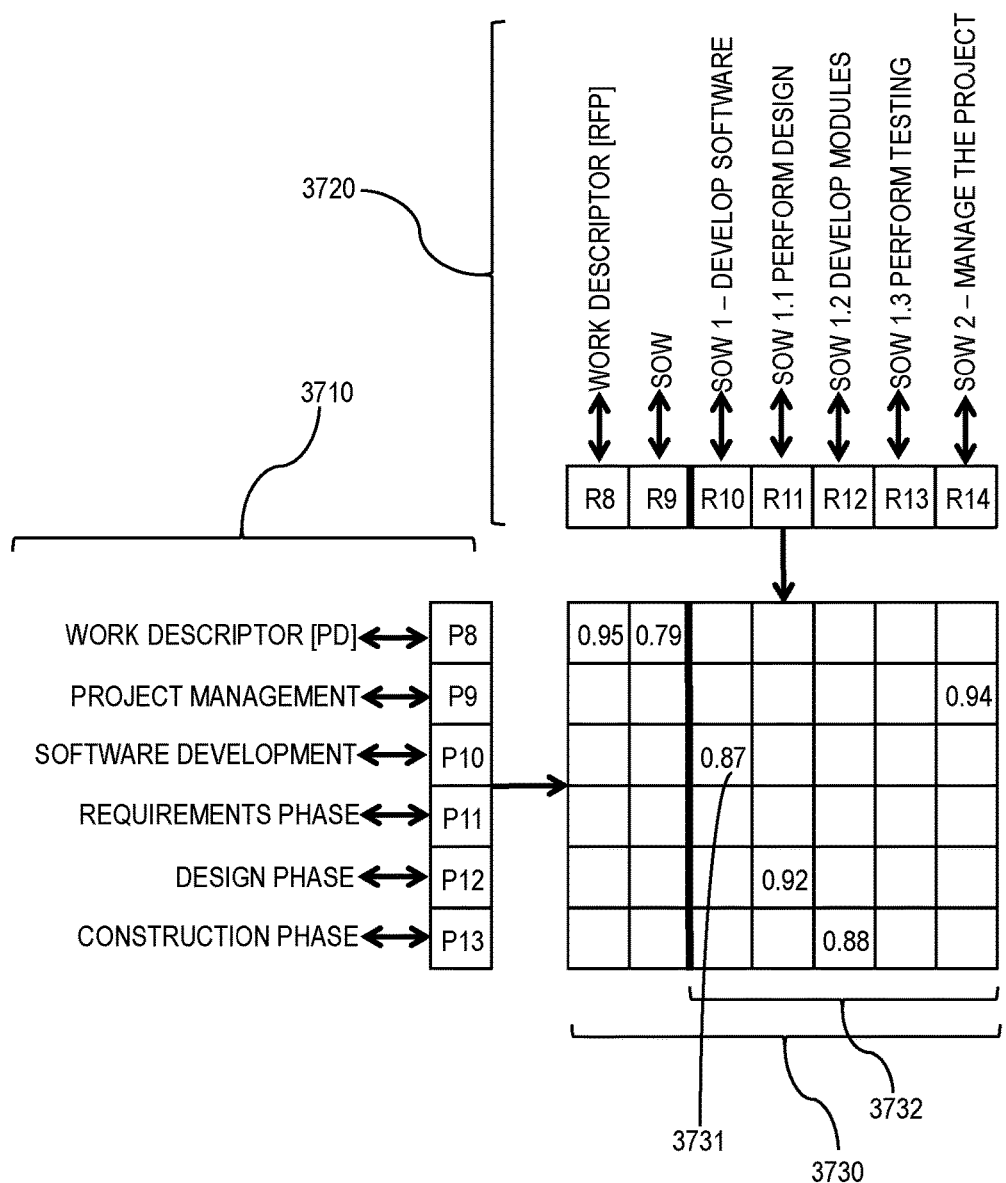
FIG. 37 depicts an exemplar execution of procedure Determine_Relevance_Matrix( ) in accordance with an exemplary embodiment of the invention.

FIG. 37 generally depicts an exemplar execution of procedure Determine_Relevance_Matrix( ) (depicted in FIG. 35), in accordance with an exemplary embodiment of the invention. Further regarding the functionality and operation of procedure Determine_Relevance_Matrix( ) depicted in FIG. 35, we disclose that the procedure first creates a new, two-dimensional matrix named Rel, with a first dimension that corresponds to the length of the array for argument A, and a second dimension that corresponds to the length of the array for argument B, and which is initialized to zeros. An exemplar of a new matrix Rel 3730 is disclosed in reference to FIG. 37 (which also corresponds to a matrix 3434). Next, the procedure iterates across the dimensions of the A and B arrays in a nested fashion, calling a Content_Comparator( ) function with successive elements of A and B to determine the similarity between the documents that correspond to these A and B elements. If the resulting "element match value" for that A and B element pair is greater than or equal to the Min_Threshold value, the corresponding entry in the matrix Rel is updated with the element match value computed by said Content_Comparator( ) function. This is shown, for example, by a matrix Rel entry 3731 being updated with the value of 0.87, indicating that a Content_Comparator( ) function determined that a document associated with a PD element P10 (for "SOFTWARE DEVELOPMENT") has a similarity value of 0.87 to a document associated with an RFP element R10 (for "SOW 1—DEVELOP SOFTWARE").

Further regarding the functionality and operation of procedure Determine_Relevance_Matrix( ) depicted in FIG. 35, we disclose that at the termination of the nested loops in Determine_Relevance_Matrix( ), the matrix Rel will be populated with those "element match values" for pairs of PD and RFP work descriptor elements that are greater than or equal to Min_Threshold, for the input PD and RFP work descriptors. This is shown in our on-going example by the six non-zero entries in the matrix Rel, as shown by 3730. At the termination of Determine_Relevance_Matrix( ), the procedure returns the relevance matrix Rel, which a relevance management system 1140 may store in a relevance data store 2045.

ETL Processing

We disclose, in reference to a processing module such as illustrated in FIG. 20, that ETL processing 2060 may provide functionality to perform an incremental, multi-stage transformation of data stored in a relevance data store 2045, into a multidimensional structure (shown as a relevance cube 2070) that supports OLAP-type functionality such as roll-up and drill-down (i.e., hierarchical aggregation and disaggregation), as well as filtering or ranking.

FIG. 38 generally depicts pseudo-code for a procedure Build_Relevance_Table( ) that we disclose, in accordance with an exemplary embodiment of the invention, that a relevance management system 1140 may use to perform various aspects of ETL processing. We disclose, in reference to FIG. 38, that a relevance matrix that may have been stored in a relevance data store 2045 may be transformed into a table whose row and column structure support basic hierarchical aggregation, and to which further columns may be added to provide additional aggregation, filtering, and ranking functionality. The resulting structure may be stored in a relevance cube 2070 and may enable multidimensional manipulation for capability determination 2080, RFP relevance determination 2085, and team construction processing 2090, which may be the basis for system functionality for viewing relevance results 1350 or teaming facilitation 1360.

Regarding procedure Build_Relevance_Table( ) depicted in FIG. 38, said procedure takes as input three arguments: a relevance matrix Rel (as e.g. may be computed by procedure Determine_Relevance_Matrix( ) in FIG. 35), and two corresponding arrays named A and B that were used to create the relevance matrix Rel. (These are the same arrays A and B that were used by Determine_Relevance_Matrix( ) to compute the matrix Rel.) We disclose that the matrix Rel that is used as an argument to Build_Relevance_Table( ) may in fact be a sub-matrix of the matrix computed by Determine_Relevance_Matrix( ); this is shown by a sub-matrix 3732, which contains five columns, as opposed to the entire matrix 3730 that contains all seven columns. To simplify display by a relevance management system 1140 using output such as FIG. 43A (and to clarify the presentation in the specification of the present invention) it may be convenient to process only those columns of matrix Rel that may be represented on interface such as FIG. 43A. Thus, as is shown by a sub-matrix 3732, a matrix Rel argument to procedure Build_Relevance_Table( ) may contain a subset of a relevance matrix, and a correspondingly shortened array B (indicated here as R10 through R14 3720).

FIG. 39 generally depicts an exemplar execution of procedure Build_Relevance_Table( ) (depicted in FIG. 38), in accordance with an exemplary embodiment of the invention. Regarding the functionality and operation of procedure Build_Relevance_Table( ) depicted in FIG. 38, said procedure begins by constructing a new empty table T whose columns correspond to the initial columns in a multidimensional relevance cube 2070, which in an embodiment may be "PD Element", "RFP Element", "Match Value", "PD ID", "RFP ID", "PD Owner", and "RFP Owner". This is disclosed in reference to FIG. 39 by the names of the seven column headings 3911 for the seven columns (Ref. 3901 through 3907). The procedure next iterates across the relevance matrix Rel using two nested loops, identifying non-zero matrix entries. For each such entry, the procedure inserts into table T a row with the corresponding PD Element, RFP Element, and relevance matrix match value, as well as the corresponding project IDs (PD ID and RFP ID) and the corresponding project owners (PD Owner and RFP Owner). We disclose this in reference to FIG. 39 by four rows 3912 that have been inserted into table T, which correspond to the four non-zero entries 3732 in FIG. 37.

Further regarding the functionality and operation of procedure Build_Relevance_Table( ) depicted in FIG. 38, when said procedure has completed iterating across the matrix Rel, table T contains a row for each non-zero match value in the input matrix Rel, as well as the hierarchical relationships of that match value for both the PD and the RFP. Specifically, as related to a data organization we disclose in reference to FIG. 21, table T captures individual Level 4 Work relationships (namely, the non-zero match values for pairs of single PD work elements and single RFP work elements), corresponding Level 3 Project relationships for PD and RFP work elements (namely, which PD and RFP those matching PD and RFP elements belong to), as well as Level 2 Project Owner relationships (namely, owners of the corresponding PD and RFP). As we move forward in the specification for the present invention, table T, produced by the functionality such as procedure Build_Relevance_ Table( ) (Ref. FIG. 38) and illustrated by the exemplar depicted in FIG. 39, may be extended and augmented with additional columns, and it should be clear to a those skilled in the art that said table T, and the functionality such as provided by Build_Relevance_Table( ) (Ref. FIG. 38), form a basis for multidimensional aggregation. At the conclusion of Build_Relevance_Table( ) processing, the procedure returns table T, which a relevance management system 1140 may then use to update a relevance cube 2070.

Hierarchical Aggregation
Roll-Up by PD Processing

We disclose, in reference to a processing module such as illustrated in FIG. 20, that a relevance management system 1140 may use functionality such as we disclose in Determine_Relevance_Matrix( ) (Ref. FIG. 35) and Build_Relevance_Table( ) (Ref. FIG. 38) to create a basic relevance cube 2070, whose central facts as we disclose in reference to FIG. 39 may be match values 3903 between individual PD elements 3901 and individual RFP elements 3902. While such detailed information may be interesting (and, central to functionality of a relevance management system 1140 embodiment), from an end-user perspective (Ref 210 or 211), it may be important to understand such RFP-to-PD relevance results at a higher level, namely the relevance of the overall PD to the overall RFP (not merely how individual elements within each are relevant to one another).

FIG. 40 generally depicts pseudo-code for a procedure Roll_Up_By_PD( ) that we disclose, in accordance with an exemplary embodiment of the invention, that a relevance management system 1140 may use to aggregate (i.e., roll-up) relevance to the PD level, while preserving RFP-element level detail. Procedure Roll_Up_By_PD( ) (Ref. FIG. 40) takes as input an instance of a relevance table (for example, FIG. 39), such as may be constructed by Build_Relevance_Table( ) (Ref. FIG. 38). It then determines the Project Descriptor identifiers (PD ID and RFP ID) associated with an input relevance table instance, which are PD001 and RFP001 in this example. The procedure next creates a new empty table T whose left-hand columns represent work elements associated with a work descriptor for the identified RFP ID; these work elements consist of elements of a work descriptor array that was passed to Build_Relevance_ Table( ) (Ref. FIG. 38) as argument B. Tracing back through this example, we can see that said work elements corresponds to a set {R10, R11, R12, R13, R14}, as shown in an exemplary input 3720. Thus we can see that the headings of the left-hand columns of the new empty table T produced by Roll_Up_By_PD( ) correspond to these values (a first column 4101 equals R10, a second column 4102 equals R11, and so on through a column 4105 equaling R14 in FIG. 41). The remainder of the names of the columns of the new table T (which appear on the right-hand side as a collection of columns 4106) may be set to equal the four right-hand columns of the input relevance table Rel, namely PD ID 3904, RFP ID 3905, PD Owner 3906, and RFP Owner 3907.

FIG. 41 generally depicts an exemplar execution of procedure Roll_Up_By_PD( ) (depicted in FIG. 40), in accordance with an exemplary embodiment of the invention. Further regarding the functionality and operation of procedure Roll_Up_By_PD( ) depicted in FIG. 40, said procedure next inserts into table T a new row whose values for the four right-hand columns of T (representing PD ID, RFP ID, PD Owner, and RFP Owner, in this exemplar) identify the rows being processed, which here correspond to values from the first row of the input table Rel. In the example in FIG. 41 we can see that the four columns 3906 have been updated with the values PD001, RFP001, PRIME, and PRIME, which indeed correspond to these very same values (Ref. 3904, 3905, 3906, and 3907) from the relevance table in FIG. 39, taken from the first row of the table 3912.

Further regarding the functionality and operation of procedure Roll_Up_By_PD( ) depicted in FIG. 40, said procedure next iterates across the elements in the RFP Elements column of the input relevance matrix Rel, selecting from Rel the corresponding entries for the Match Value and PD Element from that row (which is identified by the RFP Element of the current iteration). For example, using the relevance table of FIG. 39 as input table Rel, we can see that when the procedure iterates for RFP element R14 (in a column 3902), the corresponding Match Value and PD Element are 0.94 and P9, respectively, from a first column 3903 and a second column 3901 of FIG. 39, respectively. Using these two values selected from the relevance table Rel (0.94 and P9 in the example) for the current iteration (R14 in this example), the procedure updates the table T column for the current iteration (the column corresponding to R14 4105 in this example) by adding to the table entry the two selected values. This is shown by the table T entry corresponding to column R14 4105 containing the two values "0.94, [P9]". We use such notation for clarity of presentation, which can be interpreted as meaning that the match value between R14 and the PD equals the value 0.94, which comes from (in this case) a single PD element, namely P9. Note that during the iteration, if two or more PD elements had a match value for a single RFP element, the Match Value would represent the sum of these individual PD match values, and the "PD element" identification would be represented by their union, which may be expressed using notation such as "[P9, P11]" if P11 were a second PD element having a match value. We disclose that this type of roll-up aggregation by columns (and corresponding drill-down disaggregation) is the type of behavior provided by current-art multidimensional databases. The embodiment is not disclosing as inventive the underlying functionality of a multidimensional database to aggregate by e.g. columns, nor is it disclosing as inventive the underlying ability of relational databases to represent and store data as tables. Rather, the embodiment is merely employing such functionality (e.g., data stores, aggregation), providing sufficient specification for those skilled in the art to understand how such functionality is being used and to fully enable construction of embodiments of the present invention.

Further regarding the functionality and operation of procedure Roll_Up_By_PD( ) depicted in FIG. 40, when said procedure has completed iterating across the RFP elements, as represented by a first column 4101 through a fifth column 4105 in FIG. 41, table T contains the roll-up (i.e., aggregation) at the PD level of PD element relevance to the indicated RFP. Said procedure returns table T, which a relevance management system 1140 may use to update a relevance cube 2070.

Relevance_Chart

FIG. 42 generally depicts pseudo-code for a procedure Update_Relevance_Chart( ) that we disclose, in accordance with an exemplary embodiment of the invention, that a relevance management system 1140 may use to construct a relevance chart. We disclose that the aggregated RFP-to-PD relevance data, such as produced by Roll_Up_By_PD( ) (Ref. FIG. 40), an example of which is a relevance cube table shown in FIG. 41, may serve as a foundation for constructing a relevance chart as introduced in FIG. 7.

Regarding procedure Update_Relevance_Chart( ) depicted in FIG. 42, said procedure takes as input two arguments, the first named Rel, which may be a relevance cube table instance such as produced by procedure Roll_Up_By_PD( ) (Ref. FIG. 40), and the second named RUL_ID that serves as "roll-up level" (hence, "RUL") identifier, taking values such as e.g., "PD ID", "PD Owner", and so on, to identify the roll-up level, so that relevance chart rows may be labeled appropriately. (RUL_ID serves as a "flag" that enables Update_Relevance_Chart( ) to construct multiple types of relevance charts, as needed, including relevance charts that are aggregated at the "PD_ID" level, at the "PD Owner" level, and so on.)

Figure 43A:
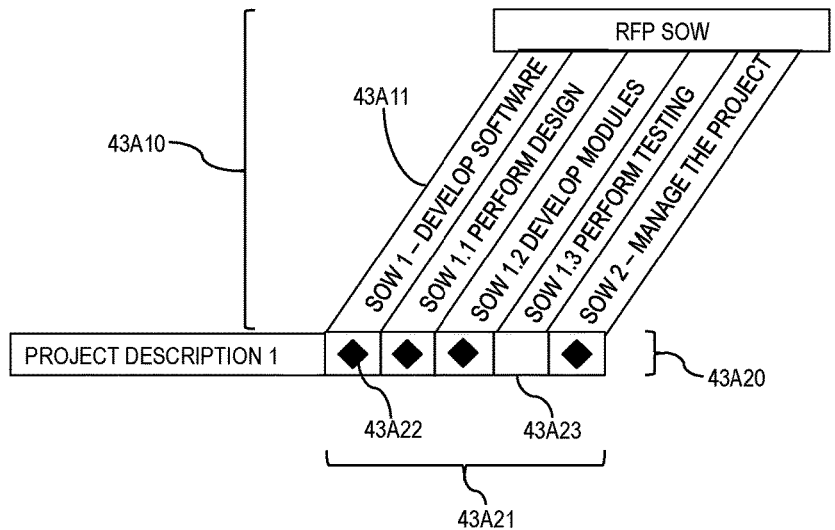
FIG. 43A is a mock-up of a single-row relevance chart that depicts exemplar execution of procedure Update_Relevance_Chart( ) using single PD Project Descriptor input, in accordance with an exemplary embodiment of the invention.

FIG. 43A generally depicts a single-row relevance chart for an exemplar execution of procedure Update_Relevance_Chart( ) depicted FIG. 42, in accordance with an exemplary embodiment of the invention, using a single PD Project Descriptor as input. Regarding the functionality and operation of procedure Update_Relevance_Chart( ) depicted in FIG. 42, said procedure begins by identifying the PD and RFP associated with a relevance table instance (i.e., the PD ID and RFP ID), which are used to retrieve various data (i.e., project name, RFP element labels) associated with said PD and RFP. If a relevance chart instance does not already exist, the procedure constructs an empty relevance chart by populating relevance chart headings with labels associated with the RFP work elements in a relevance cube table. For example, we can see in FIG. 41 that the RFP work elements in a relevance cube table are R10 4101, R11 4102, through R14 4105, which correspond to elements R10, R11, through R14 as a part 3325 of the RFP work descriptor 3315. Thus we can see, for example, that a relevance chart heading for RFP work element R10 4101 is associated with RFP work descriptor 3315 element label "SOW 1—DEVELOP SOFTWARE", which the procedure uses to update a relevance chart heading 43A11. The procedure follows an analogous set of steps for R11 4102 through R14 4105 to construct the remainder of the relevance chart column headings 43A10.

Further regarding the functionality and operation of procedure Update_Relevance_Chart( ) depicted in FIG. 42, and exemplar execution of said procedure as depicted in FIG. 43A, said procedure next fills in the description label in the relevance chart row 43A20 by retrieving the identifier associated with the argument RUL_ID; for example, if the procedure is called with RUL_ID equal to the value "PD_ID", then the row is labeled with the name associated with the entry in the PD_ID column, which is "PROJECT DESCRIPTION 1" in this case.

Further regarding the operation of procedure Update_Relevance_Chart( ) depicted in FIG. 42 and exemplar execution of said procedure as depicted in FIG. 43A, said procedure next iterates across RFP work elements that make up columns in an input relevance cube table instance Rel, i.e. R10 4101 through R14 4105, identifying entries in a Rel table that are non-empty. In this example, entries for R10, R11, R12, and R14 are non-empty (Ref. 4101, 4102, 4103, and 4105, respectively), while R13 is empty 4104. For the non-empty entries, the procedure adds a "black diamond" ("♦") indicator to the relevance chart in the corresponding column; for example, the black diamond 43A22 is added to the relevance chart row because the entry for R10 4101 is non-empty (containing the entry "0.87, [P10]"). Processing also associates the corresponding Rel table entries for match value and PD (or, PDs) with the black diamond that has been added to the relevance chart row (i.e., "0.87" and "P10" are associated with the black diamond 43A22). Regarding the association of the PD (or, PDs) with the black diamond, as we disclose below, the said PDs may be used by a relevance management system 1140 to facilitate drill-down requests when the "black diamond" entry with which it is associated has been selected by an end user.

Further regarding the operation of procedure Update_Relevance_Chart( ) depicted in FIG. 42, at the end of said procedure execution, the relevance chart has been updated to include a new row that reflects the data in a relevance cube table that was provided as an input, as shown by FIG. 43A and FIG. 41. The updated relevance chart is returned by the procedure, and a relevance management system 1140 may use such relevance chart to display relevance results to an end user.

Figure 43B:
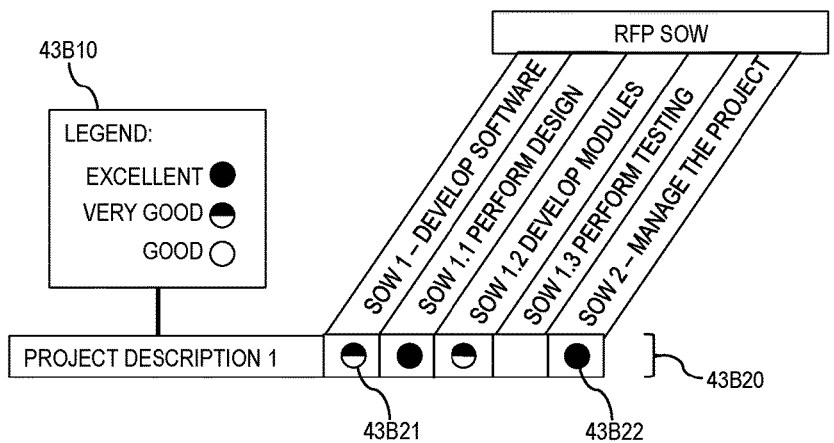
FIG. 43B is a mock-up of a single-row relevance chart that illustrates the use of alternative exemplar symbols to indicate relevance, in accordance with an exemplary embodiment of the invention.

FIG. 43B is a mock-up of a single-row relevance chart that illustrates the use of alternative exemplar symbols to indicate relevance, in accordance with an exemplary embodiment of the invention. Regarding the use of a "black diamond" ("♦") exemplar symbol to represent or indicate relevance in a relevance chart, such as produced by Update_Relevance_Chart( ) (Ref. FIG. 42) and illustrated in FIG. 43A, as well as FIG. 7, FIG. 8, FIG. 9, and FIG. 10 above, we disclose in reference to FIG. 43B that an alternative embodiment of procedure such as Update_Relevance_Chart( ) (Ref. FIG. 42) may use alternative symbols to represent relevance for an entry, whose appearance, for example, may be based on the relevance value, or relative relevance value associated with said entry. As we illustrate in reference to FIG. 43B, the numeric match value may be used to alter the appearance of the "black diamond" to reflect e.g. the strength of the match; for example, a relevance management system 1140 may use a larger match value to increase the size of the indicator, or change its color or shape, or use any of a variety of other graphical user interface (GUI) idioms, now known or hereafter developed, to convey to an end user the strength of the match. As illustrated in FIG. 43B, a relevance management system 1140 may use alternative symbols as indicators, such as those represented by "Harvey Balls" (Reference "Harvey Balls" Harvey Who?", Mar. 20, 2006, http://digitalroam.typepad.com/digital roam/2006/03/harvey_balls_ha.html, the entire contents of which is incorporated by reference), or other symbols, to represent relevance in a relevance chart. In the exemplar in FIG. 43B, we illustrate how an alternative embodiment of procedure Update_Relevance_Chart( ) (Ref. FIG. 42) may represent relevance chart values, such as represented in the exemplar table in FIG. 41, by associating a symbol such as illustrated in a legend 43B10 with an entry in a relevance chart row 43B20, based, for example, upon a value. Here we can see that an alternative embodiment of procedure Update_Relevance_Chart( ) (Ref. FIG. 42) has associated a relevance value of 0.94 4105 with a black circle exemplar symbol representing "Excellent" ("●"), and a lower relevance value of 0.87 4101 with a half-shaded black exemplar circle symbol representing "Very good". We contemplate an alternative embodiment of procedure Update_Relevance_Chart( ) (Ref. FIG. 42), as well as alternative embodiments of relevance charts such as we disclose in reference to FIG. 7, FIG. 8, FIG. 9, and FIG. 10 above; element-to-element relevance interfaces such as we disclose in reference to FIG. 52 and FIG. 113; team construction interfaces such as we disclose in reference to FIG. 97; proposal outline-to-RFP mapping interfaces such as we disclose in reference to FIG. 105; or proposal rationale artifacts such as we disclose in reference to FIG. 107 and FIG. 108; that use a broad range of symbols and indicators, including variations in size, shape, color, or other dimensions, to represent values in charts or tables, and such embodiments are intended to be within the scope of the present invention.

Further regarding the functionality of procedure Update_Relevance_Chart( ) depicted in FIG. 42, while said procedure as depicted in FIG. 42 discloses functionality to produce as output a two-dimensional relevance chart, we contemplate a broad range of alternative embodiments of Update_Relevance_Chart( ) (Ref. FIG. 42), as well as alternative embodiments of relevance charts such as we disclose in reference to FIG. 7, FIG. 8, FIG. 9, and FIG. 10 above; relevance charts such as we disclose in reference to FIG. 43A and FIG. 43B; element-to-element relevance interfaces such as we disclose in reference to FIG. 52 and FIG. 113; team construction interfaces such as we disclose in reference to FIG. 97; proposal outline-to-RFP mapping interfaces such as we disclose in reference to FIG. 105; and proposal rationale artifacts such as we disclose in reference to FIG. 107 and FIG. 108; that may use a broad range of idioms, now known or hereafter developed, to represent or indicate relevance, or relative relevance, including, but not limited to, two-, three-, or multi-dimensional graphics and charts, variations of pie-graphs, bar-graphs, histograms, and other idioms, and such embodiments are intended to be within the scope of the present invention.

Roll-Up by PD for Multiple PD Project Descriptors

FIG. 44 generally depicts an exemplar execution of procedure Build_Relevance_Table( ) depicted in FIG. 38, in accordance with an exemplary embodiment of the invention, using multiple PD Project Descriptors inputs.

Figure 45:
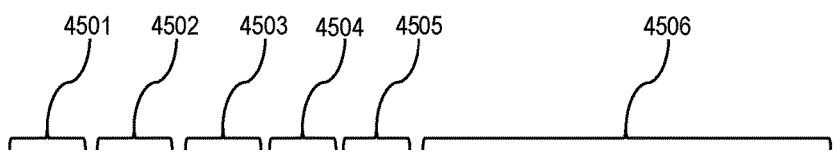
FIG. 45 depicts exemplar execution of procedure Roll_Up_By_PD( ) using multiple PD Project Descriptors inputs, in accordance with an exemplary embodiment of the invention.

FIG. 45 generally depicts an exemplar execution of procedure Roll_Up_By_PD( ) depicted in FIG. 40, in accordance with an exemplary embodiment of the invention, using multiple PD Project Descriptors inputs.

In reference to FIG. 44 and FIG. 45 we disclose how as part of direct match processing 2040, a relevance management system 1140 may use procedures Build_Relevance_Table( ) (Ref. FIG. 38) and Roll_Up_By_PD( ) (Ref. FIG. 40) to process multiple PDs. Continuing the extended example shown in FIG. 8, the first four rows of the table 4411 represent the PD with PD ID of "PD001" 4404, which corresponded to row 822, and whose construction was detailed in FIG. 32, FIG. 33, FIG. 37, and FIG. 39. We disclose in reference to FIG. 44 how a relevance management system 1140 may use Build_Relevance_Table( ) to process four additional PDs (PD002, PD003, PD004, and PD005, which correspond PDs [Ref. 824, 821, 825, and 823, respectively], and to PDs [Ref. 4412, 4421, 4422, and 4430, respectively]) using the same RFP (namely, FIG. 33) as used for PD001 previously, to construct the relevance table in FIG. 44. We disclose in reference to FIG. 45 how a relevance management system 1140 may use procedure Roll_Up_By_PD( ) with the relevance table depicted in FIG. 44 as input to produce a relevance cube table for the five PDs (i.e., PD001, PD002, PD003, PD004, and PD005 as found in a column 4404), each of whose RFP-to-PD relevance has been determined with respect to RFP001 (as noted in a column 4405).

Roll-Up by RFP Processing

FIG. 46 generally depicts pseudo-code for a procedure Roll_Up_By_RFP( ) that we disclose, in accordance with an exemplary embodiment of the invention, that a relevance management system 1140 may use to aggregate relevance by RFP, in a manner that may be similar to that performed by procedure Roll_Up_By_PD( ) (Ref. FIG. 40), as we have disclosed above. Procedure Roll_Up_By_RFP( ) takes as input two arguments: an instance of a relevance cube table named Rel, such as may be produced by procedure Roll_Up_By_PD( ) (Ref. FIG. 40), as well as a two dimensional matrix of RFP-element scaling weights named Weights, an example of which is shown in FIG. 47.

FIG. 47 generally depicts an exemplar Weights matrix, in accordance with an exemplary embodiment of the invention, such as may be used by procedure Roll_Up_By_RFP( ) depicted in FIG. 46. Such a Weights matrix may be used by a relevance management system 1140 to proportionally scale the relative importance of individual RFP element match values as they are aggregated (i.e., rolled up). The process of incorporating scaling weights during aggregation for ranking is disclosed in greater detail below, including in reference to FIG. 91, which discloses how an end user may enter relative weights, such as weights 9145 for individual RFP elements 9144. These relative weights 9145 may be represented internally by a relevance management system 1140 as a two dimensional matrix, such as that which is passed to the Roll_Up_By_RFP( ) procedure as the Weight matrix argument, or another suitable structure.

FIG. 48 generally depicts an exemplar execution of procedure Roll_Up_By_RFP( ) depicted in FIG. 46, in accordance with an exemplary embodiment of the invention. Regarding the functionality and operation of procedure Roll_Up_By_RFP( ) depicted in FIG. 46, said procedure begins by adding a new column, in one embodiment the column may identified, such as by the name "RFP-to-PD Relevance", to the table Rel, as shown in FIG. 48 by a column 4801, which may used to record the rolled-up relevance. Next, the procedure processes each row in the table Rel, summing across the RFP work elements in each row by computing the product of that RFP work element's match value and its corresponding Weight matrix value. When the noted row summation is complete, a relevance management system 1140 may update the RFP-to-PD Relevance column 4801 of the Rel table with the result. We can see that for the first row in the example 4808, a relevance management system 1140 first calculates the value 0.87*1.0, which represents the RFP element match value 4802 for R10 (which is 0.87), multiplied by the corresponding weight value 4702 for R10 4721 from the weight table FIG. 47 (which is 1.0). By further adding to said summation the corresponding products associated with elements R11 through R14, a relevance management system 1140 computes in this example an RFP-to-PD Relevance 4801 value of 3.61, and may update the first row of the table 4808.

Further regarding the operation of procedure Roll_Up_By_RFP( ) depicted in FIG. 46, when said procedure has completed processing all rows of the table Rel, the RFP-to-PD Relevance column 4801 has been updated for each row in the table to reflect the weighted sum of the RFP-element match values (Ref. 4802 through 4806) for each row, scaled by the Weight matrix (Ref. FIG. 47). Procedure Roll_Up_By_RFP( ) (Ref. FIG. 46) returns the relevance cube table Rel, which a relevance management system 1140 may use to update a relevance cube 2070.

Project Relevance Summary and Detail Display Interface

FIG. 49 generally depicts a project relevance summary interface, in accordance with an exemplary embodiment of the invention, that may use a relevance chart visual display metaphor, such as produced by Update_Relevance_Chart( ) (Ref. FIG. 42) or other suitable display metaphors, now known or hereafter developed, to display to end users relevance results, such as stored in a relevance cube 2070.

A project relevance summary interface 4910, such as shown in FIG. 49, presents relevance results in a way that facilitates, in particular, a capability-seeking end user 1130 in identifying and understanding the experience and capabilities as provided by capability-providing end users 1110. For example, the "perspective" that the interface shown in FIG. 49 provides is of (possibly multiple) PDs 4922 as they relate to a (possibly single) "reference RFP" 4926, which is associated with a capability-seeking end user. As such, a capability-seeking end user may be provided an overview and interactive, drill-down functionality for understanding PDs as they relate to a specific RFP associated with said capability-seeking end user.

We disclose that a project relevance summary interface 4910 may be comprised of multiple sections, such as a project relevance summary section 4920, a project relevance detail section 4930, or a project relevance actions section 4940, and that each such section can be considered its own interface, as can each field within a section. The viewing of relevance results in a project relevance summary interface 4910 may be facilitated by a controller module 1142 and an interface module 1143, as we disclose in reference to FIG. 11, which may generate or manage interfaces and application workflow to present the results to an end user. A project relevance summary interface 4910 may enable an end user to visualize the relevance of a PD as it relates to an RFP, and perform actions based upon these results, including but not limited to drill-down and navigation of relevance results.

Regarding an interface, such as a project relevance summary interface 4910, those skilled in the art will recognize the well known model-view-controller (MVC) paradigm, which may be used in interfaces, such as 4910 (and others such as shown in FIG. 50, FIG. 51, FIG. 52, FIG. 58, FIG. 58, FIGS. 52, and 97), to provide functionality to display a view (such as a relevance chart, or other end user-facing display idiom) from a suitable model (here, a relevance cube table, such as FIG. 48), and perform actions via a controller in response to user-input actions, for example the selection of a row (e.g., 4923) or element (e.g., 4924) within said interface.

Regarding a project relevance summary section 4920, as we disclose in further detail below, said section may provide drill down functionality, which it may perform by retrieving information to populate e.g. a project relevance detail section 4930 for a selected row 4923, using information in a selected relevance chart row 4923 and a corresponding row in the model (e.g., a relevance cube table row 4808 in our example). For example, a relevance management system 1140 may provide functionality such that when a row is selected 4923, said system may be able to determine a Project Descriptor ID (PD ID) from the table (such as via PD ID column in 4807), which is PD001 in this case. Such PD ID identifier may enable a relevance management system 1140 to access a PD data store 2031 to retrieve PD information. Similarly, a relevance management system 1140 may use functionality such as an RFP identifier in a table (such as an RFP ID column 4807), RFP001 in this case, to access information in an RFP data store 2032.

Further regarding a project relevance summary section 4920, we disclose that said section may summarize PD relevance results with respect to a reference RFP 4925, which may use a relevance chart, such as one that consists of the RFP SOW elements 4921 an end user has indicated for display, and corresponding relevance chart rows 4922 for PDs, or other suitable display format. A project relevance summary section 4920 is illustrated as displaying the RFP-to-PD relevance data of FIG. 48, in FIG. 49.

Further regarding a project relevance summary section 4920, we disclose that said section may provide functionality for an end user to visualize, interact with, or navigate relevance results (such as the exemplar results shown in FIG. 48). As shown in FIG. 49, a project relevance summary section 4920 may provide functionality to display an indicator of relative relevance, such as a column that indicates relevance ranking 4925, which may be used to display relevance chart rows 4922 in various orders (e.g., descending relevance, with project having highest relevance appearing at the top of the table), such as may be based on the RFP-to-PD relevance column of a relevance cube table 4801.

Further regarding a project relevance summary section 4920, we disclose that an end user may be able to select a project to obtain more detailed information about said project; we disclose said selection functionality by the presence of an indicator, such as a black triangle ("▶") 4923, or other suitable indicator, next to a row in a relevance chart, such as for PROJECT DESCRIPTION 1 in this example, indicating selection of said project. As a result, detail may be displayed for a selected project on a project relevance detail section 4930; such detail may include, but is not limited to, multiple elements such as a name of a selected project 4931. We contemplate a broad range of alternative indicators for selection, such as high-lighting or other graphical user interface idioms, now known or hereafter developed, as may be used in an alternative embodiment, and such embodiments are intended to be within the scope of the present invention.

Further regarding a project relevance summary section 4920, we disclose that an end user may further select, such as within a currently selected project 4923, an RFP SOW element, such as indicated by a circled black diamond 4924, or other suitable indicator; we contemplate a broad range of alternative indicators for selection, such as high-lighting or other graphical user interface idioms, now known or hereafter developed, as may be used in an alternative embodiment, and such embodiments are intended to be within the scope of the present invention. Using a SOW element selection, a relevance management system 1140 may then provide additional information, using functionality such as a project relevance detail section 4930.

Regarding a project relevance detail section 4930, we disclose that said section may provide information that may include, but is not limited to, an indication of a selected SOW element 4932, as well as detailed information regarding substantiation of a SOW element relevance from an original project description 4933. A relevance management system 1140 may provide functionality to drill down, navigate, or "trace back", such as through a relevance chart, to an original PD to retrieve (such as from a PD Project Descriptor work descriptor 2515, as shown by an element 2655) and display substantiation 4933 for a selected SOW element RFP-to-PD relevance (Ref 4924 and 4932); we disclose that said drill-down or navigation functionality may be extremely powerful, as it may enable an end user to verify or validate immediately that a PD is indeed relevant to an RFP, and very importantly, the basis for that relevance 4933.

Further regarding a project relevance detail section 4930, we disclose that said section may provide information on a project regarding the relevance of said project 4935, such as relevance rating of said project 4936, as well as the relevance rating 4937 of a selected SOW element (such as indicated by a first selection 4924 or a second selection 4932) associated with said project. A project relevance detail section 4930 may also provide an end user with functionality such as represented by "View RFP details . . . " 4934, to view details for a selected SOW element (such as indicated by a first selection 4924 or a second selection 4932), which may enable an end user to "trace back" through RFP SOW elements 4921 to an original RFP SOW element description, such as originally entered in a relevance management system 1140.

Figure 50:
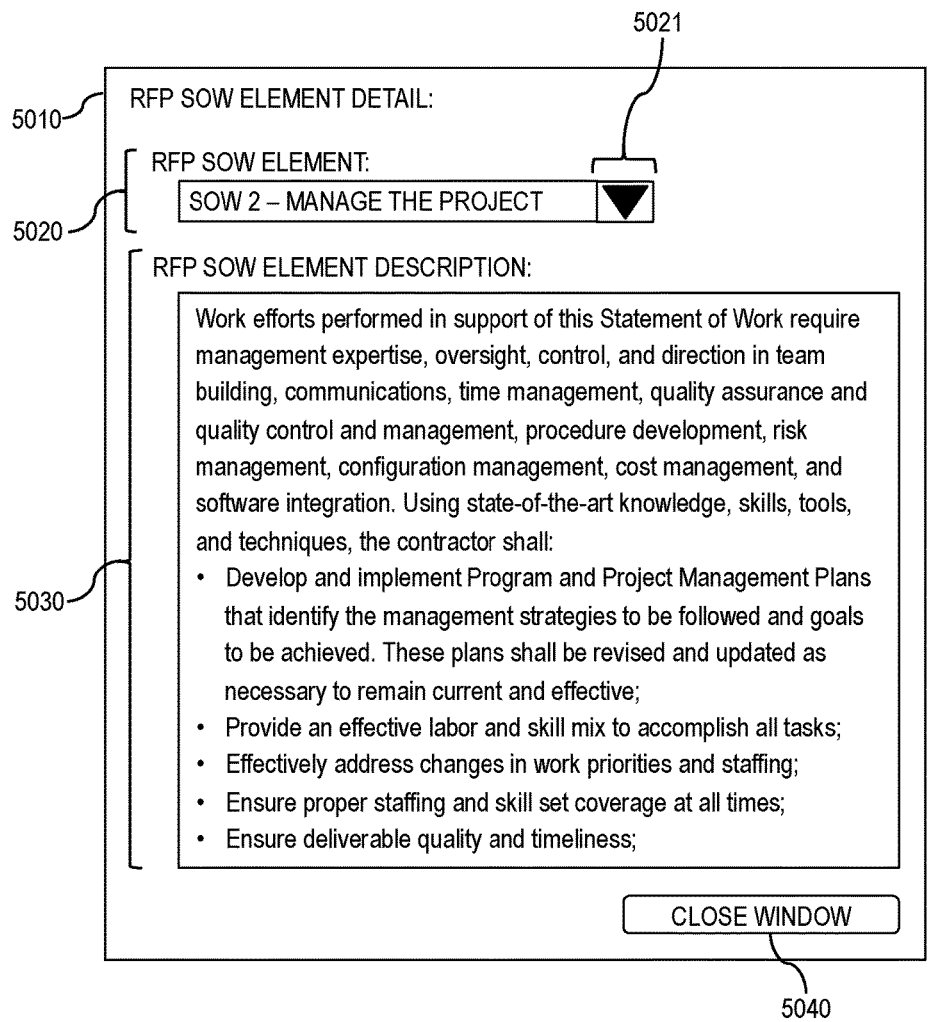
FIG. 50 is a mock-up of an RFP SOW element detail interface, in accordance with an exemplary embodiment of the invention.

FIG. 50 generally depicts an RFP SOW element detail interface 5010, in accordance with an exemplary embodiment of the invention, that a relevance management system 1140 may provide when functionality such represented by "View RFP details . . . " 4934 is invoked by an end user. A relevance management system 1140 may provide an RFP SOW element detail interface 5010, such as a "pop up" interface or embedded in a referencing interface (such as an interface 4910), that may display to an end user for a selected RFP SOW element 5020 a more lengthy RFP SOW element description 5030, such as that entered in a relevance management system 1140 (Ref 3153 and 3154). Such functionality may enable an end user to simultaneously position a substantiation for SOW element relevance from an original project description 4933 in close proximity (for example, side-by-side) with an original, detailed RFP requirements for said SOW element (Ref 5020 and 5030). As such, an end user may be provided functionality so said end user can effectively validate that the SOW element experience cited by a PD 4933 is indeed supportive of, and in alignment with, a corresponding RFP SOW requirement (Ref. 5020 and 5030).

Further regarding an RFP SOW element detail interface 5010, we disclose that indicator field that said interface may use to display an RFP SOW element 5020 may also include functionality for an end user to select alternative SOW elements for display. Such selection functionality may be provided in the form of a selector, such as a drop-down selector 5021 (which may be indicated by a symbol, such as the exemplar "▼"), which when invoked may provide an end user with a list of RFP SOW elements that may be selected. We contemplate a broad range of alternative selectors, such as drop-down menus or other graphical user interface idioms, now known or hereafter developed, as may be used in an alternative embodiment, and such embodiments are intended to be within the scope of the present invention.

When an end user has made a selection, a relevance management system 1140 may provide functionality such that an RFP SOW element shown on field 5020 may be updated with a corresponding selected RFP SOW element label, such as entered during RFP data entry 2022 (e.g., "SOW 1.3 PERFORM TESTING"), and an RFP SOW element description field 5030 may updated with a corresponding detailed description, such as also entered during RFP data entry 2022. A relevance management system 1140 may also provide an end user an ability to close 5040 an RFP SOW element detail interface.

Regarding a project relevance actions section 4940, said section may enable an end user to instruct a relevance management system 1140 to perform actions, including but not limited to saving the results 4941 of a relevance chart for reference at a later time, or for printing or working with off-line in softcopy as an artifact, such as to facilitate proposal development 233; contacting the owner of a PD 4943 in order to discuss and facilitate teaming partnerships, as we disclose in reference to FIG. 19; as well as further options 4944. In addition, an end user may have the ability to conclude processing 4945, which may return an end user to a main menu.

Regarding further options that may be selected from a project relevance actions section 4940, one of the options an end user may be able to perform, through functionality such as represented by "More options . . . " 4944, is to update the columns or other information that may be displayed, such as in a project relevance summary 4920. As shown in FIG. 49, a project relevance summary interface 4920 may provide functionality to display an indicator of relative relevance, such as a column that indicates relevance ranking 4925. An end user may have the ability to instruct a relevance management system 1140 to update the interface, such as the columns, to display additional information for each project; this is shown in FIG. 51.

Figure 51:
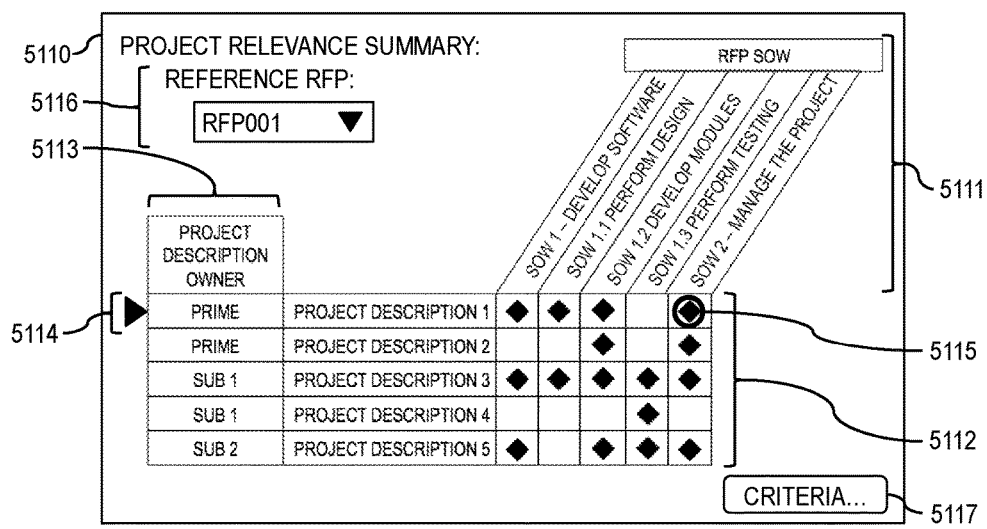
FIG. 51 is a mock-up of a project relevance summary section, showing PD owner, in accordance with an exemplary embodiment of the invention.

FIG. 51 generally depicts a project relevance summary section 5110, in accordance with an exemplary embodiment of the invention, where an end user has replaced a relevance ranking column 4925 with a column that indicates a project description owner 5113, as discussed previously in FIG. 9. A project description owner column 5113 may be populated using data from a PD Owner column 4406 of a relevance cube table. While we disclose in reference to FIG. 51 functionality in which a relevance ranking column 4925 has in effect been replaced by a project description owner column 5113, a relevance management system 1140 may provide functionality to support simultaneous display, such as in a project relevance summary section (Ref. 4920 and 5110), of both relevance ranking 4925 and project description owner 5113, as well as other columns or information, such as may provide further description of a project. As we disclose in reference to FIG. 51, once again a project relevance summary section 5110 may include a reference RFP 5116, RFP SOW elements 5111, relevance chart rows 5112, as well as functionality to select a project 5114, analogous to a first selection 4923 in FIG. 49, and a specific SOW element 5115, analogous to a second selection 4924 in FIG. 49, for display, such as using functionality provided in a project relevance detail section 4930. As we disclose in reference to FIG. 51, an end user may have an ability to sort (i.e., group) projects, including by project description owner 5113, which may give an end user an ability to see all projects associated with a single owner, such as displayed as contiguous rows using functionality such as in a relevance chart 5112. Such functionality may provide an end user an "overview" of the experience that each project owner brings, as demonstrated by their projects.

Figure 52:
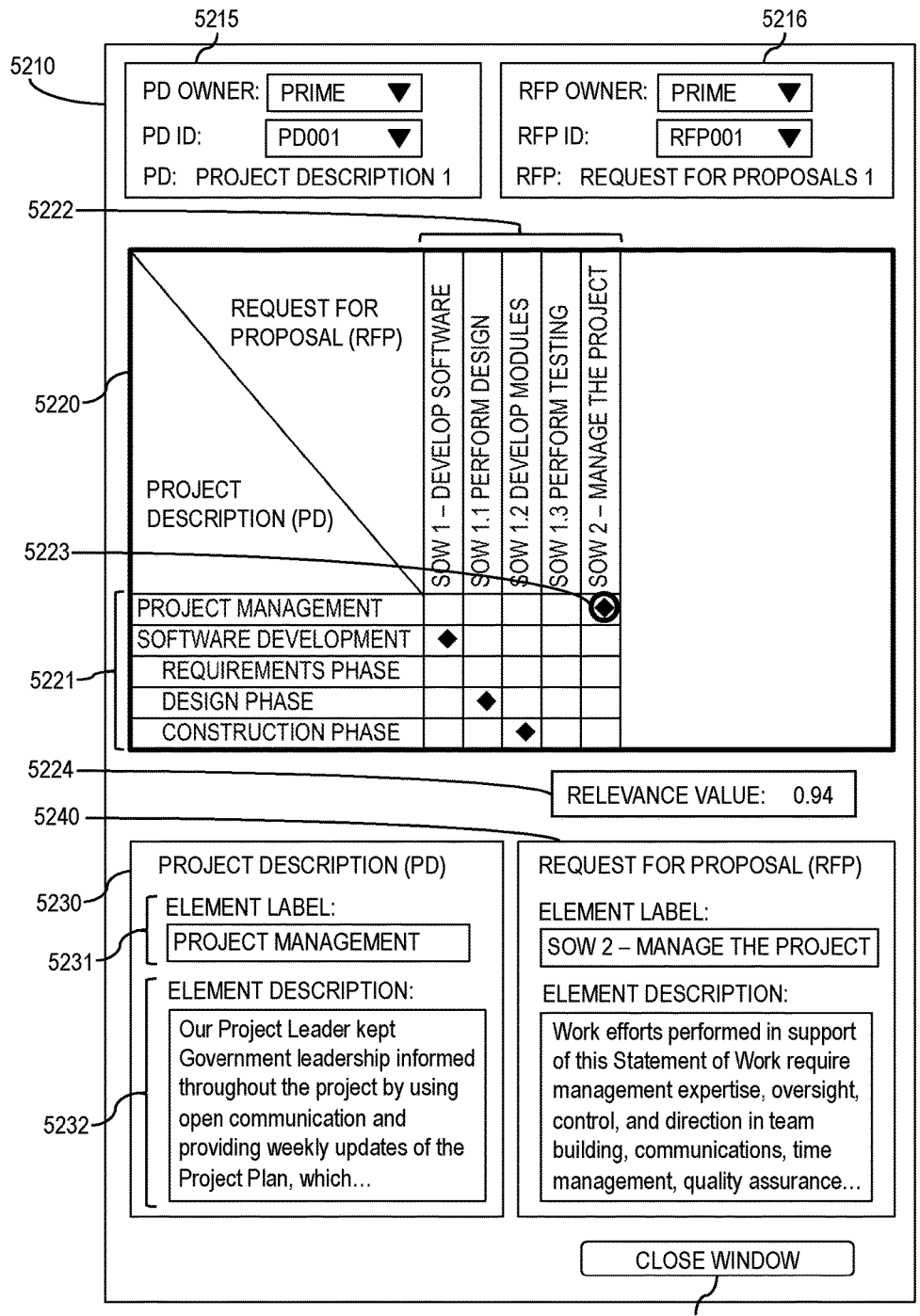
FIG. 52 is a mock-up of an RFP-to-PD element-to-element (E2E) relevance interface, in accordance with an exemplary embodiment of the invention.

FIG. 52 generally depicts an RFP-to-PD element-to-element (E2E) relevance interface 5210, in accordance with an exemplary embodiment of the invention. Regarding additional options that may be selected from a project relevance actions section 4940, such as represented by "More options . . . " 4944, one such option may be the ability to view an "expanded" or "drill-down" version of a selected project 4923. A relevance management system 1140 may provide functionality, such as shown in FIG. 52, to present to an end user information such as RFP-to-PD "element-to-element" (E2E) relevance matrix results, such as may have been computed by Determine_Relevance_Matrix( ) (Ref. FIG. 35) and subsequent processing by a call to Build_Relevance_Table( ) (Ref. FIG. 38). Such RFP-to-PD E2E relevance results may be presented to an end user, using functionality such as an RFP-to-PD E2E relevance interface 5210, which we disclose may be comprised of sections, such as a PD owner section 5215, an RFP owner section 5216, an RFP-to-PD E2E relevance section 5220, a PD-element detail section 5230, or an RFP-element detail section 5240, and that each such section can be considered its own interface, as can each field within a section. We further disclose that an RFP-to-PD E2E relevance interface 5210 we disclose in reference to FIG. 52 may provide similar functionality to an E2E relevance interface 11310 we disclose in reference to FIG. 113.

Regarding functionality such as provided by an RFP-to-PD E2E relevance section 5220, which may include a relevance chart type format or other suitable display metaphor to present results, those skilled in the art will recognize that the black diamonds ("♦"), such as shown in said section 5220, correspond to non-zero entries in a relevance matrix (e.g., a matrix 3730 in FIG. 37, in an exemplar), which represents the basis for a model that an RFP-to-PD E2E relevance section 5220 may render as a view, and which may be performed using an MVC paradigm as previously discussed. Here again, we contemplate a broad range of alternative embodiments in which the so called "black diamonds" entries and the relevance chart in the E2E relevance section 5220 may be represented or displayed in alternative ways in alternative embodiments, as we disclose in reference to FIG. 43B above.

Further regarding functionality such as provided by an RFP-to-PD E2E relevance interface 5210, said interface may provide sections to provide information to identify a PD or a PD owner 5215, or may also identify an RFP or an RFP owner 5216. As we disclose in reference to FIG. 52, an RFP-to-PD E2E relevance section 5220 may include information on a PD, here shown by PD work elements 5221, as well as information on an RFP, here shown by RFP work elements 5222. An RFP-to-PD E2E relevance section 5220 may indicate the relevance of a PD element to an RFP element by the presence of a black diamond, or other indicator as disclosed in reference to FIG. 43B. An RFP-to-PD E2E relevance section 5220 may enable an end user to select entries, for example as shown by a circle 5223 indicating selection of the intersection of the PD "Project Management" element 5221 and the RFP "SOW 2—Manage the Project" element 5222. As a result of such selection, functionality such as on an RFP-to-PD E2E relevance interface 5210 may present to an end user additional information, which may include, but is not limited to, the relevance value associated with said selected RFP and PD elements, shown in FIG. 52 by the relevance value 5224 displaying a value 0.94, which corresponds to the relevance of the PD Project Management element to the RFP SOW 2—Manage the Project element, as may have been determined by a procedure Determine_Relevance_Matrix( ) (Ref. FIG. 35), and corresponding to the entry 0.94 3732. Selection 5223 of a matrix element that does not contain a black diamond indicator, or other suitable indicator as disclosed in reference to FIG. 43B, may exercise functionality such as to display a relevance value 5240 of 0.0, or other suitable indicator.

Regarding functionality that may be provided by an RFP-to-PD E2E relevance interface 5210 when an RFP-to-PD entry has been selected, such as illustrated by a selection 5223, we disclose that said interface may provide additional information using a PD-element detail section 5230 or an RFP-element detail section 5240, whose functionality and operation may be similar to one another. An element detail section (such as a first section 5230 or a second section 5240) may present the label or description, or other relevant information, for said selected element, as shown in a PD-element detail section by a first section component 5231 or a second section component 5232, respectively.

Regarding further functionality of an RFP-to-PD E2E relevance interface 5210, said interface may enable an end user to quickly review and navigate detailed RFP-to-PD relevance results that a relevance management system 1140 has computed for a PD and an RFP. The functionality a relevance management system 1140 may provide to select 5223 and drill down on specific RFP requirements (Ref. 5222 and 5240) or "trace back", such as via a corresponding PD work element 5221 to display detailed substantiation 5232, is extremely powerful, as it enables an end user to verify and validate immediately the relevance of a PD to an RFP at a fine-grained level, using information that may have been reached via intuitive "drill down" navigation from a "rolled up" project relevance summary section (e.g., such as shown in FIG. 49, as well as in reference to FIG. 58 and FIG. 60, as we disclose below).

Expanding Concepts to Process PDs and RFPs in Multiple Dimensions

Thus far, the specification of the present invention has disclosed functionality regarding relevance of one or more PDs to a single RFP, and indeed in reference to a project relevance summary interface 4910 we have disclosed how we may summarize the relevance of multiple PDs 4922 to a single reference RFP 4926. It is important to understand that just as a single capability-providing end user (i.e., a PD owner) may be associated with multiple PDs, so too may a single capability-seeking end user (i.e., an RFP owner) be associated with multiple RFPs; and furthermore, a group of end users in a relevance management system 1140 may include multiple PD owners, as well as multiple RFP owners. Aspects of such a broadened perspective of an end-user base (and PDs and RFPs with which said end-user base is associated) may be visualized via FIG. 53.

Figure 53:
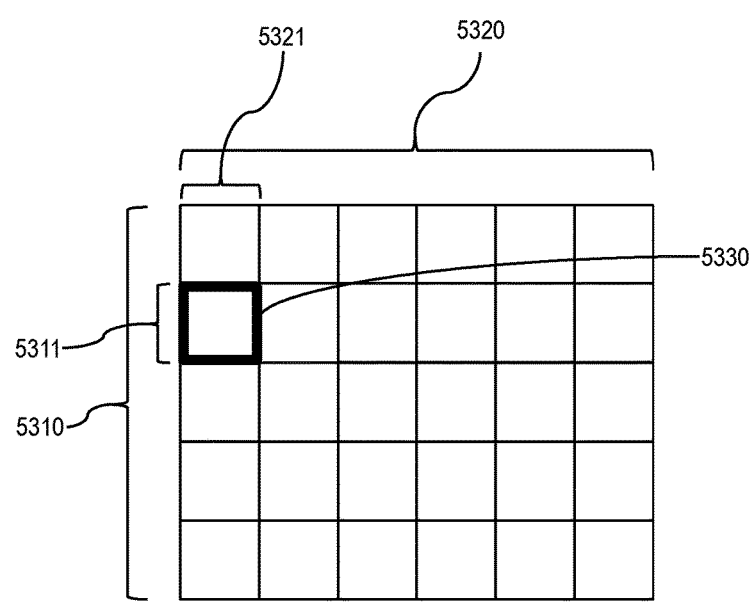
FIG. 53 depicts a structure for processing PDs and RFPs in multiple dimensions, in accordance with an exemplary embodiment of the invention.

FIG. 53 generally depicts a structure for processing PDs and RFPs in multiple dimensions, in accordance with an exemplary embodiment of the invention. We disclose in reference to FIG. 53 a matrix in which each row (for example, a row 5311) represents a single PD, and each column (for example, a column 5321) represents a single RFP. Thus we can see that an intersection of a column and a row (for example, an intersection 5330) represents relevance of an RFP to a PD. We have purposely shown the exemplar matrix in FIG. 53 as having five rows 5310, to correspond to the five PDs in our extended example, i.e., PD001, PD002, PD003, PD004, and PD005 as indicated in the PD ID column 4807 of FIG. 48. Regarding columns in the matrix 5320, if we consider a column 5321 as corresponding to RFP001 (i.e., the RFP whose RFP ID is RFP001), and a row 5311 as corresponding to PD002 (i.e., the PD whose PD ID is PD002), then the highlighted entry in the matrix 5330 represents the relevance of RFP001 to PD002, which corresponds to a row 4809.

We disclose in reference to FIG. 53 that the matrix of rows 5310 and columns 5320 represents a Cartesian product, between all PDs (i.e., rows 5310) and all RFPs (i.e., columns 5320). While the dimensionality of FIG. 53 is shown as two (i.e., rows and columns), the dimensionality of the Cartesian product of PDs and RFPs may indeed be greater when we consider the hierarchical relationships as we disclose in reference to FIG. 21. Each PD and RFP in fact may represent an aggregation of its constituent PD and RFP work elements, respectively. Furthermore, recall that each PD may have a PD owner, and said PD owner may possibly (actually, likely) be the owner of more than one PD; and similarly for RFPs, each RFP may have an RFP owner, and each possibly (again, likely) may own more than one RFP.

Star Schema to Support Hierarchical Aggregation

Figure 54:
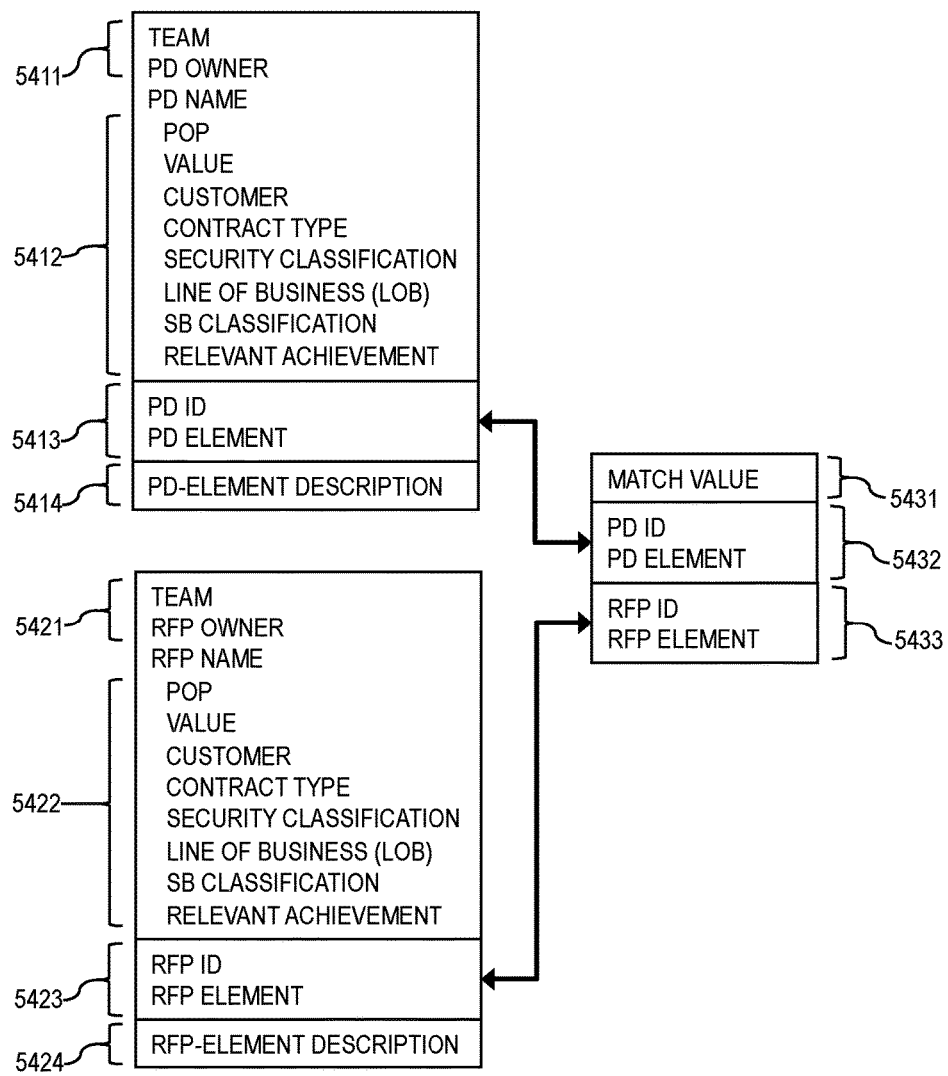
FIG. 54 is a star schema supporting hierarchical aggregation, in accordance with an exemplary embodiment of the invention.

FIG. 54 generally depicts a star schema supporting hierarchical aggregation, in accordance with an exemplary embodiment of the invention. We disclose that the multidimensional aspects (i.e., of PD owners owning multiple PDs, and RFP owners owning multiple RFPs) that we expressed in FIG. 21, in particular in reference to Level 2 and Level 3, may be represented in a data warehouse or OLAP-type "star schema" as shown in FIG. 54. As disclosed earlier with respect to FIG. 39, here too a central fact corresponds to a match value 5431 between an individual PD element and an individual RFP element, as identified by the keys PD ID 5432 and PD Element 5413, and RFP ID 5433 and RFP Element 5423, respectively. As we disclose in further detail below, use of a star schema structure may facilitate hierarchical aggregation by PD element and PD ID 5413, which may correspond to Level 4 and Level 3 in FIG. 21, respectively; as well as PD Owner and Team 5411, which may correspond to Level 2 and Level 1 in FIG. 21, respectively. For RFPs, use of a star schema structure may facilitate similar hierarchical aggregation, by RFP element and RFP ID 5423, which may correspond to Level 4 and Level 3 in FIG. 21, respectively; as well as RFP Owner 5421, which may correspond to Level 2 in FIG. 21.

Aggregation Processing for a Capability-Seeking End User

Figure 55:
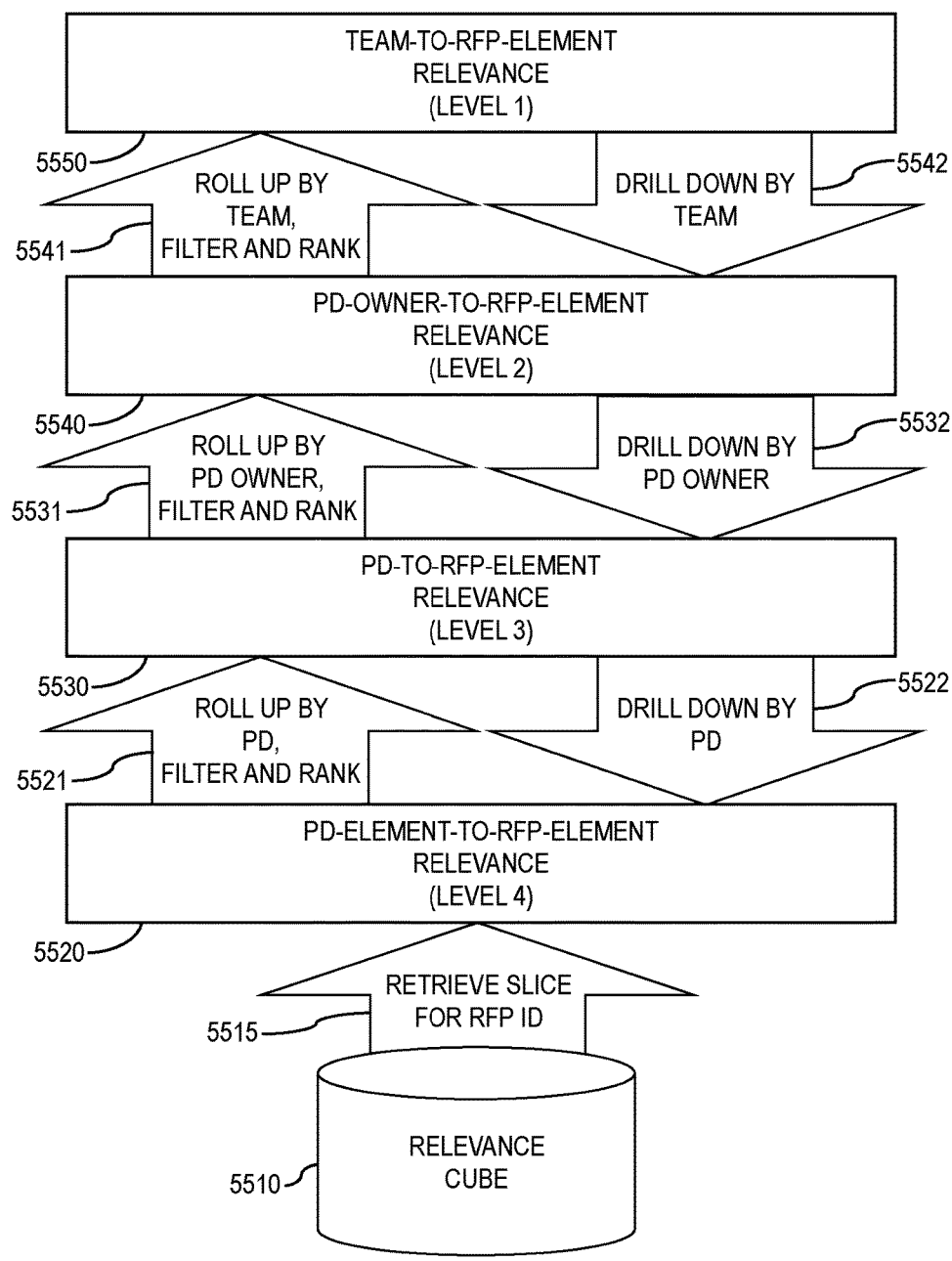
FIG. 55 is an aggregation processing flow for a capability-seeking end user, in accordance with an exemplary embodiment of the invention.

FIG. 55 generally depicts an aggregation processing flow for a capability-seeking end user, in accordance with an exemplary embodiment of the invention, in reference to which we further disclose the overall operation and functionality of a relevance management system 1140. The processing flow we disclose in reference to FIG. 55, which may be used with an interface, such as a capabilities summary interface 5810, may provide a mode of operation that a capability-seeking end user 1130 may find useful. We disclose in reference to FIG. 55 that a relevance management system 1140 may retrieve from a relevance cube 5510 a slice of a relevance cube table where said slice represents an RFP that is owned by an end user (i.e. a selection from a relevance cube of table of rows having a specific RFP ID associated with end user), which may return PD-Element-to-RFP-Element relevance data 5520. A relevance management system 1140 may roll up said data by PD 5521 (as well as perform filtering or ranking, as we disclose below) to create aggregated PD-to-RFP-Element relevance data 5530; which may then be further rolled up by PD Owner 5531 (and also filtered or ranked, as we disclose below) to create further aggregated PD-Owner-to-RFP-Element relevance data 5540; which may finally be rolled up even further by Team 5541 (and also filtered or ranked) to create aggregated, Team-to-RFP-Element relevance data 5550. As indicated by a Level 1 capability 5542, a Level 2 capability 5532, and a Level 3 capability 5522, a relevance management system 1140 may also support drill-down (disaggregation), in which an element from a set of aggregated data may be selected, and more-detailed, expanded data associated with said selected element may be referenced.

Regarding further disclosures in reference to FIG. 55, we disclose that the processing flow shown in FIG. 55 provides a method for identifying, aggregating, and navigating relevance information, which may be well suited to support the needs of a capability-seeking end user 1130. We further disclose that by virtue of the multi-dimensional nature and structure of such relevance information (as we disclose in reference to FIG. 21, FIG. 22, and FIG. 54), aggregated relevance results such as shown in FIG. 55 (Ref. 5520, 5530, 5540, and 5550), as well as other relevance results, may be determined by alternative embodiments. We contemplate a broad range of such alternative embodiments, which may include, but are not limited to, performing aggregation across dimensions other than e.g. PD element, PD, PD owner, or team, to achieve similar relevance results, or using alternate dimensions (or combinations of dimensions) for filtering, ranking, or aggregating, as we disclose in reference to FIG. 22, again to achieve similar relevance results. Those skilled in the art will recognize that such alternative embodiments for identifying, aggregating, or navigating (as well as filtering or ranking) relevance information may determine similar relevance results to those we disclose in reference to FIG. 55, and such embodiments are intended to be within the scope of the present invention.

Further regarding disclosure in reference to FIG. 55, the functionality provided by roll-up or drill-down operations, such as we disclose in reference to FIG. 55, may be implemented using current-art multidimensional databases, which provide OLAP-type functionality for aggregation and disaggregation, or by using procedures such as Build_Relevance_Table( ) (Ref. FIG. 38), Roll_Up_By_PD (Ref. FIG. 40), Roll_Up_By_RFP( ) (Ref. FIG. 46), and similar procedures, or a combination of such techniques.

Figures 56, 57:
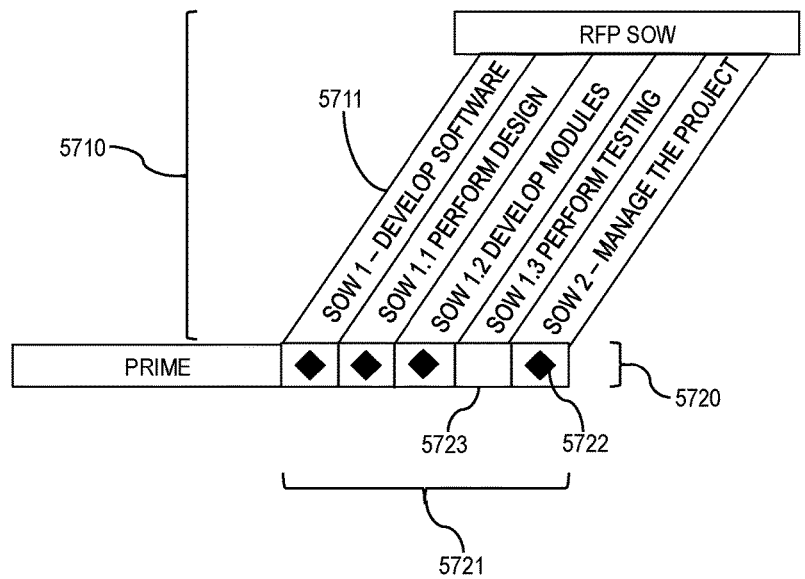
FIG. 56 depicts an exemplar execution of Roll-Up-By-PD-Owner processing, in accordance with an exemplary embodiment of the invention.
FIG. 57 is a mock-up of a single-row relevance chart that depicts exemplar execution of procedure Update_Relevance_Chart( ) using Roll-Up-By-PD-Owner input, in accordance with an exemplary embodiment of the invention.

FIG. 56 generally depicts an exemplar execution of Roll-Up-By-PD-Owner processing, in accordance with an exemplary embodiment of the invention, in which we further illustrate aggregation processing, such as we disclose in reference to FIG. 55, using data from our extended example. We disclose in reference to FIG. 56 how RFP-to-PD relevance data in a relevance cube table such as illustrated in FIG. 48 (which corresponds to the PD-to-RFP-Element relevance data 5530) may be rolled-up by PD Owner. We disclose how a relevance management system 1140 may aggregate together the rows, such as the two rows in FIG. 48 that correspond to PD Owner "Prime" (a first row 4808 and a second row 4809), to create a single row, such as a row 5608 in the table of FIG. 56. The resulting "RFP-to-PD-Owner Relevance" 5601 for said row 5608 represents the aggregation (i.e., sum) across the two rows of the table in FIG. 48 (said first row 4808 and said second row 4809) for the "RFP-to-PD-Relevance" column 4801, namely 3.61 plus 1.58, which equals 5.19 as shown in FIG. 56. Similarly, for example, the value for R12 relevance (which corresponds to a column 4804 in FIG. 48 and a column 5604 in FIG. 56) represents the sum of 0.88 plus 0.77 (from said first row 4808 and said second row 4809, respectively), which equals 1.65, as shown in FIG. 56. For clarity of presentation, we have omitted in FIG. 56 the aggregation of the PD-element references that we depicted in FIG. 48 (e.g., the "[P13]" and "[P10]" that appear in column 4804 for said first row 4808 and said second row 4809, respectively). As was the case for the previously computed relevance cube table results (e.g., as illustrated in FIG. 39, FIG. 41, and FIG. 45), the aggregated results may be stored in a relevance cube 2070.

Capabilities Summary Interface with Project Relevance Drill-Down

FIG. 57 generally depicts a single-row relevance chart for an exemplar execution of procedure Update_Relevance_Chart( ) using Roll-Up-By-PD-Owner input, in accordance with an exemplary embodiment of the invention. We disclose in reference to FIG. 57 a relevance chart that a relevance management system 1140 may construct for PD-Owner-to-RFP-Element data 5540, such as illustrated for a row 5608 in FIG. 56. A relevance management system 1140 may use functionality such as procedure Update_Relevance_Chart( ) (Ref. FIG. 42) to construct a relevance chart, such as shown in FIG. 57, from a row 5608 of FIG. 56, passing the procedure an argument "PD Owner" as RUL_ID so that the resulting row 5720 may be labeled with the name of the PD Owner (PRIME in this case).

Figure 58:
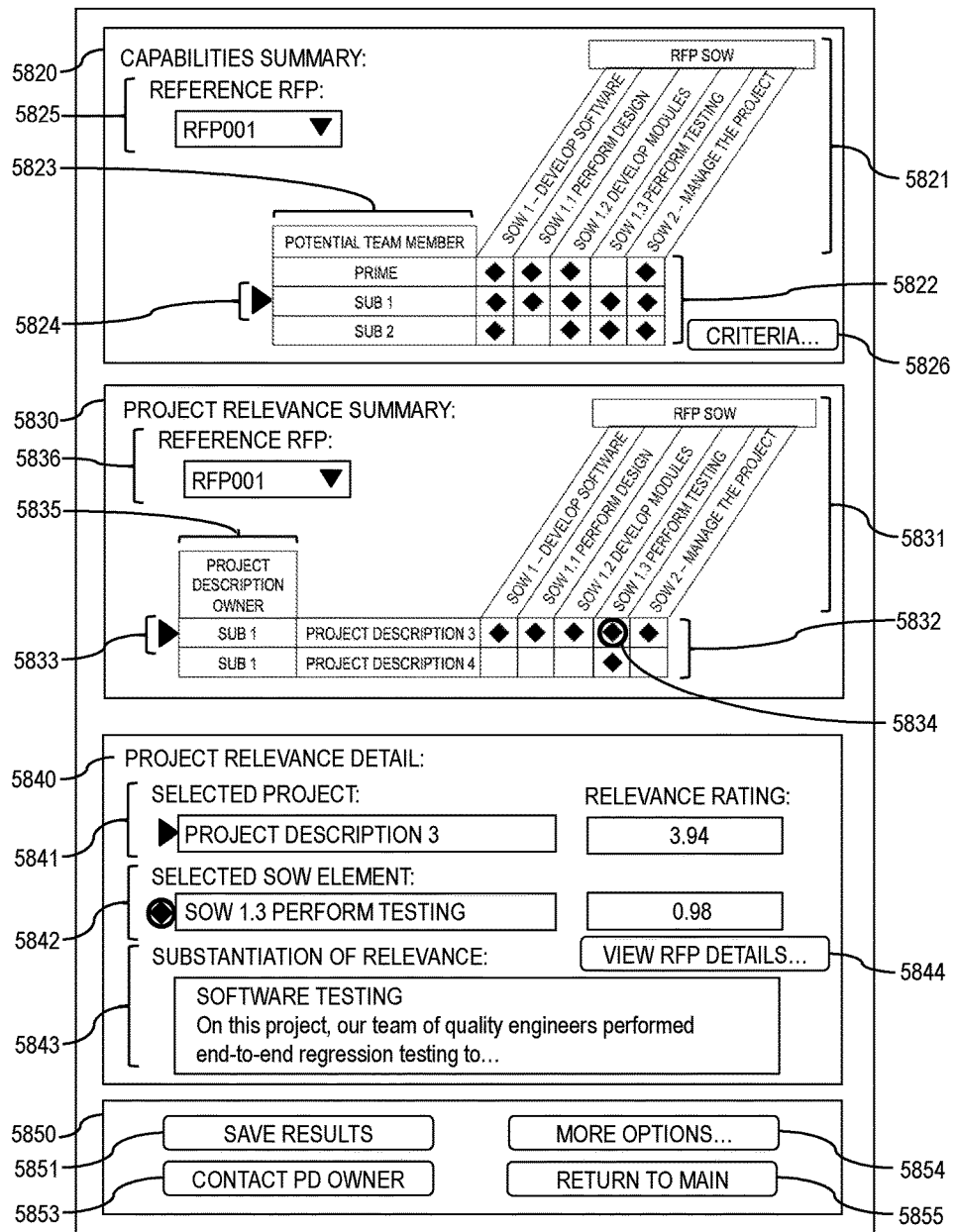
FIG. 58 is a mock-up of a capabilities summary interface with project relevance drill-down, in accordance with an exemplary embodiment of the invention.

FIG. 58 generally depicts a capabilities summary interface 5810 with project relevance drill-down, in accordance with an exemplary embodiment of the invention. A relevance management system 1140 may enable an end user to view capability summary results, which may be facilitated by a controller module 1142 and an interface module 1143, as illustrated in FIG. 11, which may generate or manage interfaces and application workflow, such as for an interface 5810 in FIG. 58, to present results to an end user, which may include the use of a relevance chart, or other suitable format, with drill-down functionality.

Regarding functionality we disclose in reference to FIG. 58, as with the interfaces shown previously in FIG. 49 and FIG. 51, the interface shown in FIG. 58 may provide functionality to present capability summary results in a way that facilitates, in particular, a capability-seeking end user 1130 in identifying and understanding the experience and capabilities as provided by a capability-providing end user 1110. Here again the "perspective" that an interface as shown in FIG. 58 may provide is of (possibly multiple) potential team members as they relate to a (possibly single) "reference RFP" associated with a capability-seeking end user. As we disclose in reference to FIG. 58, a capability-seeking end user may be provided, an overview or interactive, drill-down functionality for understanding potential team member capabilities as they relate to a capability-seeking end user's specific RFP.

We further disclose, in reference to a capabilities summary interface 5810, that said interface may be comprised of sections, such as a capabilities summary section 5820, a project relevance summary section 5830, a project relevance detail section 5840, or a capabilities actions section 5850, and that each such section can be considered its own interface, as can each field within a section.

Regarding a capabilities summary section 5820, said section may summarize potential team member capabilities with respect to a reference RFP 5825, which may use a relevance chart that includes RFP SOW elements 5821 an end user has indicated for display, and corresponding relevance chart rows 5822 that display capabilities of potential team members 5823, or other suitable format to display relevance. In a capabilities summary section 5820, an end user may be provided functionality to select a potential team member to obtain more detailed information about one of more projects associated with said potential team member; such selection may be indicated, and is illustrated in one embodiment, by the presence of an exemplar black triangle ("▶") 5824, or other suitable indicator (such as we disclose above in reference to a selection 4923 in FIG. 49), next to a row in a relevance chart (such as for SUB 1), indicating selection of a potential team member. As a result, detail may be displayed for said selected team member, using functionality such as a project relevance summary section 5830.

Regarding a project relevance summary section 5830, said section may provide detail for a reference RFP 5836, which may include multiple elements, and may summarize specified RFP SOW elements 5831 for one or more projects 5832 with which said potential team member 5835 is associated. The functionality of a project relevance summary section 5830 may be analogous and corresponds to functionality provided by a project relevance summary section (Ref 4920 and 5110) such as we disclose in reference to FIG. 49 and FIG. 51. Analogously, a project relevance summary section 5830 may provide an end user the ability to select a specific project 5833 and SOW element 5834 to receive additional "drill down" detail on said selections, which a relevance management system 1140 may provide via functionality such as a project relevance detail interface 5840, which may provide analogous functionality and correspond to a project relevance detail section 4930.

Regarding a capabilities actions section 5850, said section may enable an end user to instruct a relevance management system 1140 to perform actions, including, but not limited to, saving a result 5851 of a capabilities summary or drill-down for reference at a later time, or for printing or working with off-line in softcopy as an artifact to facilitate proposal development 233; contacting a capability owner 5853 to discuss and facilitate teaming partnerships, as we disclose in reference to FIG. 19; as well as more options 5854 that may include, but are not limited to, functionality such as opening a PD-to-RFP E2E relevance interface 5210 to view detailed information (such as RFP SOW work-element requirements, PD work-element level substation, and so on), such as regarding a selected project 5833. In addition, an end user may have the ability to conclude processing 5855 by returning to a main menu.

Regarding functionality of a capabilities summary interface 5810, said interface may provide a capability-seeking end user 1130 powerful means with which to identify, navigate, or understand capabilities of potential team members 1110. The functionality provided by said interface to perform one or more actions, such as selecting from a ranked list of potential team members 5824, drilling down into a list of relevant projects that a potential team members brings 5830, and then selecting from said list 5832 specific projects 5833 for project-level detail 5840, including substantiation 5843 at the individual SOW-element level (Ref. 5834 and 5842), may enable a capability-seeking end user 1130 to identify and vet potential team members 1110 rapidly and efficiently, which may significantly reduce the cost of business development associated with these time-consuming activities. The functionality that a capabilities summary interface 5810 may provide to drill down and "trace back", such as through one or more relevance charts, to an original PD to retrieve and display substantiation 5843 for a selected SOW element RFP-to-PD relevance (such as a first selection 5834 or a second selection 5842) may be extremely powerful, as it may enable an end user to verify and validate immediately, via said drill-down functionality, the capabilities of potential team members, or the experience upon which said (claimed) capabilities may be based.

Aggregation Processing for a Capability-Providing End User

Recall that, generally speaking, a relevance management system 1140 may support two categories of end users, namely capability-seeking end users 1130 and capability-providing end users 1110, and that while both categories of end users may be fundamentally interested in similar information (namely, which RFPs relate to which PDs) the way in which each category of end user may be best served in identifying, viewing, and navigating such information may differ. For example, a capability-seeking end user may be best served by viewing such information from the "perspective" of an RFP with which they are associated, in order to identify for said RFP the (possibly multiple) PDs and capabilities as provided by capability-providing end users that may be of use in responding to said RFP. In other words, "Find me all the current PDs and team members I should consider using, to respond to my current RFP." On the other hand, a capability-providing end user may best served by viewing such information from a complementary "perspective", namely that of a PD (or, multiple PDs) with which they are associated, in order to identify (possibly multiple) RFPs whose requirements call for the experience and capabilities demonstrated in said PDs. In other words, "Find me all the current RFPs where my PD project experience could contribute to a winning proposal."

The processing flow and interface we disclosed previously in reference to FIG. 55 and FIG. 58, respectively, provide functionality to present relevance results from a perspective that may facilitate capability-seeking end users 1130 in identifying PDs and capabilities of capability-providing end users 1110. In contrast, the processing flow and interface we disclose in reference to FIG. 59 and FIG. 60, respectively, provide functionality for a complementary perspective, to facilitate a capability-providing end user in identifying RFPs where said capability-providing end user experience and capabilities can make significant contributions.

Figure 59:
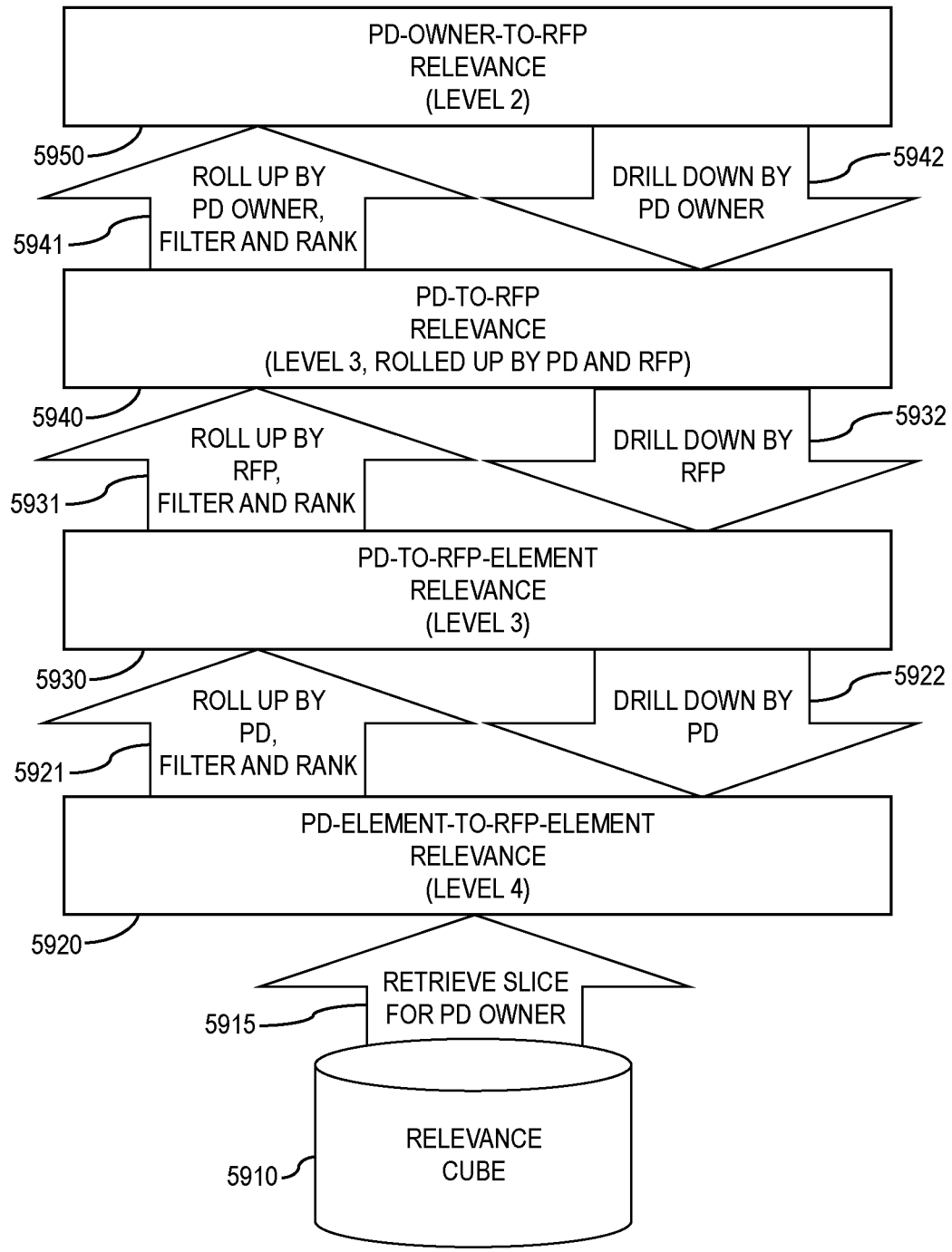
FIG. 59 is an aggregation processing flow for a capability-providing end user, in accordance with an exemplary embodiment of the invention.

FIG. 59 generally depicts an aggregation processing flow for a capability-providing end user, in accordance with an exemplary embodiment of the invention. We disclose in reference to FIG. 59 that a relevance management system 1140 may retrieve 5915 from a relevance cube 5910 a slice of a relevance cube table for a PD owner (i.e. a selection from a relevance cube of table rows associated with a specific PD Owner), which may return PD-Element-to-PD-Element relevance data 5920. A relevance management system 1140 may provide functionality to roll up such data by PD 5921 (as well as perform filtering or ranking, as we disclose below) to create aggregated PD-to-RFP-Element relevance data 5930); which may be further rolled up by RFP 5931 (and also filtered or ranked, as we disclose below) to create further aggregated PD-to-RFP relevance data 5940; which may finally be rolled up even further by PD Owner 5941 (and also filtered or ranked) to create aggregated, PD-Owner-to-RFP relevance data 5950. As indicated by 5942, 5932, and 5922, a relevance management system 1140 may also support drill-down (disaggregation), in which an element from a set of aggregated data may be selected, and more-detailed, expanded data associated with said selected element may be referenced.

Regarding further disclosure in reference to FIG. 59, analogous to our disclosure in reference to FIG. 55, we disclose in reference to FIG. 59 that by virtue of the multi-dimensional nature and structure of such relevance information (such as we disclose in reference to FIG. 21, FIG. 22, and FIG. 54), aggregated relevance results such as shown in FIG. 59 (Ref. 5920, 5930, 5940, and 5950), as well as other relevance results, may be determined by alternative embodiments. We contemplate a broad range of such alternative embodiments, which may include, but are not limited to, performing aggregation across dimensions other than e.g. PD element, PD, RFP, or PD owner to achieve similar relevance results, or using alternate dimensions (or combinations of dimensions) for filtering, ranking, or aggregating, as we disclose in reference to FIG. 22, again to achieve similar relevance results. Those skilled in the art will recognize that such alternative embodiments for identifying, aggregating, or navigating (as well as filtering or ranking) relevance information may determine similar relevance results, and such embodiments are intended to be within the scope of the present invention.

RFP Relevance Summary Interface with Project Relevance Drill-Down

Figure 60:
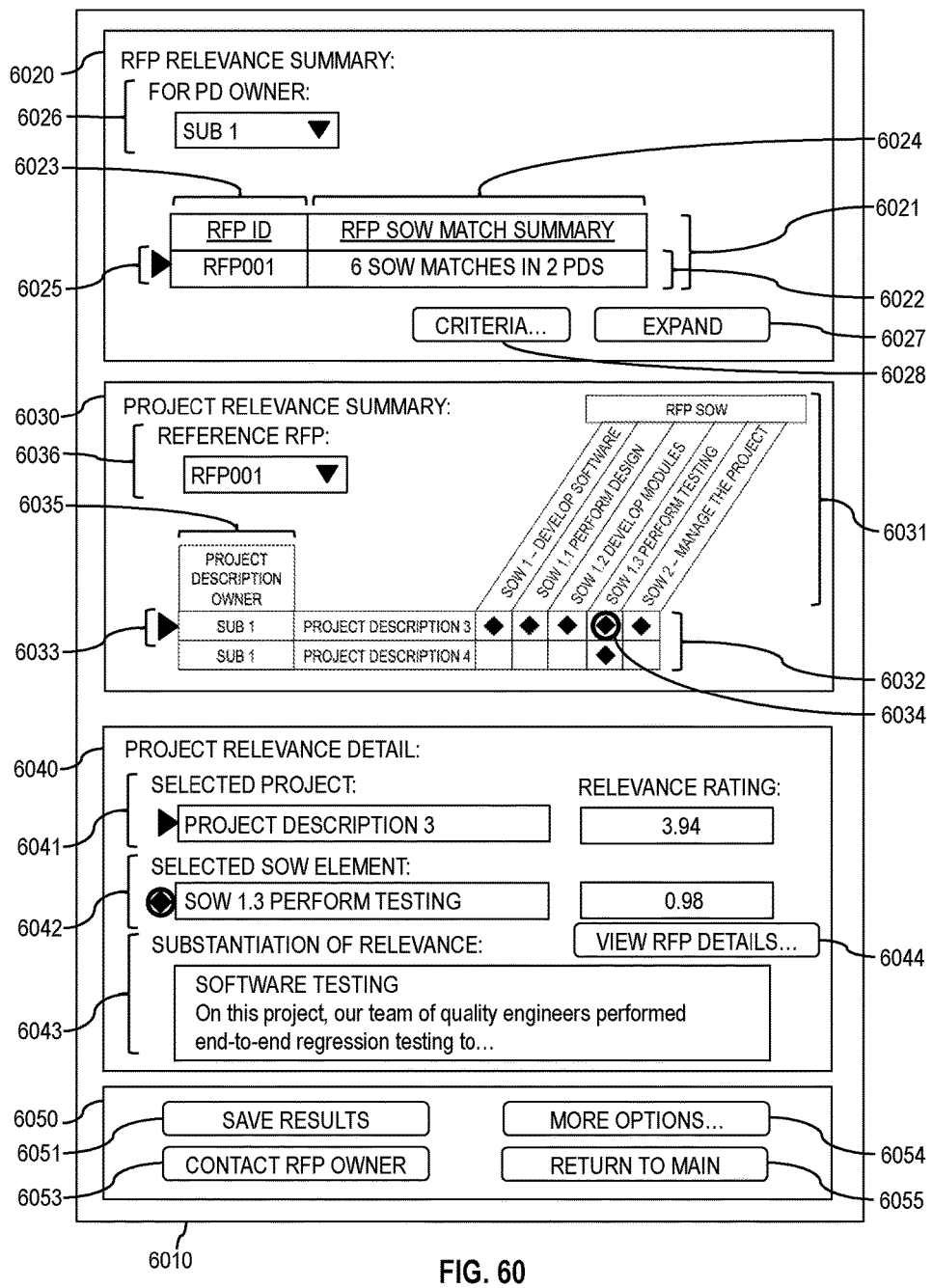
FIG. 60 is a mock-up of an RFP relevance summary interface with project relevance drill-down, in accordance with an exemplary embodiment of the invention.

FIG. 60 generally depicts an RFP relevance summary interface 6010 with project relevance drill-down, in accordance with an exemplary embodiment of the invention, which may enable an end user to view RFP relevance summary results, and may be facilitated by a controller module 1142 and an interface module 1143, as illustrated in FIG. 11, which may generate or manage an interface 6010 and application workflow to present results to an end user, which may include a relevance chart with drill-down functionality.

Regarding functionality of an RFP relevance summary interface 6010, in contrast to an interface 5810 shown previously in FIG. 58 that focused on a capability-seeking end user 1130, an RFP relevance summary interface 6010 may present RFP relevance summary results in a way that facilitates, in particular, a capability-providing end user 1110 in identifying and understanding the RFP requirements of a capability-seeking end user 1130. Here the "perspective" that an RFP relevance summary interface 6010 provides may be of (possibly multiple) RFPs associated with capability-seeking end users, as said RFPs relate to the experience and capabilities of a capability-providing end user. As such, a capability-providing end user may be provided, by a relevance management system 1140, an overview and interactive, drill-down functionality for understanding the technical and teaming requirements (i.e., needs) of one or more potential prime contractors, whose team (or teams) said capability-providing end user may seek to join as a subcontractor.

We further disclose, in reference to an RFP relevance summary interface 6010, that said interface may be comprised of sections, such as an RFP relevance summary section 6020, a project relevance summary section 6030, a project relevance detail section 6040, or an RFP relevance actions section 6050, and that each such section can be considered its own interface, as can each field within a section.

Regarding an RFP relevance summary section 6020, we disclose that a relevance management system 1140 may provide functionality to construct said section by processing aggregated PD-Owner-to-RFP relevance data 5950. We illustrate the functionality an RFP relevance summary section 6020, using the results of the extended example we have used throughout the specification of the present invention. We disclose that an RFP relevance summary table 6021 would typically have many rows of data, rather than just a single row 6022; the single row results from the simplified, extended example we have used for presentation in the specification of the present invention, for which only one RFP (RFP001) has been entered a relevance management system 1140.

Figure 61:
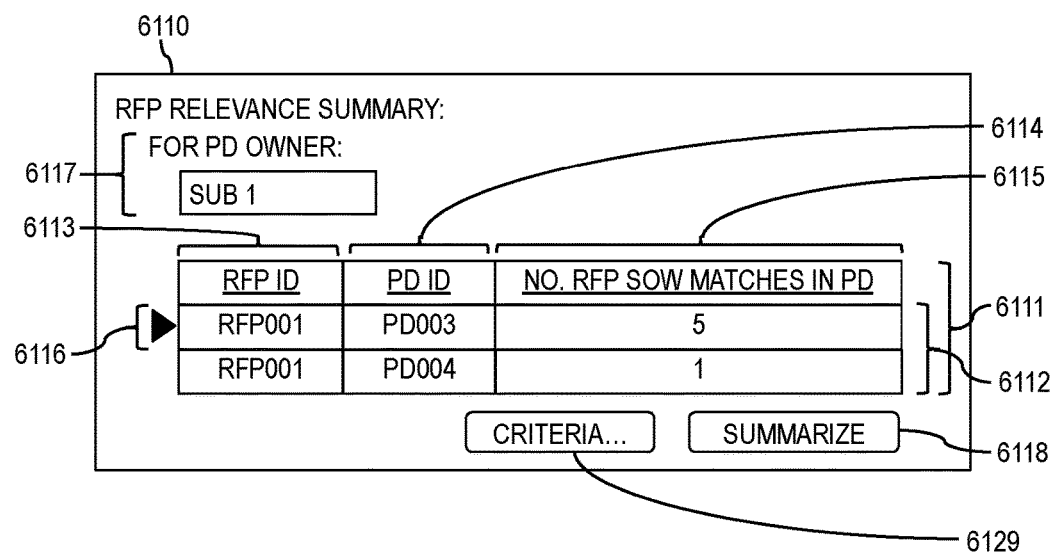
FIG. 61 is a mock-up of an RFP relevance summary section in expanded format, in accordance with an exemplary embodiment of the invention.

FIG. 61 generally depicts an RFP relevance summary section in expanded format, in accordance with an exemplary embodiment of the invention. Further regarding an RFP relevance summary section 6020, we disclose that said section may also provide functionality, such as represented by an "Expand" indicator 6027, to expand a summary table 6022, in which case a relevance management system 1140 may provide functionality that enables an RFP relevance summary section 6020 to be updated with a layout such as an alternate RFP relevance summary section 6110 in FIG. 61. An end user may be provided a functional ability to "summarize" 6118 an expanded table 6111, which may return an end user to an original RFP relevance summary section 6020.

Regarding functionality of an RFP relevance summary section (Ref. 6020 or 6110), said section may provide functionality for an end user to select an RFP, such as within a table (Ref. 6022 and 6112, respectively), or other suitable display format, for further drill-down exploration; such functionality may be illustrated in an RFP relevance summary section by a black triangle ("▶") (Ref. 6025 and 6116, respectively), or other suitable indicator (such as we disclose above in reference to an indicator 4923 in FIG. 49), indicating selection of a corresponding RFP. Such selection functionality may identify an RFP (such as exemplar RFP001, as illustrated in a first selection 6025 and a second selection 6116), which a relevance management system 1140 may use to retrieve a list of associated projects. As we disclose in reference to FIG. 49, a relevance management system 1140 may provide functionality to use these project references to generate a corresponding project relevance summary interface (such as an interface 6030 in FIG. 60, corresponding to an interface 4920 in FIG. 49), which here too may contain multiple elements relevant to an RFP. These elements may include, but are not limited to, functionality such as a relevance chart with RFP SOW elements 6031 and relevance chart rows 6032, which may support multiple actions or combinations of actions that include, but are not limited to, functionality for selection of a project 6033 and a specific SOW element 6032, which may be used to provide further drill-down functionality by generating a project relevance detail section (such as a section 6040, corresponding to a section 4930 in FIG. 49). Here again an end user may view substantiation 6043, as evidence that an indicated project may indeed represent experience for an indicated RFP SOW element (such as illustrated by a first selection 6042 or a second selection 6034).

Regarding a project relevance detail section 6040, said section may provide functionality analogous to a project relevance detail section 4930 in FIG. 49, and may provide an end user functionality such as represented by "View RFP details . . . " 6044 to view details for a selected SOW element (Ref 6022 and 6034). Such functionality may enable an end user to "trace back" through an RFP SOW element 6031, which may enable an end user to view, such as in a new RFP SOW element detail interface 5010 in FIG. 50, an RFP SOW element description, such as originally entered in a relevance management system 1140 (Ref 2022). Such functionality may enable an end user to simultaneously position a detailed RFP requirement (such as a first element 5020 or a second element 5030 in FIG. 50) for a selected SOW element (such as a first selection 6034 or a second selection 6042) in close proximity (for example, side-by-side) with substantiation for same SOW element relevance from an original project description (such as a description 6043). Using such functionality, an end user may effectively validate that SOW element experience cited by a PD 6043 is indeed supportive of or in alignment with a corresponding RFP SOW requirement (Ref 5020 and 5030 in FIG. 50).

Regarding functionality such as provided by a project relevance detail section 6040, such functionality may be extremely convenient or save time, as a capability-providing end user 1110 may not have seen (or, have immediate access to) a detailed SOW requirement 421 of the RFP 420, such as may be available via functionality to "View RFP details . . . " 6044. Specifically, although RFPs are generally distributed to the contracting community at large 130, due to the large number of RFPs that cover a broad range of services, many subcontractors remain unaware of RFPs for which said subcontractor capabilities may be useful. Instead, it is often a prime contractor 141 who maintains awareness of RFPs and analyzes them in detail. Thus, the functionality that an RFP relevance summary interface 6010 may provide for a subcontractor to view a detailed RFP requirement, and compare it with said subcontractor's experience, saves time and effectively gives said subcontractor newfound ability that saves said subcontractor time and reduces expense said subcontractor may spend locating a viable prime contractor with which to communicate regarding potential teaming arrangements.

Regarding an RFP relevance actions section 6050, said section may enable an end user to instruct a relevance management system 1140 to perform actions, that may include but are not limited to saving the results 6051 of a summary and drill-down for reference at a later time, or for printing or working with off-line in softcopy as an artifact to facilitate proposal development 233; contacting an RFP owner 6053 to discuss and facilitate teaming partnerships, as we disclose in reference to FIG. 19; as well as further options 6054. In addition, an end user may have an ability to conclude processing 6055, which may return said end user to a main menu.

Regarding an RFP relevance summary interface 6010, said interface may provide a capability-providing end user 1110 powerful functionality with which to identify, navigate, or understand the requirements of prime contractors with which said capability-providing end user may potentially team 1130. Said functionality may include one or more of the following, such as select from a ranked list of RFPs 6025, drill down into a list of relevant RFPs 6030 that may include RFP SOW requirements 6031, and select from such a list 6032 specific projects 6033 for project-level detail 6040, including substantiation 6043 at an individual SOW-element level (Ref. 6034 and 6042), and may enable a capability-providing end user 1110 to identify and vet potential prime contractors 1130 rapidly and efficiently, which may significantly reduce the cost of business development associated with these time-consuming activities. The functionality that an RFP relevance summary interface 6010 may provide to a subcontractor to identify candidate RFPs and prime contractors, and drill down through RFP requirements using one or more relevance charts to understand how said subcontractor experience and capabilities may be of value to a prime contractor is extremely powerful, as it may enable said subcontractor to reach out efficiently and effectively to said potential prime contractors with concrete evidence of said subcontractor's ability to fill specific requirements in RFPs, upon which said prime contractor may have expressed interest in bidding.

Processing Multiple PDs and RFPs

A processing module such as depicted in FIG. 20 may provide functionality to store in a relevance cube 2070 RFP-to-PD relevance results that represent relevance of an RFP to a PD. Under control of a controller module 1142, a processing module as shown in FIG. 20 may be engaged to process PDs and RFPs input into a relevance management system 1140 (Ref 2010 and 2012, respectively) to completion. As such, we disclose that a relevance cube 2070 may effectively contain a Cartesian product of PDs and RFPs (Ref. 2010 and 2012, respectively; and Ref 1111 and 1131, respectively). For example, a relevance management system 1140 my compute and store in a relevance cube 2070 RFP-to-PD relevance for combinations of PDs and RFPs. A controller module 1142 may provide functionality to implement a workflow process to "shepherd" each PD and RFP instance through a processing module such as illustrated in FIG. 20, which may use a dataflow architecture, or other architecture, where process inputs (e.g., PDs and RFPs in PD 2031 and RFP 2032 data stores) and intermediate results (e.g., relevance data stores 2045) may be queued at each processing step, and processing procedures may be executed by a controller module 1142 when new or updated inputs arrive.

As an example, when a new PD 2011 is entered into in a relevance management system 1140 (Ref 2021 and 2031), a controller module may shepherd said new PD instance through the process depicted in FIG. 20 by executing direct match processing 2045; importantly, a controller module may recognize that a new PD instance may be "run against" each RFP instance in an RFP data store 2032, and thus may invoke direct match processing 2045 multiple times, using each time as one input said new PD instance and as a second input an RFP instance in an RFP data store 2032. The result may create multiple new RFP-to-PD instances in a relevance data store 2045, which a controller module may further shepherd, for example through ETL processing transformations 2060 to update a relevance cube 2070. As such, a controller module 1142 may keep current the contents of data stores (Ref. 2031, 2032, and 2045) and relevance cube 2070.

Filtering or Ranking
Motivation for Separable and Complementary Filtering and Ranking As we disclose in reference to FIG. 22, the data organization of FIG. 21 may enable not only functionality such as hierarchical aggregation 2201, but also functionality such as filtering 2202 or ranking 2203, which we disclose next.

As we disclose below, a relevance management system 1140 may treat filtering and ranking as separable and complementary functionality, which may be in contrast to a common practice in data retrieval systems that may combine the two and use ranking as a means of "filtering". For example, it is not uncommon for a business-intelligence application to process queries that may generate thousands of "hits", which said application may first rank and then reduce (i.e., "filter") to a more manageable number (such as for presentation to an end user) by returning only e.g. the "top 50" results (or other such reduced number). In such a system, an end user may need to "tweak" ranking criteria for the dual (and at times, seemingly contradictory) purposes of (1) including only results that are of interest (and excluding results that are not of interest), while simultaneously (2) ranking results in increasing order of interest.

In contrast, by treating filtering and ranking as separable and complementary functionality, ranking and filtering such as we disclose herein, may be able to (1) precisely include only results that are of interest (and exclude results that are not of interest), while simultaneously (2) ranking results in increasing order of interest.

While we disclose filtering and ranking as separable functionality in the specification of embodiments of the present invention, we also contemplate embodiments in which said functionality may be combined, and which, for example, may use e.g. ranking to perform "filtering" as described above (e.g., by limiting a number results returned, or other techniques), with or without the use of separate filtering. More generally, as we disclose in reference to FIG. 22, we recognize hierarchical aggregation 2201, ranking 2202, and filtering 2203 as functionality that stems from an underlying data organization (such as provided in embodiments we disclose in reference to FIG. 21 and FIG. 54), and which can be used in combination or separately to perform various complementary and overlapping functions advantageously, in a relevance management system 1140.

We begin by illustrating several counterintuitive and disadvantageous results that may arise from using combined filtering and ranking, and how the use of separable filtering and ranking may overcome such issues.

FIG. 62 (A-C) generally depict exemplar customer descriptors, in accordance with an exemplary embodiment of the invention.

FIG. 62A illustrates a PD Customer Example ("PCE"), which we refer to as PCE1, and which corresponds to a customer descriptor 3214 previously illustrated in FIG. 32. As we disclose in reference to a selection 2641 in FIG. 26 and FIG. 27, darkened lines and darkened circles in PCE1 illustrate that the PD work was performed for a customer that was of type Government, Federal within Government, for USDA, and specifically for the FSA agency (which is within USDA).

FIG. 62B illustrates an RFP Customer Example ("RCE"), which we refer to as RCE1, and which corresponds to a customer descriptor 3014 previously illustrated in FIG. 30. As we disclose in reference to a selection 3141 in FIG. 31, darkened lines and darkened circles in RCE1 illustrate that the RFP work will be performed for a customer that is of type Government, Federal within Government, for USDA, and specifically for the RMA agency (which is within USDA).

FIG. 62C illustrates an intersection of PCE1 with RCE1, which we refer to as INT1, which is the portion of a customer descriptor where the darkened lines and darkened circles of PCE1 and RCE1 overlap (i.e., intersect). Because PCE1 and RCE1 represent root-originated paths within a tree, in this example, the intersection identifies "USDA" as the nearest common ancestor for PCE1 and RCE1. Intuitively, the most-specific customer that both PCE1 and RCE1 have "in common" is USDA, since both projects were performed for this agency (USDA, of the Federal government). Counting the number of darkened nodes in the "requirement" RCE1, we find five. Similarly counting the number of darkened nodes in INT1, we find four. As a result, we may say in this example that the relevance of PCE1 to RCE1, as determined by INT1, equals four divided by five, or 0.8 (alternatively, 80%). Intuitively, this makes sense— the PCE1 customer was "pretty similar" to the RCE1 customer, as both customers are within the same department (namely the department USDA, in this case).

FIG. 63 (A-D) generally depict exemplar customer descriptors, in accordance with an exemplary embodiment of the invention, which disclose counterintuitive and disadvantageous results that may arise from using combined filtering and ranking.

Figure 63A:
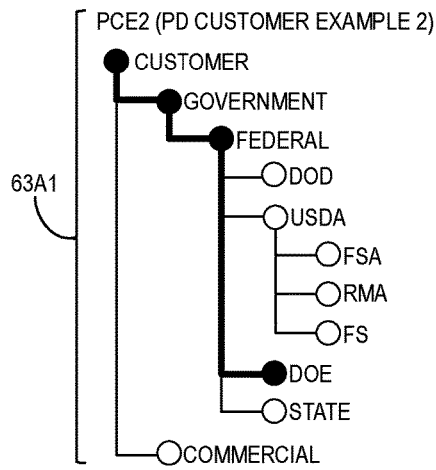
FIG. 63A depicts PD customer example 2 (PCE2), in accordance with an exemplary embodiment of the invention.
Figure 63B:
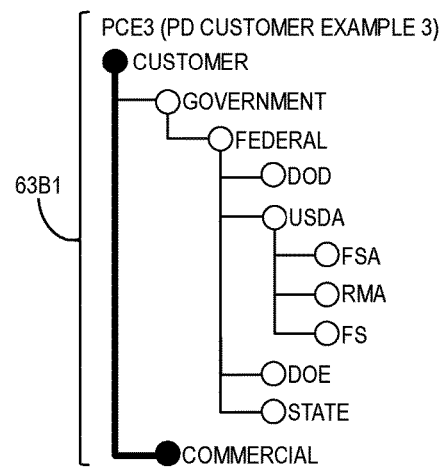
FIG. 63B depicts PD customer example 3 (PCE3), in accordance with an exemplary embodiment of the invention.

FIG. 63A through FIG. 63D extend the example in FIG. 62 further; in FIG. 63A we see that a PD customer example PCE2 is Department of Energy (DOE), also part of the Federal Government, and in FIG. 63B we see that a PD customer example PCE3 is a commercial customer (and thus e.g. not part of the Federal Government).

Figure 63C:
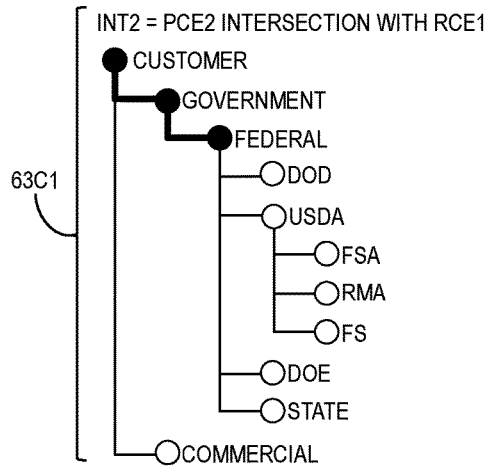
FIG. 63C depicts PCE2 intersection with RCE1 (INT2), in accordance with an exemplary embodiment of the invention.
Figure 63D:
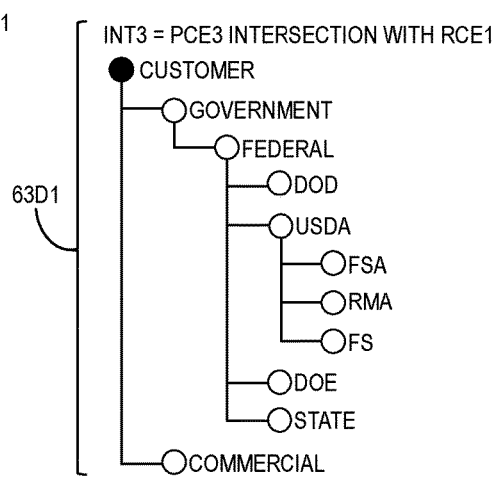
FIG. 63D depicts PCE3 intersection with RCE1 (INT3), in accordance with an exemplary embodiment of the invention.

FIG. 63C illustrates an intersection of PCE2 with the (same) RFP customer requirement RCE1, which may produce in this example a relevance value of three divided by five, or 0.6 (60%); and FIG. 63D illustrates the intersection of PCE3 again with the (same) RFP customer requirement RCE1, producing a relevance value of one divided by five, or 0.2 (20%). Once again, such relevance values seem intuitive and reasonable; a PCE2 relevance of 60% is not quite as high as that of PCE1 (at 80%), since PCE2 and RCE1 had "only" Federal as a nearest common customer (no greater similarity). Similarly, a PCE3 relevance of 20% is the lowest of the three, having only the generic entity "Customer" in common with RCE1.

We disclose that at this point in the example, all of the relevance computed values seem reasonable and intuitive, and indeed if we were to rank these three PDs strictly on "customer relevance" by such a computed relevance measure, a ranking order of PCE1, PCE2, and PCE3 appears correct (based on relevance values of 80%, 60%, and 20%, respectively).

However, we disclose that if we consider the RCE1 customer example as a filter, using it as a strict requirement to select PDs whose customer exactly "matches" that of RCE1, we encounter an issue: neither PCE1, PCE2, or PCE3 would be selected because none of their customer descriptors are an exact match. For example, if we use RCE1 as a filter to select those PDs whose customer was also "Government, Federal, USDA, and RMA", we find no such PDs. Clearly, we need to "broaden" the filter based on RFP customer requirements, to allow PDs that are "matches" (or perhaps, near matches) through.

FIG. 64 (A-C) generally depict exemplar customer descriptors, in accordance with an exemplary embodiment of the invention, which further disclose counterintuitive and disadvantageous results that may arise from using combined filtering and ranking, and disclose insights on how the use of separable filtering and ranking may overcome such issues.

Figure 64A:
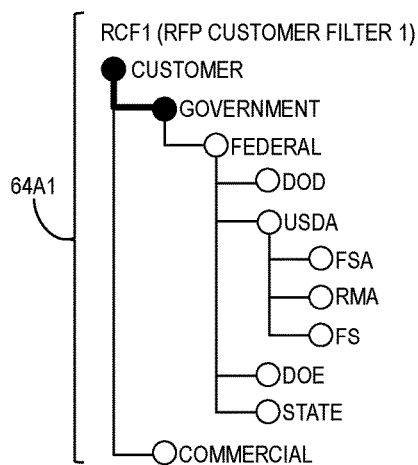
FIG. 64A depicts RFP customer filter 1 (RCF1), in accordance with an exemplary embodiment of the invention.

FIG. 64A discloses an RFP customer "filter" that may be used to identify (i.e., select) PDs having a specific type of customer. Here the RFP customer filter ("RCF") RCF1 discloses a filter to select any PD whose customer is "Government"; intuitively, if we apply such a filter to select from the set of three PDs in our example, whose customer descriptors are PCE1, PCE2, and PCE3 (Ref. FIG. 62A, FIG. 63A, and FIG. 63B, respectively), only two PDs will be selected, namely PCE1 and PCE2, as both of these customer descriptors included "Government". (PCE3 will not be selected, as its customer descriptor does not include "Government".)

Figure 64B:
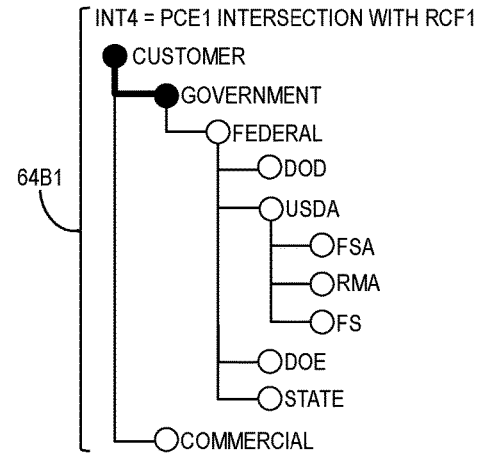
FIG. 64B depicts PCE1 intersection with RCF1 (INT4), in accordance with an exemplary embodiment of the invention.
Figure 64C:
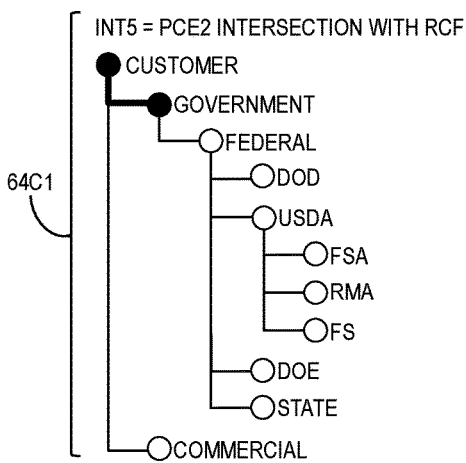
FIG. 64C depicts PCE2 intersection with RCF1 (INT5), in accordance with an exemplary embodiment of the invention.

FIG. 64B discloses INT4, an intersection of RCF1 and PCE1, which contains two darkened nodes; similarly, FIG. 64C discloses INT5, an intersection of RCF1 and PCE2, which also contains two darkened nodes. If we compute the relevance of PCE1 to RCF1, both of which have two darkened nodes, as before using INT4, the result is two divided by two, or 1.0 (100%); and similarly, the relevance of PCE2 to RCF1 is also computed using INT5 as two divided by two, or 1.0 (100%). Previously, these relevance values for PCE1 and PCE2 had been 80% and 60%, respectively, indicating that PCE1 seemed a "better match" than PCE2 for the customer RFP requirements; in contrast, the values just computed (i.e., 100% and 100%) would seem to indicate that PCE1 and PCE2 are both now equally "good matches" for the customer RFP requirements.

We disclose that if we instead alter our computation for relevance and use as a denominator a value of five (representing the number of darkened nodes in the original RFP requirement RCE1), the resulting relevance values for INT4 (Ref. FIG. 64B) an INT5 (Ref. FIG. 64C) are both two divided by five, or 0.4 (40%). Here again, the previously different relevance values for PCE1 and PCE2 (80% and 60%, respectively) are now represented by the same value (namely, 40% and 40%, respectively) and again both PCE1 and PCE2 now appear equally "good matches" for the customer RFP requirement.

In either case, it appears that as we have broadened our filtering, we have lost a level of "fidelity" in determining relevance, which may be used for ranking. We recognize that the RCF1 filter may in fact be of value in determining ranking, if that is what an end user intends—for example, if an end user wishes to use the RCF1 filter to indicate that "a PD performed for any Government customer is equally relevant", then the equivalent relevance values computed for PCE1 an PCE2 of e.g. 100% (or alternatively, both 40%) are indeed proper relevance ranking values. However, if an end user instead wishes to restrict the selected PDs to only those with a "Government" customer, but also to rank the selected customers by closeness of match to the original requirements (e.g., "Government, Federal, USDA, and RMA"), the use of a combined (i.e., single) set of criteria for both filtering and ranking may give low-fidelity results, with projects whose customers are (intuitively) better matches not being ranked more favorably.

Figures 65, 66:
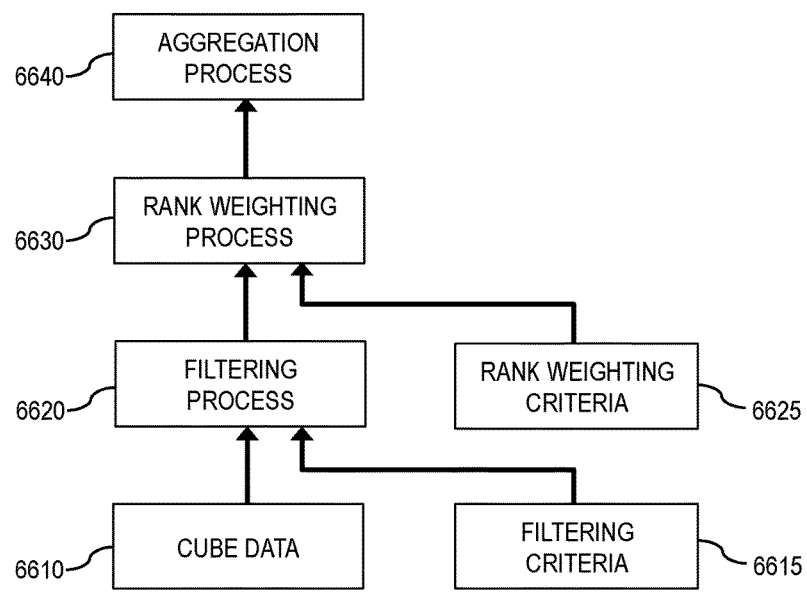
FIG. 65 is a summary of the effect of RFP criteria hierarchy on filtering and ranking processes, in accordance with an exemplary embodiment of the invention.
FIG. 66 is a structure for filtering and ranking processes and criteria, in accordance with an exemplary embodiment of the invention.

FIG. 65 generally depict a summary of the effect of RFP criteria hierarchy on filtering and ranking processes, in accordance with an exemplary embodiment of the invention. We disclose in reference to FIG. 65 a summary of the unexpected results illustrated in the previous examples; here we consider the two process steps (filtering and ranking), and the effect of the depth of the RFP criteria hierarchy, where e.g. RCE1 (Ref. FIG. 62B) illustrates a "deep" RFP criteria hierarchy and RCF1 (Ref. FIG. 64A) illustrates a "shallow" RFP criteria hierarchy, as relative to RCE1 (Ref. FIG. 62B). Intuitively, we disclose that it may be advantageous when filtering to use a shallow RFP criteria hierarchy, to broaden a search and let a relevance management system 1140 select and present to an end user a larger number of potentially relevant projects. However, as we saw in reference to FIG. 64B and FIG. 64C, the ranking values that resulted from using such shallow RFP criteria hierarchy had low fidelity, and thus may perform poorly. To improve ranking fidelity, we disclose that a deep RFP hierarchy resulted in the intuitively correct rankings of PCE1, PCE2, and PCE3 (at 80%, 60%, and 20%, respectively), and thus may perform better.

FIG. 66 generally depict a structure for filtering and ranking processes and criteria, in accordance with an exemplary embodiment of the invention. Drawing insight from the summary depicted in FIG. 65, we disclose that rather than combining filtering and ranking processes, or requiring they use the same RFP criteria hierarchies (i.e., both use a shallow hierarchy, or both use a deep hierarchy), we may provide separable and complementary filtering 6620 and ranking 6630 processes, as illustrated in FIG. 66, which may use separate filtering 6615 and rank 6625 weighting criteria, respectively. Such separation may enable a relevance management system 1140 to select, from a relevance cube 2070, cube data 6610 that may be filtered 6620 using a set of filtering criteria 6615, and ranked 6630 using a second set of rank weighting criteria 6625, with the results then aggregated 6640, such as for presentation to an user. As a result of a structure such as we disclose in reference to FIG. 66, we may provide full support for filtering (ranging from broad to narrow) while simultaneously providing support for high-fidelity ranking. We further disclose that such functionality may be applied generally; for example, separable and complementary filtering and ranking may be supported across any element of a Project Descriptor (e.g., Level 4 in FIG. 21), not simply "customer" descriptor as used here as an exemplar.

Representing and Computing Descriptor Overlays

In FIG. 67, FIG. 71, FIG. 74, FIG. 76, and FIG. 78 we present pseudo code for embodiments of procedures that may provide functionality to transform data in a relevance management system 1140 to support filtering or ranking. Those skilled in the art will recognize that as data is transformed and processed by a relevance management system 1140, such as during ETL processing, capability determination processing, and RFP relevance determination processing (Ref 2060, 2080, and 2085 in FIG. 20), that various ways of representing and structuring said data may be beneficial to facilitate transformations or processing. In order to clarify presentation of the procedures for filtering and ranking, it may be advantageous to represent Level 4 hierarchical or other such descriptors, such as represent exemplars customer, contract type, security classification, line of business, special business classification, or relevant achievement 2102 as map data structures.

Figures 67, 68:
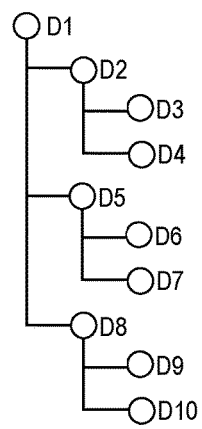
FIG. 67 is procedure Create_Descriptor_Map( ), in accordance with an exemplary embodiment of the invention.
FIG. 68 depicts an exemplar generalized descriptor, in accordance with an exemplary embodiment of the invention.

FIG. 67 generally depicts pseudo-code for a procedure Create_Descriptor_Map( ) that we disclose, in accordance with an exemplary embodiment of the invention, that a relevance management system 1140 may use to create a map from a descriptor.

FIG. 68 generally depicts an exemplar generalized descriptor, in accordance with an exemplary embodiment of the invention, which contains ten nodes, D1 through D10.

FIG. 69 (A-B) generally depict exemplar PD descriptors, in accordance with an exemplary embodiment of the invention, that are based on an exemplar generalized descriptor as we disclose in reference to FIG. 68.

Figure 69A:
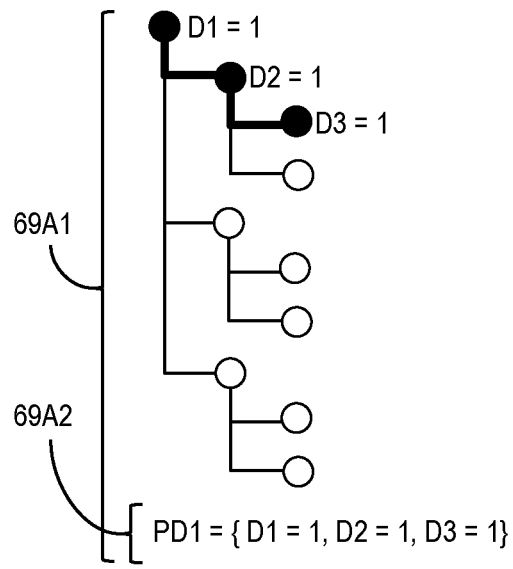
FIG. 69A depicts descriptor example PD1, in accordance with an exemplary embodiment of the invention.
Figure 69B:
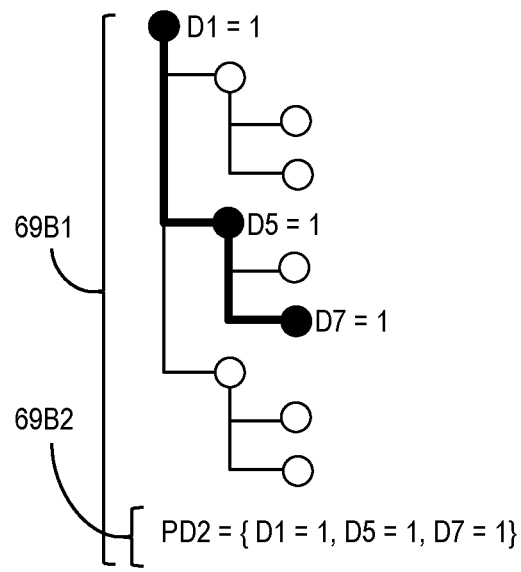
FIG. 69B depicts Descriptor example PD2, in accordance with an exemplary embodiment of the invention.

We disclose the operation and functionality procedure of a procedure Create_Descriptor_Map( ) as depicted in FIG. 67. Using the generalized descriptor we disclose in reference to FIG. 68 as a reference, we disclose in reference to FIG. 69A an example descriptor instance that we refer to as PD1, which contains three nodes D1, D2, and D3, represented by three darkened circles. (The descriptor in FIG. 69A is meant to be a generalized version of descriptors such as FIG. 62A, FIG. 62B, FIG. 62C, and so on.) We disclose that if we provide the project descriptor depicted in FIG. 69A as input Desc to the procedure Create_Discriptor_Map( ) depicted in FIG. 67, said procedure begins by creating an empty map instance M. Then, using a depth first traversal of the nodes in descriptor Desc, said procedure sequentially adds to map M the entries D1=1, D2=1, and D3=1, where the D1, D2, and D3 represent keys in the Map, and the values assigned to each (each having the same value of 1, in this exemplary case) are the corresponding values in the noted key/value pairs. Our example and pseudo-code use a value of "1" to indicate the presence of a node; we anticipate additional embodiments that indicate node presence in alternative ways. The output map 69A2 produced by Create_Descriptor_Map( ) for the descriptor in this example is shown in FIG. 69, and corresponds to the map PD1, which we denote as PD1={D1=1, D2=1, D3=1}. We can use procedure Create_Descriptor_Map( ) to process the project descriptor in FIG. 69B, which we refer to as PD2, to produce an analogous map, PD2={D1=1, D5=1, and D7=1}. In anticipation of their use below, we have purposely named PD1 and PD2 to include "PD" in their name, for we will use them to represent components of a PD.

Figure 70A:
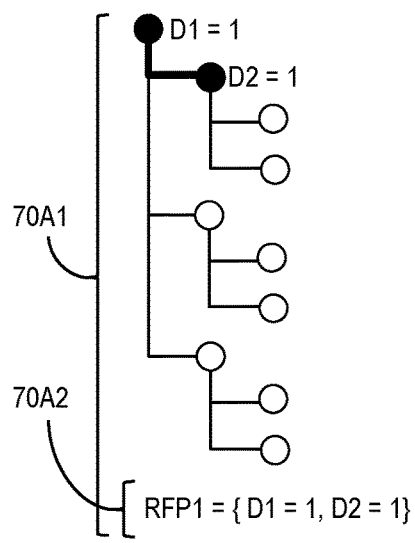
FIG. 70A depicts Descriptor example RFP1, in accordance with an exemplary embodiment of the invention.
Figure 70B:
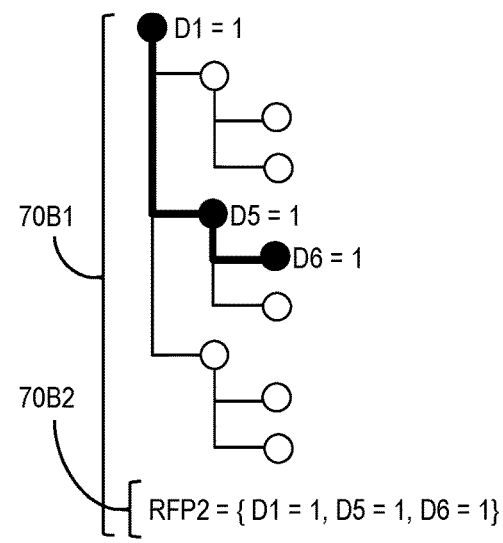
FIG. 70B depicts Descriptor example RFP2, in accordance with an exemplary embodiment of the invention.
Figure 70C:
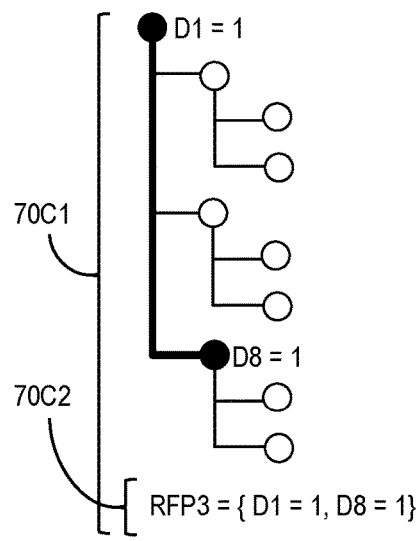
FIG. 70C depicts Descriptor example RFP3, in accordance with an exemplary embodiment of the invention.

Further regarding procedure Create_Descriptor_Map( ) as depicted in FIG. 67, we disclose that in a manner similar to that illustrated for FIG. 69A and FIG. 69B, we may use said procedure to process the "RFP" descriptor components shown in FIG. 70A, FIG. 70B, and FIG. 70C, to produce the following three map outputs: RFP1={D1=1, D2=1}, RFP2={D1=1, D5=1, D6=1}, and RFP3={D1=1, D8=1}.

Regarding an alternative embodiment of procedure Create_Descriptor_Map( ) as depicted in FIG. 67, in a tag-based alternative embodiment, such as we disclose below in reference to FIG. 121A and FIG. 121B, such transformation to a map format may be performed in a variety of way, including but not limited to an analogous but alternative embodiment of procedure Create_Descriptor_Map( ) (Ref. FIG. 67) that may enumerate the tag nodes in a set comprising a tag-based embodiment, identifying as L the label associated with each enumerated tag node, and analogously adding to M the key/value pair L, "1" for each said enumerated element, in this example.

FIG. 71 generally depicts pseudo-code for a procedure Overlay_Descriptors( ) that we disclose, in accordance with an exemplary embodiment of the invention, that a relevance management system 1140 may use to "overlay" a first descriptor onto a second descriptor. We disclose that said procedure takes three arguments: a first argument Desc1 represents a descriptor in map format; a second argument Desc2 represents a descriptor also in map format; and a variable named And_Or_Flag that may take the values of "AND" or "OR". Intuitively, procedure Overlay_Descriptor( ) produces as output a new descriptor M (also in map format) that represents the union of Desc1 and Desc2 (i.e., the overlay of Desc2 onto Desc1), with two cases, "additive" as indicated by an "AND" flag, and "non-additive" as indicated by an "OR" flag. Intuitively, we disclose that the additive case may be thought of as applying an addition operation for nodes, whereas the non-additive case may be thought of as applying a logical-OR operation for nodes. Further, regarding the use of the "AND" or "OR" flag when combining (i.e., overlaying) descriptors, we disclose that the "AND" case may be useful for representing a case where a condition in both descriptor components must be satisfied to constitute a match, and the "OR" case useful where a condition in either descriptor may be satisfied to constitute a match.

FIG. 72 (A-B) generally depict exemplar execution of procedure Overlay_Descriptors( ) depicted in FIG. 71, in accordance with an exemplary embodiment of the invention, using PD1 and PD2 as inputs, with "AND" and "OR" as inputs.

Figure 72A:
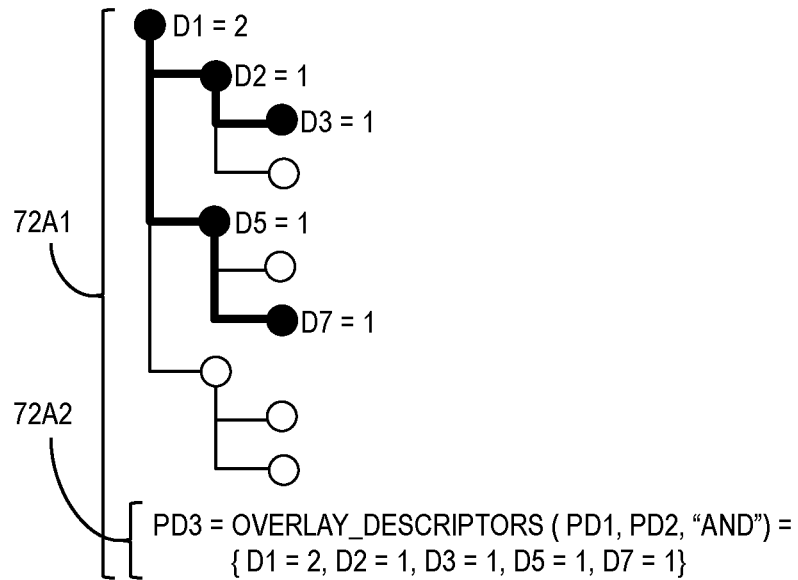
FIG. 72A depicts an exemplar execution of procedure Overlay_Descriptors( ) using PD1, PD2, and "AND" inputs, in accordance with an exemplary embodiment of the invention.
Figure 72B:
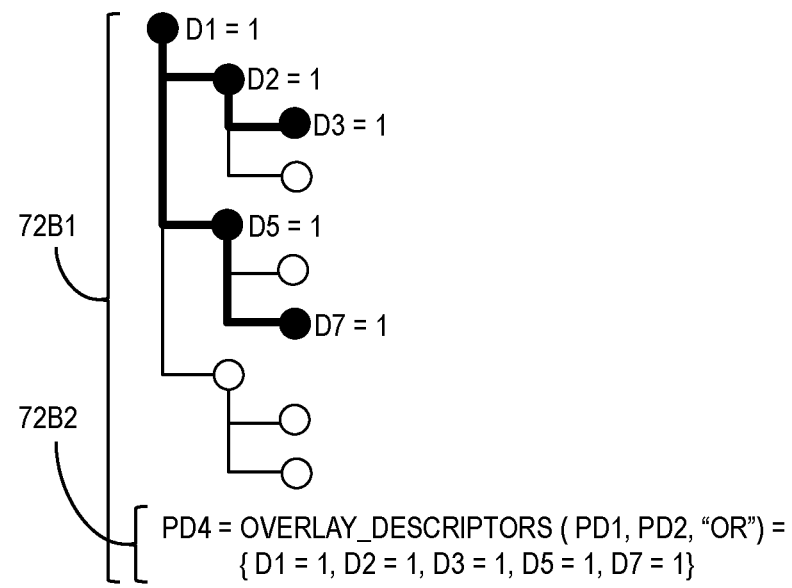
FIG. 72B depicts an exemplar execution of procedure Overlay_Descriptors( ) using PD1, PD2, and "OR" inputs, in accordance with an exemplary embodiment of the invention.

FIG. 72A discloses the operation of procedure Overlay_Descriptors( ) such as when applied to the PD1 and PD2 instances (Ref. FIG. 69A and FIG. 69B, respectively) with an "AND" flag. In this example, we disclose that the node that overlapped in PD1 and PD2 (i.e., the node D1) has a value of D1=2 in the final resulting map for PD3 72A2, while D2, D3, D5, and D7 each have a value of 1. FIG. 72B discloses the operation of procedure Overlay_Descriptors( ) with the same inputs PD1 and PD2, but with the "OR" flag; in the final resulting map for PD4, all entries D1, D2, D3, D5, and D7 have a value of 1.

FIG. 73 (A-B) generally depict exemplar execution of procedure Overlay_Descriptors( ) depicted in FIG. 71, in accordance with an exemplary embodiment of the invention, using RFP1, RFP2, and RFP3 as inputs, with "AND" and "OR" as inputs.

Figure 73A:
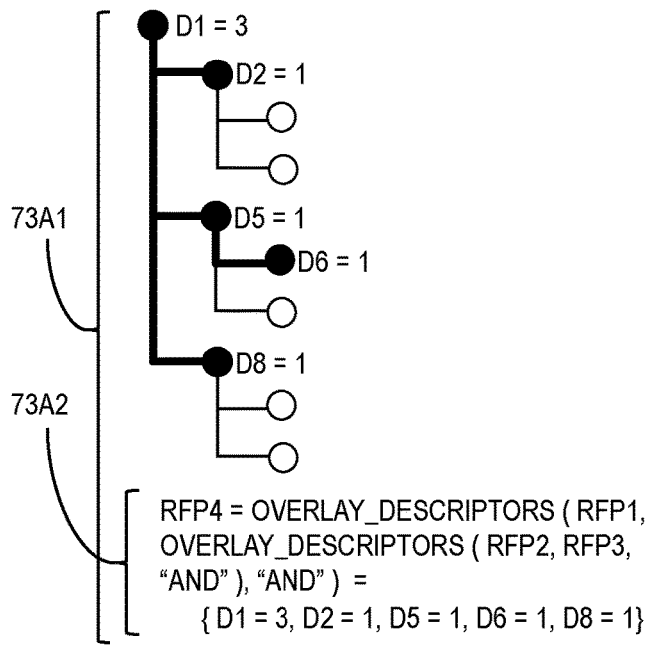
FIG. 73A depicts an exemplar execution of procedure Overlay_Descriptors( ) using RFP1, RFP2, RFP3, and "AND" inputs, in accordance with an exemplary embodiment of the invention.
Figure 73B:
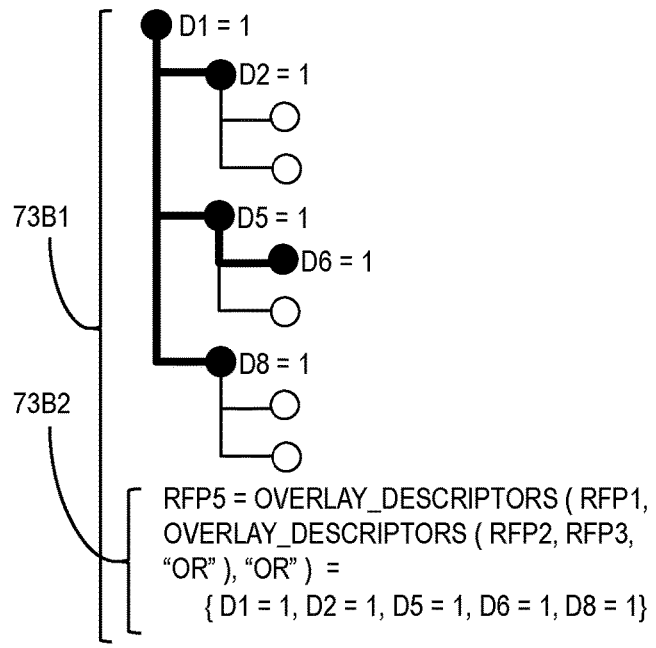
FIG. 73B depicts an exemplar execution of procedure Overlay_Descriptors( ) using RFP1, RFP2, RFP3, and "OR" inputs, in accordance with an exemplary embodiment of the invention.

FIG. 73A discloses analogous operation of a procedure Overlay_Descriptors( ) when applied to the RFP1, RFP2, and RFP3 instances (Ref. FIG. 70A, FIG. 70B, and FIG. 70C, respectively), also using an "AND" flag. In this example, we disclose that we first compute the result for Overlay_Descriptors( ) with inputs RFP2 and RFP3, the result of which is passed as an argument to a second invocation of Overlay_Descriptors( ) along with the argument RFP1 and an instance of an "AND" flag. As expected, we disclose that the single node D1 that is common to all three RFP descriptors (RFP1, RFP2, and RFP3) is assigned a value of D1=3 in the final resulting map for RFP4. FIG. 73B discloses the operation of a procedure Overlay_Descriptors( ) with the same inputs RFP1, RFP2, and RFP3, but with an "OR" flag; in the final resulting map for RFP5, all entries D1, D2, D5, D6, and D8 have a value of 1.

Computing Descriptor Intersection

Figures 74, 75:
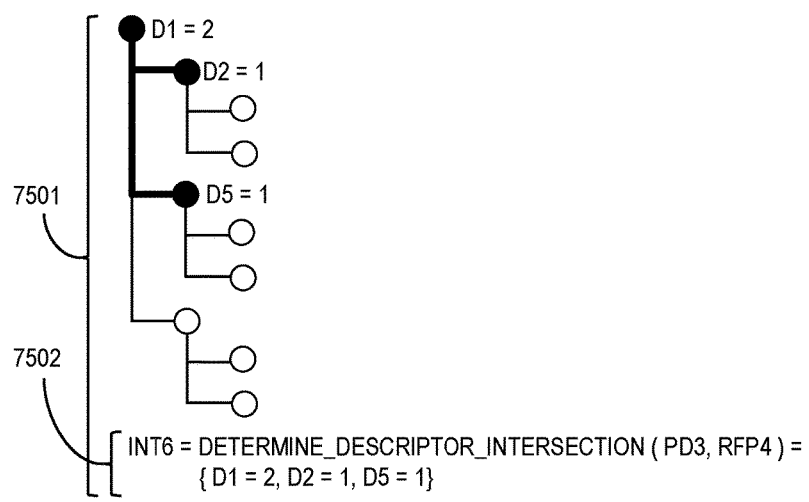
FIG. 74 is procedure Determine_Descriptor_Intersection( ), in accordance with an exemplary embodiment of the invention.
FIG. 75 depicts an exemplar execution of procedure Determine_Descriptor_Intersection( ) using PD3 and RFP4 inputs, in accordance with an exemplary embodiment of the invention.

FIG. 74 generally depicts pseudo-code for a procedure Determine_Descriptor_Intersection( ) that we disclose, in accordance with an exemplary embodiment of the invention, which provides functionality a relevance management system 1140 may use to create a map that represents a degree of match (i.e., intersection between) between two descriptor instances in map format, which may be provided to said procedure as inputs named Desc1 and Desc2. Said procedure first creates an enumeration of the keys in input Desc2 (which will be used for iteration), and an empty map M that will be used to represent intersection results. Said procedure next iterates through the Desc2 key enumeration, identifying those keys that have corresponding entries in map Desc1 (i.e., intersect with Desc1). We disclose that to determine the degree of intersection, said procedure determines the minimum of the values of Desc1 and Desc2 for the given key, and adds the resulting key/value pair to the map M.

FIG. 75 generally depicts an exemplar execution of procedure Determine_Descriptor_Intersection( ) depicted in FIG. 74, in accordance with an exemplary embodiment of the invention, using PD3 and RFP4 as inputs. The operation of said procedure is illustrated by a call to said procedure with two arguments, a first being PD3 72A2 and a second being RFP4 73A2, which produces as output INT6 7502. Intuitively, this intersection as illustrated in FIG. 75 represents the degree of commonality between the PD instance (PD3) and the RFP instance (RFP4). We disclose that a descriptor intersection map, such as produced by procedure Determine_Descriptor_Intersection( ) depicted in FIG. 74, and illustrated by an exemplar result in FIG. 75, may be used to compute further items that may be used in subsequent ranking and filtering, which we disclose next.

Computing Weighted Relevance

FIG. 76 generally depicts pseudo-code for a procedure Compute_Weighted_Relevance_Value( ) that we disclose, in accordance with an exemplary embodiment of the invention, which provides functionality to compute a weighted relevance value for an intersection descriptor map. Said procedure may take as input three arguments: a descriptor intersection map M, such as produced by Determine_Descriptor_Intersection( ) (Ref. FIG. 74); the descriptor map Desc2 that was used as a second argument to Determine_Descriptor_Intersection( ) that produced said map M; and a weighting map W, which contains relative weightings to be applied to Desc2 elements when computing a weighted relevance value.

FIG. 77 generally depicts an exemplar weighting map, in accordance with an exemplary embodiment of the invention, which may be used as input to procedure Compute_Weighted_Relevance( ) depicted in FIG. 76.

To facilitate explanation of procedure Compute_Weighted_Relevance_Value( ) depicted in FIG. 76, we use as input arguments to said procedure a descriptor intersection map INT6 depicted in FIG. 75 as the first argument M, a descriptor RFP4 depicted in FIG. 73A as a second argument Desc2, and a weighting map 7701 depicted in FIG. 77 as a third argument W. Intuitively, we disclose that said procedure computes two sums, Sum1 and Sum2, and then the value of Sum1 divided by Sum2, which said procedure returns as its result. Sum1 represents a sum of the values of the nodes in the intersection map M, where each value in said sum is weighted by its corresponding entry in map W 7701; thus Sum1 represents the weighted sum of the "match" represented by a descriptor intersection map M. We disclose that Sum2 may be computed in an analogous way, as the sum of the values of the nodes of Desc2 descriptor (which represents the RFP requirements), where each value in said sum is also weighted by its corresponding entry in map W 7701; thus Sum2 represents the weighted sum of the "RFP requirements" represented by a descriptor map Desc2. In this example, Sum1 is computed (using a value 7502 from FIG. 75 and a value 7701 from FIG. 77) as 2 times 1.0 (for enumeration element D1), plus 1 times 1.0 (for D2), plus 1 times 1.0 (for D5), which equals 4.0. Similarly, Sum2 is computed (using a value 73A2 from FIG. 73 and a value 7701 from FIG. 77) as 3 times 1.0 (for D1), plus 1 times 1.0 (for D2), plus 1 times 1.0 (for D5), plus 1 times 1.0 (for D6), plus 1 times 1.0 (for D8), which equals 7.0. Dividing Sum1 by Sum2 results in 4.0/7.0, or approximately 0.57 (57%) for a weighted value, which the procedure returns. Intuitively, the procedure has rated PD3 as being 57% similar (or having a match value of 57%) with respect to RFP4.

Regarding the functionality and operation of procedure Compute_Weighted_Relevance_Value( ) as depicted in FIG. 76, said procedure discloses the use of a linear, weighted sums to compute Sum1 and Sum2, and computing a returned relevance value as a fraction (e.g., percentage) of Sum1 with respect to Sum2 (i.e., Sum1 divided by Sum2). We disclose that such a relatively simple and intuitive computation represents just one of many embodiments we contemplate for computing a weighted relevance value of project descriptor instances (e.g., PDs and RFPs). We contemplate alternative embodiments of Compute_Weighted_Relevance_Value( ) in which summations are not necessarily linear (e.g., node weights may be adjusted by linear or non-linear functions, such as distance or distance-squared from root node), and a relevance value may be computed by functions other than division (e.g. other than Sum1 divided by Sum2). Those skilled in the art will recognize the large degree of flexibility inherent in computing relevance of one descriptor to another, and that the overlay, intersection, summation and division techniques that we disclose in reference to FIG. 71, FIG. 74, and FIG. 76 may be modified and adjusted, and that such embodiments are intended to be within the scope of the present invention.

Creating Filter Tables

FIG. 78 generally depicts pseudo-code for a procedure Create_Filter_Table_From_Map( ) that we disclose, in accordance with an exemplary embodiment of the invention, which provides functionality to create filter tables. Said procedure may be used by a relevance management system 1140 to create a tabular structure for filtering based on a descriptor intersection map, which may be used during ETL processing 2060. Said procedure takes as input two arguments, a descriptor intersection map M, such as produced by Determine_Descriptor_Intersection( ) (Ref. FIG. 74), and a descriptor map Desc2 that was used as a second argument to Determine_Descriptor_Intersection( ) that produced said map M.

FIG. 79 generally depicts an exemplar execution of procedure Create_Filter_Table_From_Map( ), in accordance with an exemplary embodiment of the invention, using as input the descriptor intersection map INT6 input as depicted in FIG. 75. Procedure Create_Filter_Table_From_Map( ), as depicted in FIG. 78, begins by creating a new table T whose columns are labeled with the keys of Desc2. This is illustrated in FIG. 79, in which we use as input M the descriptor intersection map INT6 7502, and the descriptor map Desc2 that corresponds to RFP4 73A2. The headings 7910 in the table are thus D1, D2, D5, D6, and D8, which correspond to the keys of RFP4 73A2. Said procedure next creates an enumeration of the keys in Desc2 for iteration, which said procedure uses to test for presence in the descriptor intersection map M. Intuitively, said procedure is determining whether, for each column entry in the table 7910, the intersection map contains a corresponding value. If Map M contains a value for the indicated key, that value is added to the table in the corresponding column. For example, on the iteration for key D1, the procedure determines that map M 7502 indeed contains an entry for D1, whose value is 2, and updates column D1 in the table 7901 with a value of 2. The remaining columns in the table 7910 may be populated in a similar manner. At the conclusion of processing, procedure Create_Filter_Table_From_Map( ), as depicted in FIG. 78, returns an updated table T, whose column headings correspond to keys of the Desc2 input, and whose values under said headings contain the corresponding values (if they exist) from descriptor intersection map M.

Regarding further functionality as disclosed in reference to FIG. 79, rows in a table such as depicted in FIG. 79 may be concatenated with their corresponding entries in a relevance cube 2070, to enable filtering by e.g. columns. Using as an example the data illustrated in FIG. 79, a relevance management system 1140 may use such a filter table to select rows, for example, in which column D1 contains a non-zero value (which is true, here). Intuitively, columns in a filter table enable us to specify criteria (e.g., D1 must be non-zero, or D6 must be non-zero, and so on) to determine whether a corresponding PD associated with such filter (here, PD3 FIG. 72A) matches said criteria, and should be selected for inclusion in a results set. (Examining PD3 in FIG. 72A, if an end user specifies that D1 must be non-zero, PD3 would be selected for inclusion; alternatively, if an end user specifies that D6 must be non-zero, PD3 would not be selected.)

Entering Multiple Overlapping Descriptors

Figure 80:
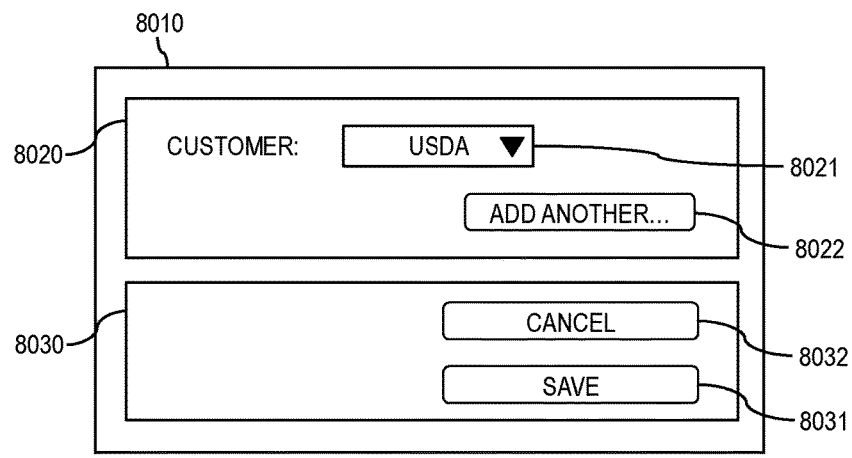
FIG. 80 is a mock-up of a multiple-entry interface for entering multiple overlapping descriptors, in accordance with an exemplary embodiment of the invention.

FIG. 80 generally depicts a multiple-entry interface 8010, in accordance with an exemplary embodiment of the invention, which may be used for entering multiple overlapping descriptors.

Figure 81:
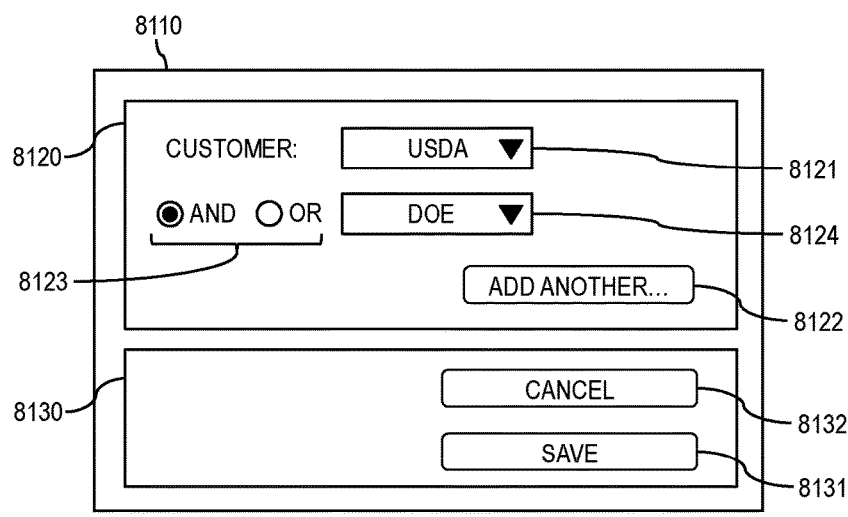
FIG. 81 depicts an exemplary execution of a multiple-entry interface, in accordance with an exemplary embodiment of the invention.

FIG. 81 generally depicts a multiple-entry interface 8110 during exemplary execution, in accordance with an exemplary embodiment of the invention.

FIG. 82 (A-C) generally depict exemplar customer descriptors and an exemplar execution of procedure Overlay_Descriptors( ) depicted in FIG. 71, in accordance with an exemplary embodiment of the invention, using as input said exemplar customer descriptors, and an "AND" input.

Figure 82A:
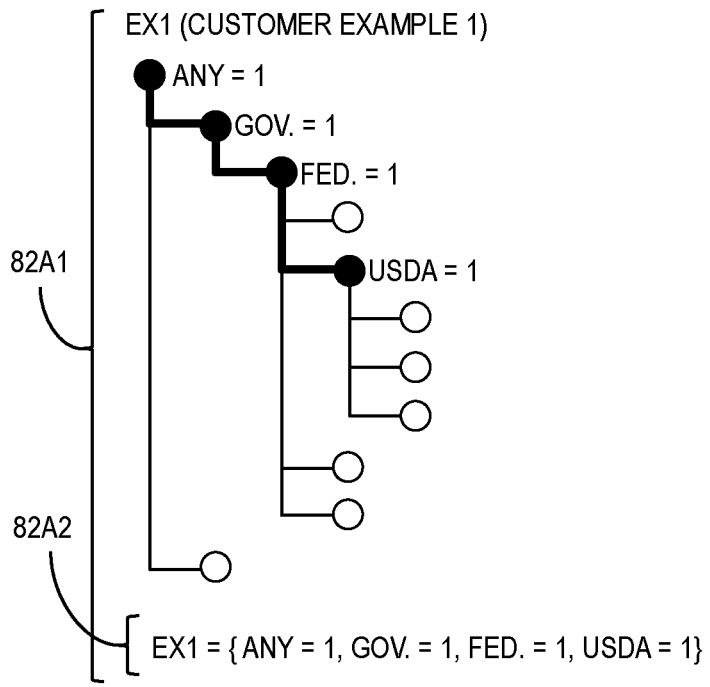
FIG. 82A depicts descriptor customer example 1 (EX1), in accordance with an exemplary embodiment of the invention.
Figure 82B:
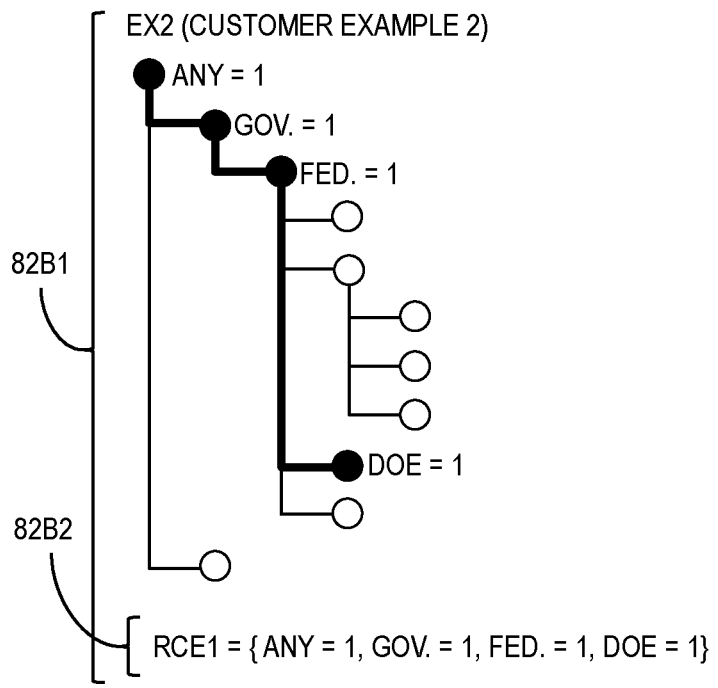
FIG. 82B depicts descriptor customer example 2 (EX2), in accordance with an exemplary embodiment of the invention.
Figure 82C:
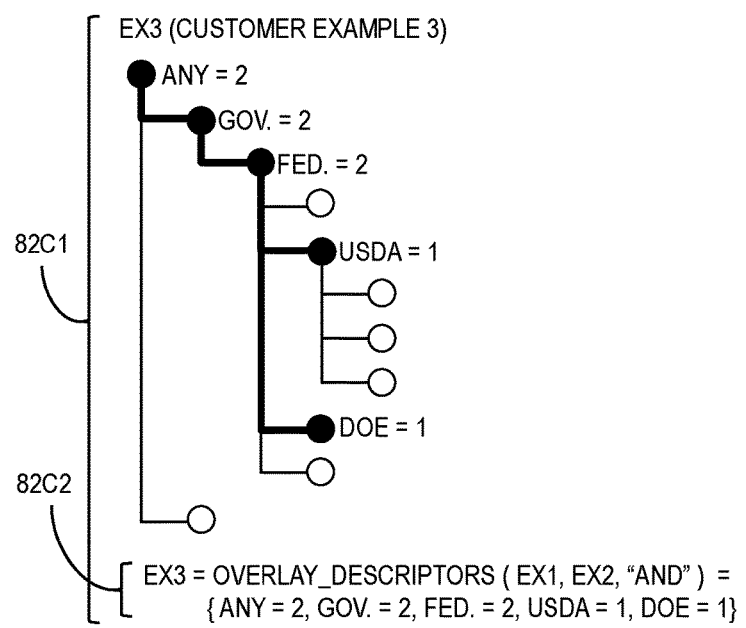
FIG. 82C depicts an exemplar execution of procedure Overlay_Descriptors( ) using EX1, EX2, and "AND" inputs, in accordance with an exemplary embodiment of the invention.

We disclose that various data entry and interface embodiments may provide functionality to support the entry of multiple values (Ref. 2642, 2824, 3142, 9133, and 9227), such as for a given descriptor. When such functionality is exercised, a relevance management system 1140 may present an end user with functionality such as a multiple-entry interface 8010 depicted in FIG. 80, which we illustrate by example for a customer field 8020, which may be associated with a customer descriptor. We can see in FIG. 80 that an end user has made a selection of "USDA" 8021, which corresponds to a descriptor shown in FIG. 82A, and that the end user is also provided a option, such as represented by "Add another . . . " 8022, to add another customer descriptor entry. If functionality such as represented by an "Add another . . . " option 8022 is exercised, a relevance management system 1140 may provide functionality to update the multiple-entry interface 8020, such as illustrated by a multiple-entry interface 8120 in FIG. 81. An end user may be presented with a second data entry element 8124, which may be associated with a first data entry element 8121 by an operator-selection option 8123. Here we can see in FIG. 81 that an end user has made a second selection of "DOE" 8124, which corresponds to a descriptor shown in FIG. 82B, and has selected an "AND" operator 8123, which a relevance management system 1140 may use to construct a resulting composite descriptor as shown in FIG. 82C, as follows. Because an end user indicated an "AND" operation 8123, a relevance management system 1140 exercises procedure Overlay_Descriptors( ) (Ref. FIG. 71) using an "AND" flag. Note that the commonality between a first and a second descriptors (Ref. FIG. 82A and FIG. 82B, respectively), namely the overlap between the ANY, GOV., and FED. nodes, has resulted in the procedure Overlay_Descriptors( ) (Ref. FIG. 71) assigning these three nodes a value of 2 in a resulting composite descriptor (Ref. FIG. 82C), and assigning other nodes a value of 1. An end user may be provided functionality by a relevance management system 1140 to save information (Ref 8031 and 8131) or cancel the operation (Ref. 8032 and 8132), and in either case a relevance management system 1140 may return an end user to an interface from which a multiple-entry interface (Ref. 8010, or 8110) was invoked.

Regarding further functionality we disclose in reference to FIG. 80 and FIG. 81, we disclose that an interface such as shown in FIG. 81 illustrates a relatively simple case in which two or more descriptor components (Ref 8121 and 8122) may be combined with one another, with a selectable operator (such as a selection 8123) between components. We contemplate a broad range of alternative embodiments, including, but not limited to, an embodiment in which an end user may specify more complex operations, such as nesting to enforce operator precedence between aggregate components and negation (i.e., a "NOT" operator), which a relevance management system 1140 may then perform. For example, such alternative embodiments may process user input such as "(FSA OR RMA) AND DOE", and operations that include a "NOT" operator. Those skilled in the art will recognize that alternative embodiments that provide such more-advanced logical operations follow directly from the specification of the present invention, and that such embodiments are intended to be within the scope of the present invention.

Creating Filtering or Ranking Structures

In FIG. 83 through FIG. 86 we return to the extended example, describing in further detail how functionality such as provided by procedure embodiments in FIG. 67, FIG. 71, FIG. 74, FIG. 76, and FIG. 78 may be used by a relevance management system 1140 to transform data in a relevance management system 1140, such as via ETL processing 2060, to support filtering or ranking.

Figure 83A:
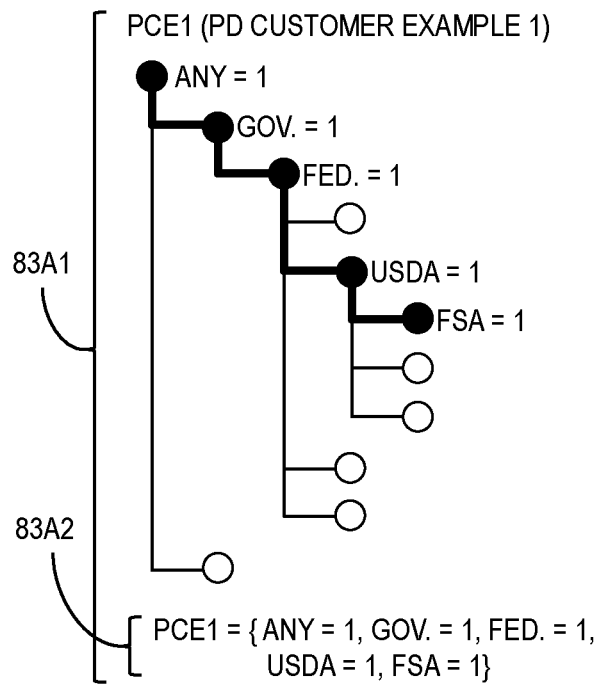
FIG. 83A depicts a PD customer example 1 (PCE1) map representation, in accordance with an exemplary embodiment of the invention.
Figure 83B:
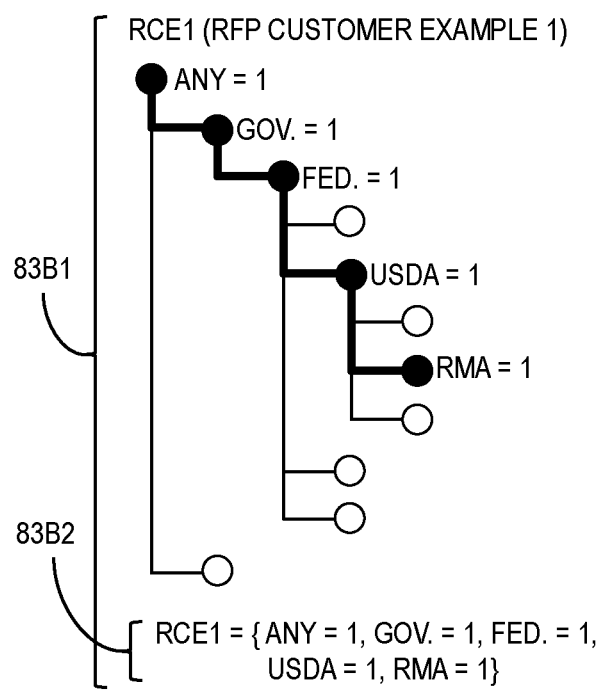
FIG. 83B depicts an RFP customer example 1 (RCE1) map representation, in accordance with an exemplary embodiment of the invention.
Figure 83C:
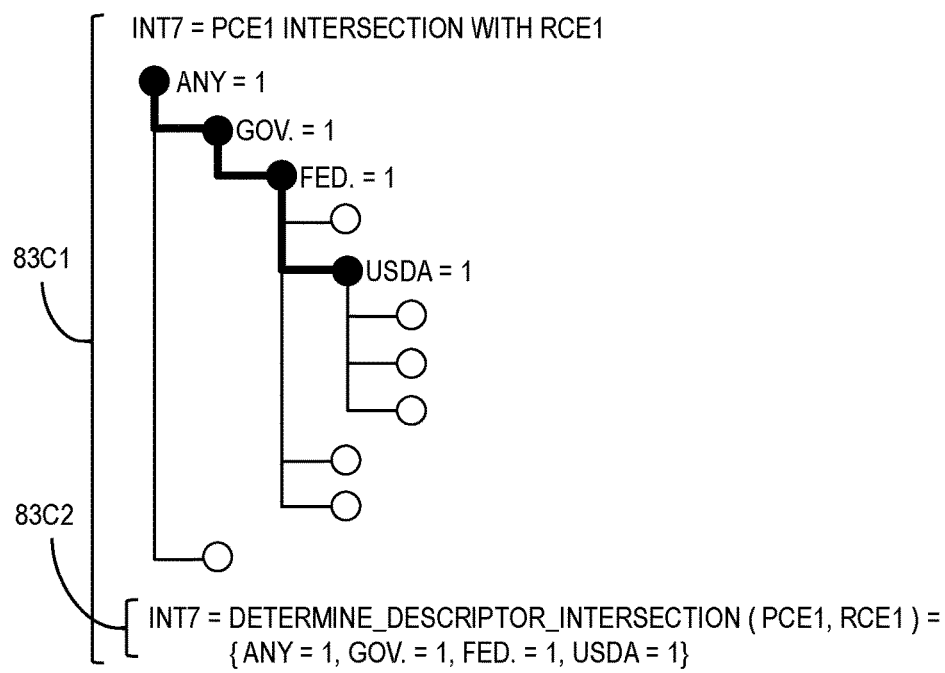
FIG. 83C depicts an exemplar execution of procedure Determine_Descriptor_Intersection( ) using PCE1 and RCE1 inputs as map representations to create INT7, in accordance with an exemplary embodiment of the invention.

FIG. 83 (A-C) generally depict exemplar customer descriptors and an exemplar execution of procedure Determine_Descriptor_Intersection( ) depicted in FIG. 74, in accordance with an exemplary embodiment of the invention, using as input said exemplar customer descriptors. FIG. 83A shows the PD customer descriptor (Ref 2514 and 2710) shown previously in FIG. 25 and FIG. 27, which we refer to here as PCE1. As part of a data transformation that may be performed during ETL processing 2060, labels of descriptor nodes may be updated, for example to facilitate filtering and ranking when a relevance management system 1140 interacts with an end user. As an example, we can see in FIG. 27, that the top-level selection 2711 for a customer descriptor was specified as "N/A" (short for "Not Available") during data entry, which has been replaced by "Any" in FIG. 83A. As we disclose below, a relevance management system 1140 may perform such relabeling, such as of a top-most node in this case, to generate a more user-friendly set of selections; for example, when a user needs to specify criteria to use for e.g. matching customers, a top-level (i.e., broadest) category may now conveniently be labeled "Any". For presentation in the specification of the present invention, we have also updated several other labels with shorter abbreviations; for example, the label "Government" has been shortened to "Gov.", and "Federal" has been shortened to "Fed." FIG. 83B shows the RFP customer descriptor 3214 shown previously in FIG. 32, which we refer to here as RCE1; here too, several of the labels have been updated, analogously to those in FIG. 83A. FIG. 83C illustrates INT7, the intersection of PCE1 and RCE1 (Ref. FIGS. 83A and 83B, respectively) produced by Produce_Descriptor_Intersection( ) (Ref. FIG. 74).

Figure 84:
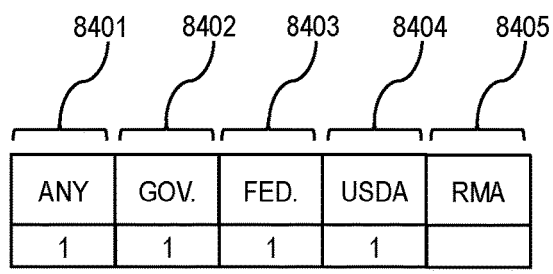
FIG. 84 depicts an exemplar execution of procedure Create_Filter_Table_From_Map( ) using INT7 input, in accordance with an exemplary embodiment of the invention.

FIG. 84 generally depicts an exemplar execution of procedure Create_Filter_Table_From_Map( ) depicted in FIG. 78, in accordance with an exemplary embodiment of the invention. FIG. 84 depicts the result produced by Create_Filter_Table_From_Map( ) (Ref. FIG. 78) when applied to the result INT7 83C2 in FIG. 83C. Intuitively, we can see that the nodes labels from the RFP customer descriptor in FIG. 82B (i.e., Any, Gov., Fed., USDA, and RMA) form the column headings in FIG. 84 (Ref. 8401, 8402, 8403, 8404, and 8405, respectively), and that a non-zero value (such as "1") appears in those columns that correspond to non-zero nodes in the descriptor intersection map in FIG. 83C (Ref. columns 8401, 8402, 8403, and 8404 in FIG. 84, respectively). Thus if we were to select based on a non-zero value for "RMA" using such a filter (Ref. FIG. 84), a relevance management system 1140 would not select PCE1 (Ref. FIG. 83A); whereas if we were to select based on a non-zero value for "Any", "Gov.", "Fed.", or "USDA", a relevance management system 1140 would select PCE1 (Ref. FIG. 83A).

FIG. 85 generally depicts exemplar customer descriptor information for RFP and PDs, in accordance with an exemplary embodiment of the invention. FIG. 85 illustrates further examples of customer descriptor data, showing first in row 8503 the RFP example RCE1, also shown in FIG. 82B, whose Project Descriptor identifier (i.e., RFP ID) is "RFP001". The remaining five rows in the table 8504 show example customer descriptor data for five PDs, having Project Descriptor PD IDs 8501 of PD001 through PD005. Note that the example for PD001 corresponds to PCE1, as illustrated in FIG. 82A.

FIG. 86 generally depicts an exemplar execution of procedure Create_Filter_Table_From_Map( ) depicted in FIG. 78, in accordance with an exemplary embodiment of the invention, using multiple customer descriptor inputs. FIG. 86 illustrates customer descriptor data that corresponds to five rows 8504 of FIG. 85 as processed by the Produce_Descriptor_Intersection( ) (Ref. FIG. 74) and Create_Filter_Table_From_Map( ) (Ref. FIG. 78), analogous to the processing that produced FIG. 84. In fact, a row 8621 in FIG. 86 corresponds to the single row of FIG. 84, as that single row represents the processing of PD001. In FIG. 86 we illustrate an additional column 8606 for PD ID, which identifies the associated PD.

FIG. 87 generally depicts an exemplar updating of a relevance cube table for customer filters and customer relevance, in accordance with an exemplary embodiment of the invention. FIG. 87 continues the extended example, illustrating how as part of ETL processing 2060, the results from Compute_Weighted_Relevance_Value( ) (Ref. FIG. 76) and Create_Filter_Table_From_Map( ) (Ref. FIG. 78) may be associated with aggregated relevance results (e.g., FIG. 48) in a relevance cube 2070, such as may be produced by functionality of procedure Determine_Relevance_Matrix( ) (Ref. FIG. 35), Build_Relevance_Table( ) (Ref. FIG. 38), Roll_Up_By_PD( ) (Ref. FIG. 40), and Roll_Up_By_RFP( ) (Ref. FIG. 46). For clarity we disclose that columns (Ref. 8703, 8704, and 8705) correspond to the extended example data as illustrated in FIG. 48; and that columns 8702 in FIG. 87 corresponds to columns (Ref. 8601, 8602, 8603, 8603, and 8605) in FIG. 86, with a column 8606 denoting PD ID in FIG. 86, enabling the rows in FIG. 86 to be associated with their corresponding rows in FIG. 87, based on the PD ID 8705.

Regarding further disclosure in reference to FIG. 87, we disclose that a new column, for Customer Relevance 8701 has been added to the table shown in FIG. 87, which is computed in the exemplar for the rows with PD ID equal to PD002 through PD005 8705 using a procedure such as Compute Weighted Relevance Value( )(Ref. FIG. 76) in a manner analogous to that used to compute the value of 0.8 (80%) for PD001, as illustrated in reference to FIG. 62A, FIG. 62B, and FIG. 62C.

Period of Performance (PoP) Filtering

FIG. 88 generally depicts an exemplar construction process for PoP date filters, in accordance with an exemplary embodiment of the invention, disclosing filter construction for a range descriptor. FIG. 88 discloses the creation of two additional columns of data, such as PD PoP Start 8801 and PD Pop End 8802, associated with each of the PDs 8803. Such a table may constructed by a relevance management system 1140 by populating, for each PD, columns such as a PoP Start and a PoP End date column (Ref. 8801 and 8802, respectively) with the corresponding data, such as PoP start and end date values 2620 recorded during a PD data entry process 2021.

FIG. 89 generally depicts an exemplar updating of relevance cube table for PoP date filters, in accordance with an exemplary embodiment of the invention, further disclosing filter construction for a range descriptor. FIG. 89 discloses how columns, such as representing PD PoP Start and PD PoP End (Ref. 8801 and 8802, respectively) associated with a PD ID 8803, may be associated with the corresponding data in a relevance cube 2070, as illustrated by the data in FIG. 87. In FIG. 89 we can see the addition of the two columns (Ref. 8901 and 8902), which have been added to the table through the PD ID (Ref 8803 and 8907). For presentation in FIG. 89, due primarily to the width of the table, we have omitted columns for PD Owner and RFP Owner, shown previously in a collection of columns 8705, without loss of clarity.

Filtering or Ranking Using Criteria from an End User

Figure 93:
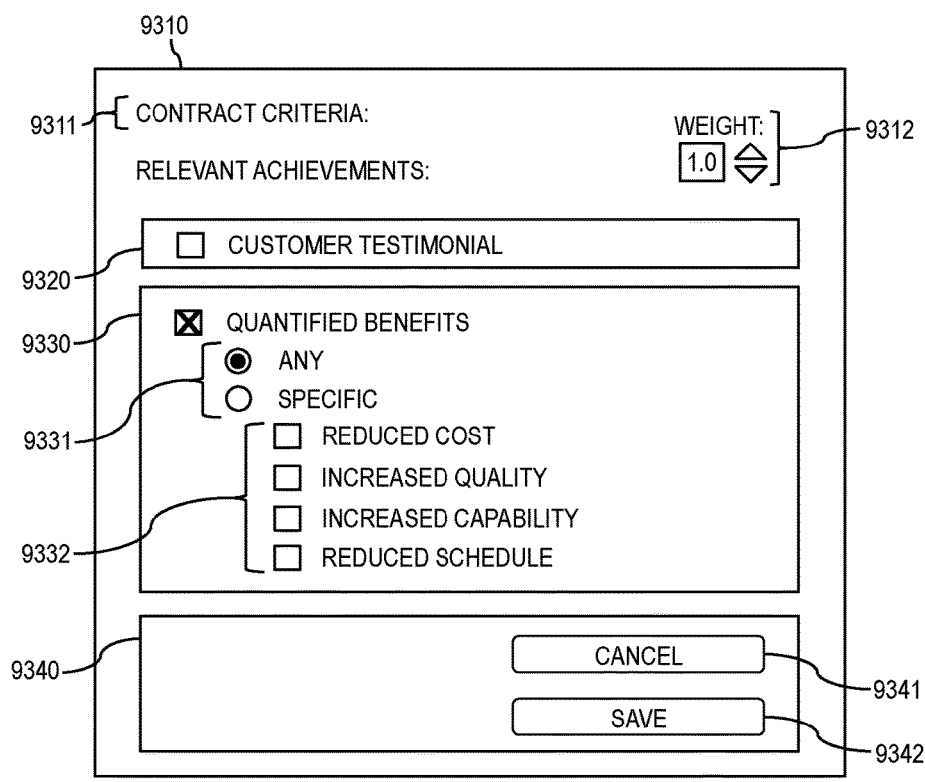
FIG. 93 is a mock-up of a contract criteria interface 3 for filtering and ranking, in accordance with an exemplary embodiment of the invention.

FIG. 91, FIG. 92, and FIG. 93 generally depict contract criteria interfaces (Ref 9110, 9210, and 9310, respectively) for filtering or ranking, in accordance with an exemplary embodiment of the invention. The interfaces we disclose in reference to in FIG. 91, FIG. 92, and FIG. 93 may contain similarities to interfaces disclosed above for PD and RFP data entry (Ref. FIG. 26, FIG. 28, and FIG. 29; and FIG. 31, respectively). Indeed, we disclose that such similarity may be expected and advantageous, as the filtering or ranking a relevance management system 1140 may perform may use similar elements (e.g., exemplar such as PoP Start and End dates, customer type, work elements, and so on, in an embodiment) to perform said filtering or ranking. FIG. 91, FIG. 92, FIG. 93, and FIG. 94 illustrate interfaces in which a controller module 1142 and an interface module 1143 provide the necessary interfaces and application logic for filtering and ranking processes.

A contract criteria interface (Ref 9110, 9210, or 9310) may contain a section where a user may specify the intended purpose of the interface, for example whether an interface is intended to represent data for filtering, or for ranking. Such functionality is illustrated in an interface 9110 by a first section 9112 and a second section 9113; the selections for a first selector 9112 and a second selector 9113 are intended to apply to a first interface 9210, or a second interface 9310 as well, although we contemplate an embodiment variation in which other interfaces, such as said first interface 9210, or said second interface 9310, may also have analogous sections associated directly with their said interfaces.

As we disclose in reference to FIG. 22 and FIG. 66, a relevance management system 1140 may include separable and complementary functionality for filtering and ranking (Ref 6620 and 6615; and 6630 and 6625, respectively). FIG. 91, FIG. 92, and FIG. 93 illustrate interfaces that provide functionality that enable a relevance management system 1140 to receive, from an end user, values for contract criteria 9111 that a relevance management system 1140 may use for filters 9112, and values said system may use for ranking 9112. Because filtering and ranking criteria may be related to the same, or similar, set of data elements (e.g., PoP Start and End dates, customer type, work elements, and so on, in an embodiment), we disclose in reference to FIG. 91 an interface that provides functionality that enables an end user to "toggle", such as via a selector 9112, between value settings for contract criteria to be used as filters, and value settings to be used for ranking. We disclose that a relevance management system 1140 may thus record two sets of values, a first to be used for filtering and a second to be used for ranking, which an end user may toggle between via a selector 9112 to enter, review, or update.

Regarding further functionality we disclose in reference to FIG. 91, FIG. 92, and FIG. 93, a relevance management system 1140 may provide functionality such as additional options that may affect how such toggling operates; for example, said system may present an end user with options, such as may be mutually exclusive options, one of which may be selected, as illustrated in a selector 9113. One such option may enable an end user to specify that the original RFP data values associated with an RFP, such as entered during an RFP data entry process 2022, be used to "populate" various ranking criteria. Such functionality may include setting an exemplar such as a PoP date range 9121, customer 9131, or other criteria to values that were entered during an RFP data entry process 2022 using e.g. a first data-input section 3120 or a second data-input section 3141, respectively.

Further regarding a selector 9113, an end user may be presented with functionality such as an additional option from which to select 9113, such as an option to use custom filter or ranking criteria, indicating that criteria values a relevance management system 1140 records when "filters" is selected 9112 may be maintained separately from criteria values said system records when "ranking" is selected 9112. In such a mode, a selector 9112 may enable an end user to toggle between two distinct sets of criteria values, one for filtering and one for ranking.

Further regarding a selector 9113, a further option an end user may be able to select 9113 is to use a common set of values for filter and rank criteria. In such a mode, a relevance management system 1140 may maintain a single set of criteria values, which may be used for both filtering and ranking.

Regarding a selector such as 9112, an option selected via functionality such as a selector 9112, i.e. "Filters" or "Ranking", may affect functionality such as which of the data entry elements on contract criteria interfaces (such as a first interface 9110 in FIG. 91, a second interface 9210 in FIG. 92, or a third interface 9310 in FIG. 93) are enabled or disabled (i.e., through which an end user may enter data, or may be prohibited from entering data). Generally speaking, the purpose of the functionality provided by contract criteria interfaces (such as said first interface 9110 in FIG. 91, said second interface 9210 in FIG. 92, or said third interface 9310 in FIG. 93) when "Filters" has been selected 9112 is for an end user to specify criteria that must be met in order to constitute a "match" with a PD (i.e., for that PD to be selected from a relevance cube 2070). Thus, for example, values for exemplars such as a PoP date range 9121, value range 9123, customer (Ref. 9131 and 9132), or work elements 9143 may be specified by an end user (and similarly as illustrated in FIG. 92, for contract type 9221, security classification 9223, line of business 9225, or special business classifications 9231; and also in FIG. 93, for customer testimonial 9320 or quantified benefits 9330).

On the other hand, the purpose of the functionality of contract criteria interface (such as a first interface 9110 in FIG. 91, a second interface 9210 in FIG. 92, or a third interface 9310 in FIG. 93) when "Ranking" has been selected 9112 is for an end user to specify "weights" that a relevance management system 1140 may use when determining the relative importance of various criteria. Thus, when a selector 9112 is set to "Ranking", the various data-entry elements and fields on the contract criteria interfaces (such as said first interface 9110 in FIG. 91, said second interface 9210 in FIG. 92, or said third interface 9310 in FIG. 93) that permit "Weight" values to be entered may be enabled, and may be disabled otherwise. These data entry elements and fields may include, but are not limited to, functionality such as provided by exemplary data entry elements and fields (Ref 9122, 9124, 9134, 9142, and 9145 in FIG. 91; 9222, 9224, 9226, and 9232 in FIG. 92; and 9312 in FIG. 93).

We disclose that the functionality provided by contract criteria interfaces, such as illustrated in FIG. 91, FIG. 92, and FIG. 93, may be used to receive filtering or ranking criteria values from an end user. An end user may access a contract criteria interface 9210 from a contract criteria interface 9110 by selecting an option such as represented by "More Criteria . . . " 9151, and similarly may access 9241 a contract criteria interface 9310 from a contract criteria interface 9210. We further disclose that when an end user has completed data entry in a contract criteria interface, they may save such information (Ref. 9342, 9243, and 9153) or cancel the operation (Ref 9341, 9242, and 9152) and in either case a relevance management system 1140 may return said end user to an interface from which a current interface (Ref. 9310, 9210, 9110, respectively) was accessed.

We have already disclosed the functionality of RFP work element 9144 weights 9145, in reference to a procedure Compute_Weighted_Relevance_Value( ) in FIG. 76, and an exemplar set of weights such as illustrated in FIG. 77.

We have already disclosed how we may use relevance weights in data that has been selected from a relevance cube 2070, such as column 4801, to display results when using formats that may include, but are not limited to, a relevance chart 4922. As was disclosed by functionality for a project relevance summary section 4920, the order of rows in a table 4922 may be associated with a row's relevance ranking 4925. A relevance management system 1140 may apply a similar approach when ranking results based on multiple relevance criteria, such as when multiple contract criteria have been received from an end user using functionality such as provided on a contract criteria interface (Ref 9110, 9210, or 9310). We illustrate such functionality with the extended example data in FIG. 89 for customer relevance 8903 criteria that correspond to contract criteria weight 9134, and RFP-to-PD relevance 8905 criteria that correspond to contract criteria weight 9142.

The table in FIG. 90 contains a subset of the columns in FIG. 89, namely Customer Relevance 9002 (which corresponds to a first column 8903) and RFP-to-PD Relevance 9003 (which corresponds to a second column 8905), as well as the PD ID and RFP ID columns 9004 (which corresponds to a pair of columns 8907). In addition, we disclose that a relevance management system 1140 may provide functionality such as to add a new column, such as illustrated by Overall Relevance 9001, in which to record an overall, weighted relevance value for each row.

We disclose that a relevance management system 1140 may compute, for each row in a table such as shown in FIG. 89, a relevance ranking, such as a sum of the products of the individual relevance column entries (Ref 9002 and 9003 in FIG. 90) and the corresponding contract criteria weight (Ref. 9134 and 9142 in FIG. 91, respectively). For example, the overall relevance of the PD with PD ID 9004 equal to PD001, which corresponds to the first row 9011 of the table, may be computed as 0.80 9002 times 1.0 9134 plus 3.61 9003 times 1.0 9142, which equals 4.41 9010. A relevance management system 1140 may compute overall relevance values 9001 for remaining rows (Ref. 9012 through 9015), in this example in a similar manner.

Note that the original relevance ranking of these PDs, illustrated in FIG. 49, produced a relevance ranking 4925 of PD003, PD001, PD005, PD002, and PD004, where "Project Description 3" corresponds to PD003, and so on. That ranking was based solely on the RFP-to-PD relevance value 4801 (which corresponds to a column 9003). When we "factor in" the relevance of the PD customers, however, as we have done in computing the Overall Relevance 9001, we see that the relative ranking of the projects has changed, to: PD001, PD005, PD003, PD002, and PD004 that correspond to specific rows in FIG. 90 (Ref. 9011, 9015, 9013, 9012, and 9014, respectively), based on descending order of the computed overall relevance values 9001. Intuitively, although PD003 has the highest relevance score when relevance is based solely on RFP work elements (producing a score of 3.94), when customer relevance is also factored in, PD001 (which had a somewhat lower RFP work element relevance score of 3.61) is determined to have a higher overall relevance score of 4.41 (versus 4.14 for PD003). Reviewing the customer relevance data illustrated in FIG. 85, we can see that PD003 was performed for a commercial customer, whereas PD001 was performed for a Government, Federal, USDA customer similar to that in the RFP 8503; this additional customer relevance resulted in the updated rankings (moving PD001 higher, above PD003), when customer relevance was factored into the overall PD relevance ranking.

FIG. 94 generally depicts an exemplar execution of an interface for filtering and ranking, in accordance with an exemplary embodiment of the invention, illustrating the entry of filters for PoP dates and customer. FIG. 94 discloses how a relevance management system 1140 may use functionality such as provided by filtering or ranking interfaces such as depicted in FIG. 91 to receive filtering criteria from an end user. Here we see that an end user has specified "Filters" 9411, and that a relevance management system 1140 has been instructed to use original RFP criteria for ranking 9413. We see that an end user has specified a PoP start date of 1-1-2013 and a PoP end date of Dec. 31, 2015 9421, and specified a value of "Fed." 9432, which is short for "Federal", for a customer filter criteria 9431.

Figure 95:
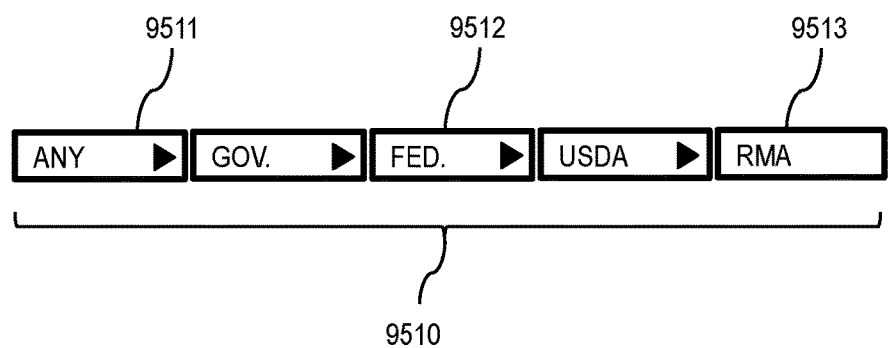
FIG. 95 depicts exemplar execution 2 of a contract criteria interface, performing customer selection, in accordance with an exemplary embodiment of the invention.

FIG. 95 generally depicts an exemplar execution of an interface for filtering or ranking, in accordance with an exemplary embodiment of the invention, illustrating customer selection. Functionality such as a drop-down menu selector 9432 for a customer criteria 9431 may have been pre-populated using headings from customer relevance columns 8904 that were used to determine customer relevance of PD with respect to this RFP. As such in this example, the drop-down menu selector 9432 will have been populated with values such as shown in FIG. 95, beginning with "Any" 9411 and ending with "RMA" 9413, corresponding to a column heading 8904. Here we see in FIG. 94 that an end user has navigated to a middle level of filter specificity, having chosen "Fed" 9512 (corresponding to a selector 9432), which happens to be midway between "Any" 9511 and "RMA" 9513.

Figure 96:
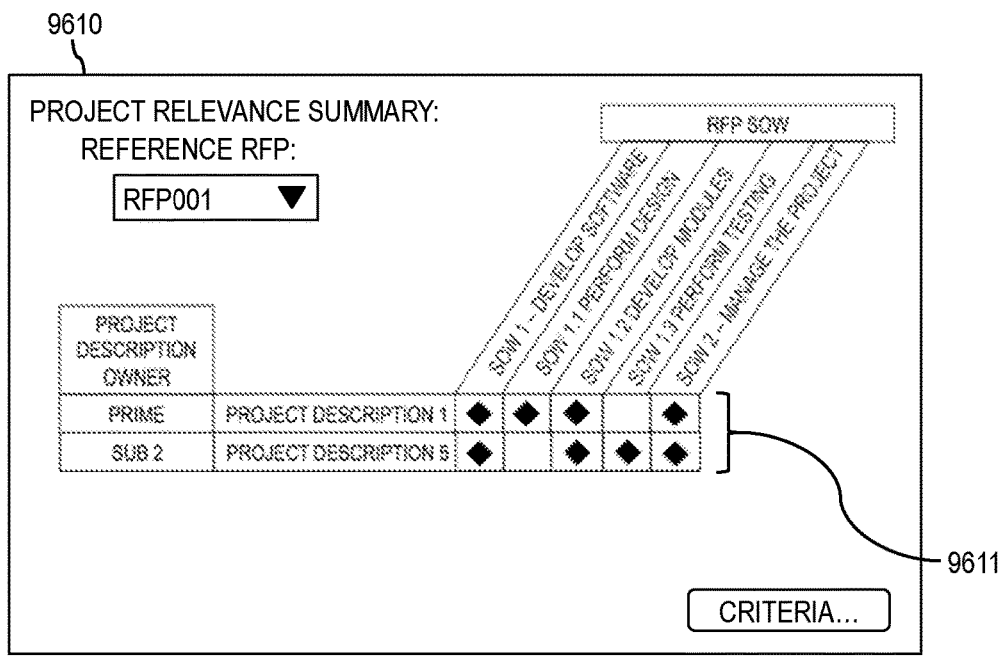
FIG. 96 is a mock-up of an exemplar project relevance summary section, presenting updated results based on contract criteria interface execution, in accordance with an exemplary embodiment of the invention.

FIG. 96 generally depicts an exemplar project relevance summary section, in accordance with an exemplary embodiment of the invention, shown presenting updated results based on contract criteria interface execution. As we disclose in reference to FIG. 94, an end user may save 9432 new or updated filter criteria, which a relevance management system 1140 may use to refresh an interface, or a section of an interface, such as a project relevance summary section 5110 illustrated in FIG. 51 that contained five rows, with a filtered selection of PDs such as illustrated by an interface 9610 in FIG. 96, which now contains the two PDs that meet the specified filter criteria: Project Description 1 (corresponding to PD001), and Project Description 5 (corresponding to PD005). Reviewing PD data that has been entered in a relevance management system 1140 for this extended example, for both customer (i.e., FIG. 85, FIG. 86, and columns 8904 in FIG. 89) and PoP start and PoP end dates (Ref. FIG. 88, and a first column 8901 and a second column 8902, respectively), we can see that when a customer filter is applied, four PDs may be "interim" selected (PD001, PD002, PD004, and PD005, corresponding to rows (Ref. 8911, 8912, 8914, and 8915) in FIG. 89, as these four PDs each have a non-zero value (i.e., a "1") in the "Fed." column 8904 in FIG. 89. When a relevance management system 1140 next applies a PoP date filter to these four interim selected rows, it may determine that PoP dates for PD002 and PD004 do not overlap with the PoP start and PoP end dates an end user has specified 9421, and thus these two PDs (PD002 and PD004) may be filtered out of an interim selection, leaving two remaining PDs in a final selection set, namely PD001 and PD005, corresponding to a first row 8911 and a second row 8915 in FIG. 89. A relevance management system 1140 then may perform updates, such as to a relevance chart 9611, to present said two PDs (Project Description 1 and Project Description 5), reflecting the filter criteria as specified by an end user (Ref. FIG. 94).

Team Construction Processing

Team Construction and Recommendation Processing

We disclose in reference to FIG. 97 through FIG. 104 functionality a relevance management system 1140 may provide to support team facilitation (Ref. 1360, and FIG. 16), including team construction 1620. We also disclose in reference to FIG. 97 through FIG. 104 how a controller module 1142 and an interface module 1143 may provide the necessary interfaces and application logic for team facilitation processes.

An end user, who may be a capability-seeking end user 1130 who has entered an RFP 1131 into a relevance management system 1140, or is otherwise associated with said RFP and is considering being a prime contractor 141, may wish to identify experience and capabilities of potential team members, who may be capability-providing end users 1130 who have entered PDs 1111 into a relevance management system 1140 or are otherwise associated with said PDs. Recall that a prime contractor, in addition to having entered an RFP into a relevance management system 1140, may also likely have entered one of more PDs into said system, as will have other non-prime contractors (i.e., potential subcontractors) who may seek to join a prime contractor's team.

FIG. 97 generally depicts a team construction interface 9710, in accordance with an exemplary embodiment of the invention, that a relevance management system 1140 may present to an end user to facilitate team construction. We disclose, in reference to a team construction interface 9710, that said interface may be comprised of sections, such as a reference RFP section 9720, a team section 9730, a selection section 9740, or a team action section 9750, and that each such section can be considered its own interface, as can each field within a section.

Generally, a team section 9730 may display the results of a team construction process; a selection section 9740 may display PDs for possible selection by an end user for adding such experience and capabilities to a team; and a team action section 9750 may provide functionality to save 9751 or cancel 9752 updates to a team under construction, as well as functionality for additional options 9753. We disclose the functionality and operation of a team construction interface 9710 using again exemplar PD and RFP data as used throughout the extended example.

For clarity of specification of the present invention, we first broadly disclose the functionality and operation of a team construction interface 9710, beginning with a disclosure of general functionality and operation of a team section 9730, then a selection section 9740, and then a reference RFP section 9720. Further disclosures on said sections and interface then follow.

Regarding a team section 9730, said section may include a visual, relevance chart, or other representations of RFP SOW work elements, such as illustrated within a section 9731; as well as visual, relevance chart, or other representations of additional contract criteria for the RFP, such as within a section 9732. A team section 9730 may also include a representation to indicate whether a PD or team member displayed in said team section 9730 has been "Confirmed" 9733, as we disclose in further detail below.

Regarding a selection section 9740, said section may include, or be associated with, the same, or similar, RFP SOW 9731, contract criteria 9732, and Confirmed indicators 9733, such as represented in a team section 9730. In the exemplar selection section illustrated in 9740, these indicators (RFP SOW 9731, contract criteria 9732, and Confirmed 9733, respectively) from the exemplar team section 9730 are used positionally, in an embodiment; for example, the black diamond ("♦") exemplar symbols in columns two through six 9741 correspond to the RFP SOW elements 9731; the next eight columns 9741 (which contain exemplar check mark symbols, "✓") correspond to the contract criteria 9732; and the final column containing exemplar asterisk symbols ("★") corresponds to the Confirmed column 9733.

Regarding a reference RFP section 9720, a relevance management system 1140 may provide functionality that enables an end user (who may be identified in a section 9721) to perform team construction, such as by beginning by selecting an RFP 9722, whose requirements will be used as criteria for forming a team. In this example, an end user is identified as having an exemplar name "PRIME" 9721. When an end user has specified an RFP 9722, such as by selecting it via its RFP ID, a relevance management system 1140 may begin implementing data retrieval, filtering, ranking, and roll-up, as we disclose in reference to FIG. 55. In particular, we disclose that a relevance management system 1140 may use an indicated RFP ID 9722 to retrieve a slice of data 5515, such as from a relevance cube 5510, rolling such data up by PD 5521 to produce PD-to-RFP-Element relevance data 5530, which may be presented in a selection section 9740, such as using rows in a table 9741 or other suitable display metaphor, such as analogous to a relevance chart. Each row in said table 9741 may represent a PD whose PD data-entry values 2021 match filtering criteria (Ref. 9724, 9731, or 9732), such as specified by an end user. The order of rows in said table 9741 may reflect the overall relevance of each PD, using ranking criteria 9724, such as specified by an end user, which may position a PD with a higher overall relevance value at the top of said table 9741, and a PD with a lower overall relevance value near the bottom of said table 9741.

Figure 98:
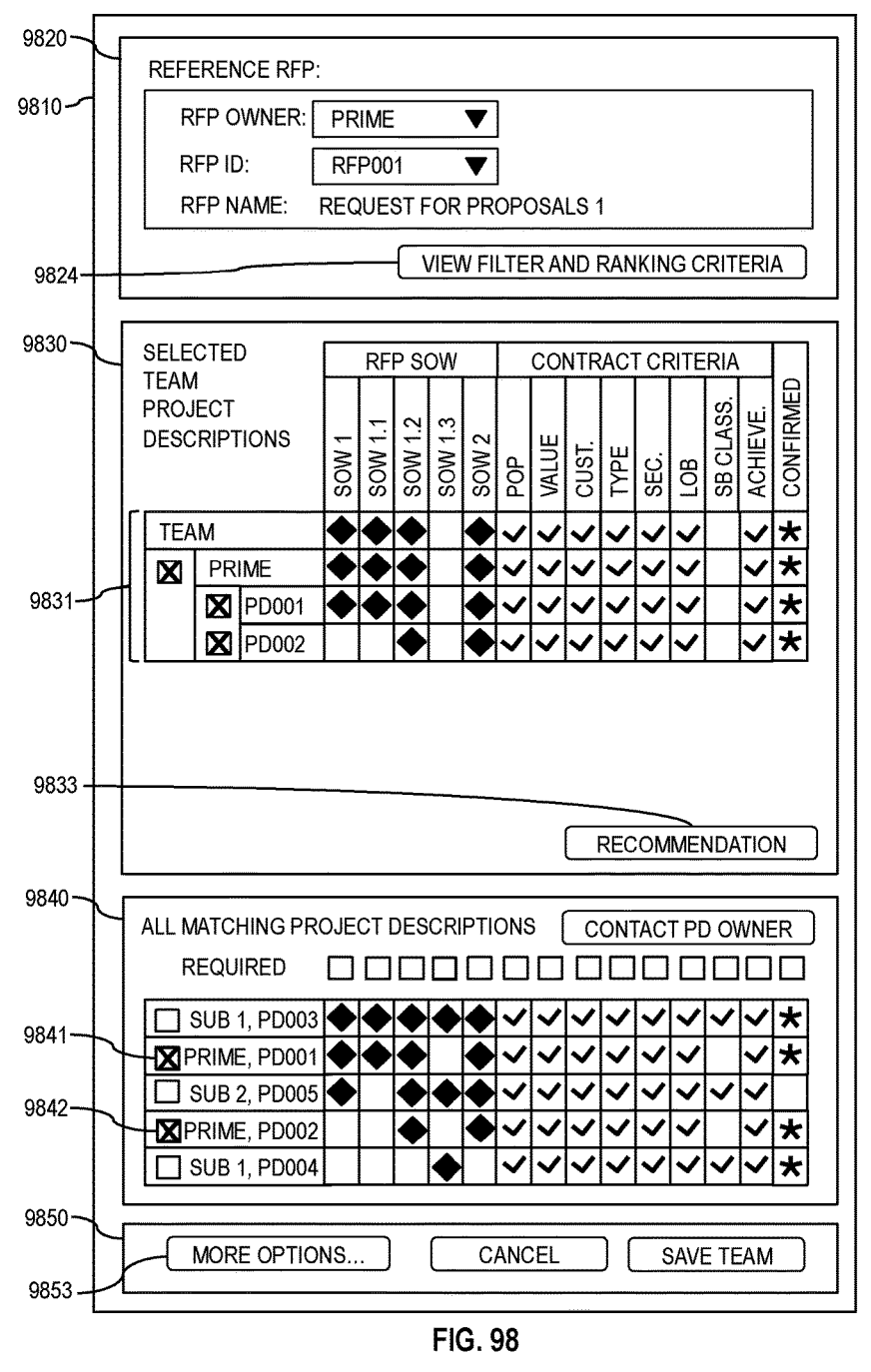

FIG. 98 generally depicts an exemplar execution of team construction interface 9810, in accordance with an exemplary embodiment of the invention. FIG. 98 illustrates a team construction interface 9810, based on the data shown in FIG. 97, on which an end user has made two selections (Ref. 9841 and 9842), as indicated in an embodiment by an exemplar "✗" symbol), which a relevance management system 1140 has used to update a team section 9830. Specifically, an end user, who is identified in this example as "PRIME", has selected for inclusion in the team capabilities, the two "PRIME" PDs (PD001 and PD002, as illustrated in a section 9831, which correspond to a first selection 9841 and a second selection 9842, respectively). Such selection behavior by a prime contractor end user, namely selecting first those relevant capabilities for which they are the owner, is quite typical, as the capabilities of a prime contractor typically form the "core" of a team's capabilities, which may then be augmented and complemented by capabilities of subcontractors that a prime contractor may add subsequently.

Regarding the functionality and operation of a team action section 9850, an end user may select functionality such as represented by "More options . . . " 9853, which may provide said end user with additional options and actions that may be performed. We disclose that through functionality such as represented by "More options . . . " 9853, and end user may instruct a relevance management system 1140 to update a team construction interface 9810, which said system may perform such as by updating a selection section 9840 or a team section 9830, to present the overall relevance of a PD (such as illustrated by a column 9001 in FIG. 90), the aggregated relevance of a PD owner (for example, "Prime", as illustrated in a section 9831), or the aggregated relevance of a team. Said aggregated relevance of a PD owner may be computed in general such as by summing the overall relevance values for the PDs with which said PD owner is associated; a relevance management system 1140 may provide an option to compute the aggregated relevance of a PD owner based on (for example, restricted to) PDs associated with the current team. As an example, in a section 9831 this may represent the two PDs (PD001 and PD002) associated with PD owner Prime. From FIG. 90, the overall relevance of Prime may be computed in this way by summing together 4.41 and 2.18 (associated with PD001 9011 and PD002 9012, respectively) to arrive at a value of 6.59. Aggregated relevance of a team may be computed analogously, in general such as by summing the aggregated relevance of PD owners associated with said team. We disclose that a relevance management system 1140 may provide similar functionality, to display PD and PD owner level relevance, such as for a capabilities summary interface 5810 illustrated in FIG. 58, or for other suitable interfaces or sections.

Further regarding a team construction interface 9810, we disclose in reference to 9831 that when an end user selects a PD, such as a first PD 9841 or a second PD 9842, the selection of which may have been performed by said end user in either order, a relevance management system 1140 may update a team section 9830, such as by adding to the team the selected PD, as illustrated by the two corresponding PDs (identified as PD001 and PD002 in a section 9831, and inclusion on the team is also indicated in an embodiment by an exemplar "✘" symbol in a section 9831), as well as by adding a row to represent a PD owner, such as a row labeled "Prime" (whose inclusion on the team is also indicated in an embodiment by an exemplar "✘" symbol), whose row contents represents a roll-up by PD owner ("PRIME" in this case) that corresponds to an operation 5531 in FIG. 55. As illustrated in FIG. 98, the row 9831 labeled "Prime" corresponds to the resulting PD-Owner-to-RFP-Element relevance data 5540 in FIG. 55. In a similar way, we disclose that a relevance management system 1140 may further rolled-up the resulting team data (i.e., performed a roll-up by team 5541 to create Team-to-RFP-Element relevance data 5550) to update a "Team" row in a section 9831.

Further regarding a team construction interface 9810, we disclose that at this point in the example, an end user may observe a capability gap that the team has for RFP SOW 1.3, which is apparent in the team section 9830 by the absence of a black diamond in the "Team" row for SOW 1.3, which is a result of the absence of a black diamond in the "Prime" row for SOW 1.3, which in turn is a result of the absence of a black diamond in either of the PD rows (PD001 or PD002), as illustrated in a section 9831 in FIG. 98. We disclose that a relevance management system 1140 may detect such capability gaps, including by identifying a column, such as in a table 9831, for which a Team row does not have an indicator, such as a black diamond indicator, or other alternative indicator in an alternative embodiment, such as we disclose above in reference to FIG. 43B. An end user may (or may not) identify such capability gaps or other shortfalls, and in either case may be provided ability to correct such shortfalls that exist (which a relevance management system 1140 has identified), by invoking a functionality such as represented by "Recommendation" 9833.

FIG. 99 generally depicts an exemplar execution of contract criteria interface 9910 being used for recommendation processing, in accordance with an exemplary embodiment of the invention. When an end user exercises functionality such as represented by "Recommendation" 9833, a relevance management system 1140 may use functionality to display a contract criteria interface 9910. Here we can see that said system has highlighted (i.e., made a selection 9942, as may be indicated in an embodiment by an exemplar "✘" symbol) the SOW 1.3 work element, providing a recommendation to an end user to use SOW 1.3 as one of the required 9941 work elements 9940 in the filter 9912. A relevance management system 1140 may have made said recommendation (i.e., to search for PDs that have a missing required work element, SOW 1.3 in this case), based on a relevance management system 1140 identifying a capability gap, which in this example corresponds to a missing indicator for said work element at the Team level 9831, as we have disclosed above. We disclose that if an end user did not wish to use functionality such as represented by "Recommendation" 9833, a relevance management system 1140 may provide functionality that enables said end user to access (and update, as necessary) a contract criteria interface 9910 by invoking functionality such as represented by "View Filter and Ranking Criteria" 9824, such as on a reference RFP section 9820. In either case, when an end user saves 9953 updates made on a contract criteria interface 9910, a relevance management system 1140 may provide functionality to update a selection section 10040 on a team construction interface 10010, as illustrated in FIG. 100.

Figure 100:
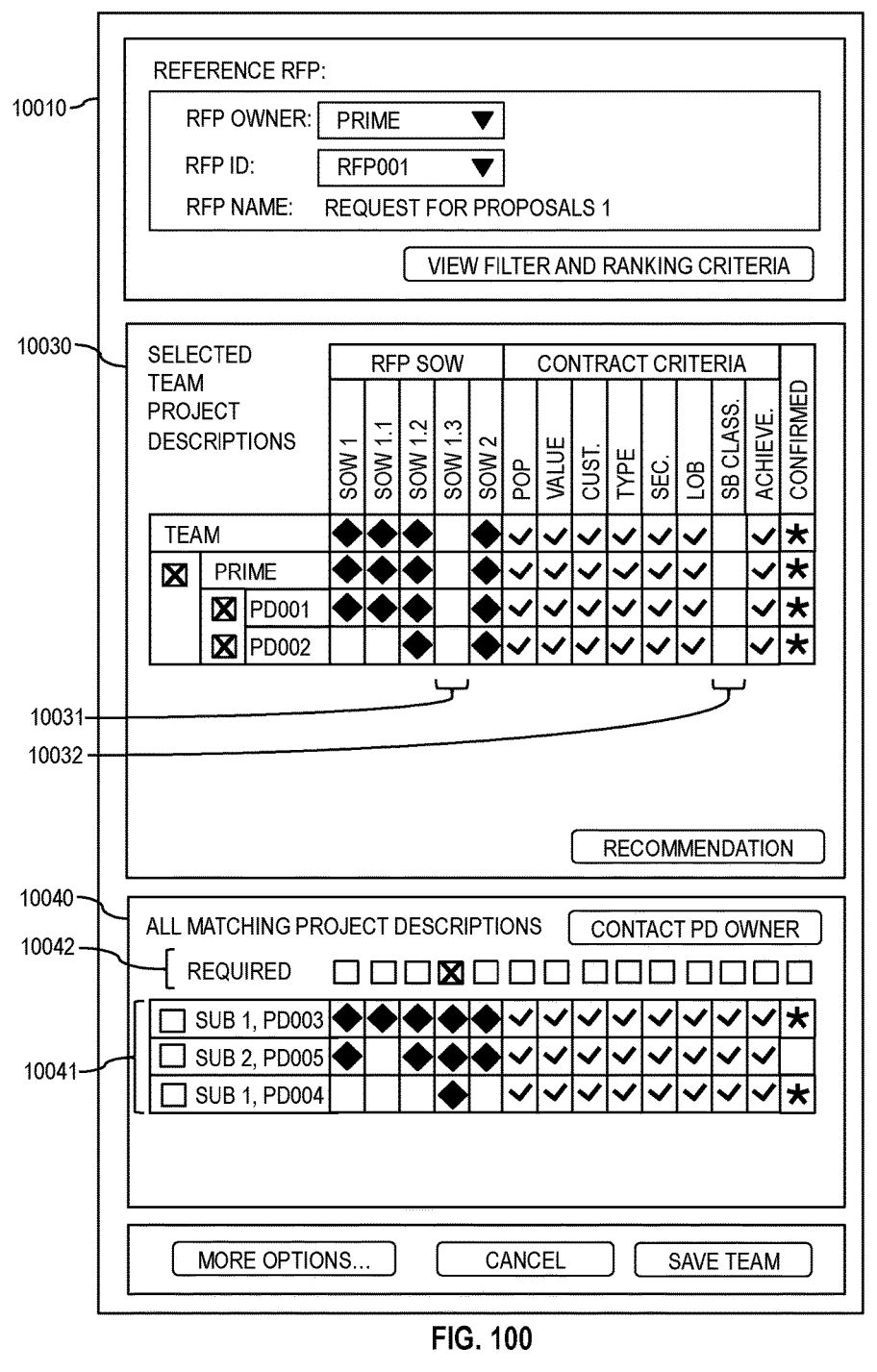

FIG. 100 generally depicts an exemplar execution of team construction interface 10010, in accordance with an exemplary embodiment of the invention. Using the updated filtering criteria (such as illustrated in FIG. 99), we disclose in reference to FIG. 100 how a relevance management system 1140 may select from a relevance cube the PDs that meet revised criteria; in the exemplar in FIG. 100 we see that a relevance management system 1140 has updated the "Required" indicator 10042 to note that SOW 1.3 RFP element is now "required", and we may confirm visually that all of the PDs displayed as rows 10041 in a selection section 10040 have an indicator, a black diamond in this exemplar, in the column 10031 corresponding to SOW 1.3.

Figure 101:
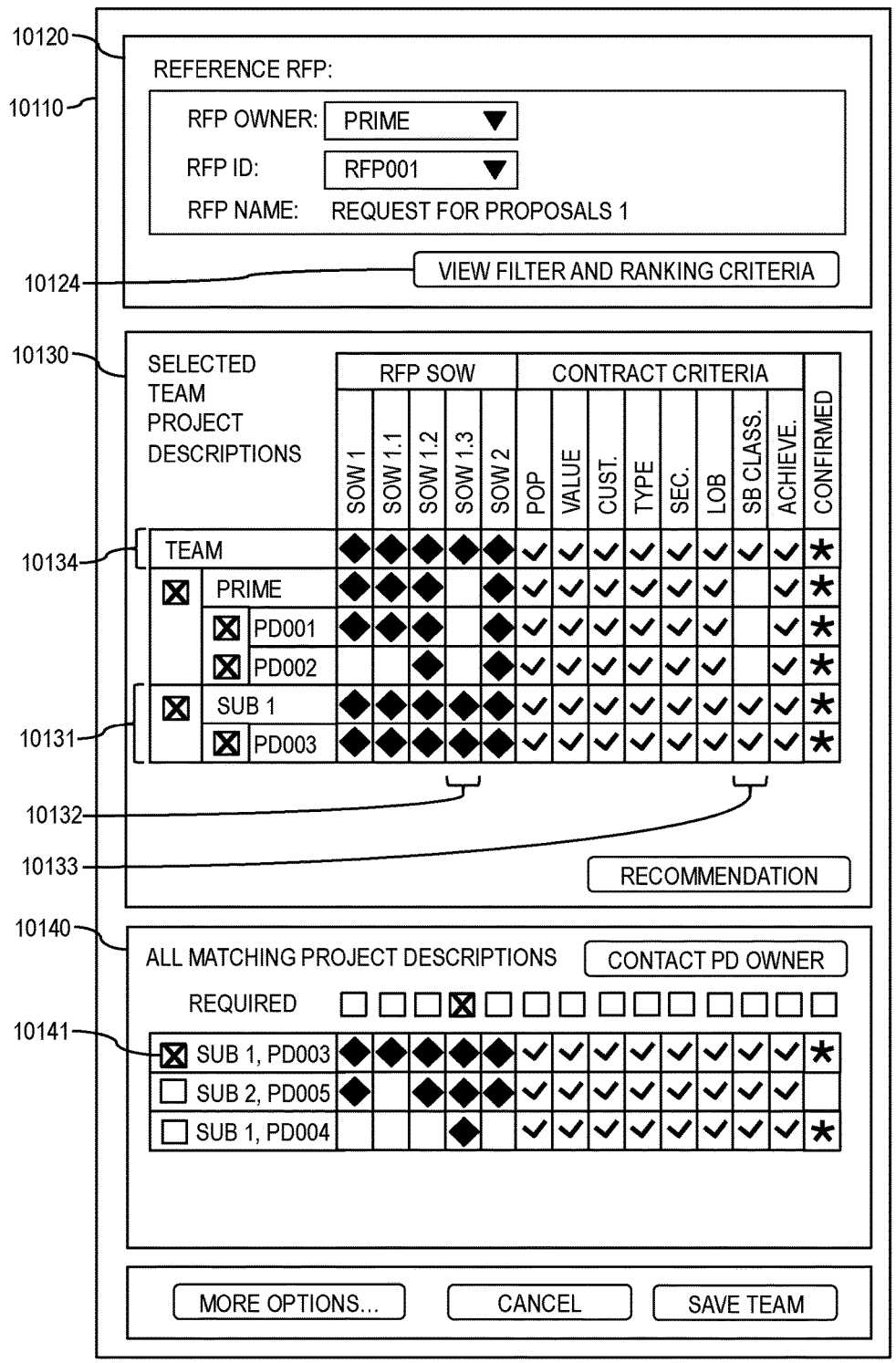
FIG. 101 depicts exemplar execution 3 of a team construction interface, in accordance with an exemplary embodiment of the invention.

FIG. 101 generally depicts an exemplar execution of team construction interface 10110, in accordance with an exemplary embodiment of the invention. FIG. 101 illustrates a selection 10141 an end user has made, based on the data shown in FIG. 100. Here we can see that an end user has been presented with three PDs 10041 that may be used to fill a capability gap for SOW 1.3 10031. We see in FIG. 101 that an end user has selected, the highest ranked (i.e., top-most row) PD 10141, PD003 whose owner is "Sub 1". We disclose that when an end user has made a selection 10141, a relevance management system 1140 may update a team section 10130 by adding rows corresponding to said selected PD and the associated PD owner, such as illustrated for the two rows 10131, a first corresponding to PD003, and a second corresponding to Sub 1. Once again, we disclose that a relevance management system 1140 may perform a roll-up by PD owner 5531 to determine the capabilities, such as illustrated for Sub 1; and may further perform a roll-up by team 5541 to create the aggregated relevance data to update the Team row of the table 10134. Here we can see that the capability gap for SOW 1.3 has indeed been filled by inclusion of PD003, and corresponding inclusion of Sub 1 (the owner of PD003) as part of the team. In a similar manner, we observe and disclose that inclusion of PD003 (and, Sub 1) on the team has enabled an end user to add to the team a PD and team member that brings special business classification (SB Class. 10133) qualifications, and that these qualifications have been aggregated to the team level 10134 as well.

FIG. 102 generally depicts an exemplar execution of contract criteria interface 10210, in accordance with an exemplary embodiment of the invention, being used for filtering using criteria from an end user. Continuing the extended example, FIG. 102 illustrates a contract criteria interface that a relevance management system 1140 may display when functionality such as represented by "View Filter and Ranking Criteria" 10124 is exercised. Here we can see, in this example, that an end user may continue to use the interface for filters 10212, and has specified a specific PoP date range 10221 and a specific customer 10231, providing as input values of 1-1-2013, 12-31-2015, and "Fed." 10232, respectively. We note that the said PoP date range and customer criteria are the same as we disclose in reference to FIG. 95 and FIG. 96. We also disclose in reference to FIG. 102 how an end user may deselect, such as deselecting 10242 SOW 1.3, a required 10241 work element, to indicate the said deselected element is no longer "required". Upon saving 10253 these updated criteria, a relevance management system 1140 may identify and present to an end user PDs that meet the revised criteria.

FIG. 103 generally depicts an exemplar execution of team construction interface 10310, in accordance with an exemplary embodiment of the invention. FIG. 103 illustrates the results a relevance management system 1140 has produced using the revised filtering criteria illustrated in FIG. 102, and the corresponding updates to a selection section 10340. Here we disclose how rows, such as in the table 10341, may be updated, for example to reflect the two PDs, PD001 and PD005, which meet revised criteria (such as illustrated in FIG. 102). Regarding the filters for PoP date range 10221 and customer 10221, we note that a relevance management system 1140 may perform filtering, and in this example has filtered the PDs down to PD001 and PD005, as was discussed in reference to this same date range and customer criteria in reference to FIG. 95 and FIG. 96. A relevance management system 1140 may also update the "Required" indicator, such as by deactivating the previous indicator for SOW 1.3, and activating indicators for "PoP" and "Cust.", as an end user specified in FIG. 102.

Further regarding a team construction interface 10310, we disclose functionality that in producing and displaying, for example the two rows 10341 in a selection section 10340, a relevance management system 1140 may indicate (such as in an embodiment by an exemplar "✘" symbol 10343) that a PD, such as PD001, has already been selected 10343 to be part of a team. Such indication may inform an end user that a project shown in a selection section 10340 is currently part of a team, as shown in team section 10330. We further disclose that if an end user were to deselect a PD, such as PD001 10343, or any of the PDs or team members in the team 10330 or selection 10340 sections, such as by removing an exemplar "✘" symbol 10343), the deselected PD and the corresponding PDs of said deselected team member would be removed in a team section 10330, such as by removing rows from a table, and the aggregated team and PD owner capabilities expressed in a team section 10330 recomputed and redisplayed, accordingly. We disclose that a relevance management system 1140 enables an end user to both add and removed PDs (and team members) from a team.

Further regarding a team construction interface 10310, FIG. 103 illustrates an additional team-construction functionality a relevance management system 1140 may provide, in which said system may maintain a status for each PD with respect to the RFP 9722, indicating whether a PD has been "Confirmed" 9733. Confirmation may be used as an indicator of whether an RFP owner has received "permission" from a PD owner to fully access and use an indicated PD. We disclose that a relevance management system 1140 may support multiple types of confirmation, which may include, but are not limited to, a case in which an RFP owner and a PD owner have a previous working relationship, and as a result said PD owner has specified a "blanket" confirmation provision whereby said RFP owner may be automatically confirmed to use any PDs owned by said PD owner. In addition, a relevance management system 1140 may provide brokering functionality that enables an RFP owner to contact a PD owner 10345 to seek such confirmation, which a relevance management system 1140 may record and display for each PD 10344. Here we can see such functionality illustrated (via an indicator 10344, and a column for such an indicator 9733 in FIG. 97), in which an RFP owner "PRIME" has not received confirmation from a Sub 2 that Prime may use PD005, as indicated by the absence of an exemplar asterisk symbol ("✱") for said project 10344. We disclose that such confirmation indicator 9733 may be provided as a convenience functionality, intended to simplify the process of companies (i.e., RFP and PD owners) knowing with whom they have discussed and confirmed the use of PDs, and may not be intended as legal permission (but also does not exclude its use as legal permission) of a first company to include a PD of a second company in a proposal, a process that may be governed by regulations such as the Federal Acquisition Register (FAR) and other legal documents and precedents.

Figure 104:
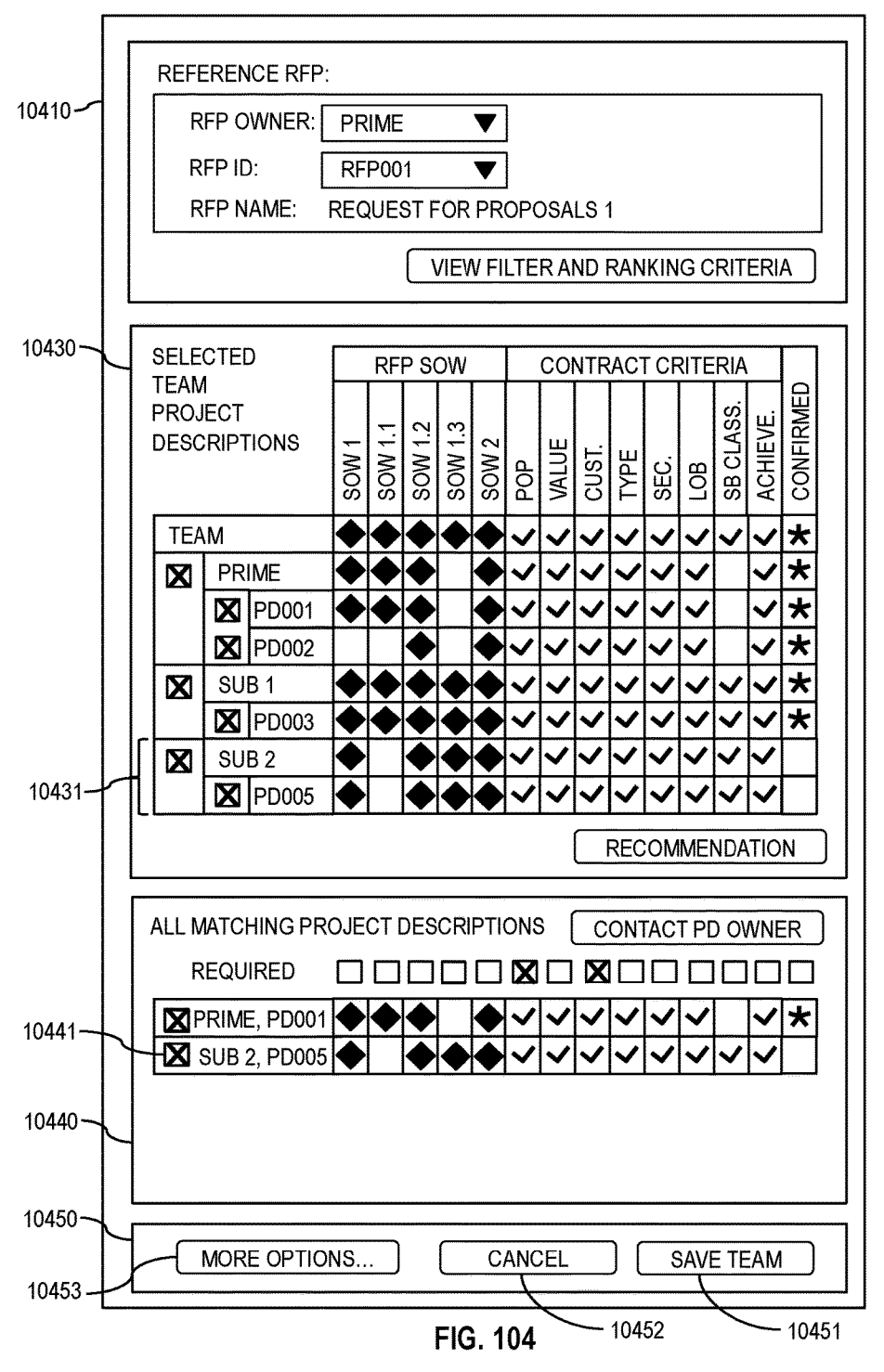

FIG. 104 generally depicts an exemplar execution of team construction interface 10410, in accordance with an exemplary embodiment of the invention. FIG. 104 illustrates selections that an end user has made, based on data in FIG. 103. In FIG. 103 we see that an end user has the option of selecting a PD, such as PD005 that is owned by Sub 2 10341, who is not currently on the team. We see in FIG. 104 that when an end user has selected a PD such as PD005 10441, a relevance management system 1140 may use such selection to update a team section 10430, such as by adding a new row for a PD and a PD owner, as necessary, which is illustrate here for two new rows 10431, corresponding to PD005 and Sub 2. Once again a relevance management system 1140 may perform processing (as we disclose in reference to FIG. 55) to aggregate or rank the results, and update a team section 10430 accordingly. When an end user has completed team construction processing, they may save information 10451 or cancel the operation 10452.

Proposal Artifact Generation Processing

As disclosed in reference to 234 and 434, a relevance management system 1140 may provide functionality to facilitate proposal development, including development of proposal volumes, to include, but not limited to a management volume 441, a technical volume 442, a past performance volume 443, or a cost volume 444. Functionality for such facilitation may be performed advantageously before, during, or after team construction processing, including as we have disclosed above in reference FIG. 97.

Recall that a team construction interface 9710, such as illustrated in FIG. 97, may contain a team actions section 9750, which may include functionality such as represented by "More options . . . " 9753, which may enable an end user to request a relevance management system 1140 to perform additional actions. Using functionality such as represented by "More options . . . " 9753, or through other suitable functionality, an end user may be presented with a proposal outline-to-RFP mapping interface 10510, such as we disclose in reference to FIG. 105. Said proposal outline-to-RFP mapping interface 10510 may provide functionality such as represented by "Generate proposal artifacts" 10533, with which a user may instruct a relevance management system 1140 to generate proposal artifacts.

Functionality for a process of generating a proposal artifact may incorporate additional information, such as may be provided by an end user, and may include, but is not limited to, information regarding a proposal and its constituent volumes 440. Specifically, said information may include, but is not limited to, a mapping that represents a relationship between a requirement in an RFP 420 and a proposal volume 440. A mapping may include, but is not limited to, a relationship between an element contained within a SOW 421, PPI 422, or EC 423, or other component of an RFP, and an element within a proposal volume 440.

Figure 105:
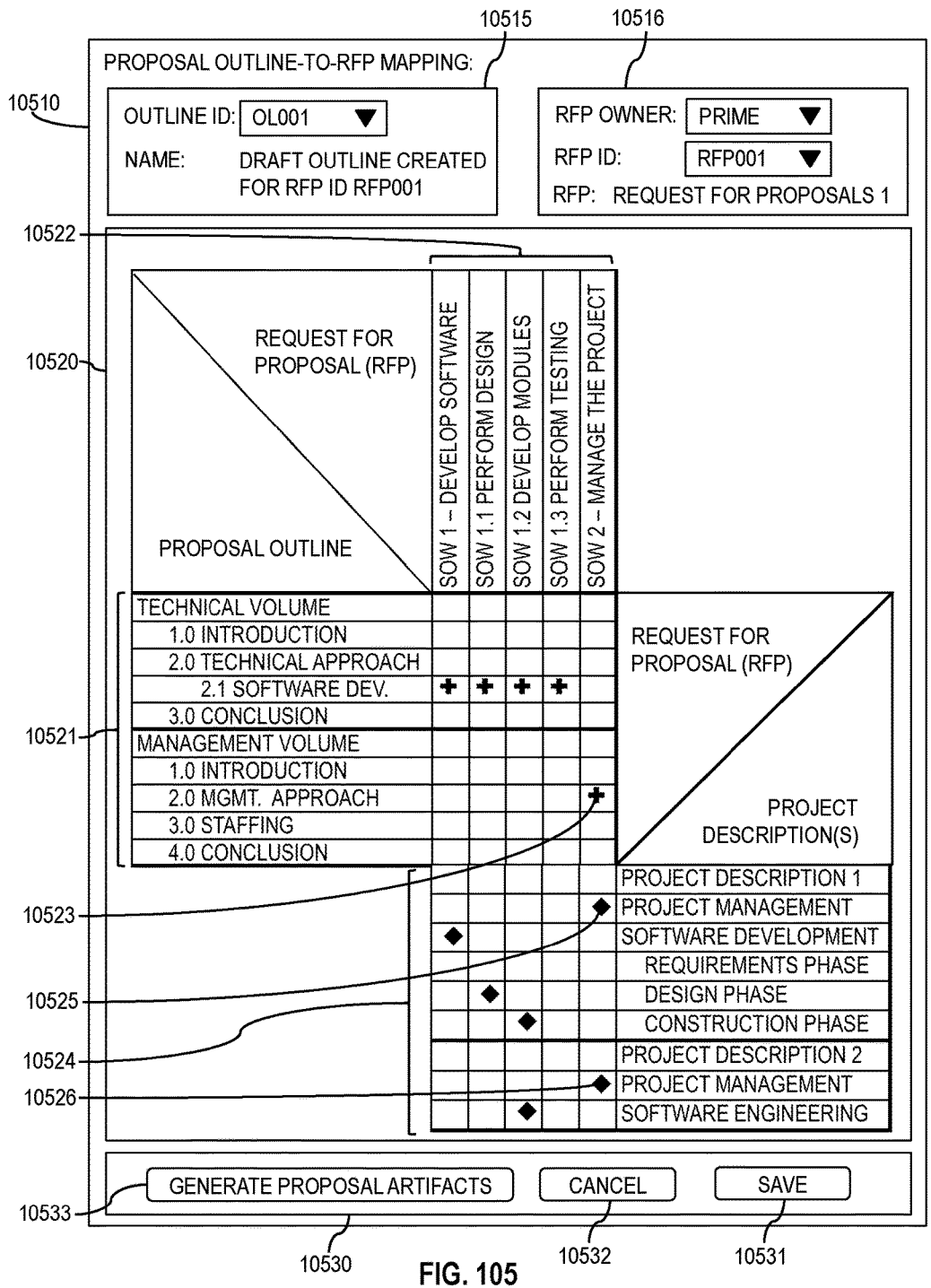

FIG. 105 generally depicts a proposal outline-to-RFP mapping interface 10510, in accordance with an exemplary embodiment of the invention, which may be facilitated by a controller module 1142 and an interface module 1143, as illustrated in FIG. 11, which may generate or manage interfaces and application workflow 10510 to represent a proposal outline-to-RFP mapping.

We disclose in reference to FIG. 105 that a proposal outline-to-RFP mapping interface 10510 may be comprised of sections, such as an outline identification section 10515, an RFP identification section 10516, a proposal mapping section 10520, or a proposal actions section 10530; and that each such section can be considered its own interface, as can each field within a section.

We disclose further in reference to FIG. 105 that a proposal mapping section 10520 may be comprised of sections, such as an RFP requirements section 10522, a proposal outline section 10521, or a relevant PDs section 10525; and that each such section can be considered its own interface, as can each field within a section.

Regarding an RFP identification section 10516, said section may identify an end user (such as an exemplar RFP owner "Prime", in the example), or may enable an end user to select an RFP, such as by RFP ID. Regarding an outline identification section 10515, said section may enable an end user to select a proposal outline or create a new proposal outline, which may be associated with said RFP.

Those skilled in the art will recognize that functionality such as provided by the intersection of a proposal outline section 10521 and an RFP requirements section 10522 may provide a matrix that may enable a proposal-development professional, such as a proposal manager (i.e., a person who oversees development of a proposal by a proposal-writing team), to specify a proposal outline (illustrated by the rows 10521), as well as how a section within said proposal outline may relate to an RFP requirement (as illustrated by a column 10522). Here we disclose an exemplary outline 10521 for a Technical Volume and a Management Volume (which may correspond to a first volume 442 and a second volume 441, respectively), and that said exemplar Technical Volume in this example contains three major sections (1.0 Introduction, 2.0 Technical Approach, and 3.0 Conclusion), as well as a single subsection 2.1 Software Dev.; and that the exemplar Management Volume contains four major sections (1.0 Introduction, 2.0 Mgmt. Approach, 3.0 Staffing, and 4.0 Conclusion). The exemplar RFP requirements 10522 illustrated in FIG. 105 are taken from the extended example used throughout the specification of the present invention, as introduced in reference to FIG. 7. Here we can see that a relevance management system 1140 may enable a section (or, subsection) of a proposal outline (such as 2.0 Mgmt. Approach) to be associated with an RFP requirement (such as SOW 2—Manage the Project), as illustrated by an exemplar "plus" sign ("+") symbol indicator 10523. Those skilled in the art will recognize that such a mapping may be intended to specify that an RFP requirement, such as associated with SOW 2—Manage the Project in this example, shall be addressed in a specific proposal section, such as section 2.0 Mgmt. Approach in this example, which is part of a Management Volume response. We disclose that in a similar way, remaining relationships between a proposal outline 10521 and RFP requirements 9722 may be specified, and recorded by a relevance management system 1140.

Recall that a relevance management system 1140 may provide functionality than enables an end user to identify one or more PDs that are relevant to RFP requirements (e.g., as illustrated in FIG. 49, FIG. 51, and FIG. 97), and that a team construction interface (such as illustrated in FIG. 97) may enable an end user to select PDs, as part of constructing a team. When such PDs have been identified or selected, a relevance management system 1140 may include said PDs (or a subset of said PDs) for display as part of a proposal outline-to-RFP mapping interface 10510, as illustrated by the inclusion of two PDs in the relevant PDs section 10524 in FIG. 105. We can see, for example, that as we disclose in reference to FIG. 49 (in particular, in reference to a selection 4924), a relevance management system 1140 may have determined that exemplar Project Description 1 is relevant to exemplar SOW 2—Manage the Project, which is illustrated analogously in FIG. 105 by an indicator 10525. (Here too as we disclose in reference to FIG. 105, that we contemplate a broad range of graphical idioms and alternative embodiments, including but not limited to a "black diamond" ("♦"), that may be used as functionality to indicate relevance or degree of relevance, as we disclose above in reference to FIG. 43B) The RFP-to-PD relevance results (as illustrated by exemplar black diamonds in rows 10524), which represent relevance of an RFP element to a PD, may be related to a proposal outline-to-RFP mapping (such as illustrated by exemplar plus sign "+" symbols in rows 10521), as we have illustrated here by juxtaposing said RFP-to-PD relevance results 10524 beneath said proposal outline-to-RFP mapping 10521 in FIG. 105. (The physical positioning of said relevance results to said mapping in FIG. 105 is for illustrative, expository purposes in an interface 10510; a relevance management system 1140 may manage a relationship between said relevance result and said mapping without requiring either or both to be displayed on an interface, as the latter has been illustrated in FIG. 105.) A relevance management system 1140 may thus determine a relationship between a section of an outline 10521 and an element in a PD 10524; for example, we can see that as part of a Management Volume, Section 2.0 Mgmt. Approach shall address a requirement in SOW 2—Manage the Project (as indicated by an indicator 10523), and that two PDs (Project Description 1 and Project Description 2) may provide relevant experience for said requirement (as indicated by a first indicator 10525 and a second indicator 10526, respectively). In this way, a relevance management system 1140 may identify those elements of a PD (such as a first element 10525 and a second element 10526, for the exemplar PDs Project Description 1 and Project Description 2, respectively, in the example in FIG. 105) that are associated with a specific section of a proposal outline (such as exemplar 2.0 Mgmt. Approach, as indicated by an indicator 10523, in the example). A relevance management system 1140 may provide multiple options to further process information associated with a proposal outline-to-RFP mapping 10510, which may include functionality to save said information 10531, cancel any updates 10532, or generate a proposal artifact 10533.

We disclose in reference to FIG. 106, FIG. 107, FIG. 108, and FIG. 109 exemplary proposal artifacts a relevance management system 1140 may generate using information such as represented in FIG. 105 and information maintained by a relevance management system 1140, when instructed (for example, via an operation request 10533 in FIG. 105).

FIG. 106 generally depicts an exemplar proposal writing plan artifact 10610, in accordance with an exemplary embodiment of the invention, which may be generated by a relevance management system 1140. Those skilled in the art will understand the importance of a proposal outline, including a high-level outline 10521 such as illustrated in FIG. 105, and a more detailed elaboration of said high-level outline, often called a "writing plan" or "detailed outline", that may identify RFP requirements that are to be addressed in each section of a proposal. FIG. 106 discloses an exemplary writing plan 10610 a relevance management system 1140 may generate as a proposal artifact. As we disclose in reference to in FIG. 106, a writing plan 10510 may include a proposal outline 10620 (which corresponds to an outline 10521 in FIG. 105), as well as RFP requirements 10621 that shall be addressed in each proposal section (which correspond to a mapping specified by exemplar plus signs "+" symbols 10522). We disclose that in an alternative embodiment, a more detailed specification of an RFP requirement may be provided as requirements 10621; for example, the contents of a column 10621 in FIG. 106 illustrate an RFP heading associated with a requirement (e.g., an RFP element label 3153 in FIG. 31), which may be augmented by a more detailed description (e.g., an RFP element description 3154 in FIG. 31).

We further disclose in reference to a proposal writing plan artifact 10610 that a relevance management system 1140 may increase the value that a writing plan, such as 10610, may provide to a proposal-writing team by incorporating, in said writing plan, directly relevant experience from PDs that said proposal-writing team may use to "substantiate" their approach as they write the associated sections, by citing in the written sections said experience as evidence that their team has performed the required services previously. We disclose that a relevance management system 1140 may provide said directly relevant experience in a work plan by processing a relationship such as represented in a proposal mapping interface 10520, such as a relationship between a proposal section 10521 and a relevant PD 10524. For example, we noted in reference to FIG. 105 that section 2.0 Mgmt. Approach shall address requirements 10523 for SOW 2—Manage the Project, and that two PDs may be relevant (as illustrated by a first indicator 10525 and a second indicator 10526 in FIG. 105). Here we can see in FIG. 106 that a relevance management system 1140 has used such a relationship to populate, for the two identified PDs (Ref. 10630 and 10631), additional columns in a work plan (illustrated by exemplars PD Owner 10622, PD ID 10623, and PD Name 10624, and a description), by retrieving from a relevance cube 2070, relevance data store 2045, or PD data store 2031 information for said additional columns. A resulting detailed writing plan (such as illustrated by a plan 10610) may be distributed to a proposal-writing team, giving said team a significant "head start" in collecting and organizing critical information they may use to effectively respond to proposal requirements, as said writing team develops the proposal volumes.

FIG. 107 generally depicts an exemplar rationale for team composition artifact 10710, in accordance with an exemplary embodiment of the invention, which may be generated by a relevance management system 1140. One of the tasks a proposal-writing team must often perform in writing a management volume of a proposal (or other such volume of a proposal) is to explain the composition of the team they are proposing, in particular if a team includes subcontractors. Intuitively, a customer may provide a higher score during evaluation 150 for a proposal 142 that provides a rationale for team composition. Does a proposed team have capabilities to meet all RFP requirements? Have subcontractors been brought on-board a team to augment or complement capabilities of a prime contractor? FIG. 107 discloses an exemplar proposal artifact a relevance management system 1140 may produce to help a proposal-writing team convey answers to such questions in a proposal. We disclose that an artifact such as depicted in FIG. 107 may be generated from information created by team construction processing 1720, for example using functionality that enabled an end user to construct a team such as in a team section 10430. For an artifact such as depicted in FIG. 107, the results such as depicted in a team section 10430 may be filtered, for example to include only PD owner and Team capabilities (i.e., omitting PDs), and restricting columns to RFP SOW elements. We further disclose that a rationale for team construction artifact 10710 may include a variety of information on team capabilities 10720, including, but not limited to, overall team capabilities 10721, as well as breakdowns such as by prime contractor 10722 or subcontractor 10723, or other suitable methods. A rationale for team composition 10710 may include information such as special business classification 2831, or other criteria, or other information.

FIG. 108 generally depicts an exemplar rationale for past performance selection artifact 10810, in accordance with an exemplary embodiment of the invention, which may be generated by a relevance management system 1140. Successful, high-scoring evaluation of a Past Performance volume 443 may be critical to achieving a high proposal evaluation score 150. As such, it may be critical for a proposal-writing team to not only select the most relevant PDs to include (as may be facilitated by functionality such as provided in interfaces such as illustrated in FIG. 49, FIG. 51, and FIG. 97), but also to convey a rationale for the resulting PD selection (such as for use in a past performance volume 443) that is easily and quickly comprehended. FIG. 108 illustrates an exemplar proposal artifact a relevance management system 1140 may generate that provides a rationale for a past performance selection 10810, and which may present various information 10820 that may include, but is not limited to, an indication of overall relevant experience 10821, such as represented by past performance PDs that may be included in a proposal, as well as an indication of relevant experience such as represented by an individual past performance 10822. As with the rationale artifact depicted in FIG. 107, a rationale artifact such as illustrated in FIG. 108 may be constructed from information created by functionality such as team construction processing 1720, for example such as represented in a team section 10430. For an artifact such as illustrated in FIG. 108, results such as illustrated in a section 10430 may be filtered to include PD results (i.e., omitting PD owner capabilities) and team capabilities, and restricting columns to RFP SOW elements. An exemplar past performance selection rationale 10810 may provide functionality such as a high-level summary that may precede detailed past performance descriptions in a past performance volume 443. A rationale for past performance selection 10810 may include information such as special business classification 2831, or other criteria, or other information.

FIG. 109 generally depicts an exemplar past performance write-up artifact, in accordance with an exemplary embodiment of the invention, which may be generated by a relevance management system 1140. In addition to providing functionality for generating a summary rationale for past performance selection (such as illustrated in FIG. 108), a relevance management system 1140 may provide functionality to generate an actual past performance description (such as may be included in a past performance volume 443), such as illustrated by the exemplar artifact in FIG. 109. The exemplar artifact in FIG. 109 illustrates a one-page a past performance "write-up" artifact a relevance management system 1140 may generate, such as for exemplar Project Description 1 as used in the extended example throughout the specification of the present invention. A relevance management system 1140 may identify said artifact as a past performance write-up 10910, illustrated in the example as being "Project 1 of 4", and corresponding to the first of four PDs as shown in an artifact 10822 in FIG. 108. A past performance write-up may include information associated with a corresponding PD 10920, which may include, but is not limited to, information captured during PD data entry 2021, such as customer, PoP, and so on, as captured using functionality such as illustrated in by 2615 in FIG. 26, or other information, including as determined or generated by a relevance management system 1140. A past performance write-up artifact may also include additional information, such as a PD owner or a project name, shown here by exemplars for a contractor and project name 10930. Perhaps most importantly, a past performance write-up artifact may include information 10940 that describes how a PD associated with said past performance write-up is relevant to an RFP requirement 10941, such as by describing relevant experience said PD brings to said RFP requirement. A relevance management system 1140 may provide such relevance information in a write-up artifact such as depicted in FIG. 109, based upon the results of a processing module such as disclosed in reference to FIG. 20; for example, for an entry that addresses a SOW requirement, such as for exemplar SOW 2—Manage the Project 10942, a relevance management system 1140 may include as relevant experience a detailed description, such as entered during PD data entry as part of a work descriptor 2655. Here again, the functionality we disclose to rapidly and automatically generate such past performance write-up artifacts may give a proposal-writing team a significant "head start" in developing the final past performance write-ups that may be submitted to a customer with a proposal. For example, an ability to rapidly generate a past performance write-up artifact for a given project (or, projects), and distribute said past performance write-up artifacts, such as internally within a proposal-writing team, or perhaps to a company's executive management for early approval, may significantly reduce effort and cost to develop a winning proposal.

Template Processing
Motivation for Template-Based Match Processing

The processing module we have disclosed in FIG. 20 may use direct match processing 2040 to determine relevance of an RFP to a PD, and may use functionality such as procedure Determine_Relevance_Matrix( ) (Ref. FIG. 35) to compute relevance of work elements of an RFP to work elements of a PD, which effectively represents relevance of an RFP work descriptor (as a whole) to a PD work descriptor (as a whole) in matrix format.

Thus we disclose that functionality such as provided by direct match processing 2040 and Determine_Relevance_Matrix( ) (Ref. FIG. 35) represent a nexus that may connect RFPs with PDs. We may consider a processing module (Ref. FIG. 20) as containing n PDs and m RFPs (which may be stored in a PD data store 2031 and an RFP data store 2032), and may determine that the number of times direct match processing 2040 may invoke Determine_Relevance_Matrix( ) (Ref. FIG. 35) to match all n PDs with all m RFPs equals the product of n times m (or simply, nm), such as to compute the resulting nm instances of relevance matrices (each such relevance instance may be analogous to an example illustrated in FIG. 37). Considering a real-world implementation of a processing module such as illustrated in FIG. 20, we disclose that it may be reasonable to expect, at any given time, thousands or tens-of thousands of PDs to be stored in a relevance management system 1140, such as in a PD data store 2031, e.g. on the order of $10^3<n<10^4$; and hundreds (if not thousands) of RFPs to be stored, such as in an RFP data store 2032, e.g. on the order of $10^2<m<10^3$. Thus we further disclose that it may be reasonable to expect a relevance management system 1140 to invoke functionality such as provided by Determine_Relevance_Matrix( ) (Ref. FIG. 35) roughly a million times (on the order of $10^6$) to produce the relevance matrices.

As we disclose above, a controller module 1142 may provide a workflow or other suitable type of processing to "shepherd" each PD and RFP instance through a processing module as illustrated in FIG. 20, which may use a dataflow architecture, or other suitable architecture, where process inputs such as PDs and RFPs in the PD 2031 and RFP 2032 data stores may be queued at each processing step, including for direct match processing 2040, and processing procedures may be executed when new or updated inputs arrive. By processing only new or updated inputs, functionality such as provided by a controller module 1142 may avoid unnecessary invocations of functionality such as Determine_Relevance_Matrix( ) (Ref. FIG. 35), including those beyond the nm.

We disclose that it is useful to consider system processing (within a processing module such as we disclose in reference to FIG. 20) that may be performed when, for example, a new RFP is entered in a relevance management system 1140. (The analysis is similar for a new PD.) As a new RFP may be shepherded through direct match processing 2040, a relevance management system 1140 may need to match it against all n PDs in a relevance management system 1140, i.e. invoking Determine_Relevance_Matrix( ) (Ref. FIG. 35) on the order of (conservatively) $10^3$ times. This illustrates the importance of automating direct match processing 2040, as may be accomplished by a relevance management system 1140 providing functionality such as a procedure Determine_Relevance_Matrix( ) (Ref. FIG. 35); for example, if an end user were to perform the $10^3$ matches manually for each new RFP entered in a relevance management system 1140, at a conservative estimate of 5 minutes per match, it would take an end user more than 80 hours to manually match the single RFP to all $10^3$ PDs.

We disclose that an important concern when providing functionality such as automated matching techniques such as Determine_Relevance_Matrix( ) (Ref. FIG. 35), which may in turn make use of document similarity matching techniques, now known or hereafter developed, such as TF-IDF, LSA, and others, as discussed in reference to FIG. 35, is the efficacy of such automated matching. Are the produced match results reasonable? Are they valid? One cannot expect, for example, an end user who has just entered a new RFP in a relevance management system 1140 to manually review all $10^3$ match results (that may represent high and low degrees of matching) such as produced by Determine_Relevance_Matrix( ) (Ref. FIG. 35), to gauge efficacy. Similarly, when an end user enters a new PD in a relevance management system 1140, to be matched against the (conservative) $10^2$ RFPs in a relevance management system 1140, is it possible to provide some level of assurance a priori such matching that an end user's PD description has been constructed effectively, and will indeed "match well" with a relevant RFPs?

Flow for Template-Based Match Processing

FIG. 110 generally depicts template processing, in accordance with an exemplary embodiment of the invention, which a relevance management system 1140 may use to improved match-processing efficiency as well as to gauge matching efficacy. As we disclose in further detail below, template processing such as we disclose in reference to FIG. 110 may be used to calibrate and validate RFP-to-PD relevance results before having a relevance management system 1140 perform all nm matches using functionality such as direct match processing 2040 and Determine_Relevance_Matrix( ) (Ref. FIG. 35). As we disclose in further detail below, functionality such as provided by template processing (Ref. FIG. 110) may have a PD or RFP owner perform (or review) a single RFP-to-PD match result to gauge efficacy, rather than requiring said owner to perform n or m matches or reviews (conservatively, $10^2$ or $10^3$ manual actions, which would not be feasible), for each PD or RFP entered in a relevance management system 1140, respectively.

We disclose in reference to FIG. 110 the use of a standard template (ST), which may be stored in an ST data store 11030 (which corresponds to a store 2030), and which may be used to represent and encode the relevance of a PD 11031 or an RFP 11032 in a standardized way for a PD 11051 or an RFP 11052, respectively.

We further disclose in reference to FIG. 110 that functionality provided through a standardized PD 11051 or a standardized RFP data store 11052 may be used for multiple purposes in a relevance management system 1140, which include, but are not limited to, the following. A first use may be to allow a PD owner and an RFP owner to view initial matching results for PD-to-ST and RFP-to-ST relevance (such as may be stored in a first store 11051 and a second store 11052, respectively) to determine how well a PD or RFP has matched with relevant elements in a standard template (ST). By inspecting the match result for a PD or RFP, an end user may gauge whether or not a PD or RFP may need to be improved, for example, by updating, augmenting, or replacing the current PD or RFP descriptive content, in order to improve match efficacy. An end user may, for example, decide to improve the description of a PD work element by including additional terms (e.g., rewriting "performed module construction . . . " as "performed software development to construct modules . . . " if said end user determined that a less commonly used phrase, such as "module construction", did not match well with an ST description, such as "software development"). After implementing such an update, a relevance management system 1140 may provide functionality that enables an end user to have said system perform functionality such as PD template pre-processing again, to determine if said update has improved the efficacy of matching.

A second use for a standardized PD 11051 or RFP 11052 data store may be to provide functionality to enable a relevance management system 1140 to efficiently estimate the relevance of an RFP to a PD when performing functionality such as template-based match processing 11060. As we disclose in reference to FIG. 114, FIG. 115, FIG. 116, and FIG. 117, functionality such as relevance estimation may be performed by leveraging the transitive nature of relevance that our definition of relevance provides. The resulting estimate of RFP-to-PD relevance, which may be relatively efficient to compute in an embodiment (in terms of time and computer processing resources), may be used to guide a relevance management system 1140 in determining whether or not it may appear worthwhile to invoke a relatively more heavyweight matching process, such as direct match processing 2040, for the purpose of computing a match result having higher fidelity than the said estimate. For example, template-based match processing 11060 may enable a relevance management system 1140 to efficiently identify potential RFP-to-PD results that appear promising and may warrant further processing, and conversely to identify potential RFP-to-PD results that do not appear promising and do not warrant further processing.

ST Project Descriptor Template Processing

Figure 111:
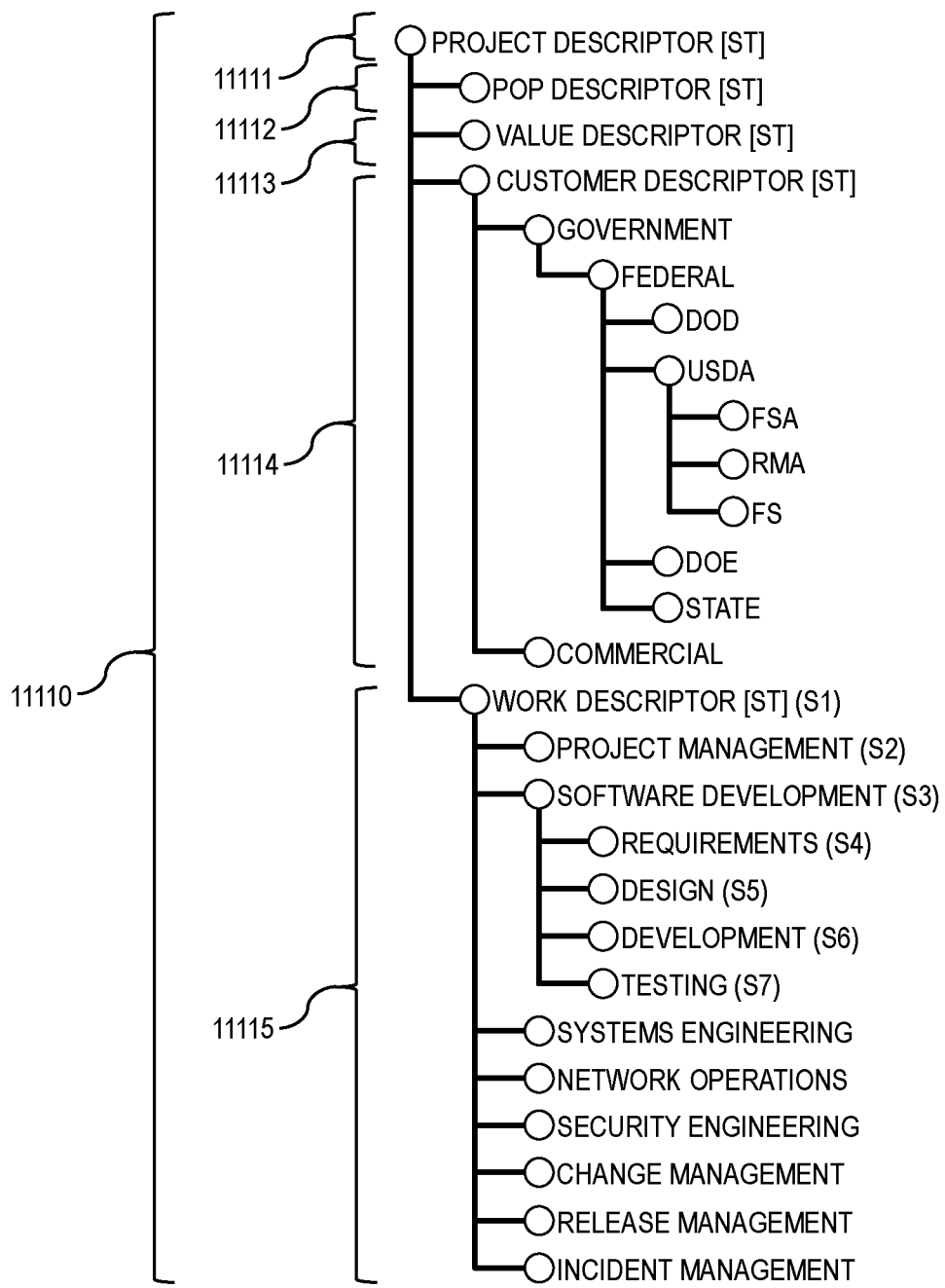

FIG. 111 generally depicts an ST Project Descriptor for template processing, in accordance with an exemplary embodiment of the invention, that is based on an ST depicted in FIG. 23, in which a work descriptor (Ref. 2315 and 11115) has been expanded. Said expanded work descriptor 11115 may provide functionality analogous to a PD or RFP work descriptor (such as illustrated by a first descriptor 2515 in FIG. 25 and a second descriptor 3015 in FIG. 30), namely to define a range of work elements that are within the scope of an ST work descriptor. Whereas a PD work descriptor (such as a third descriptor 2315 in FIG. 23) may define work that has been performed for a particular project, and an RFP work descriptor (such as said first descriptor 2515 in FIG. 25) may define work that may be performed for a future project, an ST work descriptor (such as a fourth descriptor 11115 in FIG. 111) may be intended to encompass both of these, by defining classes of work elements to represent the scope of work that may have been performed in any previous PD, as well as work that may be performed for any future project such as defined in an RFP. While such a scope definition is clearly a broad mandate for an ST work descriptor (such as said fourth descriptor 11115 in FIG. 111), we disclose that it may be accomplished by viewing an ST work descriptor as a taxonomy, ontology, or other organizational structure for a specific work domain, which may include, but are not limited, to "Information Technology Support Services", "Intelligence and Analysis Support Services", or "Research and Development Support Services", and so on. We disclose that a relevance management system 1140 may provide functionality to enable the entry and use within said system 1140 of multiple STs, such as we disclose in reference to an ST data entry process 2020 and an ST data entry interface such as FIG. 24 (which may include a meta-data section 2410 for identifying and creating multiple STs within a relevance management system 1140). In the specification of the present invention, we illustrate an ST work descriptor 11115 using terminology that aligns with an "Information Technology (IT) Support Services" work domain, without loss of generality. We can see in FIG. 111 that a work descriptor 11115 has been constructed to include a broad range of IT support services, including "Project Management", "Software Development" (and its component elements, "Requirements", "Design", "Development", and "Testing"), "Systems Engineering", and so on.

For the purpose of disclosing functionality, via the example we depict below in FIG. 118A through FIG. 118D, we have associated with the first seven elements of the ST work descriptor 11115 identifiers "S1", "S2", "S3", and so on through "S7", as shown. These ST identifiers are analogous to an array of identifiers shown for a PD work descriptor 3225 in FIG. 32 (e.g., "P8" through "P13"), and an RFP work descriptor 3325 in FIG. 33 (e.g., "R8" through "R14").

FIG. 112 generally depicts an ST data entry interface for template processing, in accordance with an exemplary embodiment of the invention, in which a controller module 1142 and an interface module 1143 may provide the necessary interface components and application logic for an ST data entry processes. We disclose in reference to FIG. 112 how an end user may be presented with functionality such as an interface 11200, which may be analogous to an interface 2400 in FIG. 24, that may present a view of an ST Project Descriptor 11110 that is in the process of being constructed, reviewed, or updated, such as by an administrative user.

We further disclose, in reference to an ST data entry interface 11200, that said interface may be comprised of sections, such as a meta-data section 11210, or an ST Project Descriptor section 11220, and that each such section can be considered its own interface, as can each field within a section.

Functionality provided by a meta-data section 11210 may include presenting information regarding an owner of a template 11211, which is an exemplar "Admin" administrative user in this case, as well as a system-generated unique identifier for a template 11212, which is an exemplar "ST001" in this case. A meta-data section may enable a user to provide a name for a template as well 11213.

Functionality provided by an ST Project Descriptor section 11220 may enable a user to update a customer descriptor section 11221, as we disclose in reference to FIG. 24, as well as a work descriptor section 11222. A user may have an ability to add 11230 or delete 11231 elements in a Project Descriptor section 11220, as well as rearrange or replicate elements or subtrees within a Project Descriptor section 11220. A Project Descriptor section 11220 may enable an end user to select elements, as we disclose by illustrating the selection of an element labeled Project Management 11223, whose circle is shown as darkened. A user may be provided functionality to enter data for a selected element label field 11224 as well as an element description field 11225. A relevance management system 1140 may provide functionality for a user to instruct said system to save 11240 to an internal ST data store 11030 changes made to a Project Descriptor, or to reject these changes by canceling 11241.

Further regarding functionality provided by an ST Project Descriptor section 11220, we can see in FIG. 112 that a user is in the process (not yet complete) of updating a work descriptor 11222, which when complete will correspond to a work descriptor 11115 illustrated in FIG. 111. In this example, when a user has completed updating a work descriptor 11222, said descriptor will contain the elements as shown in a descriptor 11115 in FIG. 111, and each said element may include a information such as a detailed description of that work element, as illustrated by an element 11224 for "Project Management" 11223. The functionality provided by a relevance management system 1140, such as a detailed description for an element (e.g., a description 11224 for "Project Management" 11223), may enable an administrative user, or other such user, to associate a description of a class of work with an element of an ST.

Relevance Validation and Tuning

A relevance management system 1140 may provide functionality such that when a new PD or RFP has been entered in a relevance management system 1140, functionality such as a controller module 1142 may implement a workflow process to "shepherd" each PD and RFP instance through a template processing module as illustrated in FIG. 110. For template processing (such as FIG. 110), a controller module 1142 may provide functionality to invoke PD template pre-processing 11041 or RFP template pre-processing 11042 for a PD or an RFP, respectively, that has been entered in a relevance management system 1140. Template pre-processing for a 11041 PD and an RFP 11042 may be analogous; we disclose the process for a PD without loss of generality.

Functionality provided by a controller module 1142 may initiate and perform PD template pre-processing 11041 by invoking procedure Determine_Relevance_Matrix( ) (Ref. FIG. 35) with a PD work descriptor in array format 3225 as argument A; an ST work descriptor in array format 3325 as argument B; as well as an instance of a Content_Comparator( ) function and a Min_Threshold value, as we disclose in reference to FIG. 35. Analogous to the execution and results as depicted in FIG. 37 (in which work descriptors for a PD and an RFP were used), a procedure Determine_Relevance_Matrix( ) (Ref. FIG. 35) may create a relevance matrix similar to a matrix 3730 in FIG. 37 in which individual entries (such as an array 3731) may represent relevance of a PD element to an ST element. A relevance management system 1140 may store the resulting relevance matrix, such as in a standardized PD data store 11051. A relevance management system 1140 may provide functionality, such as via a controller module 1142, to further invoke procedure Build_Relevance_Table( ) (Ref. FIG. 38), providing it as arguments a relevance matrix created by Determine_Relevance_Matrix( ) (Ref. FIG. 35), as well as the associated PD and ST work descriptors as arguments A and B, respectively. A relevance management system 1140 may store, such as in a relevance cube 2070, the resulting relevance table. We disclose that such "element-to-element" (E2E) relevance results may be analogous to the PD-Element-to-RFP-Element relevance results such as a result 5520 illustrated in FIG. 55, as indeed the PD, RFP, and ST Project Descriptors may share a common format, as we disclose in reference to in FIG. 20 and FIG. 21.

Figure 113:
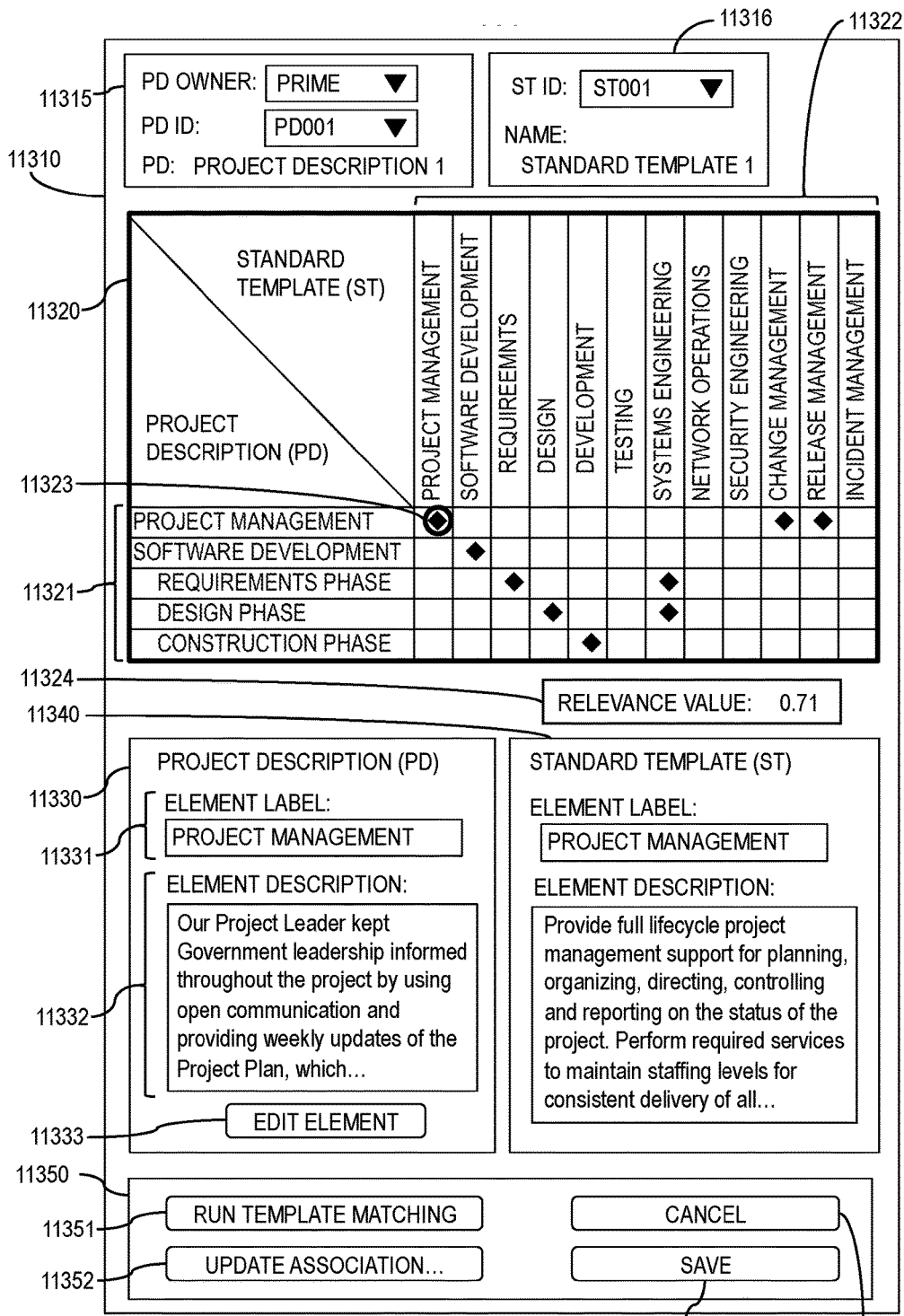

FIG. 113 generally depicts an element-to-element (E2E) relevance interface 11310, in accordance with an exemplary embodiment of the invention, which a relevance management system 1140 may use for relevance validation and tuning. Said system may provide functionality, such as illustrated in FIG. 113, as part of PD template preprocessing 11041, to present to an end user PD-to-ST element-to-element (E2E) relevance matrix results, such as may be computed by a call to Determine_Relevance_Matrix( ) (Ref. FIG. 35) and subsequent processing by a call to Build_Relevance_Table( ) (Ref. FIG. 38), using in this example a PD and an ST work descriptor as inputs.

A relevance management system 1140 may provide functionality for presenting to an end user such PD-to-ST E2E relevance results, using functionality such as a relevance interface 11310, which we disclose may be comprised of sections, such as a PD owner section 11315, an ST section 11316, an E2E relevance section 11320, a PD-element detail section 11330, or an ST-element detail section 11340, and that each such section can be considered its own interface, as can each field within a section. We further disclose that a relevance interface 11310 may provide similar functionality to an RFP-to-PD E2E relevance interface 5210 we disclose in reference to FIG. 52.

Regarding functionality such as provided by an E2E relevance section 11320, which may include a relevance chart type format or other suitable display metaphor to present results, those skilled in the art will recognize that the black diamond symbols ("♦"), such as shown in said section 11320, correspond to non-zero entries in a relevance matrix (e.g., an entry 3730, in an exemplar), which represents the basis for a model that an E2E relevance section 11320 may render as a view, and which may be performed using an MVC paradigm as previously discussed. Here again, we contemplate a broad range of alternative embodiments in which the so called "black diamonds" entries and the relevance chart in the E2E relevance section 11320 may be represented or displayed in alternative ways in alternative embodiments, as we disclose in reference to FIG. 43B above.

The functionality provided by an E2E relevance interface 11310 may have multiple uses, one of which may be to enable an end user to review or validate relevance results as computed by a relevance management system 1140 during PD template pre-processing 11041, to gauge efficacy. For example, did the correct work elements of a PD "match" with corresponding, relevant work elements of an ST? If so, an end user may conclude that a PD has been validated, such as having been effectively constructed to perform relevance matching. If there exists a PD element that an end user believes did not "match" properly, a relevance management system 1140 may provide functionality so that said end user may be able to update said PD element, for example by editing a PD element label or description (such as via functionality represented by "Edit element" 11333), or update an association between elements (such as via functionality represented by "Update association . . . " 11352), and may be provided an ability to run template matching again (such as via functionality represented by "Run template matching" 11351), to determine whether an updated description improved matching.

Further regarding functionality such as provided by an E2E relevance interface 11310, said interface may provide sections to provide information identify to a PD or a PD owner 11315, and to identify or select an ST 11316. As we disclose in reference to FIG. 113, an E2E relevance section 11320 may include information on a PD, here shown by PD work elements 11321, as well as information on an ST, here shown by ST work elements 11322. A relevance section 11320 may indicate the relevance of a PD element to an ST element by the presence of a black diamond, or other indicator as we disclose in reference to FIG. 43B. An E2E relevance section 11320 may enable an end user to select entries, for example as shown by a circle 11323 indicating selection of the intersection of the PD "Project Management" element 11321 and the ST "Project Management" element 11322. As a result of such selection, functionality such as on an E2E relevance interface 11310 may present to an end user additional information, which may include, but is not limited to, the relevance value associated with said selected PD and ST elements, shown in FIG. 113 by the relevance value 11324 displaying a value 0.71, which may correspond to the relevance of a PD Project Management element to an ST Project Management element, as may have been determined by a procedure Determine_Relevance_Matrix( ) (Ref. FIG. 35). Selection 11323 of a matrix element that does not contain a black diamond symbol, or other suitable symbol as we disclose in reference to FIG. 43B, may exercise functionality such as to display a relevance value 11340 of 0.0, or other suitable indicator.

Regarding functionality that may be provided by an E2E relevance interface 11310 when an RFP-to-PD entry has been selected 11323, we disclose that said interface may provide additional information using a PD-element detail section 11330 or an ST-element detail section 11340, whose functionality and operation may be similar to one another. An element detail section (such as a first section 11330 or a second section 11340) may present a label or description, or other relevant information, for said selected element, as shown in a PD-element detail section by a first section component 11331 and a second section component 11332, respectively. We disclose that a PD-element detail section 11330 may include edit functionality 11333 for an end user to update PD element information, for example by editing the contents of a PD element label 11331 or PD element description 11332, or performing other similar updates. We disclose that functionality such as the ability to update PD element information may be useful for an end user, for example, if a computed relevance value 11340 for a PD element does not agree with said end user's understanding of what an appropriate relevance value ought to be, based for example on their knowledge as a subject matter expert.

In providing functionality such as the ability to review results in an E2E relevance section 11320, relevance value 11324, and PD 11330 and ST 11340 element details, as well as being able to update PD element information 11333, an end user may thus "tune" a PD description so that a PD work element may more effectively match an appropriate, relevant ST work element. We disclose that the functionality provided by such a validation and refinement process may be effective for several reasons.

We disclose first that the information provided to an end user, such as by an ST-element detail section 11340, may include an ST element label (that identifies an ST work element class), and may include a detailed description of said work element. The information that is presented in an ST-element detail section 11340 thus may serve as a common "dictionary", "ontology", or other such representation, that defines a class of work elements. The information such as provided in an ST-element detail section 11340 may provide a PD owner with important clues as to how to best describe a PD work element said PD owner believe is relevant to an ST work element; for example an end user may identify specific terms that may be advantageously included in a PD element description, but which may have been inadvertently omitted when said PD was entered into a relevance management system 1140 (such as via a PD data entry process 2021).

We disclose second that, as we disclosed above without loss of generality, the functionality such as provided by an E2E relevance interface 11310 may be used to support RFP template pre-processing 11042. Thus, when an end user enters an RFP 2022 in a relevance management system 1140, said user may use process similar to that disclosed in the preceding paragraph to "tune" an RFP element label and description to best match a relevant ST element. The process of enabling both PD and RFP owners to potentially improve match results by tuning PD and RFP work-element descriptions to a common set of standardized work-element classes (as may be represented in the ST work elements), may reduce unfortunate and counterproductive "groping" that may occur during automated matching, such as where a relevant PD element and a relevant RFP element may have used dissimilar terminology to describe similar work, which may result in an erroneously low relevance score being computed by a relevance management system 1140 between said two elements. We disclose that a similar argument may be made, and addressed by a relevance management system 1140, in which dissimilar work elements may unfortunately have been described using similar terms, which may result in a "false positive" match. By providing functionality to disambiguate elements, for example using labels and descriptions of work elements in a PD and in an RFP, by using the process as we disclose above and supported by functionality such as provided by an E2E relevance interface illustrated in FIG. 113, a relevance management system 1140 may improve efficacy of relevance matching, and thus increase the value of a relevance management system 1140 to both a capability-providing 210 and a capability-seeking end user 211.

Relevance Relationships for Template Processing

FIG. 114 generally depicts relevance relationships useful for template processing (Ref. FIG. 110), in accordance with an exemplary embodiment of the invention. For our use in a relevance management system 1140, we may define relevance as a bidirectional, transitive relationship analogous to similarity. For example, if "Element 1 is similar to Element 2", and "Element 2 is similar to Element 3", then we may deduce that "Element 1 is similar to Element 3". We may express such statements as follows, where a symbol "⇔" represents a relevance, similarity or "related to" relationship:

If:
(1) Element 1 ⇔ Element 2
(2) Element 2 ⇔ Element 3
Then,
(3) Element 1 ⇔ Element 3
We can rewrite (1) and (2) succinctly as:
(4) Element 1 ⇔ Element 2 ⇔ Element 3
From which result (3) also follows.

We disclose that Element 2 here serves as an intermediary; if Elements 1 and 3 are both similar to Element 2, we can then deduce similarity between Elements 1 and Element 3. The functionality for computing relevance using an intermediary (such as a standard template, as will be discussed in reference to FIG. 110) is disclosed in a simplified form in reference to FIG. 114. In this example we would like to determine how an element in Set 1 11410 may be related to an element in Set 3 11430, with a restriction (for expository purposes) that when we determine such a relationship we may not be able to access both Set 1 11410 and Set 3 11430 simultaneously. We can think of such a restriction as Set 1 11410 and Set 3 11430 having different "owners", who are not able to work directly with one another.

To facilitate such a process, we disclose that we may create an intermediary such as Set 2 11420, whose four elements have been selected so that the domain they represent may encompass the domains of the elements in Set 1 11410 and Set 3 11430. For example, every element of Set 1 11410 may be related to (i.e., identified as "similar to") an element in Set 2 11420; and similarly, every element of Set 3 11430 may be related (i.e., identified as "similar to") an element in Set 2 11420. Note that Set 2 11420 is indeed a "set", and thus preferably does not contain repeating (i.e., identical) elements. Finally, we note that Set 2 11420 may be accessible simultaneously with Set 1 11410, and may also be accessible simultaneously with Set 3 11430.

We have used double-ended arrows in FIG. 114 to illustrate how elements of Set 1 11410 may be related to Set 2 11420, as well as how elements of Set 3 11430 may be related to Set 2 11420. For example, we can see that element "A" 11411 of Set 1 11410 is related to 11412 element "1" 11421 of Set 2 11420; similarly, we can see that element "Z" 11431 of Set 3 11430 is related to 11432 element "1" 11421 of Set 2 11420. These two relationships (Ref. 11412 and 11432) can be represented as:

(5) Element "A" ⇔ Element "1" ⇔ Element "Z"

Then, from (4) and (3) above we can "remove" the intermediary Element 1 using transitivity, to write:

(6) Element "A" ⇔ Element "Z"

FIG. 114 illustrates the following relationships (which includes (5) from above):

(7) Element "A" ⇔ Element "1" ⇔ Element "Z"
(8) Element "B" ⇔ Element "2" ⇔ Element "X"
(9) Element "3" ⇔ Element "Y"
(10) Element "C" ⇔ Element "4"

If we restrict the relationships in (7) through (10) to those that contain elements from both Set 1 11410 and Set 3 11430, we are left with relationships (7) and (8), to which we may apply (4) and (3) above to yield:

(11) Element "A" ⇔ Element "Z"
(12) Element "B" ⇔ Element "X"

The results above state that element "A" from Set 1 11410 is related to element "Z" from Set 3 11430, and that element "B" from Set 1 11410 is related to element "X" from Set 3 11430, which is easily confirmed in FIG. 114.

Looking forward, we may relate the example in FIG. 114 to functionality provided by template processing such as illustrated in FIG. 110 by noting that Set 1 11410 may correspond to an instance of a PD (such as a PD 11051); that Set 3 11430 may correspond to an instance of an RFP (such as an RFP 11052); and that intermediary Set 2 11420 may correspond to an instance of an ST (such as an ST 11030).

Furthermore, as we disclose in reference to FIG. 121A and FIG. 121B below, for a tag-based alternative embodiment, relationships between sets, such as between Set 2 11420 and Set 1 11410, may be viewed representing "tagging, where for example an element from Set 1 (such as Element A 11411) has been "tagged" by a label, such as may come from an element of Set 2 (such as Element 1 11421, which may represent a tag having the value of "1"). Thus we disclose that in a tag-based alternative embodiment, the relationships illustrated in FIG. 114 may represent Element A 11411 as having been tagged with 11412 a "1" 11421, and similarly for the other elements as shown in FIG. 114.

Template-Based Match Processing

FIG. 115 generally depicts pseudo-code for a procedure Template_Based_Match( ) that we disclose, in accordance with an exemplary embodiment of the invention, that a relevance management system 1140 may use to perform template-based match processing 11060 in FIG. 110.

Embodiment of the present invention may provide functionality such as we disclose in reference to FIG. 115, FIG. 116, FIG. 117, and FIG. 118, which illustrate procedures and functions a relevance management system 1140 may use to perform template-based match processing 11060, leveraging the transitive property of relevance as we disclose in reference to FIG. 114, and which we disclose may be formulated as a matrix product-like procedure in which the "product" operation may be generalized to a range of functions (such as the exemplars illustrated in FIG. 116) that may be more suitable for relevance computation.

Regarding the functionality and operation of procedure Template_Based_Match( ) depicted in FIG. 115, we disclose that said procedure is illustrated as taking three arguments. A first argument is a matrix P, which may have been created, such as during PD template pre-processing 11041, and which may have been produced by functionality such as procedure Determine_Relevance_Matrix( ) (Ref. FIG. 35).

A second argument is a matrix R, which may have been created during RFP template pre-processing 11042, and which also may have been produced by Determine_Relevance_Matrix( ) (Ref. FIG. 35). And a third argument is a function named Measure( ), which Template_Based_Match( ) may use when comparing elements of matrices P and D, as we disclose below.

FIG. 117 (A-D) generally depicts exemplar execution of procedure Template_Based_Match( ) depicted in FIG. 115, in accordance with an exemplary embodiment of the invention, representing execution of said procedure using inputs from FIG. 114.

We first illustrate operation of procedure Template_Based_Match( ) (Ref. FIG. 115) using data from the example in FIG. 114. FIG. 117A represents argument P, which represents the relationships between the elements of Set 1 11410 (corresponding to a first input 117A1), and the elements in Set 2 11420 (corresponding to a second input 117A4). We can see for example in FIG. 114 that element A 11411 in Set 1 is related to 11412 element 1 11421 in Set 2; correspondingly in FIG. 117A we can see that element A in a first set 117A2 is associated with identifier P1 in a second set 117A3, whose row in matrix P 117A9 has a "1" in the column associated with identifier S1 117A6, which is associated with element 1 117A5. The remaining two non-zero entries in the matrix P 117A9 correspond to the relationships between B and 2, and C and 4, analogously.

For clarity, we disclose that entries in matrix P 117A9, matrix R 117B9, matrix RT 117C9, and matrix Rel 117D9 that do not contain a value (e.g., are blank, here do not contain a "1") represent a value of zero. In addition, we disclose that indicators such as "I INDEX", "J INDEX", and "K INDEX" that may appear in said figures represent the direction that indices i, j, and k, respectively in procedure Template_Based_Match( ) (Ref. FIG. 115) will traverse a matrix.

FIG. 117B represents argument R, which represents the relationships between the elements of Set 3 11430 (corresponding to a first input 117B1), and the elements in Set 2 11420 (corresponding to a second input 117B4). We can see for example in FIG. 114 that element Z 11431 in Set 3 is related to 11432 element 1 11421 in Set 2; correspondingly in FIG. 117B we can see that element Z in a set 117B2 is associated with identifier R3 in 117B3, whose row in matrix R 117B9 has a "1" in the column associated with identifier S1 117B6, which is associated with element 1 117B5. The remaining two non-zero entries in the matrix P 117A9 correspond to the relationships between Y and 3, and X and 2, analogously.

We disclose that, in the general case, the dimensions of the two-dimensional matrices P and R are n by s, and m by s, respectively, where: n may be the number of work elements in the PD work descriptor used by a procedure Determine_Relevance_Matrix( ) (Ref. FIG. 35) to produce P; m may be the number of work elements in the RFP work descriptor used by a procedure Determine_Relevance_Matrix( ) (Ref. FIG. 35) to produce R; and s may be the number of work elements in the ST work descriptor used by a procedure Determine_Relevance_Matrix( ) (Ref. FIG. 35) in computing both P and R.

Looking ahead slightly, we can see in reference to FIG. 115 that procedure Template_Based_Match( ) uses three nested loops (having indices, i, j, and k) to traverse matrices P and R, analogous to the way two conformant matrices may traversed in a classic matrix multiplication (i.e., matrix product) procedure. We can see that matrices P and R are not conformant, i.e. the second dimension of P (namely, s) is not the same as the first dimension of R (namely, m). As such, procedure Template_Based_Match( ) (Ref. FIG. 115) begins by taking the transpose of matrix R, naming the result RT. The transpose of R is illustrated in FIG. 117C, where essentially the rows in matrix R 117B9, along with the associated identifiers 117B1, have become the columns in matrix RT 117C9, along with the associated identifiers 117C4; and similarly the columns in matrix R 117B9, along with the associated identifiers 117B4, have become the rows in matrix RT 117C9, also along with the associated identifiers 117C1.

Procedure Template_Based_Match( ) (Ref. FIG. 115) next creates an new empty two-dimensional matrix named Rel (illustrated by a matrix 117D9 in FIG. 117D), whose dimensions correspond to the "product" of P and RT, namely n by m.

Next, Template_Based_Match( ) (Ref. FIG. 115) uses three nested loops with indices, i, j, and k to traverse the P and RT matrices, calling a function Measure( ) for each combination of $P_{i,k}$ and $RT_{k,j}$ elements, analogous to a matrix-product traversal. However, unlike a standard matrix-product traversal, here we disclose that we have generalized the operation performed on each $P_{i,k}$ and $RT_{k,j}$ pair, using a function Measure( ) to perform the generalized operation.

FIG. 116 (A-C) generally depict pseudo-code for functions Intersection( ), High_Pass_Filtered_Average( ), and Product( ) that we disclose, in accordance with an exemplary embodiment of the invention, that may be used in procedure Template_Based_Match( ) (depicted in FIG. 115) as input argument Measure( ).

FIG. 116A, FIG. 116B, and FIG. 116C illustrate exemplar Measure( ) functions that procedure Template_Based_Match( ) (Ref. FIG. 115) may use to provide functionality. We contemplate a broad range of functions that may be used for Measure( ), illustrating in FIG. 116A an exemplar function that implements the intersection (i.e., overlap) between two ranges of values; in FIG. 116B an exemplar function that essentially filters out non-relevant values (illustrated here as values below an exemplar threshold value of 0.25, although we contemplate use of a broad range of threshold values) by returning a value of zero, or alternatively returning the average of the two values for non-filtered values; and in FIG. 116C an exemplar product operation, which is similar to matrix multiplication. Those skilled in the art will recognize that the exemplar Measure( ) functions we disclose, as well as other functions such as the "union", "maximum", "difference", and so on for a broad range of mathematical functions, may be combined in a variety of ways, such as filtering combined with averaging as illustrated in FIG. 116B in alternative embodiments, and such embodiments are intended to be within the scope of the present invention.

We illustrate in FIG. 117D the use as an exemplar of function Intersection( ) (Ref. FIG. 116A) as the function passed to Template_Based_Match( ) (Ref. FIG. 115) as parameter Measure( ); the use of other functions is analogous. For all of the traversals of the i, j, and k indices in this example, at least one of the $P_{i,j}$ and $RT_{k,j}$ elements (from a matrix 117A9 in FIG. 117A and from a matrix 117C9 in FIG. 117C, respectively) are equal to zero, except for the case where {i=2, j=1, k=2} and {i=1, j=3, k=1}. For the cases where either $P_{i,k}$ or $RT_{k,j}$ is zero, the call to Intersection( ) (Ref. FIG. 116A) will return a value of zero, as it is the minimum of the two. For the cases where both $P_{i,k}$ and $RT_{k,j}$ are non zero (in this example their values are "1"), the call to the Intersection( ) function (Ref. FIG. 116A) will return a value of 1. We can see in FIG. 117D that indeed the two non-zero entries in matrix Rel 117D9, here both having a value of "1", correspond to the two cases noted above, namely {i=2, j=1, k=2} and {i=1, j=3, k=1}. And, we can observe, by inspection of these two non-zero entries in matrix Rel 117D9, that the matrix Rel 117D9 indicates that element A is related to element Z, and that element B is related to element X, which we can confirm agree with the relevance results we disclosed above in reference to FIG. 114, indicating that procedure Template_Based_Match( ) depicted FIG. 115 has produced the correct result for this example.

At the completion of Template_Based_Match( ) (Ref. FIG. 115), the procedure returns the matrix Rel. At the completion of template-based match processing 11060, a relevance management system 1140 may save the resulting estimate of RFP-to-PD relevance, such as in a template-based relevance data store 11070.

FIG. 118 (A-D) generally depict exemplar execution of procedure Template_Based_Match( ) depicted in FIG. 115, in accordance with an exemplary embodiment of the invention, representing execution of said procedure using inputs from the extended example we have used throughout the specification of the present invention.

FIG. 118A, FIG. 118B, FIG. 118C, and FIG. 118D further illustrate the functionality and operation of template-based match processing 11060, and how a relevance management system 1140 may use functionality such as provided by procedure Template_Based_Match( ) (Ref. FIG. 115) and a function Measure( ), here again an exemplar function Intersection( ) (Ref. FIG. 116A), to estimate the relevance of an RFP to a PD, using data from the extended example, where RFP ID is RFP001 and PD ID is PD001.

As with the example illustrated in FIG. 117A, FIG. 117B, FIG. 117C, and FIG. 117D, here too the matrices depicted in the figures correspond to P, R, RT, and REL matrices in FIG. 118A, FIG. 118B, FIG. 118C, and FIG. 118D, respectively. For clarity of presentation, this example exercises only the first seven elements of the ST work descriptor 11115, which have been given identifiers "S1" through "S7" 11115, and which correspond to a first array 118A2, a second array 118B2, and a third array 118C1.

The PD used in this example contains the work descriptor shown in FIG. 32, which includes a PD work descriptor 3215 whose elements are associated with an array of identifiers 3225 that have the values "P8" through "P13", and which correspond to a first array 118A1 and a second array 118D1, as part of the input P 118A3 and resulting Rel 118D3 matrices.

The RFP used in this example has the work descriptor shown in FIG. 33, which includes a PD work descriptor 3315 whose elements are associated with an array of identifiers 3325 that have the values "R8" through "R14", and which correspond to a first array 118B1, a second array 118C2, and a third array 118D2, as part of the input R 118B3, RT 118C3, and resulting Rel 118D3 matrices.

The PD-to-ST relevance matrix values we disclose in FIG. 118A may have been produced by functionality such as provided by PD template pre-processing 11041, which may have used Determine_Relevance_Matrix( ) (Ref. FIG. 35). For the purposes of illustration, the matrix relevance values in P 118A3 are depicted as ascending values, starting with 0.70 and ending at 0.75. This has been done to more easily trace these values through execution of Template_Based_Match( ) (Ref. FIG. 115), for clarity of explanation.

Similarly, the RFP-to-ST relevance matrix values we disclose in FIG. 118B may have been produced by functionality such as provided by RFP template pre-processing 11042, which may have used Determine_Relevance_Matrix( ) (Ref. FIG. 35). Again, for the purposes of illustration, the matrix relevance values in R 118A3 are shown as ascending values, starting with 0.80 and ending at 0.86. This too has been done to more easily trace these values through the execution of Template_Based_Match( ) (Ref. FIG. 115), for purposes of explanation.

FIG. 118C illustrates construction by Template_Based_Match( ) (Ref. FIG. 115) of an RT matrix from an R matrix 118B3, whose construction is analogous to that illustrated in FIG. 117B and FIG. 117C.

For clarity, we disclose that entries in matrix P 118A3, matrix R 118B3, matrix RT 118C3, and matrix Rel 118D3 that do not contain a value (e.g., are blank) represent a value of zero. In addition, we disclose that indicators such as "I INDEX", "J INDEX", and "K INDEX" that may appear in said figures disclose the direction that indices i, j, and k, respectively, in procedure Template_Based_Match( ) (Ref. FIG. 115) will traverse a matrix.

In reference to FIG. 118D we disclose the matrix Rel 118D3 and the results of the iteration by Template_Based_Match( ) (Ref. FIG. 115) through the i, j, and k indices and the calls to a Measure( ) function, here again using the exemplar Intersection( ) function (Ref. FIG. 116A). As with the previous example, we disclose that for many combinations of the i, j, and k indices, either $P_{i,k}$ or $RT_{k,j}$ is equal to zero, and thus the call to the Intersection( ) function (Ref. FIG. 116A) will return a zero as the minimum, resulting in the corresponding $Rel_{i,j}$ entry being assigned a zero value.

FIG. 119 generally depicts exemplar execution values for procedure Template_Based_Match( ) depicted in FIG. 115 using ST, PD, and RFP inputs, in accordance with an exemplary embodiment of the invention, representing execution of said procedure using inputs from the extended example we have used throughout the specification of the present invention. Specifically, FIG. 119 illustrates the state of several variables and values 11901 during execution of Template_Based_Match( ) (Ref. FIG. 115), in particular for those iterations of the i, j, and k indices in which both of the $P_{i,k}$ 11903 and $RT_{k,j}$ 11904 values are non-zero. A column 11905 shows application of an exemplar Intersection( ) function (Ref. FIG. 116A), namely the result of a call to Minimum( ), and a column 11906 discloses the resulting value assigned to the $Rel_{i,j}$ matrix entry. We can see, for example that when the i, j, and k indices 11902 equal 2, 7, and 2, respectively (a shown in a row 11910), that Template_Based_Match( ) (Ref. FIG. 115) will be traversing the P and RT matrices with $P_{2,2}$=0.71 and $RT_{2,7}$=0.82, respectively. The call to the Minimum( ) within Template_Based_Match( ) (Ref. FIG. 115), will return the minimum of these two values, namely 0.71, which will be assigned to the $Rel_{2,7}$ as shown in column 11906. Computation of the remaining values for $Rel_{i,j}$ 11906 is analogous.

Relevance Advisor Processing

We disclose that the results such as computed by a template-based match processing 11060 represent an estimate of the relevance of an RFP to a PD, as computed by a relevance management system 1140 from the relevance of an RFP to an ST 11051 and the relevance of a PD to said ST 11052, as may be determined during embodiments such as RFP template 11042 and PD template 11041 pre-processing. Indeed, we may compare an example of RFP to PD relevance results computed by direct match processing 2040 with results computed by template-based match processing 11070, by viewing exemplar matrix 3732 and exemplar matrix 118D3, respectively. Here we can see that the said matrices have produced similar but different results, which may be the result of a number of factors. In a real-world implementation of a relevance management system 1140, it may be likely that direct match processing 2040 produces results with higher efficacy, as the matching process works directly with PD and RFP instances, rather than through an intermediary, such as an ST.

However, we disclose that template-based match processing 11060 may also have significant advantages over direct match processing 2040. One of these advantages may be processing speed or efficiency, as we observe that procedure Template_Based_Match( ) (Ref. FIG. 115), and the Measure( ) functions it may call, such as exemplars Intersection( ) (Ref. FIG. 116A), High_Pass_Filtered_Average( ) (Ref. FIG. 116B), and Product (Ref. FIG. 116C), are computationally relatively lightweight, consisting primarily simple comparisons, as opposed to more computationally intensive TF-IDF, LSA, or other document similarity matching techniques, now known or hereafter developed, that may be used in direct match processing 2040. In effect, the "hard work" of matching a PD or an RFP to an ST, performed during processing such as PD 11041 and RFP 11042 template pre-processing, need only be performed once per PD or RFP, and the ensuing m calls to Template_Based_Match( ) (Ref. FIG. 115) performed to match that PD to the m RFPs (and the n matches performed to match that RFP to the n PDs) may be performed using a computationally lighter weight process, such as template-based match processing 11060. In a real-world implementation, a template-based match processing 11060 for a PD and an RFP may be one, two, or more orders of magnitude faster computationally than direct match processing 2040.

To take advantage of such computational efficiencies we disclose that a relevance management system 1140 may provide functionality such as performing relevance advisor processing 11080, and via such advisor processing may interact bi-directionally 11090 with a direct-matching based relevance processing, as also illustrated in FIG. 20).

We disclose that the relevance results that may be produced by template-based match processing 11060, and may be stored in a template-based relevance data store 11070, may be structurally or functionally equivalent to relevance results such as produced by direct match processing 2040, and thus may also be stored without difficulty, such as in a relevance data store 2045. As such, RFP-to-PD relevance results stored in a template-based relevance data store 11070 may be processed by a relevance management system 1140 in the same way as those stored in a relevance data store 2045, which may include, but is not limited to, performing ETL processing 2060 and storing such results in a relevance cube 2070, said results may be indicated as having been produced via template-based match processing 11060, as opposed to having been produced via direct match processing 2040, or another method. As such, relevance results from these two processing methods (direct match processing 2040 and template-based match processing 11060) may be identified and disambiguated by a relevance management system 1140, and both may be stored in a common data store 2050 and processed equivalently by ETL processing 2060. Using the ETL processing 2060 relevance results produced via template-based match processing 11060, a relevance management system 1140 may be able to access and compare aggregated relevance results (i.e., relevance values) of RFP-to-PD relevance values produced via these two different methods (e.g., direct match processing 2040 and template-based match processing 11060 in FIG. 110).

Functionality that is provided in a relevance management system 1140 such as relevance advisor processing 11080, which is part of template processing 2050, may collaborate with a controller module 1142 in determining when direct match processing 2040 may be advantageously performed for a new PD or RFP that has been entered in a relevance management system 1140, which may be stored such as in a PD 2031 or RFP 2032 data store. For example, if an RFP-to-PD relevance value estimated by template-based match processing 11060 is below a specified threshold for an RFP and PD, relevance advisor processing 11080 may instruct a controller module 1142 to defer or cancel direct match processing 2040 for said RFP and PD pair, as the likelihood is low of direct match processing 2040 identifying a good match when template-based match processing 11060 did not identify a good match for said pair. By deferring or canceling such un-promising direct match processing (which may be computationally expensive), a relevance management system 1140 may be able to reduce the computational load of a relevance management system 1140, or improve throughput or turnaround time for PD and RFP pairs that are more likely to produce higher matches, by prioritizing direct match processing 2040 for said PD and RFP pairs that received higher match value estimates during template-based match processing 11060.

In addition, relevance advisor processing 11080 may collaborate with relevance quality control processing 2055 to perform a check on the efficacy of a result produced by direct match processing 2040, as compared to a result produced by template-based match processing 11060. For example, we disclose that a match estimate result for a PD and an RFP from template-based match processing 11060 may be a good indicator of an expected match value that may be produced by direct match processing 2040; for example, a PD and RFP that received a high match estimate via template-based match processing 11060 ought to produce a high match value during direct match processing 2040, and conversely for a low match estimate. We disclose that using such logic, relevance quality control processing 2055 may compare such results to identify divergent cases, for multiple purposes.

We disclose that if relevance quality control processing 2055 identifies a divergence between results of template-based and direct match processing that exceeds a threshold, which may be specified by a user, for a PD and RFP pair, a relevance management system 1140 may defer subsequent processing of said pair, for example by not sending the relevance results of said pair on to ETL processing 2060. Performing such action may improve the quality of final results produced by a relevance management system 1140, for example by halting subsequent processing of erroneous matches, and thereby maintaining high data quality. When relevance quality control processing 2055 identifies such a said divergence, a relevance management system 1140 may notify affected users, such as a PD owner 1110, an RFP owner 1130, or an administrative user 1120, so that corrective action may be taken. Through functionality provided by such processes that include combinations of identifying, capturing, understanding, and correcting such said divergences, affected users such as a PD owner 1110, an RFP owner 1130, or an administrative user 1120, may be able to improve their skill in using a relevance management system 1140, of may facilitate further improvements to said system itself.

Implementation of Invention and an Embodiment
Computer-Based Device with a Computer-Based Product The present invention is implemented on a computer-based device and with a computer-based product. The computer-based device may be a plurality of devices connected over a network. A discussion on how computers and network work is presented in "How Computers Work," 10th Edition, Ron White, McMillan Computer Publishing, 2014; as well as in "Encyclopedia of Computer Science," 4th Edition, Anthony Ralston (Editor), Edwin D. Reilly (Editor), and David Hemmendinger (Editor), Nature Publishing Group, 2000, of which the entire contents of both is incorporated by reference.

We disclose in reference to FIG. 120 a block diagram of a general purpose computer system that is operable to be used to execute one or more computer programs implementing the embodiments described herein, including steps described herein. It will be apparent to one of ordinary skill in the art that a more sophisticated computer system is operable to be used. Furthermore, components can be added or removed from the computer system 12000 to provide the desired functionality.

The computer system 12000 includes one or more processors, such as processor 12002, providing an execution platform for executing software. Commands and data from the processor 12002 are communicated over a communication bus 12006. The computer system 12000 also includes computer readable storage mediums including a main memory 12004, such as a Random Access Memory (RAM), where software is resident during runtime, and a secondary storage 12008. The secondary storage 12008 includes, for example, a hard disk drive or a removable storage drive representing a floppy diskette drive, a magnetic tape drive, a compact disk drive, etc., or a nonvolatile memory where a copy of the software is stored. In one example, the secondary storage 12008 also includes ROM (read only memory), EPROM (erasable, programmable ROM), EEPROM (electrically erasable, programmable ROM). The computer system 12000 includes one or more input/output (I/O) devices 12012, such as a display, keyboard, a mouse, a stylus, and the like. A network interface 12010, wired or wireless, is provided for communicating with other computer systems.

One or more of the steps of the methods described herein and other steps described herein and one or more of the components of the systems described herein may be implemented as software code stored on a computer readable medium, such as the memory or secondary storage, and executed on a computer system, for example, by a processor. For example, the steps of the embodiments may exist as software program(s) comprised of program instructions in source code, object code, executable code or other formats for performing some of the steps. Any of the above may be embodied on a computer readable medium, which include storage devices. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes.

ALTERNATIVE EMBODIMENTS

Alternative Embodiment 1

We have disclosed in reference to FIG. 11 how we contemplate an embodiment in which one or more proxies may perform the roles and activities associated with users (such as a first 1110, second 1130, or third 1120 user in FIG. 11). We have also disclosed in reference to FIG. 24, FIG. 26, and FIG. 31 how we contemplate an embodiment in which an end user may create such an ST, PD, or RFP instance, such as externally to a relevance management system 1140, such as in a file, and have said instance imported directly into a relevance management system 1140 by a corresponding data entry process (such as a first 2021, second 2020, or third 2022 process, respectively, in FIG. 20), and that the functionality of such data entry may be performed by web services and other service-oriented methods and services over an Internet or network. In addition to such embodiments, we contemplate more broadly the functionality that may be provided in an alternative embodiment in which an input and output activity associated with a relevance management system 1140 may be performed via a web service or other method or services, such as a "cloud" or distributed service, over an Internet or network. Such embodiments may include, but are not limited to, web-service, remote, or local type access to all data stores, which may include, but is not limited to, a first 2030, second 2031, third 2032, or fourth 2045 store in FIG. 20; a first 11030, second 11031, third 11032, fourth 11051, fifth 11052, or sixth 11070 store in FIG. 110; or data cube embodiments (which may include, but is not limited to, a cube 2070 in FIG. 20). In addition we contemplate an embodiment where said access to said data stores or data cubes may include, but is not limited to, functionality to create, read, update, or delete (CRUD) data in said data stores or data cubes, and that said access to said data stores or data cubes may be performed by an intermediary service, rather than via direct access to said data stores or data cubes. Those skilled in the art will recognize that such an embodiment may employ techniques such as a service-oriented architecture (SOA) or an enterprise service bus (ESB), and such embodiments are intended to be within the scope of the present invention.

Alternative Embodiment 2

We also contemplate an embodiment in which CRUD or other type of access to said data stores and data cubes may be used for a broad range of purposes, which may include, but are not limited to, exporting data from a relevance management system 1140, and importing data into a relevance management system 1140. We furthermore contemplate an embodiment where said exporting and importing of data may be used to facilitate performing a processing step in a relevance management system 1140, which may, for example, involve exporting data from a relevance management system 1140, performing processing of said exported data using alternate or comparable processing, and possibly importing into said system embodiment a result produced by said alternate or comparable processing. We contemplate that said processing step in an embodiment may include, but is not limited to, data entry processing (Ref 2020, 2021, or 2022), direct match processing 2040, ETL processing 2060, capability determination processing 2080, RFP relevance processing 2085, team construction processing 2090, or quality control processing 2055, as well as template processing (Ref. 11041 or 11042), template-based match processing 11060, or relevance advisor processing 11080. As an example, we contemplate an embodiment in which relevance results (for example, such as may be stored in embodiments such as a relevance data store 2045 or relevance cube 2070 may be provided to external peer or downstream services, which may incorporate said relevance results to create value-added services or offerings for end users (Ref 1110 and 1130) or other entities.

Alternative Embodiment 3

Further regarding the use of proxies that may perform roles and activities on behalf of end users (Ref 1110 and 1130), we contemplate an embodiment in which a user may operate within a relevance management system 1140 as a capability-seeking end user 1130, to identify capability-providing end users 1110 who may advantageously serve as a prime contractor or a subcontractor, such as with respect to a specific RFP. For example, such an entity may operate to facilitate the formation of teams, such as by identifying potential team members, such as by their experience and capabilities, and potentially brokering communication between or among said potential team members, to facilitate team formation, possibly as a value-added service.

Alternative Embodiment 4

Further regarding the formation of teams, such as we disclose in reference to FIG. 97, we contemplate an embodiment with enhanced recommendation functionality, which may extend functionality we disclose above as represented by "Recommendation" 9734. Said enhanced recommendation functionality may operate in multiple ways, for example, to identify a most advantageous (perhaps, optimal) set of PDs (from a collection of PDs) that an end user may select, in order to maximize a score with respect to a criteria, such as maximizing said end user's PD owner relevance score. (For example, identify a set of PDs, whose number may be bounded, that maximize a PD owner's relevance score; said set of PDs may represent the PDs that a PD owner should submit to maximize a proposal evaluation score.) We contemplate a second type of enhanced recommendation functionality, which may build upon the first enhanced recommendation functionality just disclosed, in which a relevance management system 1140 may provide recommendations regarding a most advantageous team that an end user may construct, which too may maximize a score with respect to a criteria, such as maximizing said team's relevance score. (For example, identify a set of PD owners and corresponding PDs, either of whose number may be bounded, that maximizes a team's overall relevance score.) We contemplate a broad range of multi-objective optimization techniques that may be used to provide such enhanced recommendation functionality in alternative embodiments, and such embodiments are intended to be within the scope of the present invention.

Alternative Embodiment 5

While the embodiments illustrated in FIG. 20 and FIG. 110 focus on direct match processing and template-based match processing, respectively, we contemplate an embodiment in which a controller module 1142 may enable a PD and an RFP pair, such as may be stored in a PD 2031 or an RFP 2032 data store, to bypass direct match processing, and which may result in an "unmatched" relevance result being placed in a data store, such as, but not limited to, a relevance data store 2045. We contemplate that an end user may be able to use an element-to-element (E2E) relevance interface 11310 to view, update, and save such said unmatched (or, matched) relevance result, which may include, but is not limited to creating, deleting, or otherwise updating associations 11352, such as represented by an exemplar black diamond, or other suitable indicator such as we disclose in reference to FIG. 43B, indicating that a PD work element 11321 is relevant to an RFP work element 11322, and which may include providing a relevance value 11324, or updating a PD element 11333, or other element. In effect, the functionality disclosed above will enable an alternative embodiment in which an end user may manually create (or update) in a relevance management system 1140 an RFP-to-PD relevance result, that a relevance management system 1140 may subsequently further process, for example by performing ETL processing 2060 for said RFP-to-PD relevance result. As a result, an end user may exercise embodiments such as capability determination processing 2080, RFP relevance processing 2085, or team construction processing 2090 using an RFP-to-PD relevance result that has been manually created (or manually updated).

Alternative Embodiment 6

Although the specification of the present invention disclose a sub-descriptor, such as a work descriptor (e.g., a first descriptor 2515 or a second descriptor 3015), as comprised of multiple elements (organized hierarchically, or otherwise), in a relevance management system 1140 said descriptor may contain zero, one, or more elements (organized hierarchically, or otherwise). In this way, we contemplate an embodiment in which, for example, a work descriptor for a PD 410 or an RFP 420, or a portion of said PD or RFP, such as a SOW 421, may be comprised of a single work element representing a whole, rather than comprised of a collection of work elements whose sum represents a whole. As a result, for example, a relevance management system 1140 may be able to perform relevance processing (such as illustrated in FIG. 2085, for example) for an RFP and a PD that may match individual RFP work elements to a PD in its entirety, or may match an RFP in its entirety to individual PD work elements, or may match an RFP in its entirety to a PD in its entirety. Such embodiments are intended to be within the scope of the present invention.

Alternative Embodiment 7

FIG. 121A and FIG. 121B generally depict tag-based Project Descriptors sub-descriptor for an exemplar ST and PD, respectively, in accordance with an exemplary embodiment of the invention. We have disclosed the use of a standard template (ST), such as in reference to FIG. 23 and FIG. 111, within a relevance management system 1140, for multiple purposes. For example, we have disclosed above the use of an ST in simplifying the PD and RFP data entry process and corresponding classification of a PD or RFP, such as with respect to identifying a customer associated with said PD or RFP. (For example, the selection of "FSA" as illustrated in FIG. 27 associates an exemplar PD with a customer that is of type "Government, Federal, USDA, and FSA".)

We disclose that a Project Descriptor, which may represent an ST, PD, or RFP, or a sub-descriptor of which it is comprised, may be represented as a set or collection of "tags" or "tag nodes", or a set of said set of tags or tag nodes. This is illustrated in FIG. 121A, in which we have represented the customer descriptor 2314 illustrated in FIG. 23 as a set-based ST customer descriptor 121A10, which contains tag nodes for "Government" 121A11, "Federal" 121A12, and so on through "Commercial" 121A13. We disclose that a "tag" associated with a tag node may represent a label for said node; and that a tag node may also have a description associated with said tag node, as well as other fields. Using such tag-based representation, which may correspond with a non-tag-based representation, we disclose that an ST may enable an end user to "tag" a PD or an RFP, with results that are analogous to and also more general than, the selection and identification process we disclose in reference to FIG. 27. For example, we illustrate in FIG. 121B a tag-based PD customer descriptor that corresponds to a PD customer descriptor 2513 in FIG. 25. Here a user has "tagged" the PD customer with tags for "Government" 121B11, "Federal" 121B12, "USDA" 121B13, and "FSA" 121A13, which correspond to the customer descriptor elements in 2513 in FIG. 25, although a user may have alternatively tagged the customer with a subset of such tags, such as only "Federal" 121B12, or "FSA" 121A13, or some other combination. We have further disclosed above the use of an ST in facilitating template-based match processing 11060, where an ST may serve as an intermediary. Here too we now disclose that the association of an element of a PD or an RFP with an element of an ST (such as we disclose in reference to FIG. 113) may be viewed as a PD or an RFP as having been "tagged" with an identifier, such as may be associated with an ST. (For example, the PD "Construction Phase" element in 11321 may be viewed as having being "tagged" with a "Development" identifier from an ST 11322, with the "tag" association represented by the presence of the exemplar black diamond indicator that relates these two items, as shown.) Thus we disclose that an ST may represent, in an alternative embodiment, a collection of "tags", specified a priori or determined dynamically, such as by a user, that may be associated with a PD or an RFP, and that such tag-based embodiments, which may be used such as to facilitate data entry or template-based match processing (such as we disclose in reference to FIG. 110), are intended to be within the scope of the present invention.

Alternative Embodiment 8

In the specification of the present invention, we disclose subcontractor's typical role in a relevance management system 1140 as being that of a PD provider 210. In the specification of the present invention, including in reference to FIG. 4, we have disclosed a two-tiered teaming process, namely where a prime contractor (at a first level) may lead a team of subcontractors (at a second level). Those skilled in the art will recognize that teaming may involve an arbitrarily deep number of levels, where for example a subcontractor that is "subbing" to a prime contractor may in fact represent a team of subcontractors (who are in effect sub-subcontractors, with respect to a prime contractor), one or more of whom could also represent a team of subcontractors (who in effect would become, sub-sub-subcontractors to a prime contractor), and so on. For clarity of presentation in the specification of the present invention, we have disclosed an embodiment that involves two levels, namely a prime contractor at a highest level and a subcontractor at a secondary level; however, we contemplate an alternative embodiment that supports an arbitrarily deep number of levels. An embodiment may enable said arbitrarily deep number of levels in a variety of ways, which may include, but are not limited to, the use within a relevance management system 1140 of end users having multiple roles, as well as aggregation across teaming. For example, we contemplate an embodiment in which: a subcontractor may serve in a role as a "prime contractor" (such as a user 1130), which may include providing as input to a relevance management system 1140 a "subcontractor RFP" (analogous to an RFP 420); a potential sub-subcontractor (as disclosed above) may serve in a role as a "subcontractor" (such as a user 1110); and functionality that may be provided using roll-up-by-team (such as may be performed by a processing step S541) applied across team dimensions (such as a first dimension 5411 or a second dimension 5411, which may correspond to Level 1 in FIG. 21). In an alternative embodiment a first subcontractor may aggregate experience and capabilities of a second subcontractor. In effect, in such an embodiment, a first subcontractor may identify and construct a first team (at a first level) that comprises a second subcontractor (at a second level); a prime contractor may then identify and construct a second team (at a first level) that comprises a third subcontractor (at a second level); said third subcontractor may be a team, such as the first team constructed by the first subcontractor; and analogously for additional levels. Such embodiments are intended to be within the scope of the present invention.

Alternative Embodiment 9

We contemplate an alternative embodiment of a relevance management system 1140 in which an end user (Ref. 1110 and 1130) may specify or restrict access to a PD or an RFP with which said end user is associated, within a relevance management system 1140. For example, a capability-seeking end user 1130 that also operates as a capability-providing end user 1110 may not wish to make "publicly available" a PD with which said user is associated, but rather may wish said PD to only be visible or accessible within a relevance management system 1140 to said user, or other such restrictive set of users. In this way, said user would be able to more discreetly identify potential team members whose capabilities and experience complement those of said user, without said user having to disclose said user's capabilities and experience to other users. We contemplate an embodiment in which users may be provided fine-grained control of access to projects with which they are associated in a relevance management system 1140, and such embodiments are intended to be within the scope of the present invention.

Alternative Embodiment 10

We contemplate an embodiment of a relevance management system 1140 in which match results are determined and estimated not only between an RFP and a PD (i.e., RFP-to-PD relevance), but also between a first and second RFP (i.e., RFP-to-RFP relevance), a first and second PD (PD-to-PD relevance), as well as between a first and second ST (i.e., ST-to-ST relevance). For example, said RFP-to-RFP relevance results may be helpful in identifying a previous RFP that is similar to a current RFP; such information may be of value to a capability-seeking end user, who may have prepared a proposal in response to said previous RFP, and thus may advantageously use content from said previous proposal in responding to said current RFP. Such embodiments are intended to be within the scope of the present invention.

Alternative Embodiment 11

We contemplate an embodiment of a relevance management system 1140 whose inputs are not from the contracting domain, and which for example may not used for the purpose of helping to prepare a proposal in response to an RFP. We contemplate broader application of a relevance management system 1140 to domains in which aggregated capabilities may be advantageously matched to meet requirements, including aggregated requirements. For example, such alternative embodiments may include, but are not limited to, identifying a team of personnel to meet a project's requirement, such as based on the cumulative experience and capabilities of said personnel, such as may have been acquired through work experience, education, or other methods. An alternative embodiment may include matching products or services that may be provided by one or more entities, such as companies or other organizations, to the requirements for products or services, such as may be associated with one or more entities, such as consumers. Such embodiments are intended to be within the scope of the present invention.

While the embodiments have been described with reference to examples, those skilled in the art will be able to make various modifications to the described embodiments without departing from the scope of the claimed embodiments.

Although the invention has been described in terms of the embodiments disclosed herein, those skilled in the art will appreciate many modifications that may be made without departing from the true spirit and scope of the invention. All such modifications are intended to be included within the scope of the claims appended hereto.

Thus, specific systems and methods of to identify, aggregate, navigate, validate, recommend, and broker relevant experience and team member capabilities for proposals have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A non-transitory computer readable medium including code that is executed by a computer system comprising one or more processors, a main memory, a secondary storage, a communications bus, one or more input or output devices, and a network interface to perform a method of managing relevance of a plurality of request for proposal (RFP) documents with respect to a plurality of project description (PD) documents, said plurality of RFP documents stored in a data store, the method comprising:

receiving using at least one of said input devices, said communications bus, or said network interface a PD document;

creating using said one or more processors a PD-document decomposition by decomposing said PD document into PD segments;

establishing using said one or more processors hierarchical relationships for said PD-document decomposition comprising contains-as-a-segment relationships, is-a-segment-of relationships, or both said relationships between said PD document and said PD segments;

determining using said one or more processors an RFP-document-to-PD-segment relevance for an RFP document from said plurality of RFP documents and said PD segments using document similarity processing and a metric, wherein said determining said RFP-document-to-PD-segment relevance comprises creating a relevance matrix $R_1$ of dimensions 1 by M where M is a number of said PD segments, and populating each element $R_1[1, m]$ of said relevance matrix $R_1$ with a relevance value produced by said document similarity processing and said metric that represents a similarity of said RFP document to a corresponding PD segment m of said PD segments;

aggregating using said one or more processors said RFP-document-to-PD-segment relevance by said hierarchical relationships for said PD-document decomposition to produce an RFP-to-PD relevance, wherein said aggregating comprises performing a summation by said dimension M of said element $R_1[1, m]$ relevance values of said relevance matrix $R_1$; and transmitting using at least one of said output devices, said communications bus, or said network interface said RFP-to-PD relevance, said RFP-document-to-PD-segment relevance, or both said relevances to an originator of said PD document.

2. The computer readable medium of claim 1, wherein determining the RFP-document-to-PD-segment relevance further comprises:

creating using said one or more processors an RFP-document decomposition by decomposing said RFP document into RFP segments;

establishing using said one or more processors hierarchical relationships for said RFP-document decomposition comprising contains-as-a-segment relationships, is-a-segment-of relationships, or both said relationships between said RFP document and said RFP segments;

determining using said one or more processors an RFP-segment-to-PD-segment relevance for an PD segment of said PD-document decomposition and an RFP segment of said RFP-document decomposition using said document similarity processing and said metric, wherein said determining said RFP-segment-to-PD-segment relevance comprises creating a second relevance matrix $R_2$ of dimensions N by M where N is a number of said RFP segments in said RFP-document decomposition and M is the number of said PD segments, and populating each element $R_2[n, m]$ of said relevance matrix $R_2$ with a relevance value produced by said document similarity processing and said metric that represents a similarity of an RFP segment n of said RFP segments and said PD segment m of said PD segments;

aggregating using said one or more processors said RFP-segment-to-PD-segment relevance of said RFP document by said hierarchical relationships for said RFP-document decomposition to produce said RFP-document-to-PD-segment relevance, wherein said aggregating said RFP-segment-to-PD-segment relevance comprises performing a summation by said dimension N of said element $R_2[n, m]$ relevance values of said relevance matrix $R_2$ to produce said relevance matrix $R_1$; and transmitting using at least one of said output devices, said communications bus, or said network interface said RFP-document-to-PD-segment relevance to said originator of said PD document.

3. The computer readable medium of claim 2, wherein determining the RFP-segment-to-PD-segment relevance further comprises:

determining using said one or more processors said relevance using said document similarity processing, said metric, and a threshold metric; and using said one or more processors and said threshold metric such that when said RFP-segment-to-PD-segment relevance falls below a level of said threshold metric, said RFP-segment-to-PD-PD relevance is considered to indicate an absence of similarity.

4. The computer readable medium of claim 2, wherein aggregating the RFP-segment-to-PD-segment relevance of the RFP document by the RFP-document decomposition to produce the RFP-document-to-PD-segment relevance further comprises:
disaggregating using said one or more processors said aggregated RFP-document-to-PD-segment relevance result into said aggregated result's constituent components and
transmitting using at least one of said output devices, said communications bus, or said network interface said disaggregated RFP-document-to-PD-segment relevance to said originator of said PD document.

5. The computer readable medium of claim 2, wherein aggregating the RFP-segment-to-PD-segment relevance further comprises:
ranking using said RFP-segment-to-PD-segment relevance said RFP segment from said RFP document using said one or more processors.

6. The computer readable medium of claim 1, wherein determining the RFP-document-to-PD-segment relevance further comprises:
determining using said one or more processors said relevance using said document similarity processing, said metric, and a threshold metric; and
using said one or more processors and said threshold metric such that when said RFP-document-to-PD-segment relevance falls below a level of said threshold metric, said RFP-document-to-PD-segment relevance is considered to indicate an absence of similarity.

7. The computer readable medium of claim 1, wherein aggregating the RFP-document-to-PD-segment relevance by the PD-document decomposition to produce the RFP-to-PD relevance further comprises:
disaggregating using said one or more processors said aggregated RFP-to-PD relevance result into said aggregated result's constituent components; and
transmitting using at least one of said output devices, said communications bus, or said network interface said disaggregated RFP-to-PD relevance to said originator of said PD document.

8. The computer readable medium of claim 1, wherein managing the relevance of the plurality of RFP documents with respect to the plurality of PD documents further comprises:
associating using said one or more processors an attribute with one or more documents comprising said plurality of RFP documents; and
using said one or more processors and said attribute to filter a document from said plurality using said one or more processors to select for consideration or eliminate said document from consideration when managing said relevance.

9. The computer readable medium of claim 1, wherein managing the relevance of the plurality of RFP documents with respect to the plurality of PD documents further comprises:
associating using said one or more processors an ownership attribute with one or more documents comprising said plurality of RFP documents;
aggregating using said one or more processors said RFP-to-PD relevance by said ownership attribute to produce an aggregated RFP-owner-to-PD relevance, wherein said aggregating said RFP-to-PD relevance by said ownership attribute comprises performing a summation of RFP-to-PD relevance values of said one-or-more documents having said ownership attribute; and
transmitting using at least one of said output devices, said communications bus, or said network interface said aggregated RFP-owner-to-PD relevance to said originator of said PD document.

10. The computer readable medium of claim 9, wherein aggregating the RFP-to-PD relevance by the ownership attribute to produce the aggregated RFP-owner-to-PD relevance further comprises:
disaggregating using said one or more processors said aggregated RFP-owner-to-PD relevance result into said aggregated result's constituent components; and
transmitting using at least one of said output devices, said communications bus, or said network interface said disaggregated RFP-owner-to-PD relevance to said originator of said PD document.

11. The computer readable medium of claim 1, wherein aggregating the RFP-document-to-PD-segment relevance by said hierarchical PD-document relationships to produce the RFP-to-PD relevance further comprises:
ranking using said one or more processors said RFP document from said plurality of RFP documents by at least one of: said aggregated RFP-to-PD relevance, or said RFP-document-to-PD-segment relevance.

12. The computer readable medium of claim 1, wherein managing the relevance of the plurality of RFP documents with respect to a plurality of PD documents further comprises:
associating using said one or more processors an attribute with one or more documents comprising said plurality of RFP documents, said plurality of PD documents, or both said pluralities, wherein said attribute denotes ownership of said one or more documents by a party; and
communicating using said one or more processors and at least one of said input devices, said output devices, said communications bus, or said network interface information relating to said relevance between a first party associated with a document from said plurality of RFP documents and a second party associated with a document from said plurality of PD documents.

13. The computer readable medium of claim 12, wherein communicating information relating to the relevance between said first party and said second party further comprises:
brokering using said one or more processors of said information relating to said relevance between said first party and said second party.

14. The computer readable medium of claim 1, wherein aggregating the RFP-document-to-PD-segment relevance by the PD-document decomposition to produce the RFP-to-PD relevance further comprises:
receiving using at least one of said input devices, said communications bus, or said network interface a weights matrix; and
using said weights matrix to proportionally scale using said one or more processors a relative importance of an individual RFP-document-to-PD-segment relevance value when aggregating said RFP-document-to-PD-segment relevance.

15. The computer readable medium of claim 1, wherein managing the relevance of the plurality of RFP documents with respect to a plurality of PD documents further comprises:
   presenting using at least one of said output devices, said communications bus, or said network interface to said originator of said PD via a user interface said RFP-document-to-PD-segment relevance, wherein a positive relevance of one or more elements of said RFP-document-to-PD-segment relevance is indicated by presenting via said user interface said positive relevance using a visual symbol having at least one different size, color, or shape than an element of said RFP-document-to-PD-segment relevance having an absence of relevance.

16. The computer readable medium of claim 1, wherein receiving the PD document further comprises:
   receiving using at least one of said input devices, said communications bus, or said network interface said PD document via a user interface that is presented to said originator of said PD document, wherein said user interface is used to receive from said originator a descriptive text of one or more sentences or paragraphs to be matched.

17. The computer readable medium of claim 16, wherein aggregating the RFP-document-to-PD-segment relevance by the PD-document decomposition to produce the RFP-to-PD relevance further comprises:
   disaggregating using said one or more processors said aggregated RFP-to-PD relevance result into said aggregated result's constituent components; and
   transmitting using at least one of said output devices, said communications bus, or said network interface said disaggregated RFP-to-PD relevance to said originator of said PD document.

18. The computer readable medium of claim 16, wherein aggregating the RFP-document-to-PD-segment relevance by said hierarchical PD-document relationships to produce the RFP-to-PD relevance further comprises:
   ranking using said one or more processors said RFP document from said plurality of RFP documents by at least one of: said aggregated RFP-to-PD relevance, or said RFP-document-to-PD-segment relevance.

19. The computer readable medium of claim 16, wherein managing the relevance of the plurality of RFP documents with respect to a plurality of PD documents further comprises:
   associating using said one or more processors an attribute with one or more documents comprising said plurality of RFP documents, said plurality of PD documents, or both said pluralities, wherein said attribute denotes ownership of said one or more documents by a party; and
   communicating using said one or more processors and at least one of said input devices, said output devices, said communications bus, or said network interface information relating to said relevance between a first party associated with a document from said plurality of RFP documents and a second party associated with a document from said plurality of PD documents.

20. The computer readable medium of claim 16, wherein managing the relevance of the plurality of RFP documents with respect to a plurality of PD documents further comprises:
   presenting using at least one of said output devices, said communications bus, or said network interface to said originator of said PD via a user interface said RFP-document-to-PD-segment relevance, wherein a positive relevance of one or more elements of said RFP-document-to-PD-segment relevance is indicated by presenting via said user interface said positive relevance using a visual symbol having at least one different size, color, or shape than an element of said RFP-document-to-PD-segment relevance having an absence of relevance.

* * * * *